(12) United States Patent
Sawa et al.

(10) Patent No.: US 9,860,439 B2
(45) Date of Patent: Jan. 2, 2018

(54) DIRECTIONALITY CONTROL SYSTEM, CALIBRATION METHOD, HORIZONTAL DEVIATION ANGLE COMPUTATION METHOD, AND DIRECTIONALITY CONTROL METHOD

(71) Applicant: PANASONIC INTELLECTUAL PROPERTY MANAGEMENT CO., LTD., Osaka (JP)

(72) Inventors: Hirotaka Sawa, Tokyo (JP); Toshimichi Tokuda, Fukuoka (JP); Shinichi Shigenaga, Tokyo (JP); Shuichi Watanabe, Fukuoka (JP); Shojiro Matsuo, Fukuoka (JP); Takashi Hirabara, Fukuoka (JP); Tadashi Maki, Fukuoka (JP); Hisashi Tsuji, Fukuoka (JP); Teppei Fukuda, Fukuoka (JP); Akitoshi Izumi, Fukuoka (JP); Shintaro Yoshikuni, Fukuoka (JP); Hiroyuki Matsumoto, Fukuoka (JP); Kazunori Hayashi, Fukuoka (JP); Kosuke Shinozaki, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 14/767,411

(22) PCT Filed: Feb. 14, 2014

(86) PCT No.: PCT/JP2014/000775
§ 371 (c)(1),
(2) Date: Oct. 1, 2015

(87) PCT Pub. No.: WO2014/125835
PCT Pub. Date: Aug. 21, 2014

(65) Prior Publication Data
US 2016/0142620 A1 May 19, 2016

(30) Foreign Application Priority Data

Feb. 15, 2013 (JP) .................................. 2013-028402
Jun. 6, 2013 (JP) .................................. 2013-119850
(Continued)

(51) Int. Cl.
H04N 7/18 (2006.01)
H04N 5/77 (2006.01)
(Continued)

(52) U.S. Cl.
CPC ......... *H04N 5/23216* (2013.01); *G01S 3/785* (2013.01); *G01S 3/7864* (2013.01);
(Continued)

(58) Field of Classification Search
None
See application file for complete search history.

(56) References Cited

U.S. PATENT DOCUMENTS 5,686,957 A * 11/1997 Baker .................. G02B 3/0087
348/14.07
2004/0001137 A1* 1/2004 Cutler .................. H04N 5/2259
348/14.08
(Continued)

FOREIGN PATENT DOCUMENTS

EP 1526756 4/2005
JP 08-286680 11/1996
(Continued)

OTHER PUBLICATIONS

Search Report issued in European Patent Office (EPO) Patent Application No. 14751319.6, dated Dec. 20, 2016.
(Continued)

*Primary Examiner* — Hung Dang
(74) *Attorney, Agent, or Firm* — Greenblum & Bernstein, P.L.C.

(57) ABSTRACT

Sound collection directionality is formed toward a location corresponding to a position designated in a video of a predetermined region which is imaged by a camera apparatus with a microphone array apparatus as a reference, and audio data is collected with high accuracy. In a directionality control system (10), a signal processing unit (33) derives a sound collection direction ($\theta_{MAh}, \theta_{MAv}$) which is directed from an installation position of a microphone array apparatus (2) toward a sound position corresponding to a position designated in video data on a screen of the display device (36) in response to a user's designation of any position in the video data displayed on the screen. The signal processing unit (33) forms sound collection directionality of audio data in the derived sound collection direction ($\theta_{MAh}, \theta_{MAv}$).

1 Claim, 91 Drawing Sheets

(30) Foreign Application Priority Data

Jun. 20, 2013 (JP) ................................ 2013-129964
Jul. 25, 2013 (JP) ................................ 2013-154867
Oct. 18, 2013 (JP) ................................ 2013-217707

(51) Int. Cl.

| | | |
|---|---|---|
| *H04N 9/80* | (2006.01) | |
| *H04N 5/232* | (2006.01) | |
| *G01S 3/785* | (2006.01) | |
| *H04R 1/04* | (2006.01) | |
| *H04R 1/40* | (2006.01) | |
| *G01S 3/786* | (2006.01) | |
| *H04S 7/00* | (2006.01) | |

(52) U.S. Cl.
CPC ..... *H04N 5/23293* (2013.01); *H04N 5/23296* (2013.01); *H04R 1/04* (2013.01); *H04R 1/406* (2013.01); *H04S 7/00* (2013.01); *H04R 2201/401* (2013.01); *H04R 2430/23* (2013.01); *H04S 2420/01* (2013.01)

(56) References Cited

U.S. PATENT DOCUMENTS

| | | |
|---|---|---|
| 2005/0140810 A1 | 6/2005 | Ozawa |
| 2010/0123785 A1 | 5/2010 | Chen et al. |
| 2010/0254543 A1 | 10/2010 | Kjolerbakken |
| 2012/0076304 A1 | 3/2012 | Suzuki |
| 2015/0281833 A1 | 10/2015 | Shigenaga et al. |

FOREIGN PATENT DOCUMENTS

| | | |
|---|---|---|
| JP | 10-51889 | 2/1998 |
| JP | 2006-222618 | 8/2006 |
| JP | 2007-214753 | 8/2007 |
| JP | 2008-271157 | 11/2008 |
| JP | 2010-213091 | 9/2010 |
| JP | 2012-186551 | 9/2012 |

OTHER PUBLICATIONS

Search Report and Written Opinion in PCT/JP2014/000775 dated May 13, 2014.

\* cited by examiner

O: SCREEN CENTRAL POINT (REFERENCE POINT) OF DISPLAY DEVICE
A': DESIGNATED POSITION (CENTRAL POINT OF SOUND COLLECTION REGION)

O: REFERENCE POINT
A': CENTRAL POINT OF SOUND COLLECTION REGION

FIG. 20
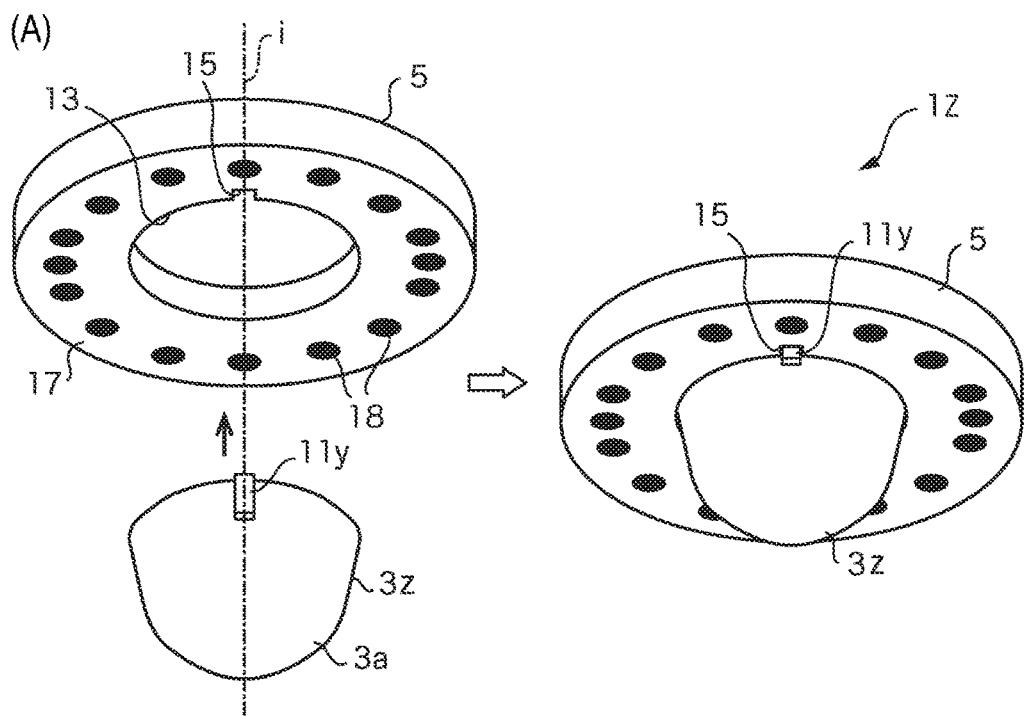
(A)
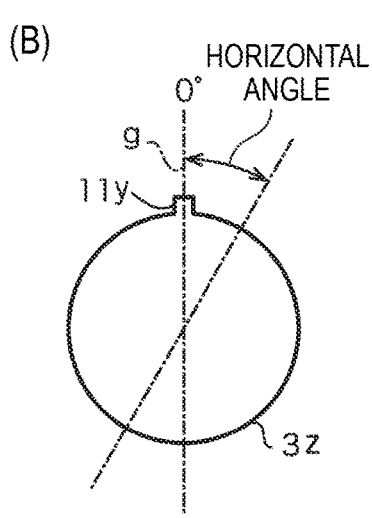
(B)
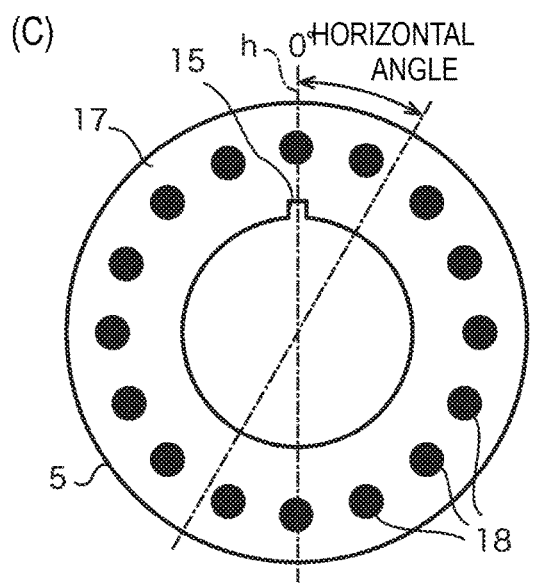
(C)

FIG. 21
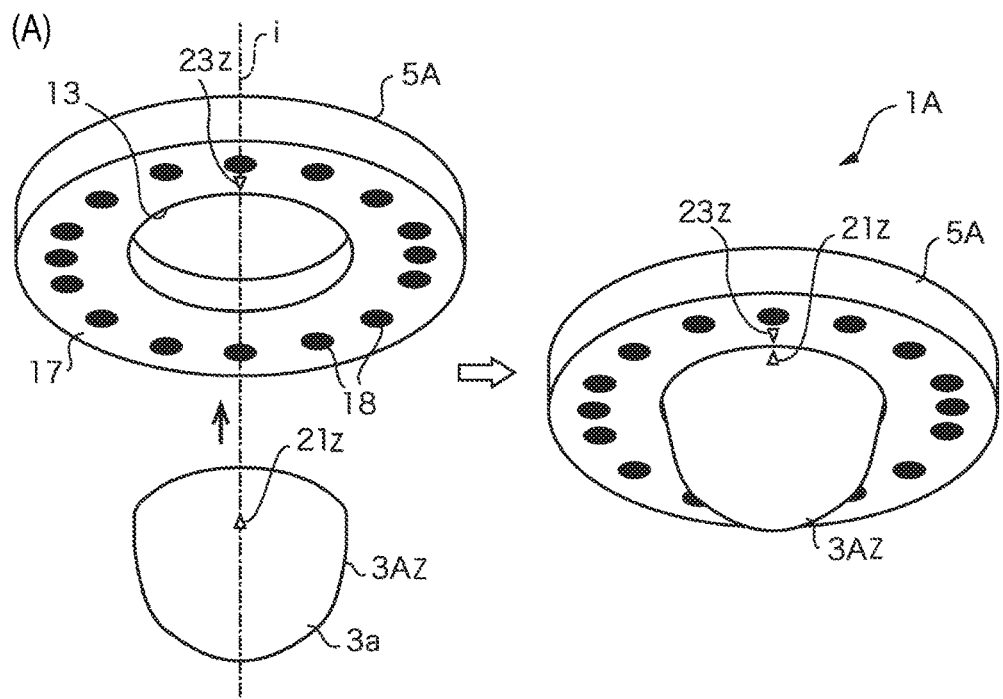
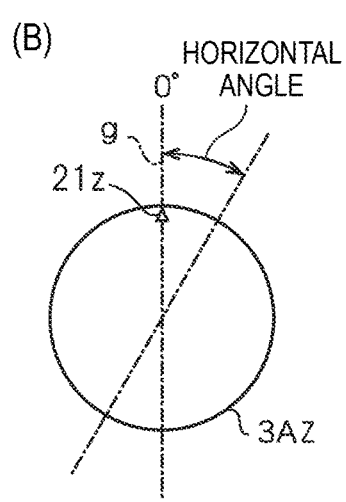
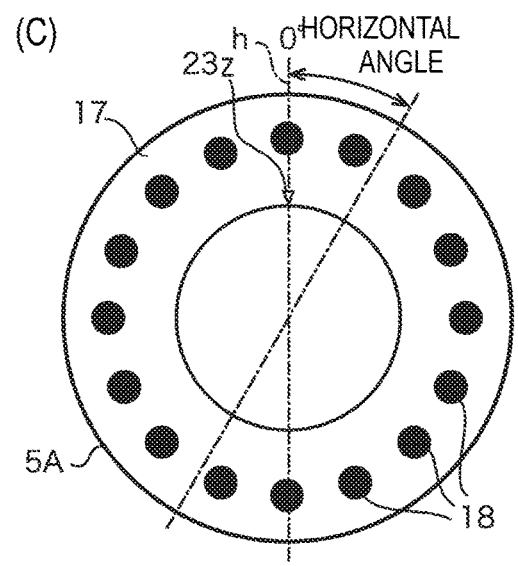

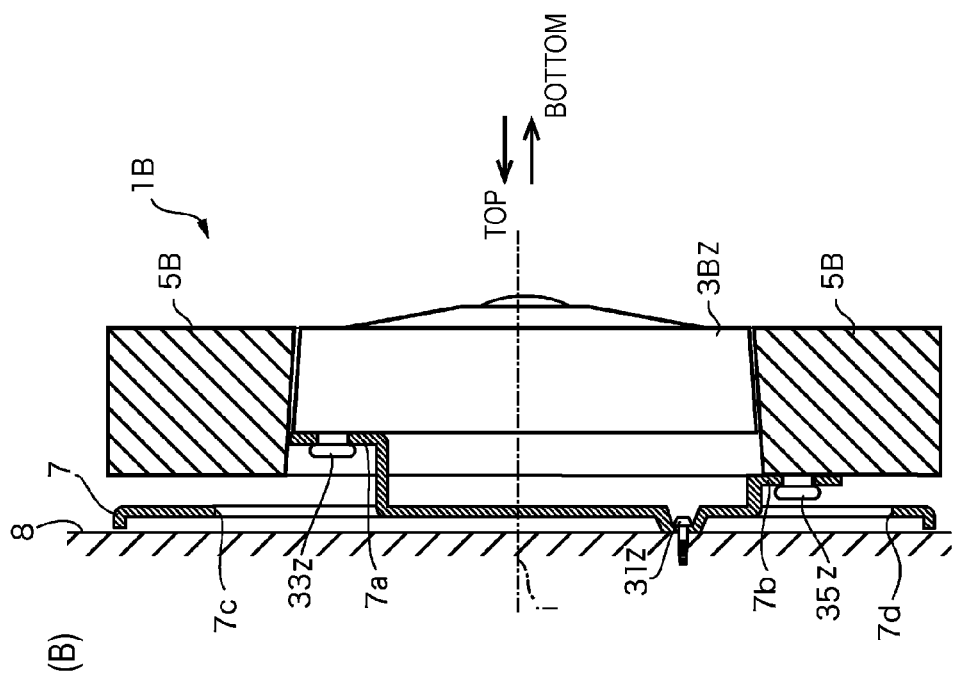
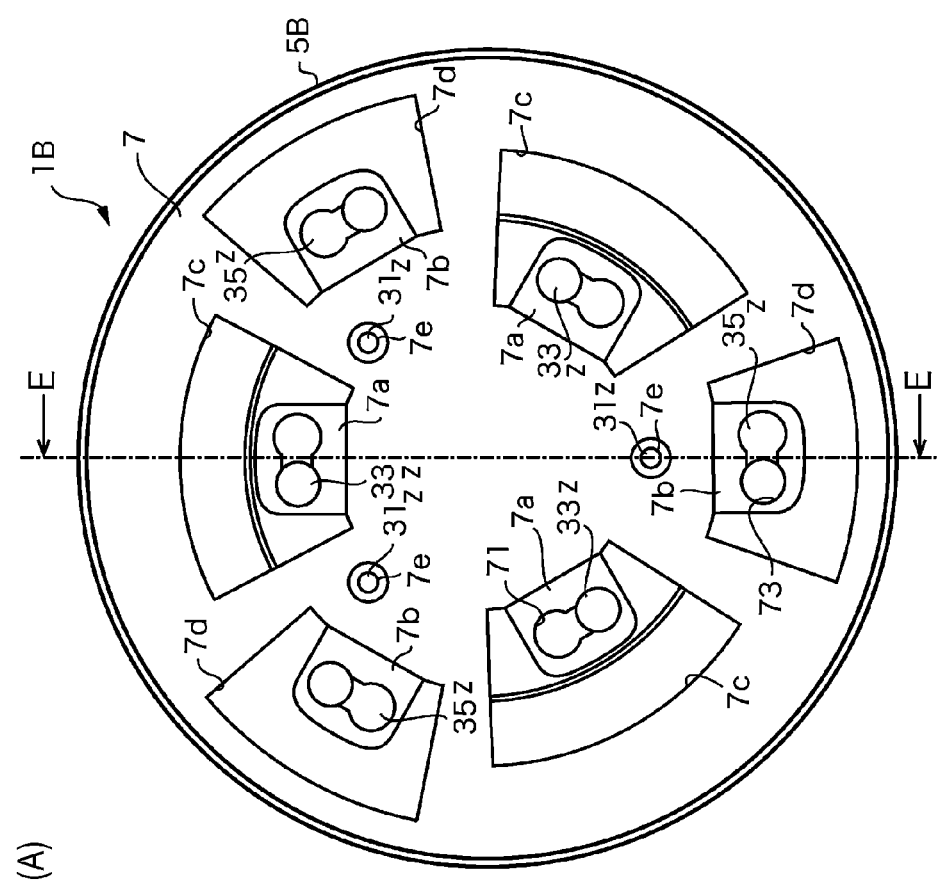
FIG. 23

FIG. 25
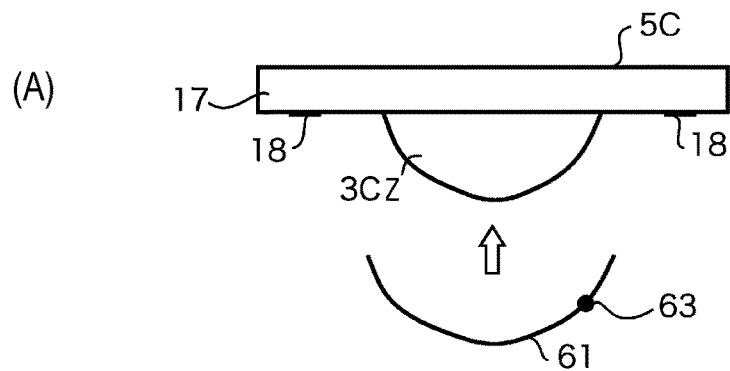
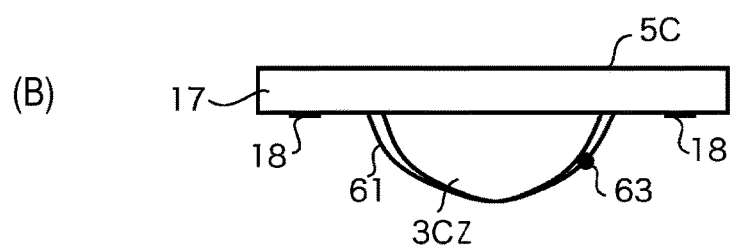
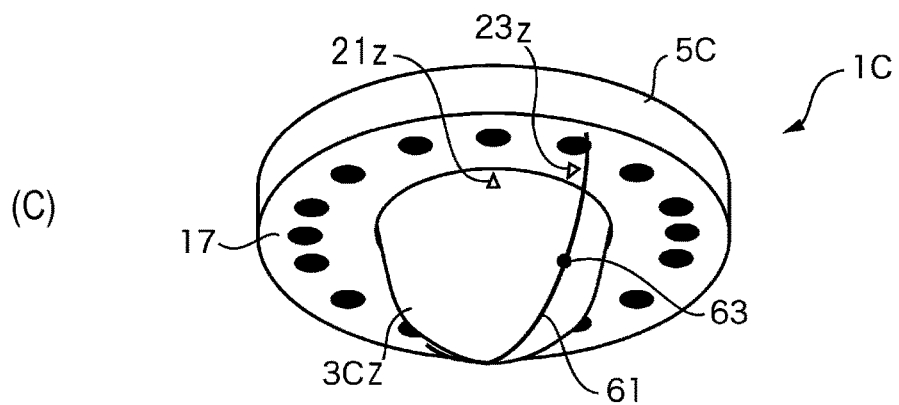

FIG. 28
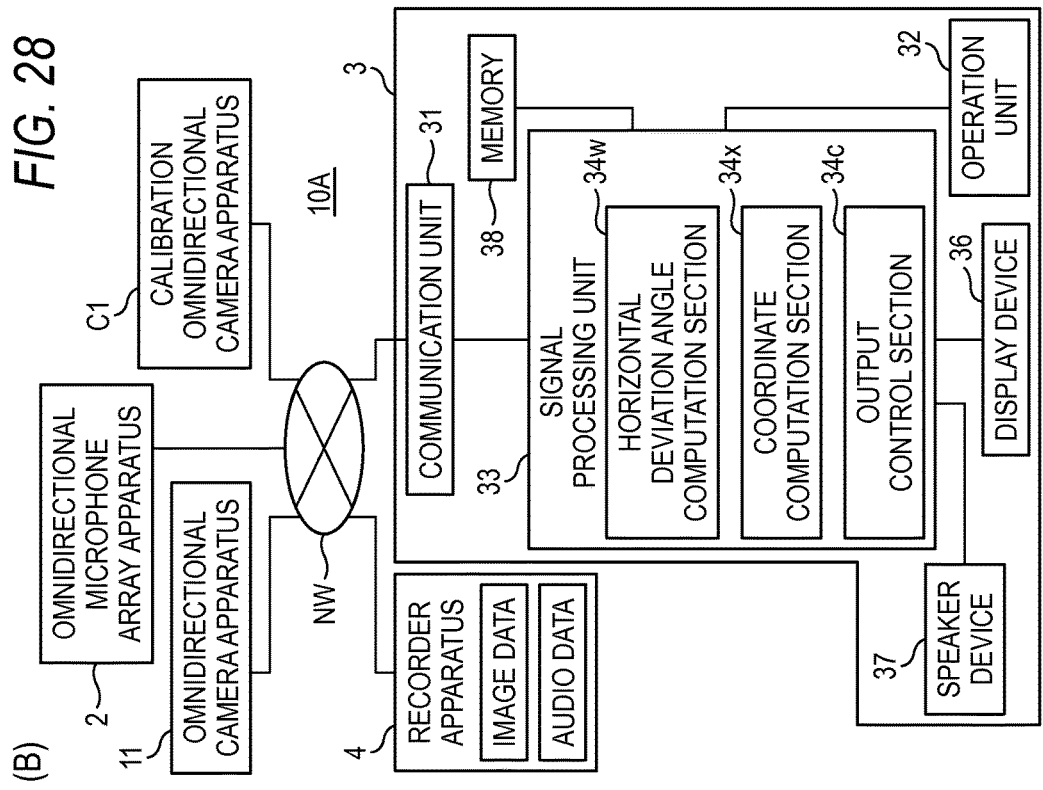
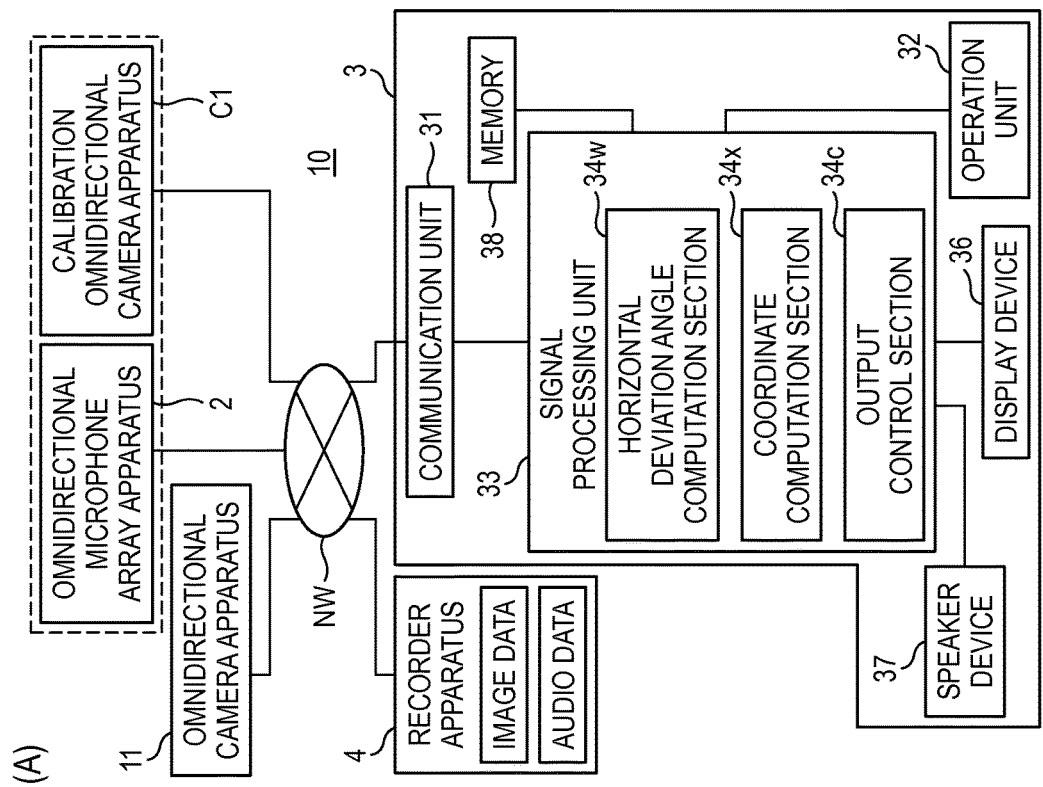

FIG. 39
(B)
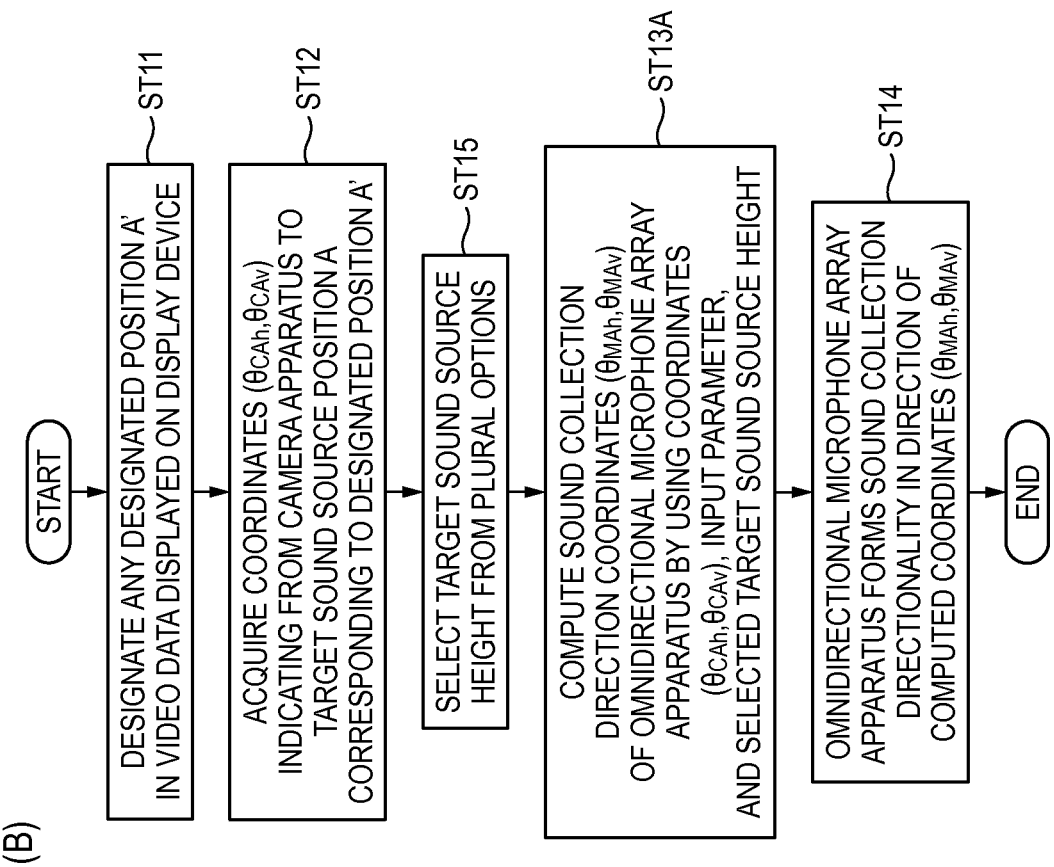
(A)
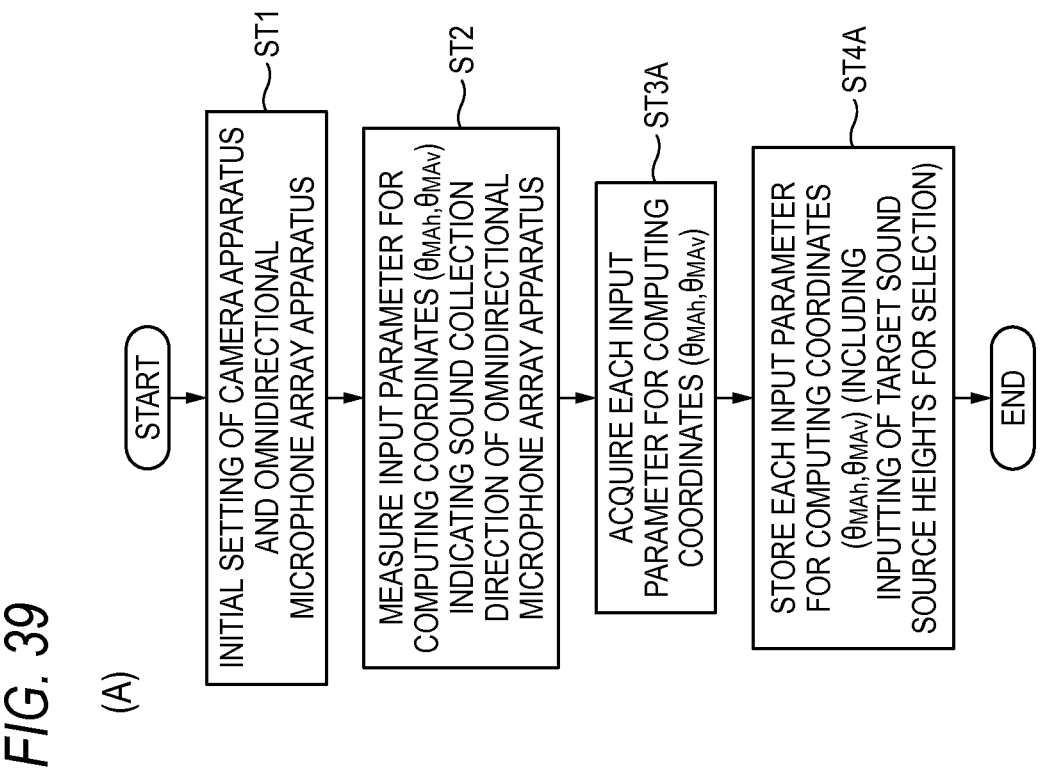

FIG. 41
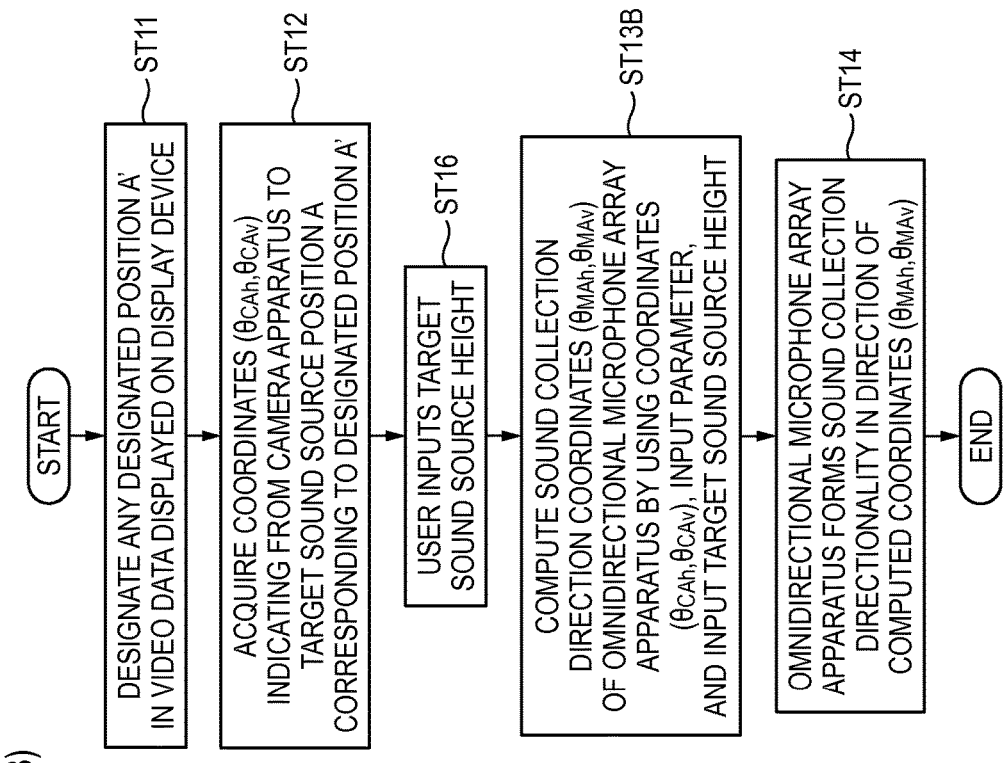
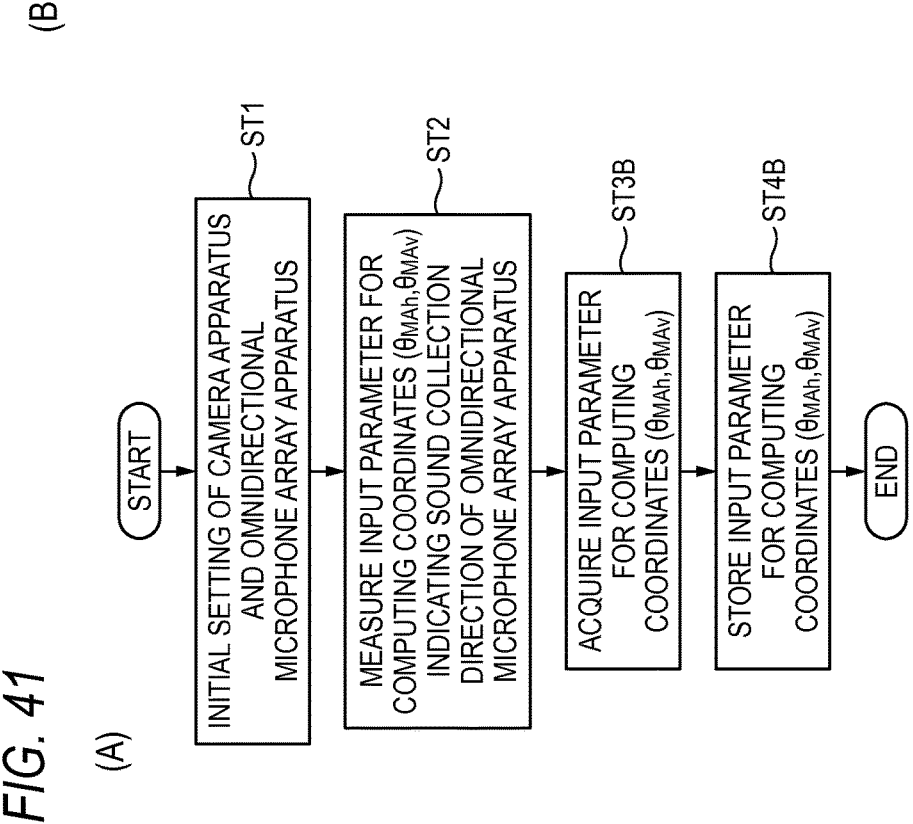

FIG. 58

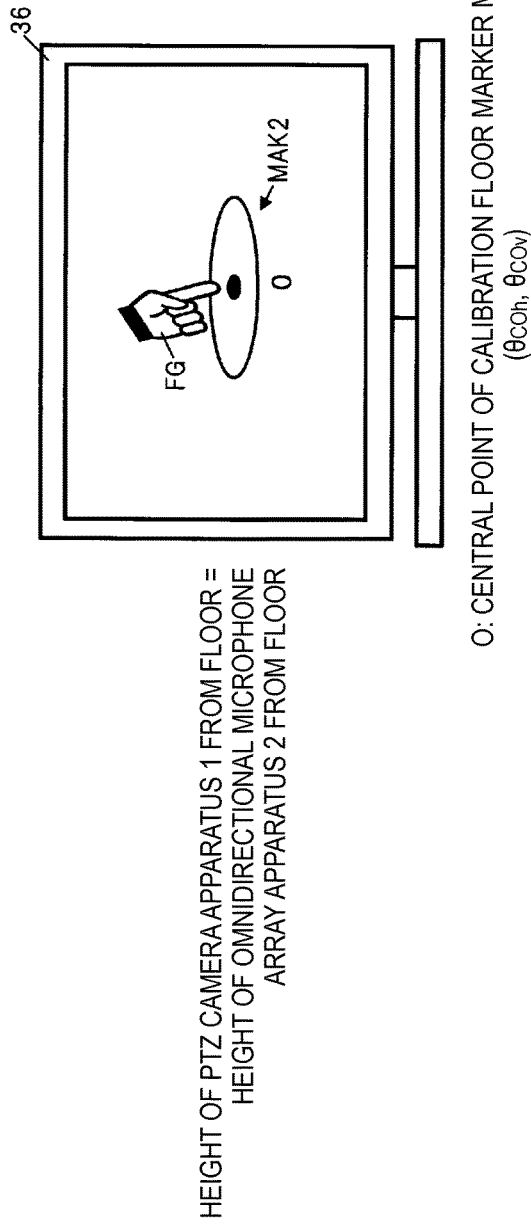

HEIGHT OF PTZ CAMERA APPARATUS 1 FROM FLOOR = HEIGHT OF OMNIDIRECTIONAL MICROPHONE ARRAY APPARATUS 2 FROM FLOOR

O: CENTRAL POINT OF CALIBRATION FLOOR MARKER MAK2 ($\theta_{COh}$, $\theta_{COv}$)

· CALIBRATION FLOOR MARKER MAK2
  → INSTALLED ON FLOOR DIRECTLY UNDER OMNIDIRECTIONAL MICROPHONE ARRAY APPARATUS 2

· DESIGNATE SINGLE POINT INCLUDING CENTRAL POINT O OF CALIBRATION FLOOR MARKER MAK2
  → HEIGHT $H_M$ OF OMNIDIRECTIONAL MICROPHONE ARRAY APPARATUS 2, AND DISTANCE $L_{CMh}$ BETWEEN PTZ CAMERA APPARATUS 1 AND OMNIDIRECTIONAL MICROPHONE ARRAY APPARATUS 2 CAN BE COMPUTED

· HEIGHT OF TARGET SOUND SOURCE POSITION FROM FLOOR
  → CAN BE ARBITRARILY DESIGNATED BY USER

FIG. 60

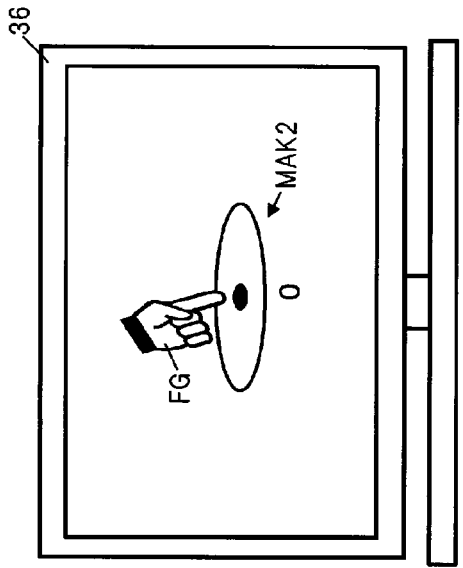

HEIGHT OF PTZ CAMERA APPARATUS 1 FROM FLOOR = HEIGHT OF OMNIDIRECTIONAL MICROPHONE ARRAY APPARATUS 2 FROM FLOOR

O: CENTRAL POINT OF CALIBRATION FLOOR MARKER MAK2
O': END POINT ON CIRCUMFERENCE OF CALIBRATION FLOOR MARKER MAK2
($\theta_{COh}$, $\theta_{COv}$)
($\theta_{CO'h}$, $\theta_{CO'v}$)

· CALIBRATION FLOOR MARKER MAK2
  → INSTALLED ON FLOOR DIRECTLY UNDER OMNIDIRECTIONAL MICROPHONE ARRAY APPARATUS 2

· DESIGNATE TWO POINTS INCLUDING CENTRAL POINT O AND END POINT O' ON CIRCUMFERENCE OF CALIBRATION FLOOR MARKER MAK2
  → HEIGHT $H_M$ OF OMNIDIRECTIONAL MICROPHONE ARRAY APPARATUS 2, AND DISTANCE $L_{CMh}$ BETWEEN PTZ CAMERA APPARATUS 1 AND OMNIDIRECTIONAL MICROPHONE ARRAY APPARATUS 2 CAN BE COMPUTED

· HEIGHT OF TARGET SOUND SOURCE POSITION FROM FLOOR
  → CAN BE ARBITRARILY DESIGNATED BY USER

FIG. 62

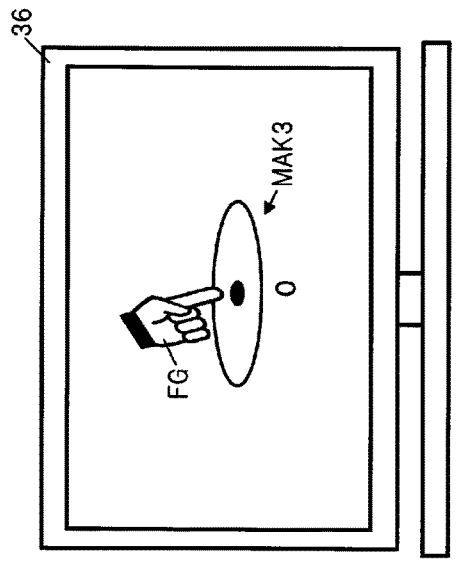

HEIGHT OF PTZ CAMERA APPARATUS 1 FROM FLOOR =
HEIGHT OF OMNIDIRECTIONAL MICROPHONE
ARRAY APPARATUS 2 FROM FLOOR

O: CENTRAL POINT OF CALIBRATION MARKER MAK3
($\theta_{COh}$, $\theta_{COv}$)

· CALIBRATION MARKER MAK3
  → INSTALLED AT POSITION HAVING PREDETERMINED HEIGHT FROM FLOOR DIRECTLY UNDER OMNIDIRECTIONAL MICROPHONE ARRAY APPARATUS 2

· DESIGNATE SINGLE POINT INCLUDING CENTRAL POINT O OF CALIBRATION MARKER MAK3
  → DISTANCE $L_{MOv}$ FROM CALIBRATION MARKER MAK3 TO OMNIDIRECTIONAL MICROPHONE ARRAY APPARATUS 2, DISTANCE $L_{CMh}$ BETWEEN PTZ CAMERA APPARATUS 1 AND OMNIDIRECTIONAL MICROPHONE ARRAY APPARATUS 2 CAN BE COMPUTED

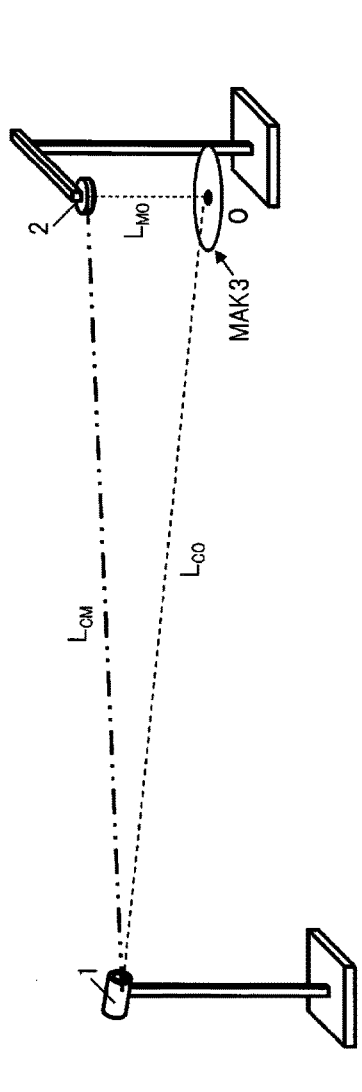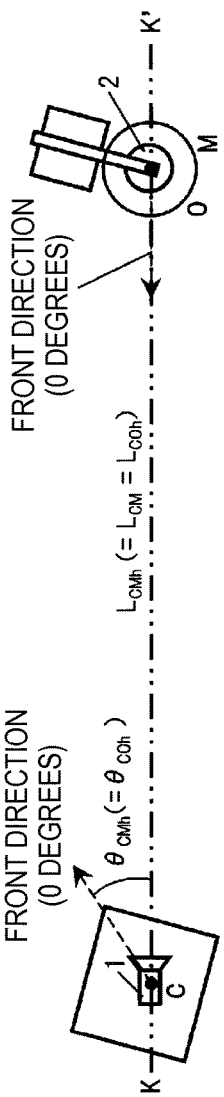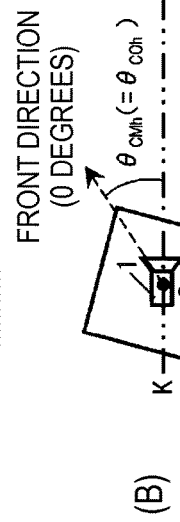
FIG. 63

FIG. 64

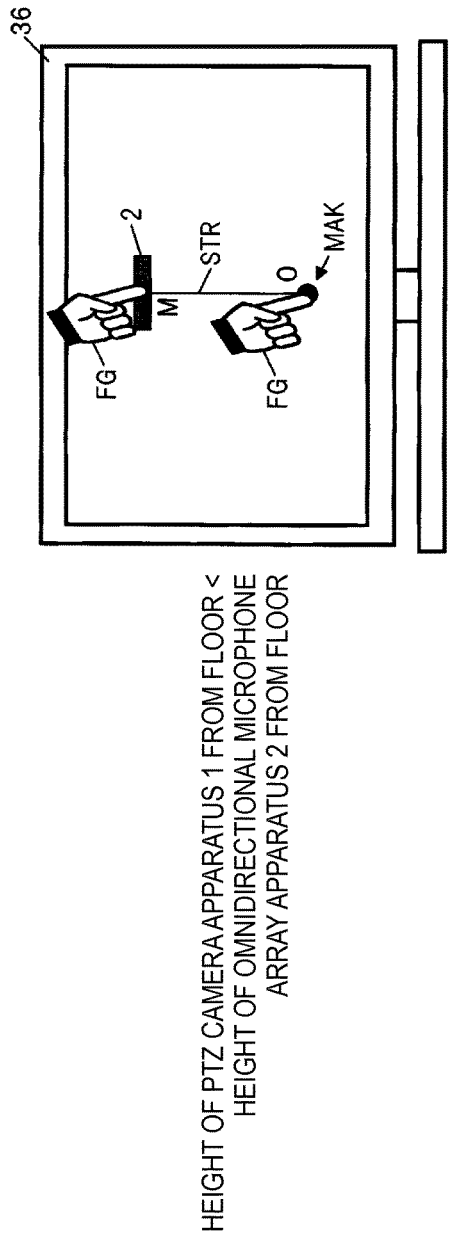

HEIGHT OF PTZ CAMERA APPARATUS 1 FROM FLOOR <
HEIGHT OF OMNIDIRECTIONAL MICROPHONE
ARRAY APPARATUS 2 FROM FLOOR

O: CENTRAL POINT OF CALIBRATION MARKER MAK3
M: CENTRAL POINT OF OMNIDIRECTIONAL MICROPHONE ARRAY APPARATUS 2
O($\theta_{COh}$, $\theta_{COv}$)
M($\theta_{CMh}$, $\theta_{CMv}$)

- CALIBRATION MARKER MAK
  → SUSPENDED DIRECTLY UNDER OMNIDIRECTIONAL MICROPHONE ARRAY APPARATUS 2
- OMNIDIRECTIONAL MICROPHONE ARRAY APPARATUS 2
  → INSTALLED SO AS TO BE LOCATED WITHIN IMAGING VIEWING ANGLE OF PTZ CAMERA APPARATUS 1
- DESIGNATE SINGLE POINT INCLUDING CENTRAL POINT O OF CALIBRATION MARKER MAK
  → DISTANCE $L_{MOv}$ (=$L_{MOv}$) FROM OMNIDIRECTIONAL MICROPHONE ARRAY APPARATUS 2 TO
  CALIBRATION MARKER MAK, AND HORIZONTAL DIRECTION DISTANCE $L_{CMh}$ BETWEEN PTZ CAMERA
  APPARATUS 1 AND OMNIDIRECTIONAL MICROPHONE ARRAY APPARATUS 2 CAN BE COMPUTED

FIG. 68

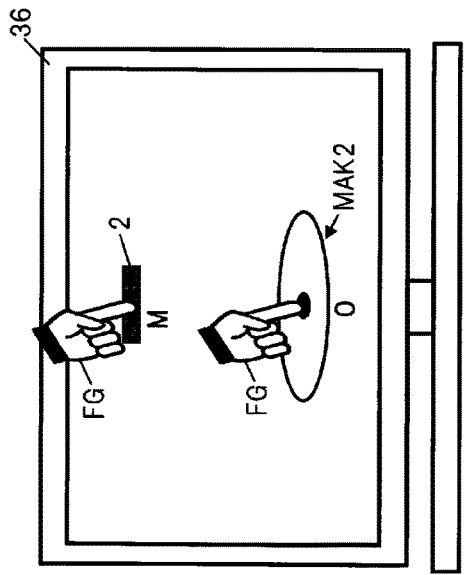

HEIGHT OF PTZ CAMERA APPARATUS 1 FROM FLOOR <
HEIGHT OF OMNIDIRECTIONAL MICROPHONE
ARRAY APPARATUS 2 FROM FLOOR

O: CENTRAL POINT OF CALIBRATION FLOOR MARKER MAK2
M: CENTRAL POINT OF OMNIDIRECTIONAL MICROPHONE ARRAY APPARATUS 2

$O(\theta_{COh}, \theta_{COv})$
$M(\theta_{CMh}, \theta_{CMv})$

- CALIBRATION FLOOR MARKER MAK2
  → INSTALLED ON FLOOR DIRECTLY UNDER OMNIDIRECTIONAL MICROPHONE ARRAY APPARATUS 2
- OMNIDIRECTIONAL MICROPHONE ARRAY APPARATUS 2
  → INSTALLED SO AS TO BE LOCATED WITHIN IMAGING VIEWING ANGLE OF PTZ CAMERA APPARATUS 1
- DESIGNATE TWO POINTS INCLUDING CENTRAL POINT O OF CALIBRATION FLOOR MARKER MAK2 AND OMNIDIRECTIONAL MICROPHONE ARRAY APPARATUS 2
  → HEIGHT $H_M$ OF OMNIDIRECTIONAL MICROPHONE ARRAY APPARATUS 2 FROM FLOOR, HEIGHT $H_C$ OF PTZ CAMERA APPARATUS 1 FROM FLOOR, AND HORIZONTAL DIRECTION DISTANCE $L_{CMh}$ BETWEEN PTZ CAMERA APPARATUS 1 AND OMNIDIRECTIONAL MICROPHONE ARRAY APPARATUS 2 CAN BE COMPUTED
- HEIGHT OF TARGET SOUND SOURCE POSITION FROM FLOOR
  → CAN BE ARBITRARILY DESIGNATED BY USER

FIG. 72

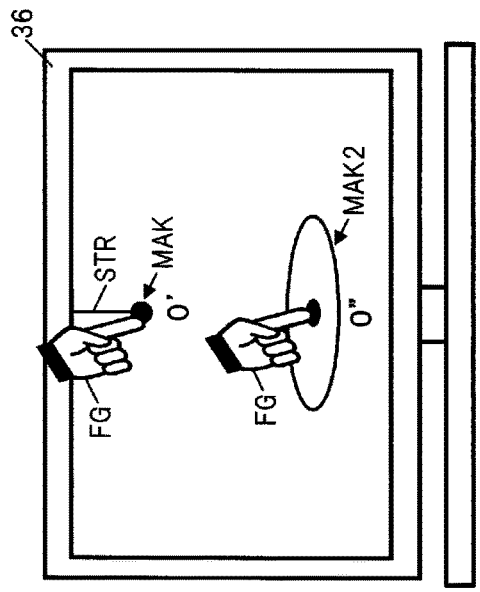

HEIGHT OF PTZ CAMERA APPARATUS 1 FROM FLOOR <
HEIGHT OF OMNIDIRECTIONAL MICROPHONE ARRAY
APPARATUS 2 FROM FLOOR

O': CENTRAL POINT OF CALIBRATION MARKER MAK
O": CENTRAL POINT OF CALIBRATION FLOOR MARKER MAK2

O'($\theta_{COh}$, $\theta_{COv}$)
O"($\theta_{CMh}$", $\theta_{CMv}$")

· CALIBRATION MARKER MAK/CALIBRATION FLOOR MARKER MAK2
  → SUSPENDED DIRECTLY UNDER OMNIDIRECTIONAL MICROPHONE ARRAY APPARATUS 2/
     INSTALLED ON FLOOR DIRECTLY UNDER OMNIDIRECTIONAL MICROPHONE ARRAY APPARATUS 2

· OMNIDIRECTIONAL MICROPHONE ARRAY APPARATUS 2
  → INSTALLED SO AS NOT TO BE LOCATED WITHIN IMAGING VIEWING ANGLE OF PTZ CAMERA APPARATUS 1

· DESIGNATE TWO POINTS INCLUDING CENTRAL POINTS O' AND O" OF CALIBRATION MARKER MAK AND
  CALIBRATION FLOOR MARKER MAK2
  → HEIGHT $H_M$ OF OMNIDIRECTIONAL MICROPHONE ARRAY APPARATUS 2 FROM FLOOR, HEIGHT $H_C$ OF
     PTZ CAMERA APPARATUS 1 FROM FLOOR, AND HORIZONTAL DIRECTION DISTANCE $L_{CMh}$ BETWEEN PTZ
     CAMERA APPARATUS 1 AND OMNIDIRECTIONAL MICROPHONE ARRAY APPARATUS 2 CAN BE COMPUTED

· HEIGHT OF TARGET SOUND SOURCE POSITION FROM FLOOR
  → CAN BE ARBITRARILY DESIGNATED BY USER

FIG. 74

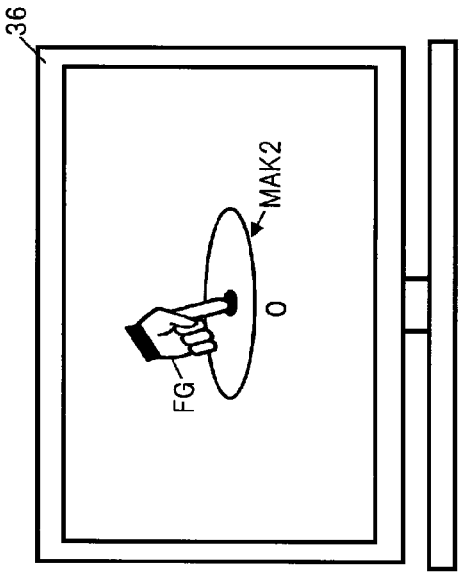

HEIGHT OF PTZ CAMERA APPARATUS 1 FROM FLOOR <
HEIGHT OF OMNIDIRECTIONAL MICROPHONE
ARRAY APPARATUS 2 FROM FLOOR

O: CENTRAL POINT OF CALIBRATION FLOOR MARKER MAK2
$O(\theta_{COh}, \theta_{COv})$ · CALIBRATION FLOOR MARKER MAK2
→ INSTALLED ON FLOOR DIRECTLY UNDER OMNIDIRECTIONAL MICROPHONE ARRAY APPARATUS 2

· OMNIDIRECTIONAL MICROPHONE ARRAY APPARATUS 2
→ INSTALLED SO AS NOT TO BE LOCATED WITHIN IMAGING VIEWING ANGLE OF PTZ CAMERA APPARATUS 1

· DESIGNATE SINGLE POINT INCLUDING CENTRAL POINT O OF CALIBRATION FLOOR MARKER MAK2
→ HEIGHT $H_C$ OF PTZ CAMERA APPARATUS 1 FROM FLOOR, AND HORIZONTAL
DIRECTION DISTANCE $L_{CMh}$ BETWEEN PTZ CAMERA APPARATUS 1 AND OMNIDIRECTIONAL
MICROPHONE ARRAY APPARATUS 2 CAN BE COMPUTED

· HEIGHT OF TARGET SOUND SOURCE POSITION FROM FLOOR
→ CAN BE ARBITRARILY DESIGNATED BY USER

FIG. 76

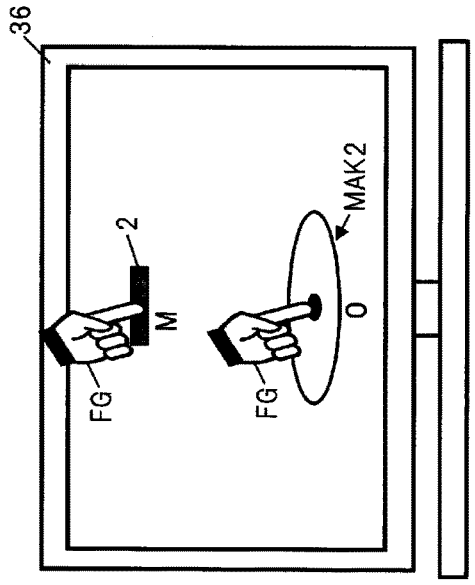

HEIGHT OF PTZ CAMERA APPARATUS 1 FROM FLOOR >
HEIGHT OF OMNIDIRECTIONAL MICROPHONE
ARRAY APPARATUS 2 FROM FLOOR

O: CENTRAL POINT OF CALIBRATION FLOOR MARKER MAK2
M: CENTRAL POINT OF OMNIDIRECTIONAL MICROPHONE ARRAY APPARATUS 2

O($\theta_{COh}$, $\theta_{COv}$)
M($\theta_{CMh}$, $\theta_{CMv}$)

· CALIBRATION FLOOR MARKER MAK2
  → INSTALLED ON FLOOR DIRECTLY UNDER OMNIDIRECTIONAL MICROPHONE ARRAY APPARATUS 2

· OMNIDIRECTIONAL MICROPHONE ARRAY APPARATUS 2
  → INSTALLED SO AS TO BE LOCATED WITHIN IMAGING VIEWING ANGLE OF PTZ CAMERA APPARATUS 1

· DESIGNATE TWO POINTS INCLUDING CENTRAL POINT O OF CALIBRATION FLOOR MARKER MAK2 AND OMNIDIRECTIONAL MICROPHONE ARRAY APPARATUS 2
  → HEIGHT $H_M$ OF OMNIDIRECTIONAL MICROPHONE ARRAY APPARATUS 2 FROM FLOOR, HEIGHT $H_C$ OF PTZ CAMERA APPARATUS 1 FROM FLOOR, AND HORIZONTAL DIRECTION DISTANCE $L_{CMh}$ BETWEEN PTZ CAMERA APPARATUS 1 AND OMNIDIRECTIONAL MICROPHONE ARRAY APPARATUS 2 CAN BE COMPUTED

· HEIGHT OF TARGET SOUND SOURCE POSITION FROM FLOOR
  → CAN BE ARBITRARILY DESIGNATED BY USER

DIRECTIONALITY CONTROL SYSTEM, CALIBRATION METHOD, HORIZONTAL DEVIATION ANGLE COMPUTATION METHOD, AND DIRECTIONALITY CONTROL METHOD

TECHNICAL FIELD

The present invention relates to a directionality control system, a calibration method, a horizontal deviation angle computation method, and a directionality control method, for controlling sound collection directionality of audio data.

BACKGROUND ART

In the related art, in a monitoring system provided at a predetermined position (for example, a ceiling) of a factory, a store (for example, a retail store or a bank), or a public place (for example, a library), a plurality of monitoring cameras (for example, pan-tilt cameras or omnidirectional cameras) are connected to each other via a network, and thus a wide angle of view of video data (including a still image and a moving image; this is also the same for the following description) regarding a predetermined region of a monitoring target are realized.

In addition, since an information amount obtained with the monitoring only using images may possibly be limited, there are increasing demands for a monitoring system in which a microphone array as well as the camera is disposed, and thus audio data is obtained in a direction in which the camera performs imaging.

Here, as the related art for obtaining audio data in the direction in which a camera performs imaging by using the camera and a microphone array, for example, a control system disclosed in Patent Literature 1 is known. The control system disclosed in Patent Literature 1 includes a camera, a microphone array, and a conference terminal which controls operations of the camera and the microphone array.

The control system disclosed in Patent Literature 1 is provided in a conference room which is available to a television conference system, and changes a sound collection region of the microphone array based on a distance between the camera and a subject imaged by the camera, a panning direction of the camera, a distance between the camera and the microphone array, and a direction which is directed from the camera toward the microphone array.

CITATION LIST

Patent Literature

Patent Literature 1: JP-A-2012-186551

SUMMARY OF INVENTION

Technical Problem

Patent Literature 1 assumes that, for example, the camera, the microphone array, and a subject (for example, a speaker) being present on the same plane.

However, in the above-described monitoring system, the camera, the microphone array, and a subject (for example, a staff of a retail store) are all seldom present on the same plane, that is, on two-dimensional coordinates, and are present on stereoscopic three-dimensional coordinates in most cases.

For this reason, if the control system disclosed in Patent Literature 1 in which only the panning direction of the camera, that is, only a horizontal angle is used to change a sound collection region of the microphone array is applied to the above-described monitoring system, the microphone array is unlikely to collect sound in a specific direction with high accuracy in relation to videos of a monitoring target imaged by the camera.

In addition, in the above-described monitoring system, in a case where the camera and the microphone array are integrally assembled with each other and are disposed on the same axis, an optical axis of the camera and a physical central axis of the microphone array are common to each other. Thus, in a case where the microphone array collects conversations of a subject in videos which are captured by the camera, coordinates (horizontal angle, vertical angle) indicating a direction in which the camera performs imaging can be used as coordinates (horizontal angle, vertical angle) indicating a direction in which the microphone array collects sound.

However, in a case where the camera and the microphone array are disposed at different positions separately from each other, the optical axis of the camera is different from the physical central axis of the microphone array. For this reason, in a case where the microphone array collects conversations of a subject in videos which are currently being captured by the camera, there is a problem in that coordinates (horizontal angle, vertical angle) indicating a direction in which the camera performs imaging cannot be used as coordinates (horizontal angle, vertical angle) indicating a direction in which the microphone array collects sound without being changed.

In order to solve the problem of the related art, an object of the present invention is to provide a directionality control system and a directionality control method capable of forming sound collection directionality toward a location or in a direction corresponding to a designated position based on videos of a predetermined region imaged by a camera apparatus with a microphone array apparatus as a reference and thus of collecting audio data in the corresponding direction with high accuracy.

Solution to Problem

An aspect of the present invention corresponds to a directionality control system including: at least one imaging part that captures a video; at least one sound collection part that collects sound; a display part that displays video data captured by the at least one imaging part on a screen; and a sound collection direction computation part that computes a sound collection direction which is directed from the sound collection part toward a sound position corresponding to a designated position in the video data in response to designation of any position in the displayed video data, wherein the sound collection direction computation part computes the sound collection direction which is directed from the sound collection part toward the sound position corresponding to the designated position in the video data by using a predetermined sound collection direction computation parameter and a direction which is directed from the at least one imaging part toward the sound position corresponding to the designated position in the video data.

An aspect of the present invention corresponds to a directionality control method for a directionality control system which includes at least one imaging part that captures a video, and at least one sound collection part that collects sound, the method including: a step of displaying video data captured by the at least one imaging part on a screen; a step of receiving designation of any position in the video data displayed on the screen; and a step of computing a sound collection direction which is directed from the sound collection part toward a sound position corresponding to a designated position in the video data, wherein the sound collection direction which is directed from the sound collection part toward the sound position corresponding to the designated position in the video data is computed by using a predetermined sound collection direction computation parameter and a direction which is directed from the at least one imaging part toward the sound position corresponding to the designated position in the video data.

An aspect of the present invention corresponds to a calibration method including: a step of positioning a camera apparatus which captures a video of a predetermined imaging region and a microphone array apparatus which collects sound of the imaging region of the camera apparatus on a same axis; a step of attaching the camera apparatus to a circumferential edge of an opening formed at a center of a casing of the microphone array apparatus; and a step of matching reference directions of respective horizontal angles of the camera apparatus and the microphone array apparatus with each other on a plane perpendicular to the same axis by attaching the camera apparatus to inside of the opening.

An aspect of the present invention corresponds to a calibration method including: a step of positioning a camera apparatus which captures a video of a predetermined imaging region and a microphone array apparatus which collects sound of the imaging region of the camera apparatus on a same axis; a step of attaching the camera apparatus to a circumferential edge of an opening formed at a center of a casing of the microphone array apparatus; a step of attaching a tool indicating a reference direction of a horizontal angle of the microphone array apparatus to both opposing ends of the casing of the microphone array apparatus; a step of causing the camera apparatus to capture an image of the tool; a step of computing a deviation amount of a reference direction of a horizontal angle of the camera apparatus relative to the reference direction of the horizontal angle of the microphone array apparatus based on the captured image of the tool; and a step of matching the reference directions of the respective horizontal angles of the camera apparatus and the microphone array apparatus with each other on a plane perpendicular to the same axis by adjusting a horizontal angle of a sound collection direction of the microphone array apparatus by using the computed deviation amount.

An aspect of the present invention corresponds to a directionality control system including: a first imaging part that captures an image of a subject; a second imaging part that captures an image of the subject; a sound collection part that collects voice of the subject; a display part that displays image data captured by the first imaging part; and a deviation amount computation part that computes a first horizontal deviation angle of a horizontal angle of a first imaging direction which is directed from the first imaging part toward a sound position corresponding to a designated position in the image data relative to a first reference direction, and a second horizontal deviation angle of a horizontal angle of a second imaging direction which is directed from the second imaging part toward the sound position relative to a second reference direction, in response to designation of any position in the displayed image data.

An aspect of the present invention corresponds to a horizontal deviation angle computation method for a directionality control system including a first imaging part, a second imaging part, and a sound collection part, the method including: a step of causing the first imaging part to capture an image of a subject; a step of causing the second imaging part to capture an image of the subject; a step of causing the sound collection part to collect voice of the subject; a step of displaying image data captured by the first imaging part on a display part; and a step of computing a first horizontal deviation angle of a horizontal angle of a first imaging direction which is directed from the first imaging part toward a sound position corresponding to a designated position in the image data relative to a first reference direction, and a second horizontal deviation angle of a horizontal angle of a second imaging direction which is directed from the second imaging part toward the sound position relative to a second reference direction, in response to designation of any position in the image data displayed on the display part.

An aspect of the present invention corresponds to a directionality control system including: at least one imaging part that captures a video; a sound collection part that collects sound; a display part that displays video data captured by the at least one imaging part; a height determination part that determines a height of a sound position from a reference surface, corresponding to a position designated in the video data in response to designation of the position in the video data; a sound collection direction computation part that computes a sound collection direction which is directed from the sound collection part toward the sound position based on the height of the sound position from the reference surface; and a control part that forms sound collection directionality of the sound in the computed sound collection direction.

An aspect of the present invention corresponds to a directionality control method for a directionality control system including at least one imaging part that captures a video and a sound collection part that collects sound, the method including: a step of displaying video data captured by the at least one imaging part; a step of determining a height of a target sound source position from a reference surface, corresponding to a position designated in the video data in response to designation of the position in the video data; a step of computing a sound collection directional direction which is directed from the sound collection part toward the target sound source position based on the height of the target sound source position from the reference surface; and a step of causing the sound collection part to form sound collection directionality of the sound in the computed sound collection directional direction.

Advantageous Effects of Invention

According to the present invention, sound collection directionality can be formed toward a location or in a direction corresponding to a position designated in a video of a predetermined region imaged by a camera apparatus with a microphone array apparatus as a reference, and thus audio data can be collected in the corresponding direction with high accuracy.

According to the present invention, it is possible to match a reference direction of a horizontal angle of coordinates indicating an imaging direction of a camera apparatus with a reference direction of a horizontal angle of coordinates indicating a sound collection direction of a microphone array apparatus in a case where the camera apparatus and the microphone array apparatus are integrally used.

According to the present invention, it is possible to compute a horizontal deviation angle indicating an angle between a 0° direction of each horizontal angle of imaging direction coordinates of a camera apparatus and sound collection direction coordinates of a microphone array apparatus and mutual reference directions connecting both the apparatuses to each other, and thus the microphone array apparatus can appropriately collect conversation voice of a subject who is present in an imaging direction of the camera apparatus.

According to the present invention, a height of a target sound source position present in a sound collection space from a reference surface can be determined, and sound collection directionality can be formed in a sound collection direction which is directed from a microphone array apparatus toward the target sound source position based on the height of the target sound source position from the reference surface.

BRIEF DESCRIPTION OF DRAWINGS

FIG. 4 illustrates an operation summary of a directionality control system of the present embodiment, in which FIG. 4(A) is a diagram illustrating a state in which a single camera apparatus images subjects reflected in a range of the angle of view, and a state in which the microphone array apparatus collects conversations of subject people present in a sound collection direction and music output from a speaker device which is not present in the sound collection direction, and FIG. 4(B) is a diagram illustrating a state in which collected audio data is output from the speaker device when a direction which is directed from the microphone array apparatus toward a sound collection region central position A corresponding to a position A' designated with the finger of the user in a video displayed on a display device is a sound collection direction.

FIG. 8 illustrates each positional relationship between the camera apparatus and the microphone array apparatus of the directionality control system, the reference point O, and the sound collection region central position A in the first computation method, in which FIG. 8(A) is a perspective view, FIG. 8(B) is a horizontal direction plan view, and FIG. 8(C) is a vertical direction sectional view taken along the line K-K' of FIG. 8(B).

FIG. 9 illustrates each positional relationship between the camera apparatus and the microphone array apparatus of the directionality control system, the reference point O, and the sound collection region central position A in the first computation method, in which FIG. 9(A) is a perspective view, FIG. 9(B) is a horizontal direction plan view, and FIG. 9(C) is a vertical direction sectional view taken along the line Q-Q' of FIG. 9(B).

FIG. 10 illustrates each positional relationship between the camera apparatus and the microphone array apparatus of the directionality control system, the reference point O, and the sound collection region central position A in the first computation method, in which FIG. 10(A) is a perspective view, FIG. 10(B) is a horizontal direction plan view, and FIG. 10(C) is a vertical direction sectional view taken along the line R-R' of FIG. 10(B).

FIG. 12 illustrates each positional relationship between the camera apparatus and the microphone array apparatus of the directionality control system, a position of the marker (reference point O), and the sound collection region central position A in a second computation method, in which FIG. 12(A) is a perspective view, FIG. 12(B) is a horizontal direction plan view, and FIG. 12(C) is a vertical direction sectional view taken along the line K-K' of FIG. 12(B).

FIG. 13 illustrates each positional relationship between the camera apparatus and the microphone array apparatus of the directionality control system, the position of the marker (reference point O), and the sound collection region central position A in the second computation method, in which FIG. 13(A) is a perspective view, FIG. 13(B) is a horizontal direction plan view, and FIG. 13(C) is a vertical direction sectional view taken along the line R-R' of FIG. 13(B).

FIG. 14 illustrates each positional relationship between the camera apparatus and the microphone array apparatus of the directionality control system, a sound source position (reference point O), and the sound collection region central position A in a third computation method, in which FIG. 14(A) is a perspective view, FIG. 14(B) is a horizontal direction plan view, and FIG. 14(C) is a vertical direction sectional view taken along the line K-K' of FIG. 14(B).

FIG. 15 illustrates each positional relationship between the camera apparatus and the microphone array apparatus of the directionality control system, the sound source position (reference point O), and the sound collection region central position A in the third computation method, in which FIG. 15(A) is a perspective view, FIG. 15(B) is a horizontal direction plan view, and FIG. 15(C) is a vertical direction sectional view taken along the line Q-Q' of FIG. 15(B).

FIG. 16 illustrates each positional relationship between the camera apparatus and the microphone array apparatus of the directionality control system, the sound source position (reference point O), and the sound collection region central position A in the third computation method, in which FIG. 16(A) is a perspective view, FIG. 16(B) is a horizontal direction plan view, and FIG. 16(C) is a vertical direction sectional view taken along the line R-R' of FIG. 16(B).

FIG. 17 illustrates a positional relationship between the camera apparatus, the microphone array apparatus, and the sound collection region central position A in a fourth computation method in a case where the microphone array apparatus and the camera apparatus are installed so as to be connected to each other by using a dedicated tool, in which FIG. 17(A) is a perspective view, FIG. 17(B) is a horizontal direction plan view, and FIG. 17(C) is a vertical direction sectional view taken along the line K-K' of FIG. 17(B).

FIG. 18 illustrates a positional relationship between the camera apparatus, the microphone array apparatus, and the sound collection region central position A in the fourth computation method in a case where the microphone array apparatus and the camera apparatus are installed so as to be connected to each other by using the dedicated tool, in which FIG. 18(A) is a perspective view, FIG. 18(B) is a horizontal direction plan view, and FIG. 18(C) is a vertical direction sectional view taken along the line Q-Q' of FIG. 18(B).

FIG. 20(A) is a schematic diagram illustrating a calibration method in a sound collection system of a second embodiment, FIG. 20(B) is a plan view in which an omnidirectional camera apparatus is viewed from a vertically lower side, and FIG. 20(C) is a plan view in which an omnidirectional microphone array apparatus is viewed from the vertically lower side.

FIG. 21(A) is a schematic diagram illustrating a calibration method in a sound collection system of a third embodiment, FIG. 21(B) is a plan view in which an omnidirectional camera apparatus is viewed from a vertically lower side, and FIG. 21(C) is a plan view in which an omnidirectional microphone array apparatus is viewed from the vertically lower side.

FIG. 23(A) is a plan view illustrating an omnidirectional camera apparatus and an omnidirectional microphone array apparatus are attached to an attachment member, and FIG. 23(B) is a sectional view taken along the line E-E in FIG. 23(A).

FIG. 25(A) is a side view illustrating a state in which a tool is being attached to an omnidirectional microphone array apparatus in a calibration method of a fifth embodiment, FIG. 25(B) is a side view illustrating a state in which attachment of the tool to the omnidirectional microphone array apparatus is completed, and FIG. 25(C) is an exterior perspective view of a sound collection system in which attachment of the tool to the omnidirectional microphone array apparatus is completed.

FIG. 28(A) is a block diagram illustrating an example of a configuration of the sound collection system illustrated in FIG. 27(A), and FIG. 28(B) is a block diagram illustrating an example of a configuration of the sound collection system illustrated in FIG. 27(B).

FIG. 31 is a diagram illustrating each positional relationship between the omnidirectional camera apparatus, the calibration omnidirectional camera apparatus, and the sound collection region central position A in the sixth embodiment, in which FIG. 31(A) is a perspective view, FIG. 31(B) is a plan view in which FIG. 31(A) is viewed in a vertically lower direction from an upper side, and FIG. 31(C) is a vertical direction sectional view taken along the line P-P' of FIG. 31(B).

FIG. 32 is a diagram illustrating each positional relationship between the omnidirectional camera apparatus, the calibration omnidirectional camera apparatus, and the sound collection region central position A in the sixth embodiment, in which FIG. 32(A) is a perspective view, FIG. 32(B) is a plan view in which FIG. 32(A) is viewed in a vertically lower direction from an upper side, and FIG. 32(C) is a vertical direction sectional view taken along the line Q-Q' of FIG. 31(B).

FIG. 36(A) is a perspective view illustrating each position of the camera apparatus, the omnidirectional microphone array apparatus, a reference point O, and the target sound source position A, FIG. 36(B) is a horizontal direction plan view in which FIG. 36(A) is viewed in a vertically lower direction from a vertically upper direction, and FIG. 36(C) is a vertical direction sectional view taken along the line K-K' of FIG. 36(B).

FIG. 37(A) is a perspective view illustrating each position of the camera apparatus, the omnidirectional microphone array apparatus, the reference point O, and the target sound source position A, FIG. 37(B) is a horizontal direction plan view in which FIG. 37(A) is viewed in a vertically lower direction from a vertically upper direction, and FIG. 37(C) is a vertical direction sectional view taken along the line Q-Q' of FIG. 37(B).

FIG. 39(A) is a flowchart illustrating an operation procedure of initial setting in the sound collection system of the eighth embodiment, and FIG. 39(B) is a flowchart illustrating an operation procedure following the initial setting in the sound collection system of the eighth embodiment.

FIG. 41(A) is a flowchart illustrating an operation procedure of initial setting in the sound collection system of the ninth embodiment, and FIG. 41(B) is a flowchart illustrating an operation procedure following the initial setting in the sound collection system of the ninth embodiment.

57(B) is a horizontal direction plan view of FIG. 57(A)

FIG. 58 is a diagram illustrating a third calibration method in the eleventh embodiment.

FIG. 60 is a diagram illustrating a fourth calibration method in the eleventh embodiment.

FIG. 62 is a diagram illustrating a fifth calibration method in the eleventh embodiment.

FIG. 63(A) is a diagram illustrating a positional relationship between the PTZ camera apparatus 1, the omnidirectional microphone array apparatus 2, and a calibration marker MAK3 in the fifth calibration method, FIG. 63(B) is a horizontal direction plan view of FIG. 63(A), and FIG. 63(C) is a vertical direction sectional view taken along the line K-K' of FIG. 63(B).

FIG. 64 is a diagram illustrating a sixth calibration method in the eleventh embodiment.

FIG. 68 is a diagram illustrating a seventh calibration method in the eleventh embodiment.

FIG. 72 is a diagram illustrating an eighth calibration method in the eleventh embodiment.

FIG. 74 is a diagram illustrating a ninth calibration method in the eleventh embodiment.

FIG. 76 is a diagram illustrating a tenth calibration method in the eleventh embodiment.

DESCRIPTION OF EMBODIMENTS

Hereinafter, embodiments of a directionality control system and a directionality control method related to the present invention will be described with reference to the drawings. The directionality control system of the present embodiment is used as a monitoring system (including a manned monitoring system and an unmanned monitoring system) provided in, for example, a factory, a public facility (for example, a library or an event hall), or a store (for example, a retail store or a bank).

In addition, the present invention can be expressed as respective apparatuses (for example, a directionality control apparatus to be described later) constituting the directionality control system, or a directionality control method including respective operations (steps) performed by each apparatus constituting the directionality control system.

(First Embodiment)
(Configuration of Directionality Control System)

Figure 1:
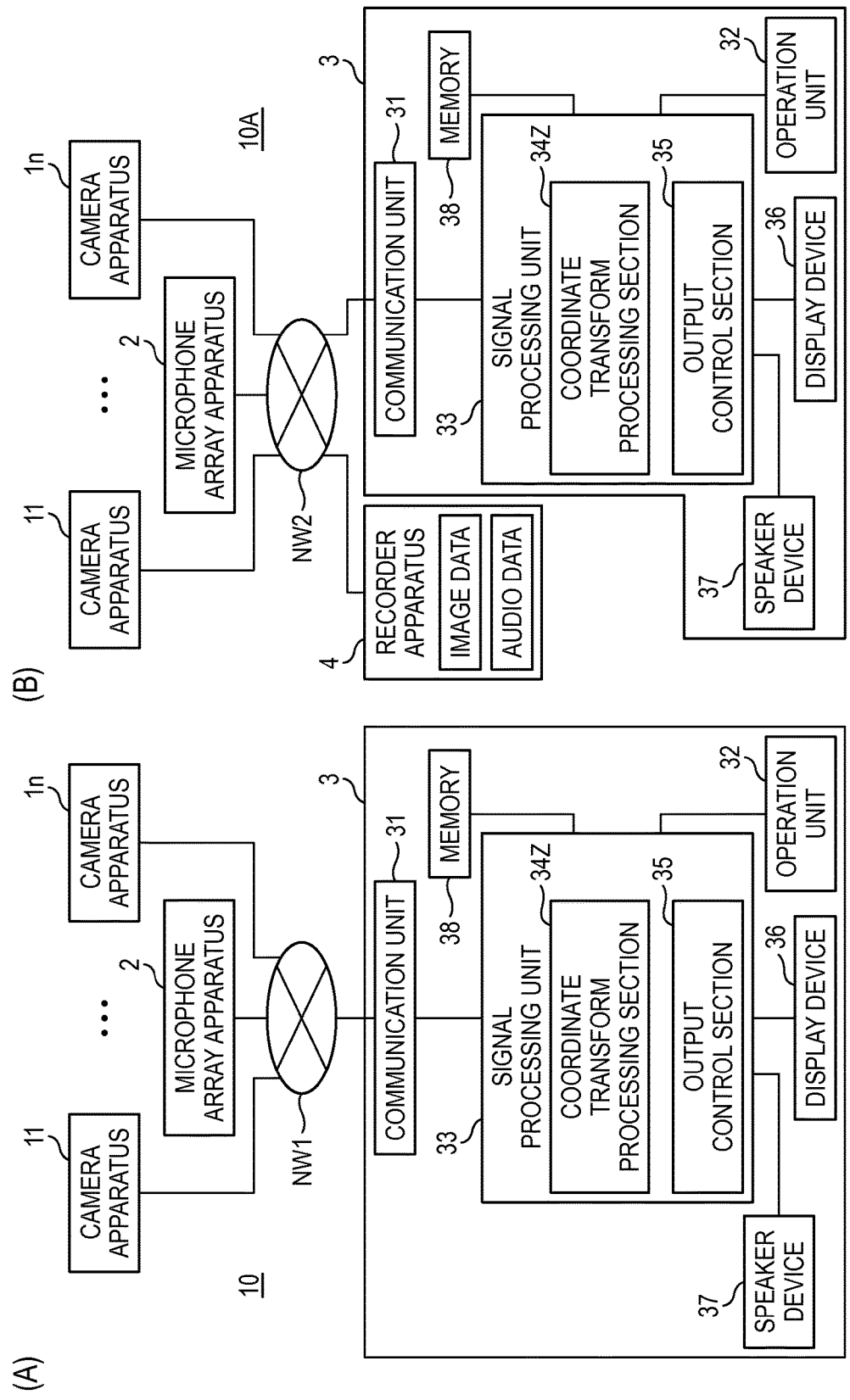
FIGS. 1(A) and 1(B) are block diagrams illustrating a configuration of a directionality control system of the present embodiment.

FIGS. 1(A) and 1(B) are block diagrams illustrating configurations of directionality control systems 10 and 10A of the present embodiment. The directionality control system 10 illustrated in FIG. 1(A) includes at least one camera apparatuses 11 to 1n, a microphone array apparatus (or an omnidirectional microphone array apparatus) 2, and a directionality control apparatus 3. Here, n indicates the number of camera apparatuses, and is an integer of 1 or higher. The camera apparatuses 11 to 1n, the microphone array apparatus 2, and the directionality control apparatus 3 are connected to each other via a network NW1.

The directionality control system 10A illustrated in FIG. 1(B) includes at least one camera apparatuses 11 to 1n, a microphone array apparatus 2, a directionality control apparatus 3, and a recorder apparatus 4. The camera apparatuses 11 to 1n, the microphone array apparatus 2, the directionality control apparatus 3, and the recorder apparatus 4 are connected to each other via a network NW2.

Hereinafter, a description will be made focusing on an operation of each unit of the directionality control system 10, and a description of an operation of each unit of the directionality control system 10A will be made regarding the content which is different from the operation of each unit of the directionality control system 10.

Each of the camera apparatuses 11 to 1n as at least one imaging part is a monitoring camera which is connected to the network NW1 and is installed on, for example, a ceiling surface or a wall surface (refer to FIG. 81) of a room of an event hall or a predetermined stand (refer to FIG. 4(A)) in a fixed manner, and perform a panning operation, a tilting operation, a zooming operation (for example, zoom-in and zoom-out), and a distance-measuring operation and an angle-measuring operation related to a designated specific position in a captured video through a remote operation from a monitoring system control room (not illustrated) which is connected thereto via the network NW1.

The camera apparatuses 11 to 1n capture a video (including a still image and a moving image; this is also the same for the following description) of a position of a monitoring target which is present in a predefined angle of view CAR centering on an optical axis CX. The camera apparatuses 11 to 1n transmit the captured video data, and input parameters for computing a sound collection direction $(\theta_{MAh}, \theta_{MAv})$ which will be described later to the directionality control apparatus 3 or the recorder apparatus 4 via the network NW1.

The microphone array apparatus 2 as a sound collection part which is connected to the network NW1 is installed on, for example, a ceiling surface or a wall surface of a room of an event hall or a predetermined stand (refer to FIG. 4(A)) in a fixed manner, and is provided with at least microphone 22 and 23 (refer to FIG. 2) which are provided in a uniform manner and a control unit (not illustrated) which controls an operation of each of the microphones 22 and 23.

The microphone array apparatus 2 collects sound of a monitoring target in a sound collection direction by using each of the microphone (or microphones) 22 and 23, and transmits audio data collected by each of the microphones 22 and 23 to the directionality control apparatus 3 or the recorder apparatus 4 via the network NW1 or the network NW2.

The microphone array apparatus 2 forms sound collection directionality of each of the microphones 22 and 23 in a sound collection direction ($\theta_{MAh}, \theta_{MAv}$) which is derived (hereinafter, referred to as "computed") by a signal processing unit 33 which will be described later in response to a directionality formation instruction from the signal processing unit 33.

Consequently, the microphone array apparatus 2 can increase a volume level of audio data which is collected from the sound collection direction ($\theta_{MAh}, \theta_{MAv}$) in which the sound collection directionality is formed, and can reduce a volume level of audio data which is collected from a direction in which the sound collection directionality is not formed. In addition, a method of computing the sound collection direction ($\theta_{MAh}, \theta_{MAv}$) will be described later.

Exteriors of the microphone array apparatus 2 will be described later with reference to FIG. 2. Further, each of the microphones 22 and 23 may employ a nondirectional microphone, a bidirectional microphone, a unidirectional microphone, a sharply directional microphone, a super-directional microphone (for example, a shotgun microphone), or a combination thereof.

The networks NW1 and NW2 are wired communication networks (for example, an intranet or the Internet) or wireless communication networks (for example, a local area network (LAN)).

The directionality control apparatus 3 is connected to the network NW1 or the network NW2, and may be, for example, a stationery personal computer (PC) installed in a monitoring system control room (not illustrated), and may be a mobile phone, a tablet terminal, or a smart phone, which can be carried by a user.

The directionality control apparatus 3 includes at least a communication unit 31, an operation unit 32, a signal processing unit 33, a display device 36, a speaker device 37, and a memory 38. The signal processing unit 33 includes at least a coordinate transform processing section 34z and an output control section 35.

The communication unit 31 receives video data or audio data which is transmitted from the camera apparatuses 11 to 1n or the microphone array apparatus 2, and outputs the data to the signal processing unit 33 via the network NW1 or the network NW2.

The operation unit 32 is a user interface (UI) for notifying the signal processing unit 33 of the content of a user's input operation, and is, for example, a pointing device such as a mouse or a keyboard. In addition, the operation unit 32 may be configured by using a touch panel or a touch pad which is disposed so as to correspond to, for example, a screen of the display device 36 and allows an input operation to be performed with the finger FG of the user or a stylus pen.

The operation unit 32 outputs coordinate data indicating a region where the user desires to increase or decrease a volume level, that is, a designated position A' or a region B illustrated in FIG. 4(B) to the signal processing unit 33 in response to the user's input operation.

The signal processing unit 33 is configured by using, for example, a central processing unit (CPU), a micro processing unit (MPU), or a digital signal processor (DSP), and performs a control process for collectively controlling operations of the respective units of the directionality control apparatus 3, data input and output processes with other respective units, a data computation (calculation) process, and a data storage process.

The coordinate transform processing section 34z computes, as a sound collection direction, coordinates ($\theta_{MAh}, \theta_{MAv}$) indicating a direction which is directed from an installation position of the microphone array apparatus 2 toward a sound collection region central position (a sound position) A by using coordinate data indicating the position A' or the region B which is output from the operation unit 32. In the sound collection direction ($\theta_{MAh}, \theta_{MAv}$), $\theta_{MAh}$ indicates a horizontal angle of a depression angle $\theta_{MA}$ which is directed toward the sound collection region central position A from the microphone array apparatus 2, and $\theta_{MAv}$ indicates a vertical angle of the depression angle $\theta_{MA}$ which is directed toward the sound collection region central position A from the microphone array apparatus 2. In addition, a process of computing the sound collection direction ($\theta_{MAh}, \theta_{MAv}$) will be described later in detail with reference to the drawings.

In addition, the sound collection region central position A is a field position which corresponds to the position A' designated with the finger FG of the user or a stylus pen on a screen of the display device 36 via the operation unit 32, and is an actual monitoring target.

The output control section 35 controls operations of the display device 36 and the speaker device 37, so as to cause the display device 36 to reproduce and output video data transmitted from the camera apparatuses 11 to 1n, and to cause the speaker device 37 to output audio data transmitted from the microphone array apparatus 2 as sound.

The display device 36 as a display part displays video data captured by the camera apparatuses 11 to 1n on a screen.

The speaker device 37 as a sound output part outputs, as sound, audio data collected by the microphone array apparatus 2 or audio data which is collected by the microphone array apparatus 2 after the sound collection directionality is formed in the sound collection direction ($\theta_{MAh}, \theta_{MAv}$) computed by the coordinate transform processing section 34z. In addition, the display device 36 and the speaker device 27 may be configured separately from the directionality control apparatus 3.

The memory 38 is configured by using, for example, a random access memory (RAM), and functions as a work memory when the respective units of the directionality control apparatus 3 operate.

The recorder apparatus 4 records video data captured by the camera apparatuses 11 to 1n and audio data collected by the microphone array apparatus 2. The recorder apparatus 4 records the video data captured by the camera apparatuses 11 to 1n and the audio data collected by the microphone array apparatus 2 in correlation with each other. In addition, the networks NW1 and NW2 may be connected to each other, and various data items may be transmitted between the directionality control systems 10 and 10A.

FIGS. 2(A) to 2(E) are exterior views of the microphone array apparatus 2. The microphone array apparatuses 2 illustrated in FIGS. 2(A) to 2(E) have different exteriors and arrangement positions of a plurality of microphones, but functions of the microphone array apparatuses 2 are equivalent to each other.

The microphone array apparatus 2 illustrated in FIG. 2(A) includes a plurality of microphones 22 and 23 disposed in a disc-shaped casing 21. The plurality of microphones 22 and 23 are disposed along a surface of the casing 21. Specifically, a plurality of microphones 22 which are disposed in a large circular shape having the same center as the casing 21 and a plurality of microphones 23 which are disposed in a large circular shape having the same center as the casing 21 are disposed in a concentric shape.

The plurality of microphone units 22 which are disposed in the large circular shape have a wide interval therebetween, have a large diameter, and have a characteristic suitable for a low sound range. On the other hand, the respective microphone units 23 have a narrow interval therebetween, have a small diameter, and have a characteristic suitable for a high sound range.

The microphone array apparatus 2A illustrated in FIG. 2(B) has a configuration in which a plurality of microphones 22 are disposed in a vertical direction and a horizontal direction in a uniform manner along a surface of a disc-shaped casing 21. In the microphone array apparatus 2A, the plurality of microphones 22 are disposed in a straight line in the vertical direction and the horizontal direction, and thus it is possible to reduce a computation amount in a process of forming the sound collection directionality in audio data. In addition, the plurality of microphones 22 may be disposed either in the vertical direction or in the horizontal direction.

The microphone array apparatus 2B illustrated in FIG. 2(C) has a disc-shaped casing 21B with a smaller diameter than that of the microphone array apparatus 2 illustrated in FIG. 2(A), and has a configuration in which a plurality of microphones 22 are disposed in a uniform manner along a surface of the disc-shaped casing 21B. Since the intervals between the respective microphones 22 are short, the microphone array apparatus 2B has a characteristic suitable for a high sound range.

The microphone array apparatus 2C illustrated in FIG. 2(D) includes a casing 21C with a doughnut shape in which an opening 21a is formed inside thereof, and a plurality of microphones 22 which are disposed in the casing 21C in a uniform manner. The plurality of microphones 22 are disposed in a concentric shape in the casing 21C. In addition, for example, a camera apparatus (for example, an omnidirectional camera apparatus) may be installed inside the opening 21a in a state of being inserted thereinto.

The microphone array apparatus 2D illustrated in FIG. 2(E) has a configuration in which a plurality of microphones 22 are disposed in a uniform manner along a surface of a rectangular casing 21D. Since the casing 21D has a rectangular shape, the microphone array apparatus 2D can be easily installed even at a location such as a corner.

Figure 3:
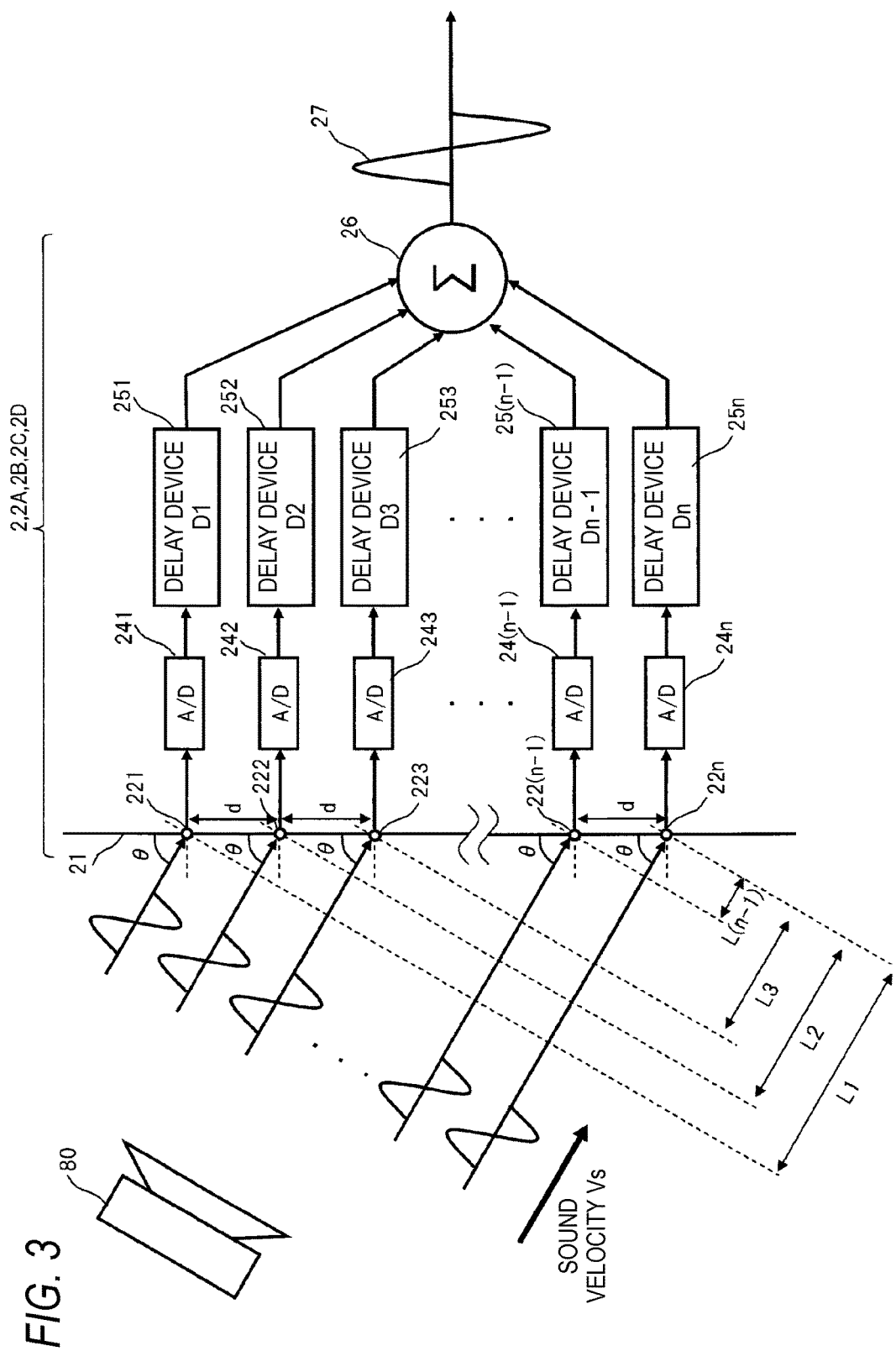
FIG. 3 is a principle diagram illustrating the content in which the microphone array apparatus forms the sound collection directionality in a predetermined direction θ as a sound collection direction.

FIG. 3 is a principle diagram illustrating the content in which the microphone array apparatus 2 forms the sound collection directionality in a predetermined direction θ as a sound collection direction. In FIG. 3, a brief description will be made of a principle of a directionality control process using, for example, a delay sum method. Sound waveforms generated from a sound source 80 are incident to respective microphones 221, 222, 223, . . . , 22(n−1) and 22n of the microphone array apparatus 2 with a predetermined angle (incidence angle=(90−θ) [degrees]). An incidence angle θ illustrated in FIG. 3 may be a horizontal angle $\theta_{MAh}$ or a vertical angle $\theta_{MAv}$ of the depression angle $\theta_{MA}$ which is directed toward the sound collection region central position A from the microphone array apparatus 2.

The sound source 80 is, for example, a conversation of subjects of the camera apparatus 11, present in a sound collection direction in which the microphone array apparatus 2 collects sound, and is present in a direction of a predetermined angle θ with respect to the upper surface of the casing 21 of the microphone array apparatus 2. In addition, gaps d between the respective microphones 221, 222, 223, . . . , 22(n−1) and 22n are assumed to be constant.

The sound waveforms generated from the sound source 80 initially arrive at and are collected by the microphone 221, then arrive at and are collected by the microphone 222, similarly, sequentially arrive at and are collected by the microphones, and, finally, arrive at and are collected by the microphone 22n.

In addition, a direction which is directed toward the sound source 80 from each of the microphones 221, 222, 223, . . . , 22(n−1) and 22n of the microphone array apparatus 2 is the same as, for example, a direction which is directed toward a sound collection region central position corresponding to a position designated by the user on a screen of the display device 36 from each microphone of the microphone array apparatus 2 in a case where the sound source 80 is the sound of conversations which people have.

Here, there are occurrences of arrival time differences τ1, τ2, τ3, . . . and τ(n−1) between time points at which the sound waves arrive at the microphones 221, 222, 223, . . . and 22(n−1) and finally arrive at the microphone 22n. For this reason, if audio data of sound collected by the respective microphones 221, 222, 223, . . . , 22(n−1) and 22n is added without change, the audio data is added in a state where a phase thereof is shifted, and thus a volume level of the sound waves is completely lowered.

In addition, τ1 indicates a time difference between the time point at which the sound wave arrives at the microphone 221 and the time point at which the sound wave arrives at the microphone 22n, τ2 indicates a time difference between the time point at which the sound wave arrives at the microphone 222 and the time point at which the sound wave arrives at the microphone 22n, and, similarly, τ(n−1) indicates a time difference between the time point at which the sound wave arrives at the microphone 22(n−1) and the time point at which the sound wave arrives at the microphone 22n.

In the present embodiment, the microphone array apparatus 2 includes A/D converters 241, 242, 243, . . . , 24(n−1) and 24n, delay devices 251, 252, 253, . . . , 25(n−1) and 25n which are respectively provided so as to correspond to the microphones 221, 222, 223, . . . , 22(n−1) and 22n, and an adder 26 (refer to FIG. 3).

In other words, in the microphone array apparatus 2, the A/D converters 241, 242, 243, . . . , 24(n−1) and 24n A/D-convert analog audio data collected by the respective microphones 221, 222, 223, . . . , 22(n−1) and 22n into digital audio data.

In addition, in the microphone array apparatus 2, the delay devices 251, 252, 253, . . . , 25(n−1) and 25n provide delay times corresponding to the arrival time differences in the respective microphones 221, 222, 222, . . . , 22(n−1) and 22n to all phases of the sound waves so that the phases thereof are made to match each other, and then the adder 26 adds the audio data having undergone the delay process together. Accordingly, the microphone array apparatus 2 can form a directionality of the audio data in each of the microphones 221, 222, 223, . . . , 22(n−1) and 22n in a direction of the predetermined angel B.

For example, in FIG. 3, delay times D1, D2, D3, . . . , D(n−1) and Dn which are respectively set in the delay devices 251, 252, 253, . . . , 25(n−1) and 25n respectively correspond to the arrival time differences τ1, τ2, τ3, . . . and τ(n−1), and are expressed by Equation (1)

[Equation 1]

$$D1 = \frac{L1}{Vs} = \frac{\{d \times (n-1) \times \cos\theta\}}{Vs} \qquad (1)$$

-continued $$D2 = \frac{L2}{Vs} = \frac{\{d \times (n-2) \times \cos\theta\}}{Vs}$$

$$D3 = \frac{L3}{Vs} = \frac{\{d \times (n-3) \times \cos\theta\}}{Vs}$$

...

$$Dn-1 = \frac{Ln-1}{Vs} = \frac{\{d \times 1 \times \cos\theta\}}{Vs}$$

$$Dn = 0$$

Here, L1 indicates a difference between sound wave arrival distances in the microphone 221 and the microphone 22n. L2 indicates a difference between sound wave arrival distances in the microphone 222 and the microphone 22n. L3 indicates a difference between sound wave arrival distances in the microphone 223 and the microphone 22n, and, similarly, L(n−1) indicates a difference between sound wave arrival distances in the microphone 22(n−1) and the microphone 22n. Vs indicates a velocity of the sound wave (sound velocity). L1, L2, L3, . . . , and L(n−1), and Vs are known values. In FIG. 3, the delay time Dn set in the delay device 25n is 0 (zero).

In the above-described way, the microphone array apparatus 2 can easily form the sound collection directionality of audio data collected by each of the microphones 22 and 23 by changing the delay times D1, D2, D3, . . . , D(n−1) and Dn which are respectively set in the delay devices 251, 252, 253, . . . , 25(n−1) and 25n.

In addition, for convenience of description, the directionality forming process illustrated in FIG. 3 has been described on the premise that the microphone array apparatus 2 performs the process. However, in a case where the signal processing unit 33 includes the same number of A/D converters and the same number of delay devices as the number of microphones, and a single adder, the signal processing unit 33 may perform the above-described process.

Figure 4:
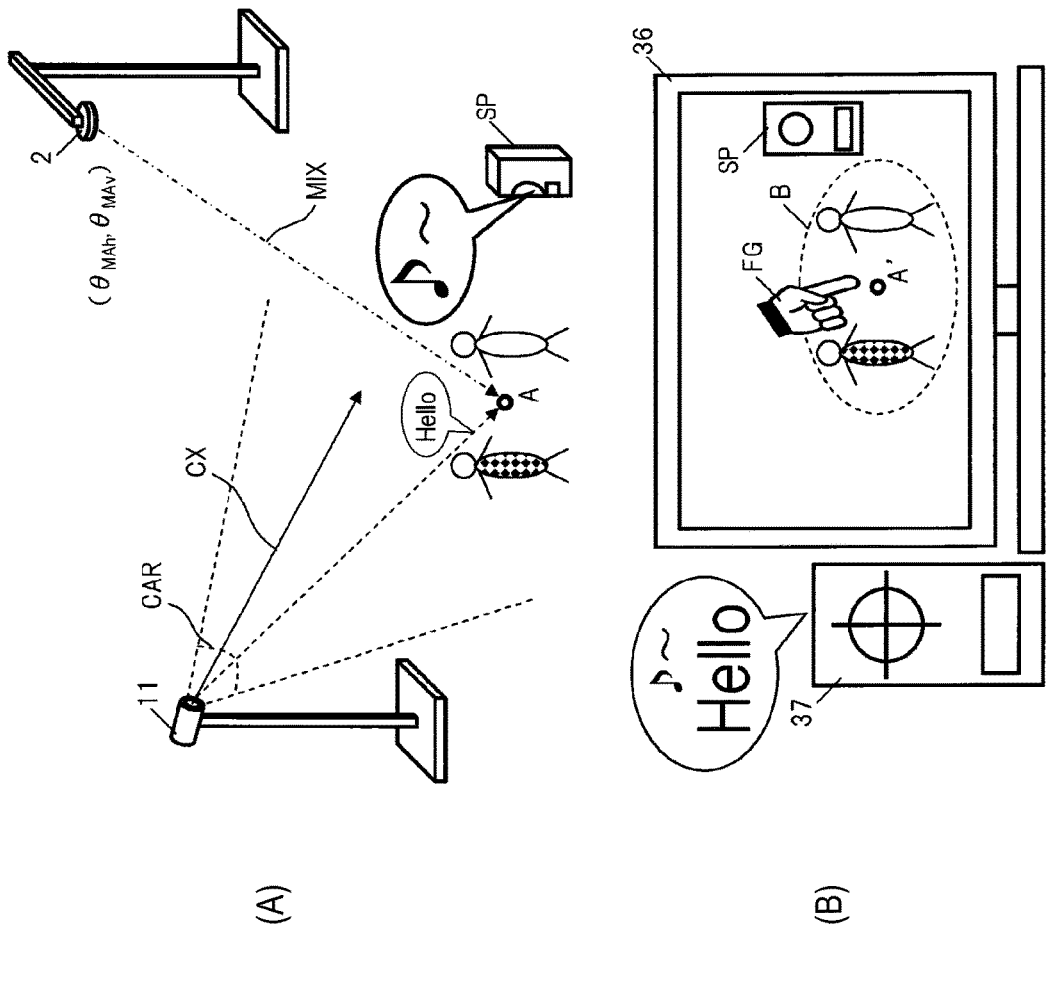

Next, a summary of an operation of the directionality control system 10 of the present embodiment will be described with reference to FIGS. 4(A) and 4(B). FIG. 4 illustrates an operation summary of the directionality control system 10 of the present embodiment. FIG. 4(A) is a diagram illustrating a state in which a single camera apparatus 11 images subjects reflected in a range of the angle of view CAR, and a state in which the microphone array apparatus 2 collects conversations of subject people present in a sound collection direction and music output from a speaker device SP which is not present in the sound collection direction. FIG. 4(B) is a diagram illustrating a state in which collected audio data is output from the speaker device 37 when a direction which is directed from the microphone array apparatus 2 toward the sound collection region central position A corresponding to the position A' designated with the finger FG of the user in a video displayed on the display device 36 is a sound collection direction.

In the directionality control system 10, the camera apparatus 11 images the subjects (for example, two people) and the speaker device SP reflected in the predefined angle of view CAR. The microphone array apparatus 2 collects ambient sound. In FIG. 4(A), the two people who are subjects are having conversations, and the speaker device SP is outputting music ($\mathcal{J}$ ~) as sound. Video data captured by the camera apparatus 11 is displayed on the display device 36 of the directionality control apparatus 3 (refer to FIG. 4(B)).

Here, if the position A' on the display device 36, that is, a substantially central position or the region B of the two people having conversations is designated with the finger FG of the user, the directionality control apparatus 3 computes coordinates ($\theta_{MAh}, \theta_{MAv}$) indicating a direction which is directed from the installation position of the microphone array apparatus 2 toward the sound collection region central position A as a sound collection direction of the microphone array apparatus 2 by using coordinate data indicating the position A' or the region B. The microphone array apparatus 2 forms sound collection directionality MIX in the direction which is directed from the microphone array apparatus 2 toward the sound collection region central position A by using the coordinate data ($\theta_{MAh}, \theta_{MAv}$) computed by the directionality control apparatus 3.

Therefore, the microphone array apparatus 2 can increase a volume level of the conversation (Hello) of the two people present in the direction in which the sound collection directionality MIX is formed more than a volume level of the music ($\mathcal{J}$ ~) output from the speaker device SP which is not present in the direction in which the sound collection directionality MIX is formed.

Consequently, the directionality control apparatus 3 causes the speaker device 37 to output sound with a volume level of the conversation (Hello) of the two people present in the direction in which the sound collection directionality MIX is formed higher than a volume level of the music ($\mathcal{J}$ ~) output from the speaker device SP which is not present in the direction in which the sound collection directionality MIX is formed (refer to FIG. 4(B)).

Figure 5:
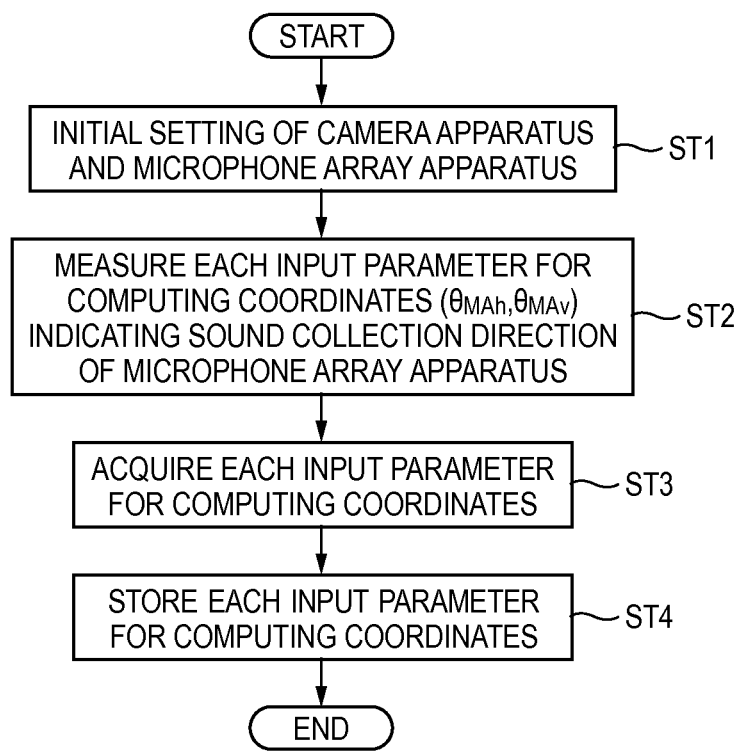
FIG. 5 is a flowchart illustrating an operation procedure of the initial setting (calibration) in the directionality control system of the present embodiment.

Next, initial setting (calibration) performed in the directionality control systems 10 and 10A of the present embodiment will be described with reference to FIG. 5. FIG. 5 is a flowchart illustrating an operation procedure of the initial setting (calibration) in the directionality control system 10 or 10A of the present embodiment. The initial setting (calibration) includes, for example, an operation in which the signal processing unit 33 of the directionality control apparatus 3 acquires input parameters which are required to compute a direction of the sound collection directionality formed by the microphone array apparatus 2.

Hereinafter, for simplification of description, the directionality control system 10 will be described of the directionality control systems 10 and 10A, and the directionality control system 10 includes the single camera apparatus 11.

In FIG. 5, the camera apparatus 11 and the microphone array apparatus 2 constituting the directionality control system 10 are initially installed so as to be fixed at predetermined positions (for example, a ceiling surface or a wall surface of a room of an event hall or a stand) (step ST1). In the present embodiment, the camera apparatus 11 and the microphone array apparatus 2 are respectively installed at different positions.

After the camera apparatus 11 and the microphone array apparatus 2 are initially installed, the signal processing unit 33 measures each input parameter which is required to compute coordinates ($\theta_{MAh}, \theta_{MAv}$) indicating a sound collection direction of the microphone array apparatus 2 (step ST2). The process in step ST2 includes a case where the user measures the input parameter by using a measuring device (for example, a laser range finder), a case where the camera apparatus 11 measures and acquires the input parameter by using functions of well-known techniques of the camera apparatus 11, or a case where the input parameter is acquired by using a design drawing (layout) of an installation space (for example, a building). Each input parameter in step ST2 differs in each embodiment which will be described later, and thus detailed content thereof will be described later.

After step ST2, each input parameter measured in step ST2 is input to the signal processing unit 33 of the directionality control apparatus 3 (step ST3). For example, the camera apparatus 11 transmits an input parameter acquired by using functions of well-known techniques of the camera apparatus 11, to the communication unit 31 of the directionality control apparatus 3. The communication unit 31 outputs the input parameter transmitted by the camera apparatus 11, to the signal processing unit 33.

In addition, the microphone array apparatus 2 transmits an input parameter acquired by using functions of well-known techniques of the microphone array apparatus 2, to the communication unit 31 of the directionality control apparatus 3. The communication unit 31 outputs the input parameter transmitted by the medical examination support system 2, to the signal processing unit 33.

Further, the operation unit 32 outputs an input parameter to the signal processing unit 33 in response to a user's input operation for operating the directionality control apparatus 3.

The signal processing unit 33 temporarily preserves each input parameter acquired in step ST3, in the memory 38 (step ST4). Through the above-described steps, the operation of the initial setting (calibration) in the directionality control system 10 is finished.

Figure 6:
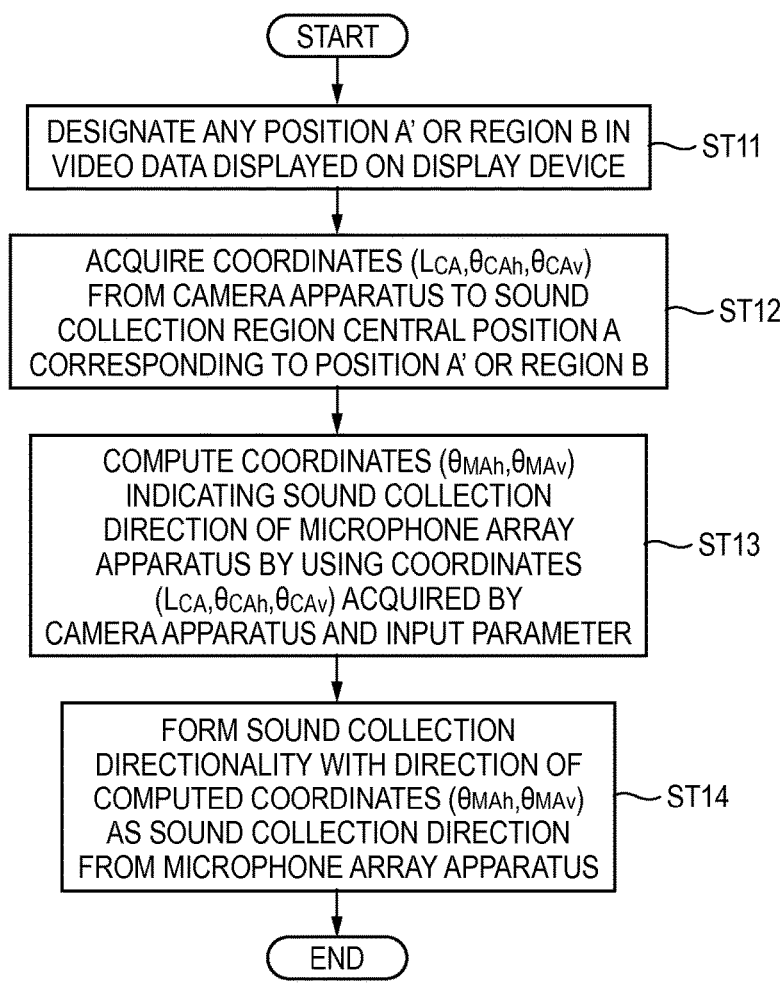
FIG. 6 is a flowchart illustrating an operation procedure in which a directionality control apparatus of the directionality control system of the present embodiment computes a sound collection direction of the microphone array apparatus.
Figure 80:
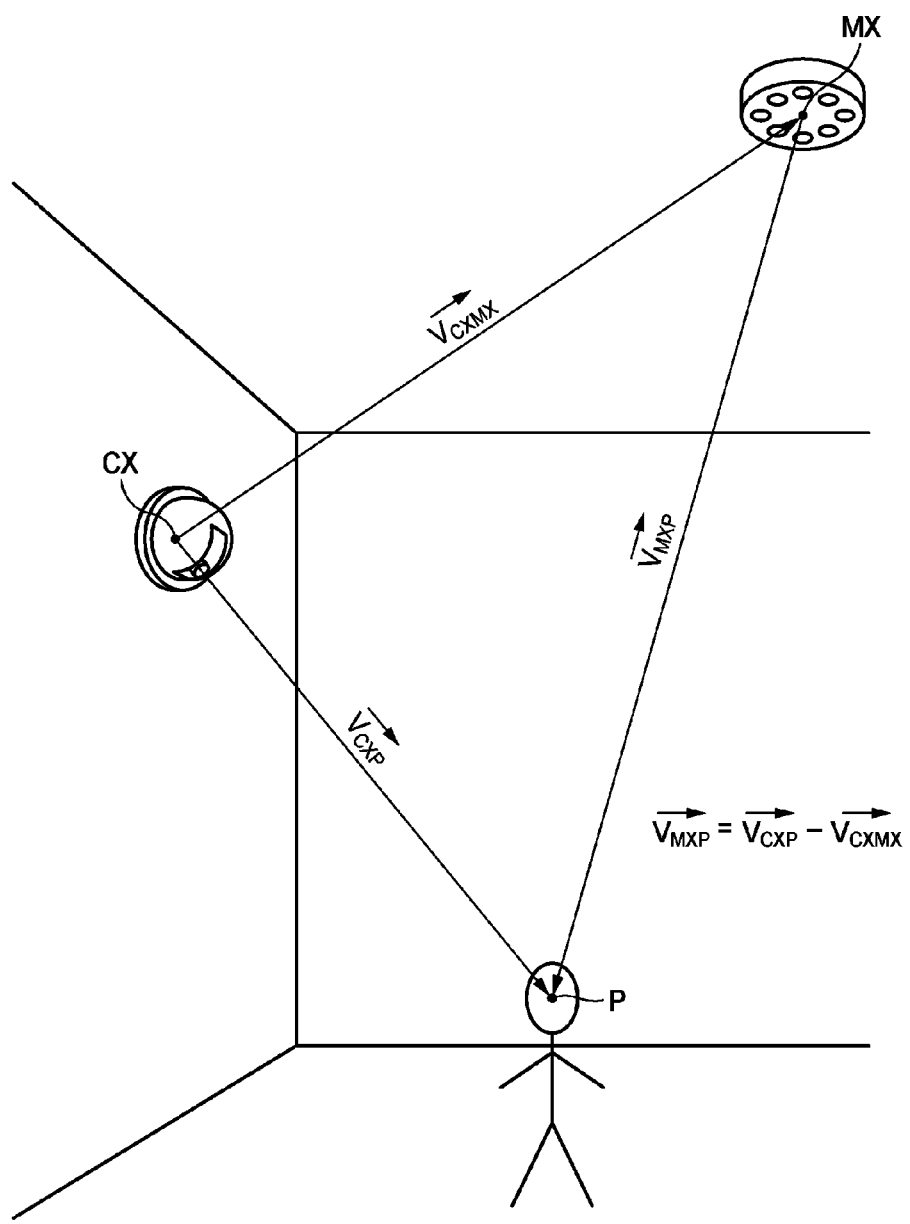
FIG. 80 is a diagram illustrating a positional relationship between a camera installed on a wall surface of a room, an omnidirectional microphone array apparatus installed on a ceiling surface of the room, and a sound source position.
Figure 81:
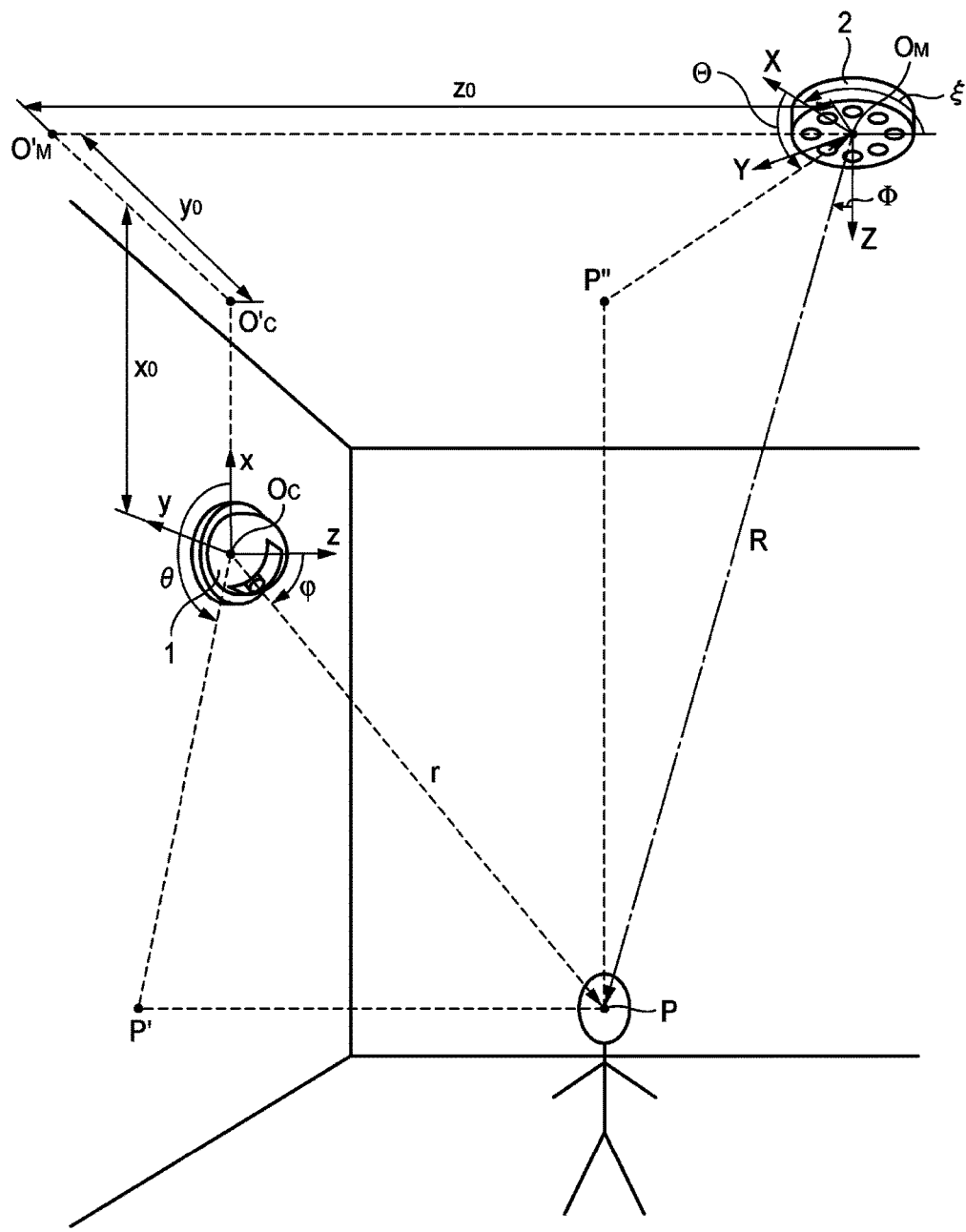
FIG. 81 is a diagram illustrating a horizontal angle and a vertical angle which are computed by using a microphone coordinate system of an omnidirectional microphone array apparatus converted from a camera coordinate system of a PTZ camera and which are directed from the omnidirectional microphone array apparatus toward the sound source position.
Figure 82:
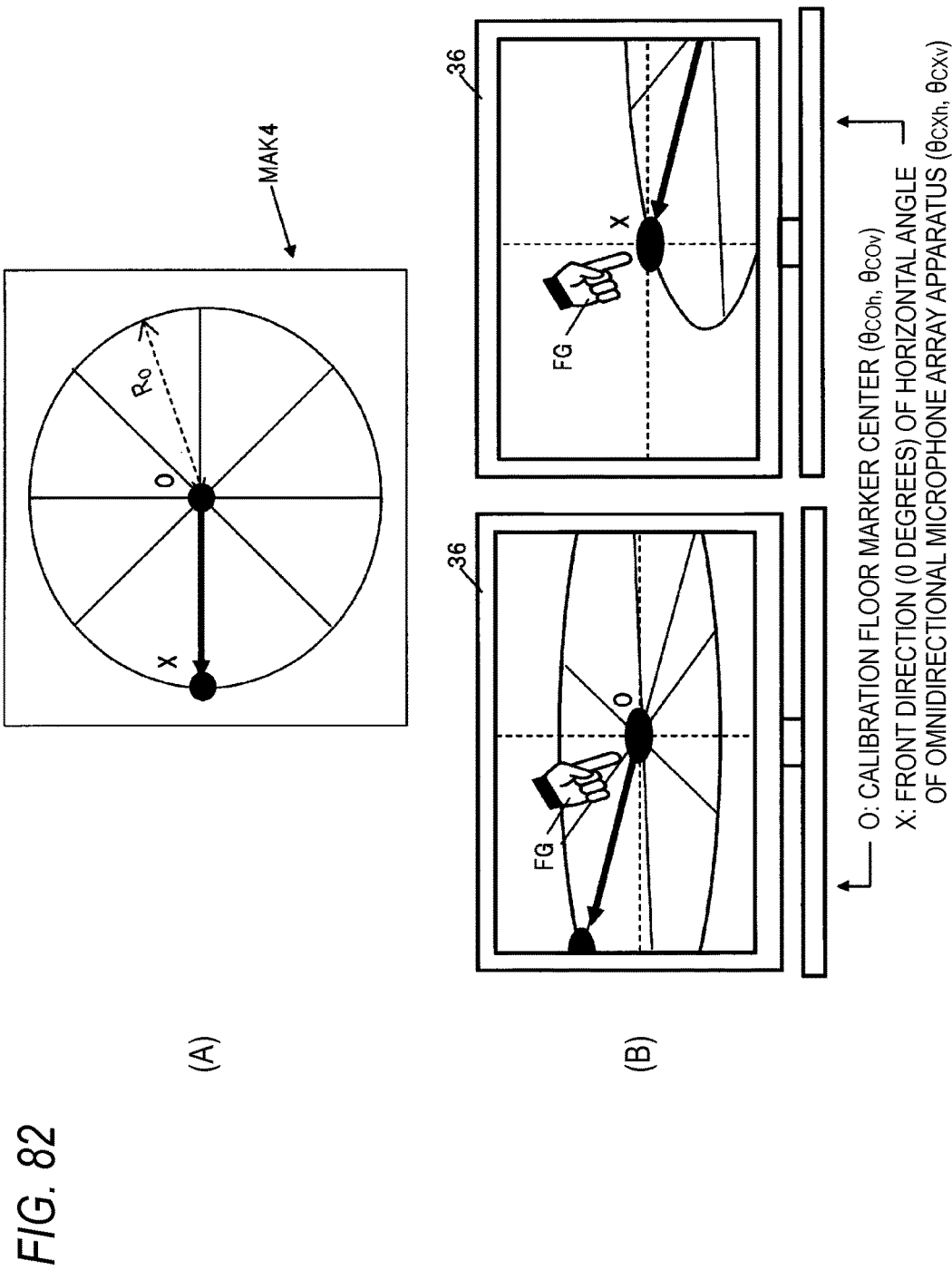
FIG. 82(A) is a plan view illustrating a calibration floor marker MAK4 used in an eleventh calibration method.
FIG. 82(B) illustrates screens of a point O and a point X enlarged by using a focus function of the PTZ camera apparatus 1.
Figure 83:
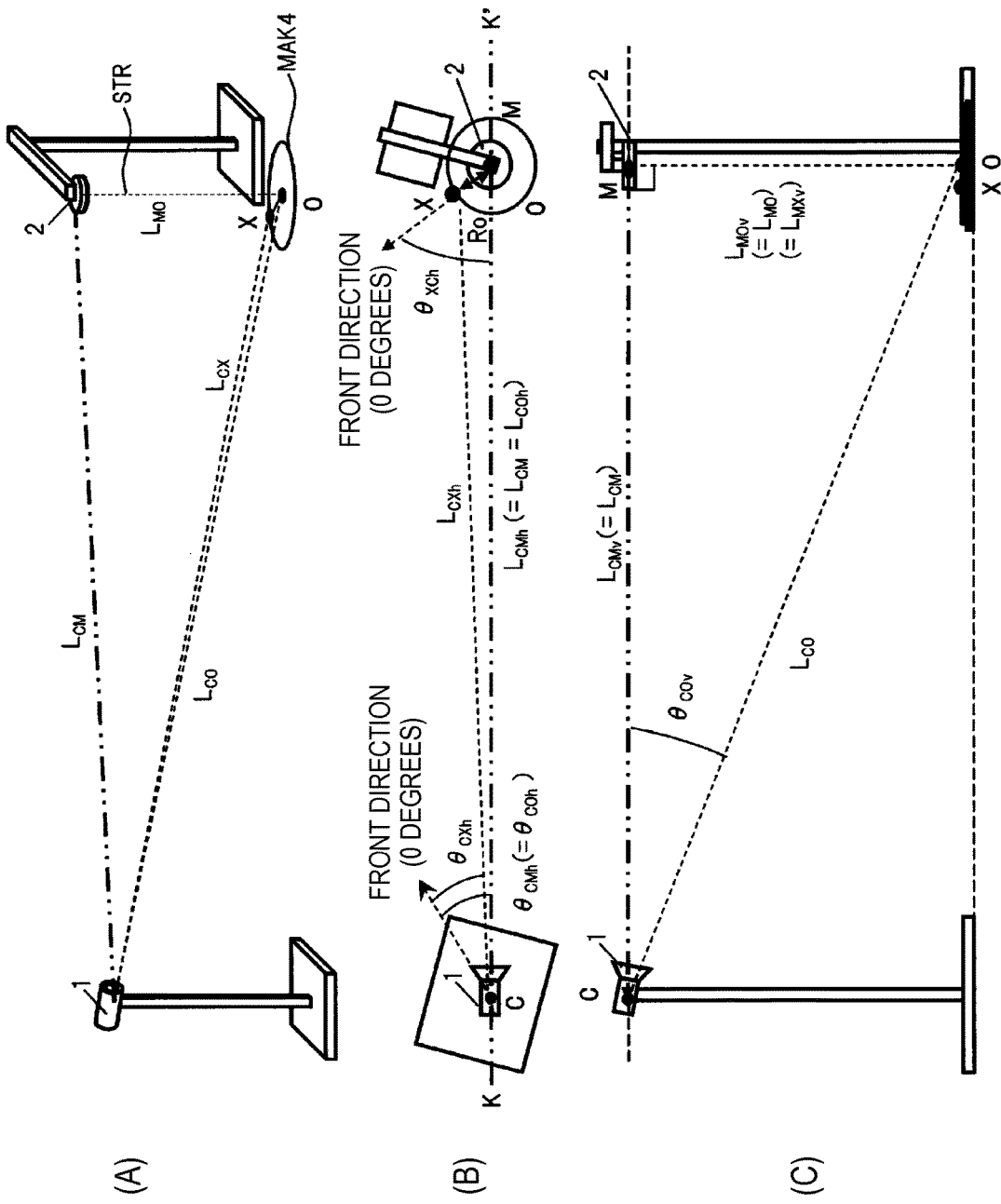
FIG. 83(A) is a diagram illustrating a positional relationship between the PTZ camera apparatus 1, the omnidirectional microphone array apparatus 2, and the calibration floor marker MAK4 in the eleventh calibration method.
FIG. 83(B) is a horizontal direction plan view of FIG. 83(A)
FIG. 83(C) is a sectional view taken along the line K-K' of FIG. 83(B).
Figure 84:
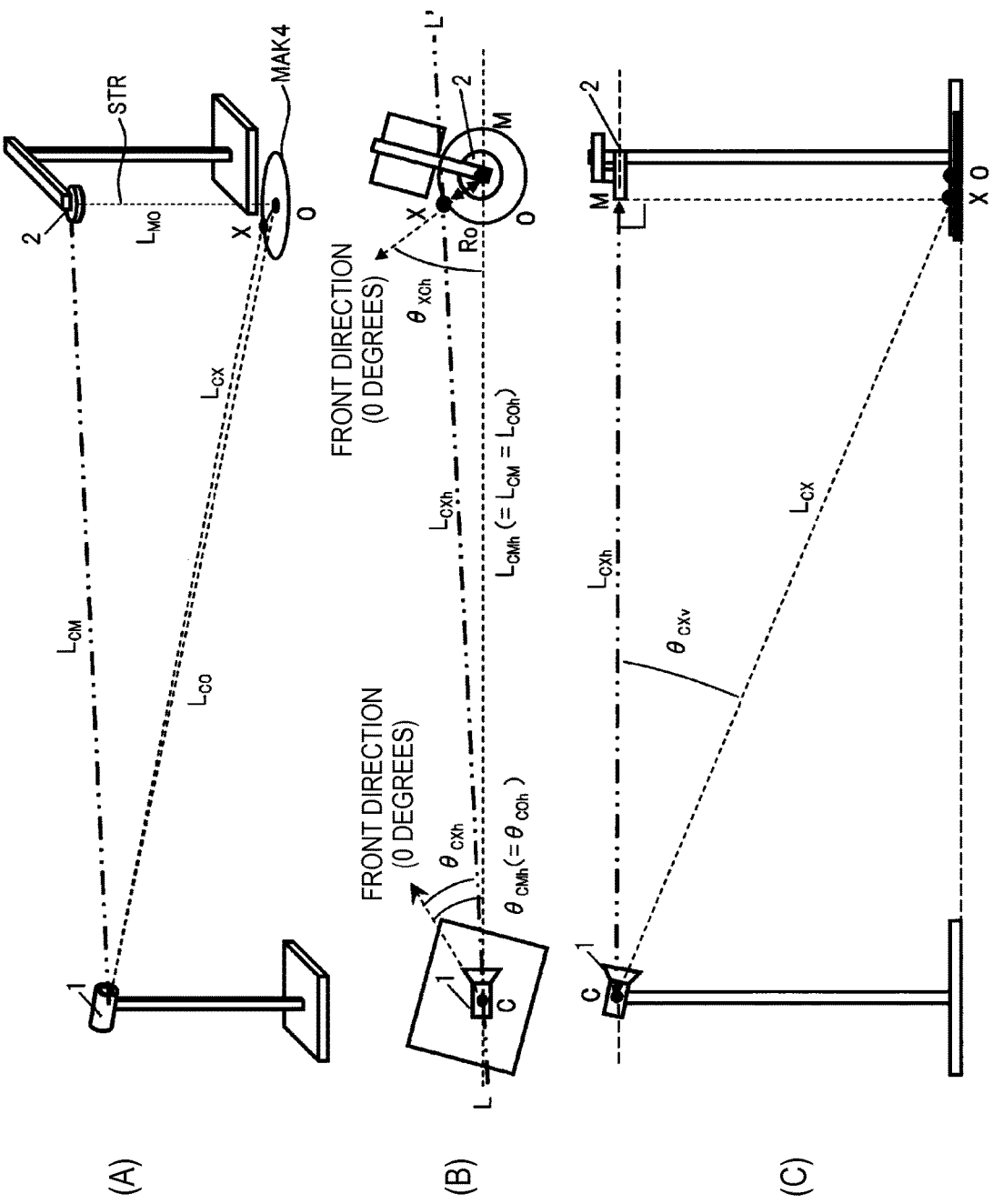
FIG. 84(A) is a diagram illustrating a positional relationship between the PTZ camera apparatus 1, the omnidirectional microphone array apparatus 2, and the calibration floor marker MAK4 in the eleventh calibration method.
FIG. 84(B) is a horizontal direction plan view of FIG. 84(A)
FIG. 84(C) is a sectional view taken along the line L-L' of FIG. 84(B).
Figure 85:
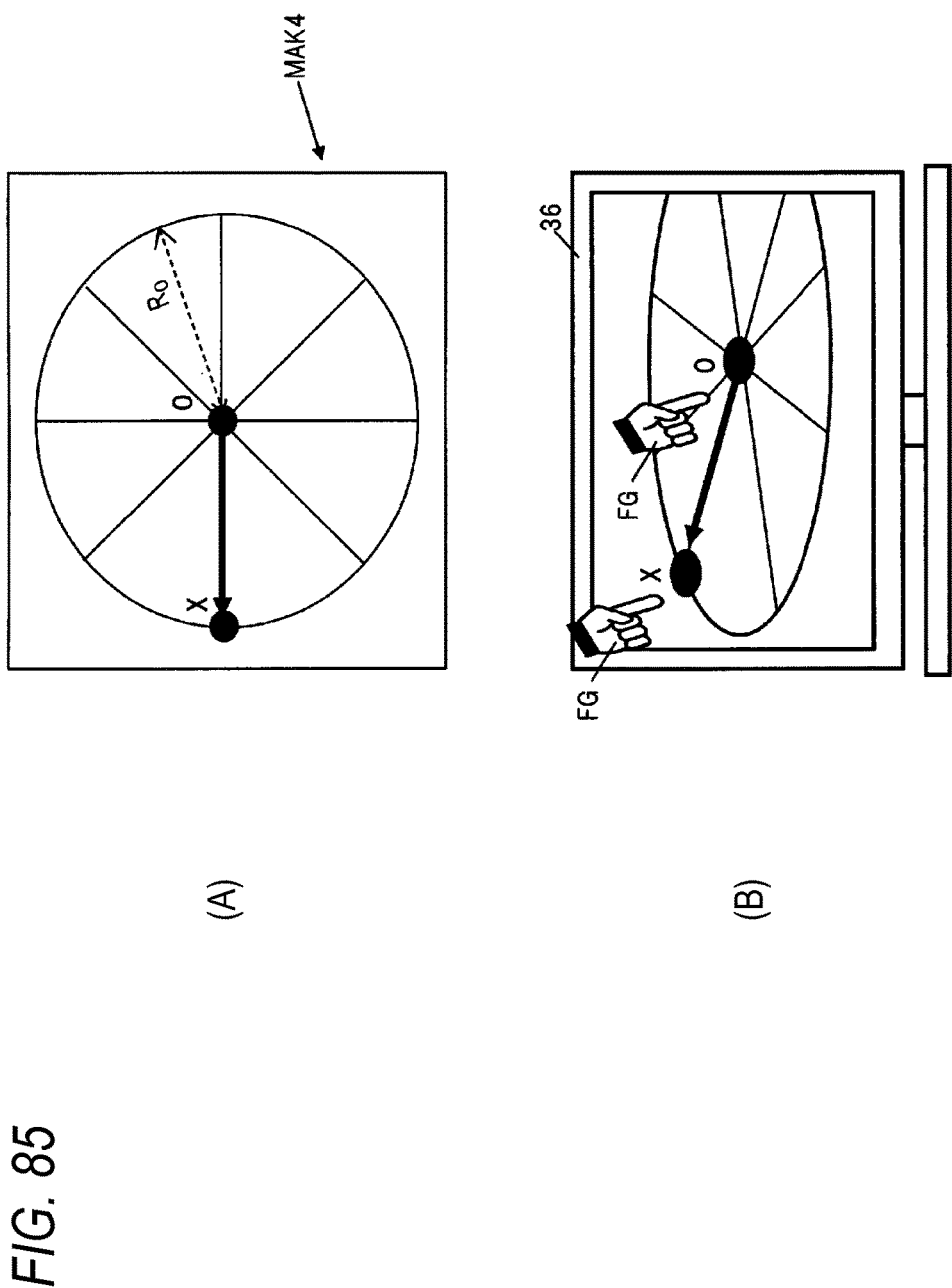
FIG. 85(A) is a plan view illustrating the calibration floor marker MAK4 used in a twelfth calibration method.
FIG. 85(B) illustrates screens of a point O and a point X enlarged by using the focus function of the PTZ camera apparatus 1.
Figure 86:
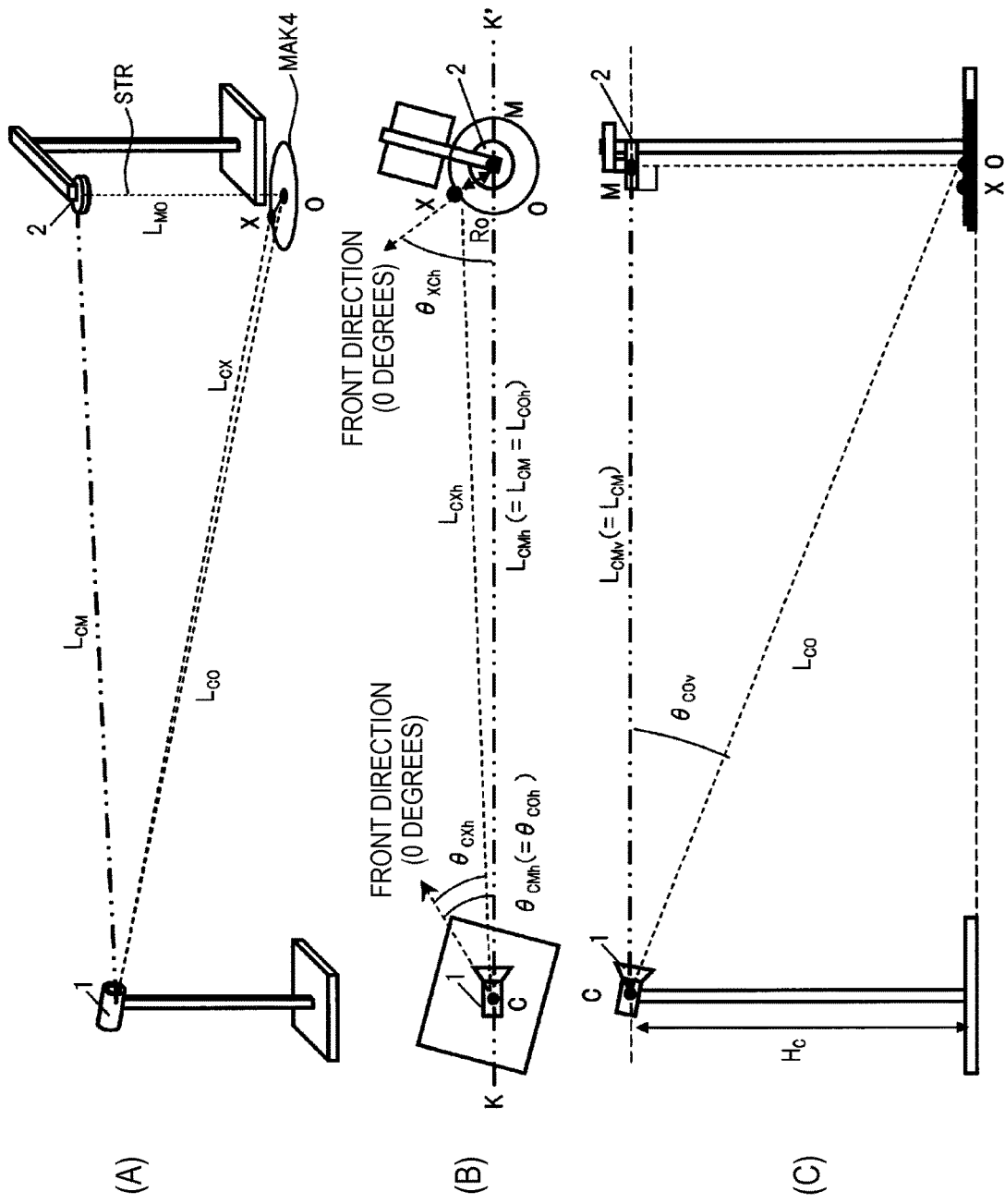
FIG. 86(A) is a diagram illustrating a positional relationship between the PTZ camera apparatus 1, the omnidirectional microphone array apparatus 2, and the calibration floor marker MAK4 in the twelfth calibration method.
FIG. 86(B) is a horizontal direction plan view of FIG. 86(A)
FIG. 86(C) is a sectional view taken along the line K-K' of FIG. 86(B).
Figure 87:
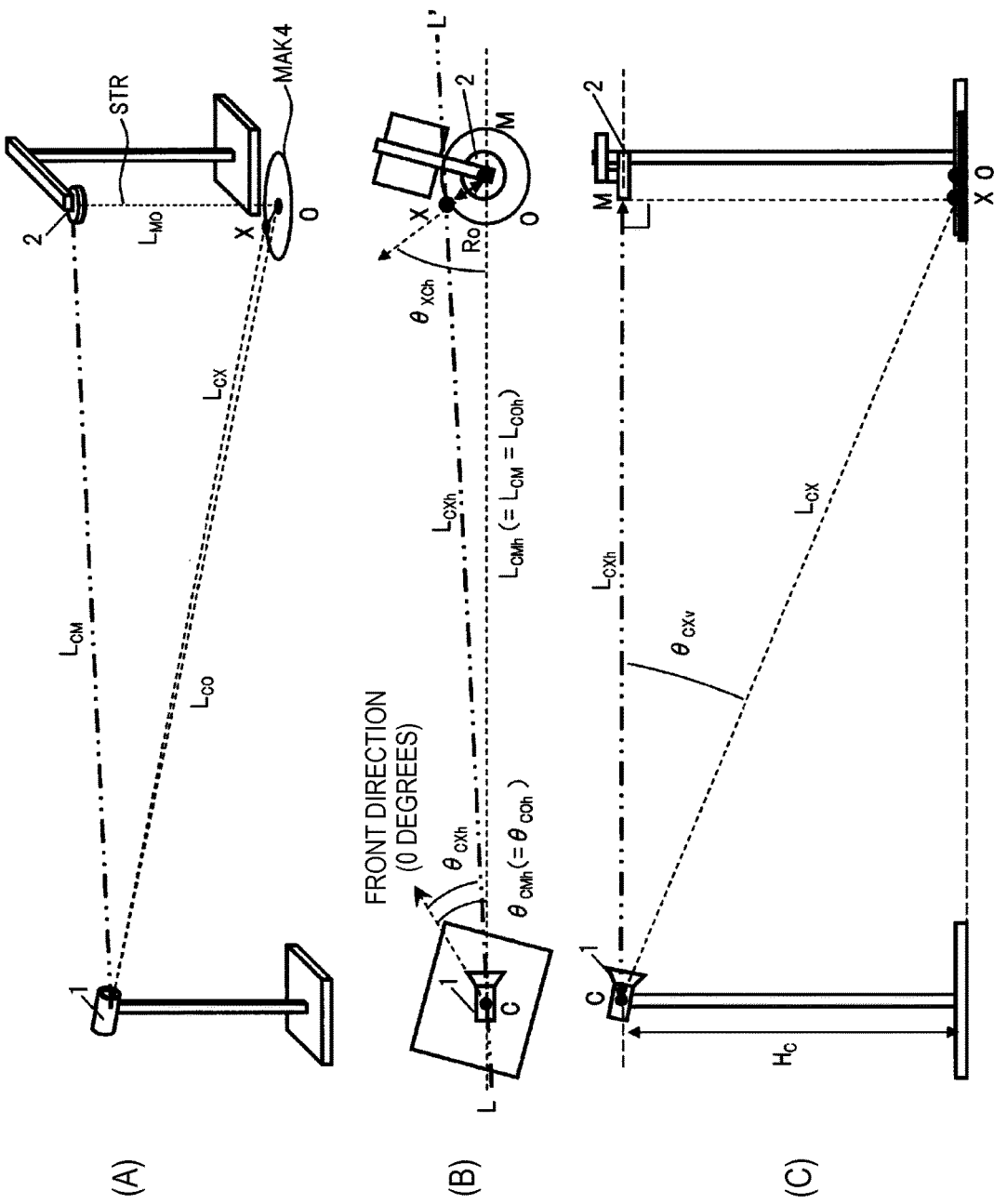
FIG. 87(A) is a diagram illustrating a positional relationship between the PTZ camera apparatus 1, the omnidirectional microphone array apparatus 2, and the calibration floor marker MAK4 in the twelfth calibration method.
FIG. 87(B) is a horizontal direction plan view of FIG. 87(A)
FIG. 87(C) is a sectional view taken along the line L-L' of FIG. 87(B).
Figure 88:
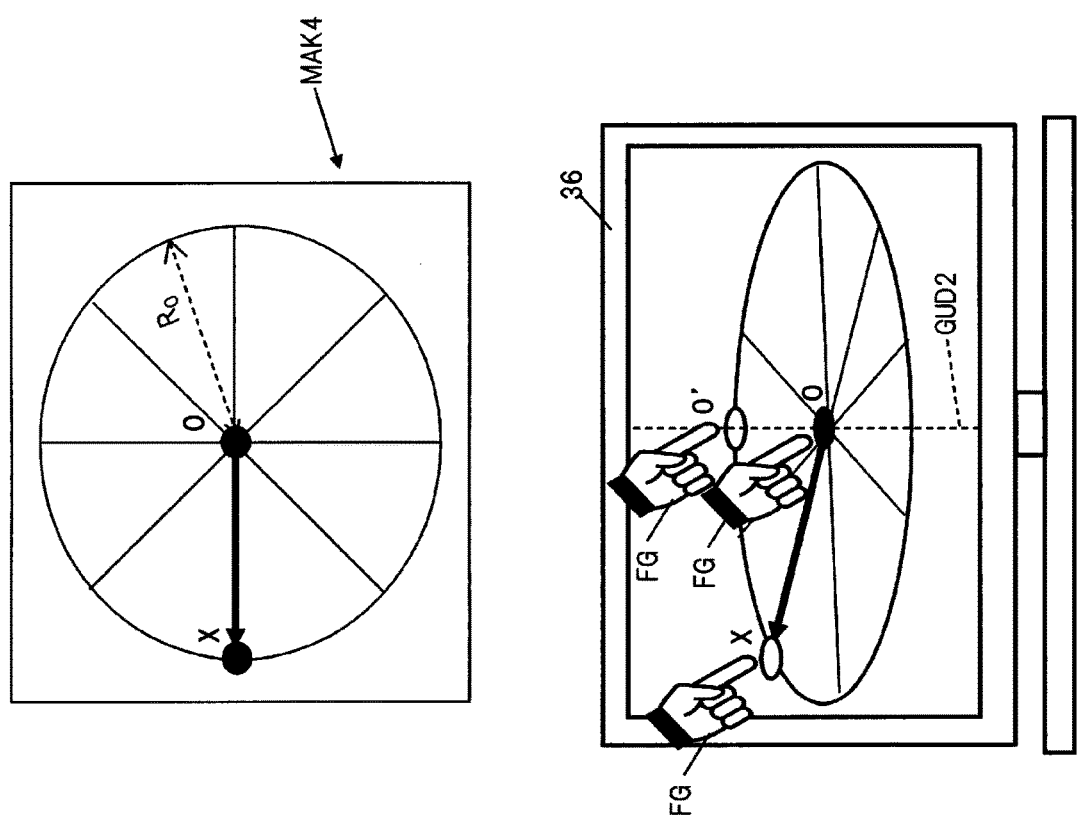
FIG. 88(A) is a plan view illustrating a calibration floor marker MAK4 used in a thirteenth calibration method.
FIG. 88(B) illustrates screens of points O and O' and a point X enlarged by using the focus function of the PTZ camera apparatus 1.
Figure 89:
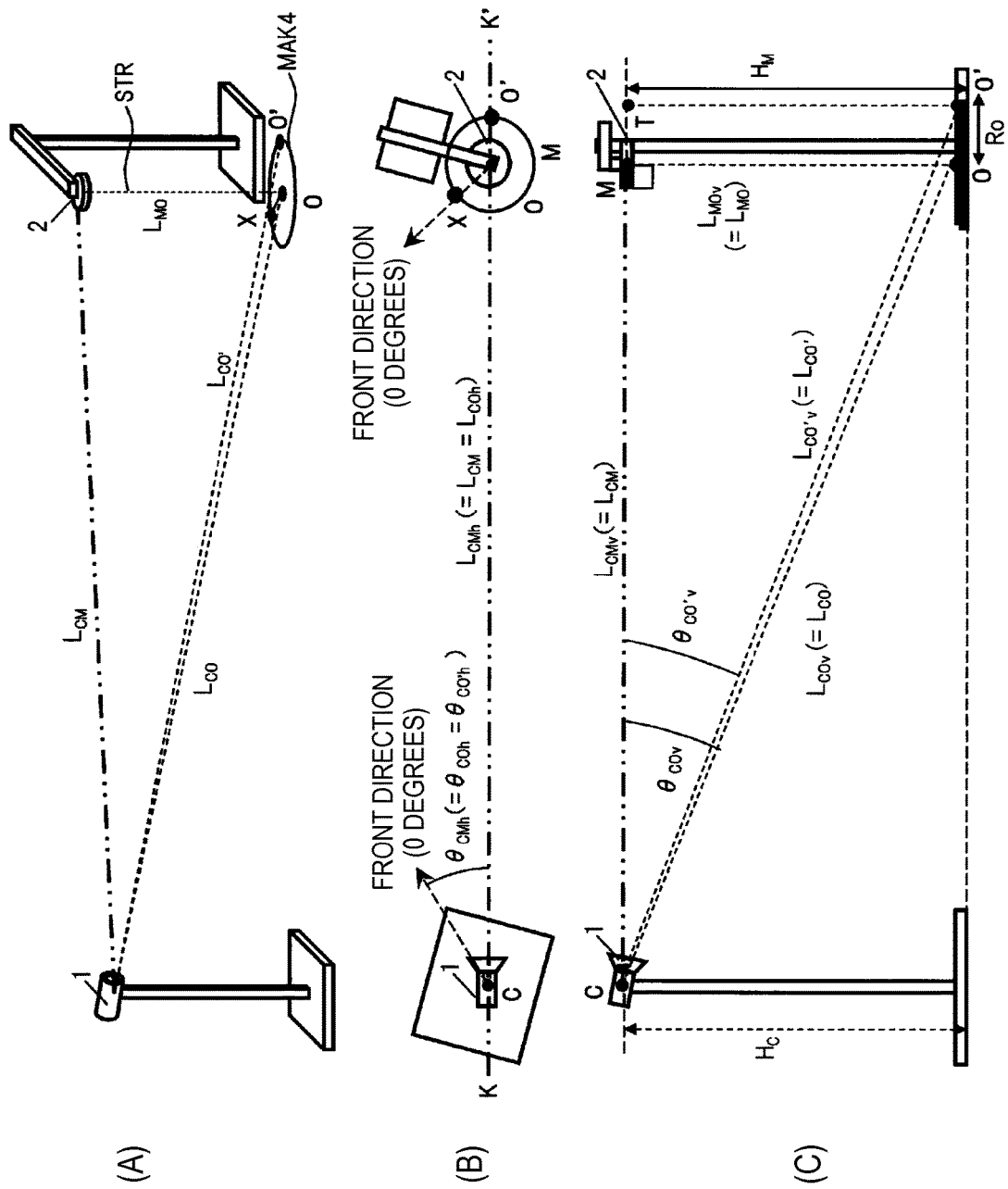
FIG. 89(A) is a diagram illustrating a positional relationship between the PTZ camera apparatus 1, the omnidirectional microphone array apparatus 2, and the calibration floor marker MAK4 in the thirteenth calibration method.
FIG. 89(B) is a horizontal direction plan view of FIG. 89(A)
FIG. 89(C) is a sectional view taken along the line K-K' of FIG. 89(B).
Figure 90:
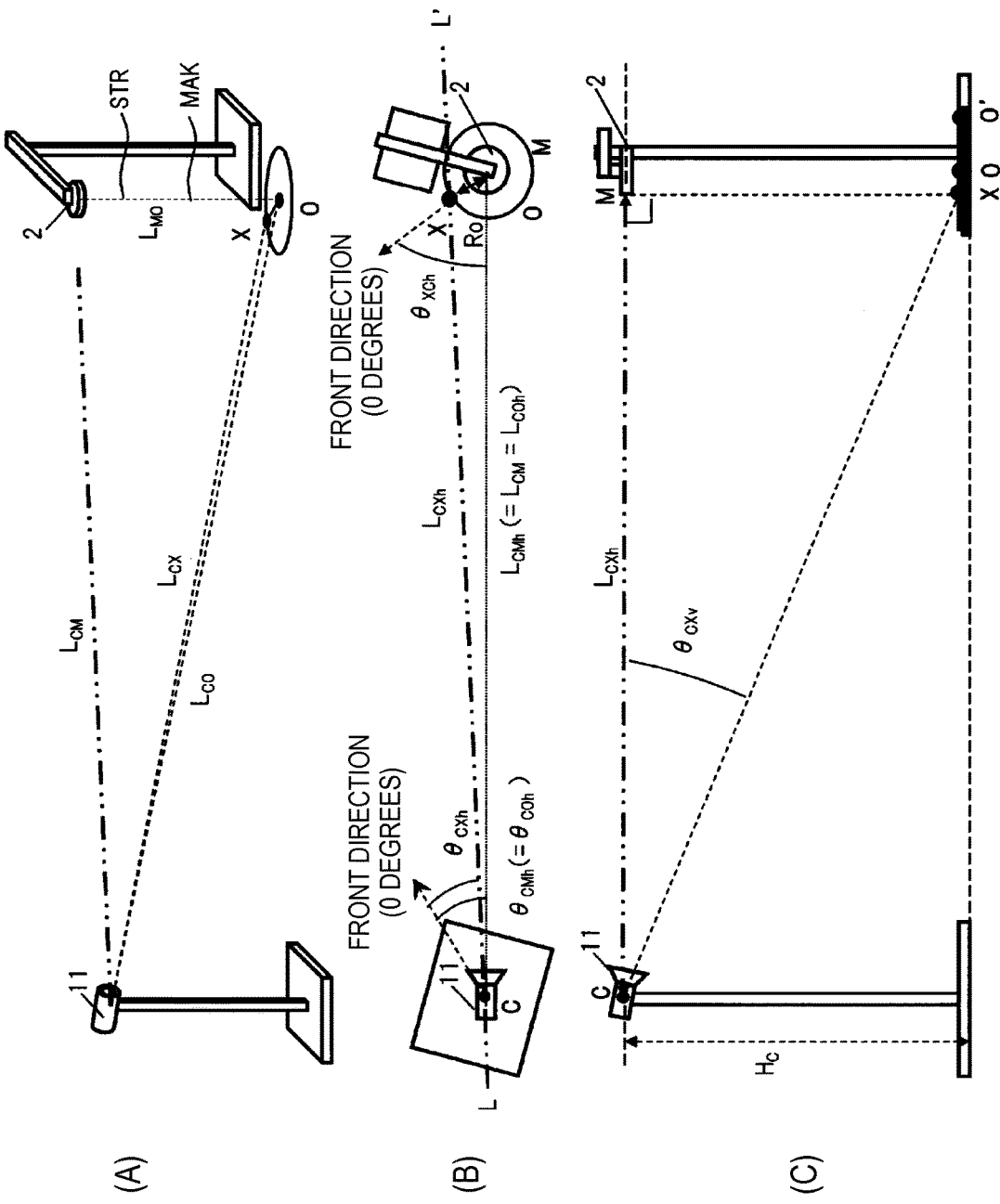
FIG. 90(A) is a diagram illustrating a positional relationship between the PTZ camera apparatus 1, the omnidirectional microphone array apparatus 2, and the calibration floor marker MAK4 in the thirteenth calibration method.
FIG. 90(B) is a horizontal direction plan view of FIG. 90(A)
FIG. 90(C) is a sectional view taken along the line L-L' of FIG. 90(B).
Figure 91:
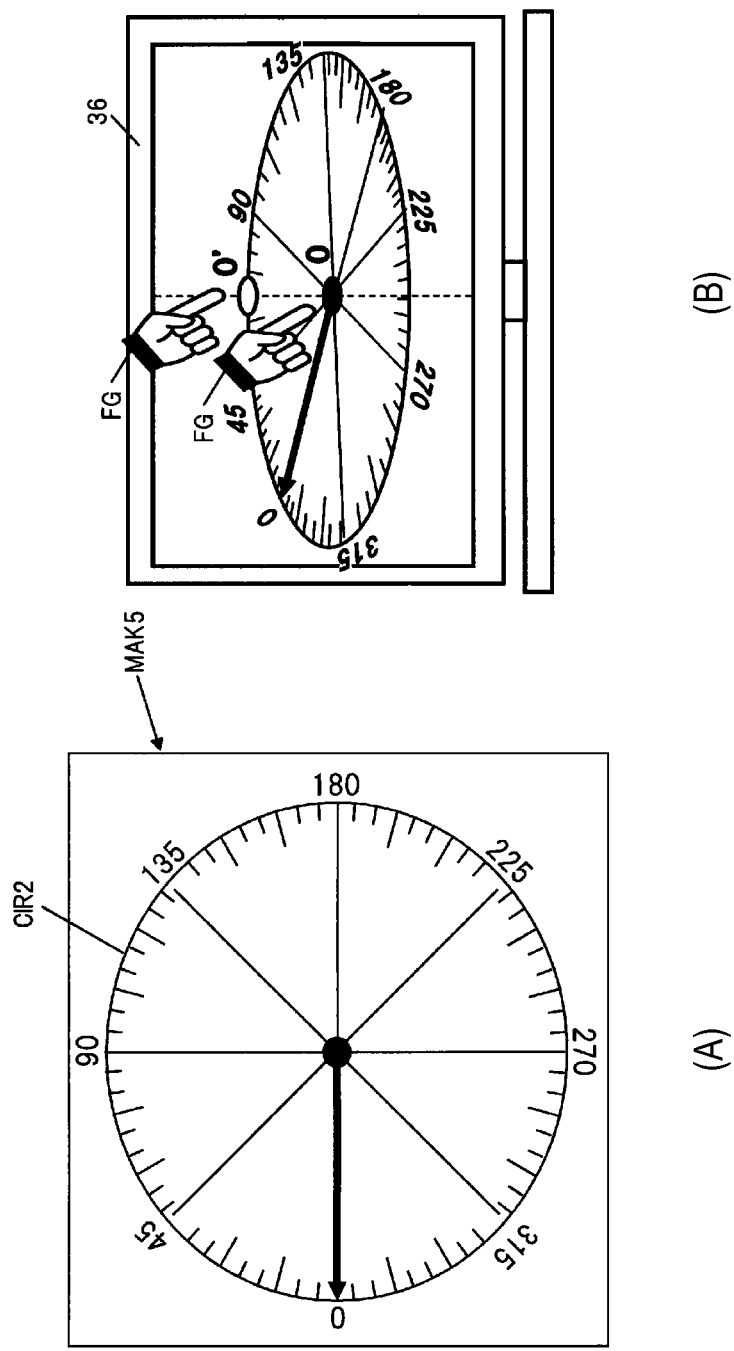
FIG. 91(A) is a plan view illustrating a calibration floor marker MAK5 with an angle memory.
FIG. 91(B) illustrates a screen of points O and O' enlarged by using the focus function of the PTZ camera apparatus 1.

Next, with reference to FIGS. 6, 80 and 81, a description will be made of an operation procedure in which the directionality control apparatus 3 of the directionality control system 10 of the present embodiment computes a sound collection direction of the microphone array apparatus 2. FIG. 6 is a flowchart illustrating an operation procedure in which the directionality control apparatus 3 of the directionality control system 10 of the present embodiment computes a sound collection direction of the microphone array apparatus 2. FIG. 6 illustrates the entire operation procedure in which the directionality control apparatus 3 of the directionality control system 10 of the present embodiment computes a sound collection direction of the microphone array apparatus 2, and FIGS. 80 and 81 illustrate a fundamental approach to the computation. A detailed computation process will be described later with reference to FIG. 7 and the subsequent drawings.

In FIG. 6, the directionality control apparatus 3 receives designation of any position A' or region B in video data which is being displayed on a screen of the display device 36, via the operation unit 32 (step ST11). The directionality control apparatus 3 transmits a notification indicating that the designation of any position A' or region B in the video data which is being displayed on the screen of the display device 36 has been received, to the camera apparatus 11.

After step ST11, in a case where the camera apparatus 11 receives the notification indicating that the designation of the position A' or the region B has been received from the directionality control apparatus 3, the camera apparatus 11 acquires all or some coordinates of a distance, a horizontal angle, and a vertical angle ($L_{CA}, \theta_{CAh}, \theta_{CAv}$) to the sound collection region central position A corresponding to the position A' or the region B on the screen designated in step ST11, with the installation position of the camera apparatus 11 as a start point (step ST12).

The camera apparatus 11 transmits all or some of the coordinates of the distance, the horizontal angle, and the vertical angle ($L_{CA}, \theta_{CAh}, \theta_{CAv}$) to the sound collection region central position A corresponding to the position A' or the region B on the screen designated in step ST11 with the installation position of the camera apparatus 11 as a start point, to the directionality control apparatus 3.

The signal processing unit 33 of the directionality control apparatus 3 computes coordinates ($\theta_{MAh}, \theta_{MAv}$) indicating a sound collection direction of the microphone array apparatus 2 by using all or some of the coordinates of the distance, the horizontal angle, and the vertical angle ($L_{CA}, \theta_{CAh}, \theta_{CAv}$) to the sound collection region central position A corresponding to the position A' or the region B on the screen designated in step ST11 with the installation position of the camera apparatus 11 acquired in step ST12 as a start point, and each input parameter which is temporarily preserved in the memory 38 in step ST4 illustrated in FIG. 5 (step ST13).

The directionality control apparatus 3 transmits a directionality formation instruction including the coordinates ($\theta_{MAh}, \theta_{MAv}$) computed in step ST13 to the microphone array apparatus 2. The microphone array apparatus 2 forms the sound collection directionality of each of the microphones 22 and 23 in a sound collection direction indicated by the coordinates ($\theta_{MAh}, \theta_{MAv}$) computed by the directionality control apparatus 3 in response to the directionality formation instruction from the directionality control apparatus 3 (step ST14).

Consequently, the microphone array apparatus 2 can increase a volume level of audio data which is collected from the sound collection direction ($\theta_{MAh}, \theta_{MAv}$) in which the sound collection directionality is formed, and can reduce a volume level of audio data which is collected from a direction in which the sound collection directionality is not formed. In the above-described way, the operation is finished in which the directionality control apparatus 3 of the directionality control system 10 computes a sound collection direction of the microphone array apparatus 2.

(In Case of Camera Apparatus Sends Only Panning/Tilting/Zooming Information)

In the description hitherto, the camera apparatus 11 performs the operation in step ST12 illustrated in FIG. 6, but the camera apparatus 11 may send information regarding an angle in a panning direction, information regarding an angle in a tilting direction, and zooming information to the directionality control apparatus 3, and the directionality control apparatus 3 may compute a distance from the camera apparatus 11 to the sound collection region central position A, a horizontal angle, and a vertical angle ($L_{CA}, \theta_{CAh}, \theta_{CAv}$), which is also the same for each of the following embodiments.

In addition, in the directionality control system 10 of the present embodiment, a timing at which the microphone array apparatus 2 collects sound is not limited to the time right after step ST14, and may be, for example, the time after power is supplied to the microphone array apparatus 2.

(Description of Generalization of Coordinate Transform Process from Camera Coordinate System to Microphone Coordinate System)

FIG. 80 is a diagram illustrating a positional relationship between a camera CX installed on a wall surface of a room, an omnidirectional microphone array apparatus MX installed on a ceiling surface of the room, and a position of a sound source P. FIG. 81 is a diagram illustrating a horizontal angle and a vertical angle which are computed by using a microphone coordinate system of an omnidirectional microphone array apparatus 2 converted from a camera coordinate system of a PTZ camera apparatus 1 and which are directed from the omnidirectional microphone array apparatus 2 toward the sound source position P.

As illustrated in FIG. 80, for example, a case is assumed in which the camera CX (for example, the PTZ camera apparatus 1) is installed on the wall surface of the room, and the omnidirectional microphone array apparatus MX (for example, the omnidirectional microphone array apparatus 2)

is installed on the ceiling surface of the room. In this case, when the entire space is observed as a single coordinate system, if a position (that is, a vector $V_{CXMX}$) from the camera CX to the omnidirectional microphone array apparatus MX is known, a position (that is, a vector $V_{MXP}$) of the sound source P viewed from the omnidirectional microphone array apparatus MX can be specified by using a position (that is, a vector $V_{CXP}$) of the sound source P viewed from the camera CX. In other words, Equation (2) is established (refer to FIG. 80).

[Equation 2]

$$\vec{V}_{MXP} = \vec{V}_{CXP} - \vec{V}_{CXMX} \tag{2}$$

However, a position of the sound source P on an image captured by the camera CX is represented by coordinates corresponding to an independent coordinate system (hereinafter, referred to as a "camera coordinate system") of the camera CX, and a position of the sound source P which is a sound collection target of the omnidirectional microphone array apparatus MX is represented by coordinates corresponding to an independent coordinate system (hereinafter, referred to as a "microphone coordinate system") of the omnidirectional microphone array apparatus MX. For this reason, a coordinate transform process is required to compute a position of the sound source P viewed from the omnidirectional microphone array apparatus MX by using a position of the sound source P based on the camera coordinate system, viewed from the camera CX.

Coordinates (X,Y,Z) corresponding to the microphone coordinate system are expressed by Equation (3) by using coordinates (x,y,z) corresponding to the camera coordinate system, and a predetermined coordinate transform matrix U.

[Equation 3]

$$\begin{bmatrix} X \\ Y \\ Z \\ 1 \end{bmatrix} = [U] \begin{bmatrix} x \\ y \\ z \\ 1 \end{bmatrix} = \begin{bmatrix} U_{11} & U_{12} & U_{13} & U_{14} \\ U_{21} & U_{22} & U_{23} & U_{24} \\ U_{31} & U_{32} & U_{33} & U_{34} \\ 0 & 0 & 0 & 1 \end{bmatrix} \begin{bmatrix} x \\ y \\ z \\ 1 \end{bmatrix} \tag{3}$$

As a specific example, in a case where the x axis, the y axis, and the z axis of the camera coordinate system are rotated about the z axis by γ degrees, rotated about the x axis by α degrees, and rotated about the y axis by β degrees so that the coordinates of the camera CX are moved in parallel by $(x_0, y_0, z_0)$, the coordinate transform matrix U is expressed by Equation (4). In addition, in Equation (4), a parallel movement, an order of integration in a rotation matrix of the coordinate axes, or selection of a rotation axis is not limited thereto.

[Equation 4]

$$\begin{bmatrix} U_{11} & U_{12} & U_{13} & U_{14} \\ U_{21} & U_{22} & U_{23} & U_{24} \\ U_{31} & U_{32} & U_{33} & U_{34} \\ 0 & 0 & 0 & 1 \end{bmatrix} = \begin{bmatrix} 1 & 0 & 0 & -x_0 \\ 0 & 1 & 0 & -y_0 \\ 0 & 0 & 1 & -z_0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{bmatrix} \tag{4}$$

In order to compute the coordinate transform matrix U, a method using a design drawing (layout) of a space (for example, a room) in which the camera CX and the omnidirectional microphone array apparatus MX are installed may be employed (refer to FIG. 81, for example), and a method using an actually measured result may be employed in a case where there is no design drawing. Further, the coordinate transform matrix U is computed in a case where a single omnidirectional microphone array apparatus 2 is installed for a single camera CX. However, also in a case where a plurality of cameras CX and a single omnidirectional microphone array apparatus MX are installed or a case where a plurality of cameras CX and a plurality of omnidirectional microphone array apparatuses MX are installed, the coordinate transform matrix U between each camera CX and each omnidirectional microphone array apparatus MX is required to be computed.

Here, for example, it is assumed that data regarding coordinates $(x_0, y_0, z_0)$ in the camera coordinate system, indicating a distance between the PTZ camera apparatus 1 as the camera CX and the omnidirectional microphone array apparatus 2 as the omnidirectional microphone array apparatus MX, and the camera coordinate system and the microphone coordinate system are predefined, and an angle ξ formed by a horizontal reference axis of the camera is known. The user obtains data regarding coordinates of the PTZ camera apparatus 1 in an orthogonal coordinate system and the angle ξ by using a layout diagram and inputs the data and the angle via the operation unit 32.

Hereinafter, with reference to FIG. 81, a description will be made of an example in which the coordinate transform processing section 34z of the signal processing unit 33 of the directionality control apparatus 3 computes the coordinate transform matrix U and sound collection direction coordinates (Θ,Φ) in the microphone coordinate system by using the coordinate transform matrix U.

As illustrated in FIG. 81, the PTZ camera apparatus 1 is installed on the wall surface of the sound collection space (for example, a room), and the omnidirectional microphone array apparatus 2 is installed on the ceiling surface of the sound collection space (for example, a room). It is assumed that the wall surface is vertical (perpendicular) to a horizontal floor surface, and the ceiling surface is parallel (horizontal) to the horizontal floor surface.

In the camera coordinate system of the PTZ camera apparatus 1, an origin $O_C$ is a rotation center of the PTZ camera apparatus 1 in the panning direction and the tilting direction, an x-y plane is defined in parallel to a pedestal of the PTZ camera apparatus 1, and this x-y plane is parallel to the wall surface. In addition, the x axis is directed vertically upward.

First, the PTZ camera apparatus 1 transforms coordinates (r,θ,φ) in a spherical coordinate system of the camera coordinate system into coordinates (x,y,z) in the orthogonal coordinate system according to Equation (5), and transmits data regarding the coordinates (x,y,z) having undergone the transform process to the directionality control apparatus 3.

[Equation 5]

$$\begin{bmatrix} x \\ y \\ z \end{bmatrix} = \begin{bmatrix} r\sin\theta\cos\varphi \\ r\sin\theta\sin\varphi \\ r\cos\theta \end{bmatrix} \tag{5}$$

An origin $O_M$ of the omnidirectional microphone array apparatus 2 viewed from the PTZ camera apparatus 1 is provided at the position of $(x_0, y_0, z_0)$ when viewed from the orthogonal coordinate system of the PTZ camera apparatus 1. The microphone coordinate system of the omnidirectional microphone array apparatus 2 has the origin $O_M$ as a center of the omnidirectional microphone array apparatus 2, an array formation plane of the omnidirectional microphone array apparatus 2 is an X-Y plane, and the X-Y plane is parallel to the ceiling surface. In addition, the Z axis is perpendicular to the array formation plane (X-Y plane) and is directed vertically downward.

The coordinate transform processing section 34z of the signal processing unit 33 of the directionality control apparatus 3 moves in the origin $O_C$ of the PTZ camera apparatus 1 parallel by $(x_0,y_0,z_0)$ by using the data regarding the coordinates (x,y,z) in the orthogonal coordinate system of the PTZ camera apparatus 1 received from the PTZ camera apparatus 1, rotates the origin $O_C$ about the y axis by 90 degrees, and then rotates the origin $O_C$ about the z axis by ξ degrees, so as to compute data regarding the coordinates (X,Y,Z) in the orthogonal coordinate system of the omnidirectional microphone array apparatus 2 (refer to Equation (6)). In addition, in Equation (6), a parallel movement or an order of integration in a rotation matrix of the coordinate axes is not particularly limited, and the content of each vector changes depending on rotation about a rotation axis and an order of parallel movement according to an approach to coordinate transform in mathematics.

[Equation 6]

$$\begin{bmatrix} X \\ Y \\ Z \\ 1 \end{bmatrix} = \begin{bmatrix} \cos\xi & \sin\xi & 0 & 0 \\ -\sin\xi & \cos\xi & 0 & 0 \\ 0 & 0 & 1 & 0 \\ 0 & 0 & 0 & 1 \end{bmatrix} \begin{bmatrix} 0 & 0 & 1 & 0 \\ 0 & 1 & 0 & 0 \\ -1 & 0 & 0 & 0 \\ 0 & 0 & 0 & 1 \end{bmatrix} \begin{bmatrix} 1 & 0 & 0 & -x_0 \\ 0 & 1 & 0 & -y_0 \\ 0 & 0 & 1 & -z_0 \\ 0 & 0 & 0 & 1 \end{bmatrix} \cdot \begin{bmatrix} x \\ y \\ z \\ 1 \end{bmatrix} \quad (6)$$

The coordinate transform processing section 34z of the signal processing unit 33 of the directionality control apparatus 3 transforms the coordinates (X,Y,Z) in the orthogonal coordinate system of the omnidirectional microphone array apparatus 2 into coordinates (R,Θ,Φ) in the spherical coordinate system of the omnidirectional microphone array apparatus 2 according to Equation (7) based on the computation result using Equation (6). Thus, the directionality control apparatus 3 can compute the coordinates (Θ,Φ) in the spherical coordinate system of the omnidirectional microphone array apparatus 2 as the sound collection direction coordinates (Θ,Φ). Further, the output control section 35 of the signal processing unit 33 of the directionality control apparatus 3 forms the directionality in the sound collection direction coordinates (Θ,Φ).

[Equation 7]

$$\begin{bmatrix} R \\ \Theta \\ \Phi \end{bmatrix} = \begin{bmatrix} \sqrt{X^2+Y^2+Z^2} \\ \cos^{-1}\{Z/\sqrt{X^2+Y^2+Z^2}\} \\ \tan^{-1}\{Y/Z\} \end{bmatrix} \quad (7)$$

In addition, the above-described example of computing the sound collection direction coordinates (Θ,Φ) has been described with the position of the PTZ camera apparatus 1 as a reference, but is not limited to a case of using the position of the PTZ camera apparatus 1 as a reference as illustrated in FIG. 81, and, for example, a position of the sound source P may be used as a reference.

Further, a description has been made of a case where the PTZ camera apparatus 1 sends data which is transformed into orthogonal coordinates, but data of the camera coordinate system may be transmitted to the directionality control apparatus 3, and the directionality control apparatus 3 may perform coordinate transform on the data.

Hereinafter, a description will be made of an example of a method in which the camera apparatus 11 and the omnidirectional microphone array apparatus 2 specifically compute a sound collection direction of the omnidirectional microphone array apparatus 2 for a sound position viewed from the camera apparatus 11 based on an actually measured value from the camera apparatus 11 to the sound position without a design drawing (layout diagram) of an installation space (for example, a room).

(Method of Computing Coordinates ($\theta_{MAh},\theta_{MAv}$) Indicating Sound Collection Direction of Microphone Array Apparatus 2)

Next, with reference to FIGS. 7 to 18, a detailed description will be made of a method of computing the coordinates ($\theta_{MAh},\theta_{MAv}$) indicating a sound collection direction of the microphone array apparatus 2 in the signal processing unit 33 of the directionality control apparatus 3. Herein, a description will be made of a total of four types of computation methods.

(First Computation Method)

In a first computation method, a reference point O is provided in a direction of the optical axis CX of the camera apparatus 11.

The signal processing unit 33 computes the coordinates ($\theta_{MAh},\theta_{MAv}$) indicating a sound collection direction of the microphone array apparatus 2 based on:

(1) a horizontal component (direction) distance $L_{CMh}$ of a distance $L_{CM}$ between the camera apparatus 11 and the microphone array apparatus 2;

(2) a distance $L_{CO}$ and a depression angle $\theta_{CO}$ from the camera apparatus 11 to the reference point O;

(3) a distance $L_{MO}$ and a depression angle $\theta_{MO}$ from the microphone array apparatus 2 to the reference point O;

(4) respective heights $H_C$, $H_M$ and $H_O$ of the camera apparatus 11, the microphone array apparatus 2, and the reference point O from a horizontal surface;

(5) a horizontal angle $\theta_{CAh}$ and a vertical angle $\theta_{CAv}$ from the camera apparatus 11 to the sound collection region central position A; and (6) a height $H_A$ of the sound collection region central position A from the horizontal surface.

In the first computation method, the input parameters in step ST2 illustrated in FIG. 5 include:

(1) the horizontal component (direction) distance $L_{CMh}$ of the distance $L_{CM}$ from the camera apparatus 11 to the microphone array apparatus 2;

(2) the distance $L_{CO}$ and the depression angle $\theta_{CO}$ from the camera apparatus 11 to the reference point O;

(3) the distance $L_{MO}$ and the depression angle $\theta_{MO}$ from the microphone array apparatus 2 to the reference point O; and (4) the respective heights $H_C$, $H_M$ and $H_O$ of the camera apparatus 11, the microphone array apparatus 2, and the reference point O from the horizontal surface.

(1) The horizontal component (direction) distance $L_{CMh}$ of the distance $L_{CM}$ from the camera apparatus 11 to the microphone array apparatus 2 is a fixed value defined when the camera apparatus 11 and the microphone array apparatus 2 are initially installed.

(2) The distance $L_{CO}$ and the depression angle $\theta_{CO}$ from the camera apparatus 11 to the reference point O can be easily measured, for example, by the user causing a laser range finder to be directed toward the camera apparatus 11 at the position of the reference point O.

(3) The distance $L_{MO}$ and the depression angle $\theta_{MO}$ from the microphone array apparatus 2 to the reference point O can be easily measured, for example, by the user causing the laser range finder to be directed toward the medical examination support system 2 at the position of the reference point O.

(4) The respective heights $H_C$, $H_M$ and $H_O$ of the camera apparatus 11, the microphone array apparatus 2, and the reference point O from the horizontal surface are fixed values defined when the camera apparatus 11 and the microphone array apparatus 2 are initially installed, and are fixed values defined when the position of the reference point O is determined.

In addition, in the first computation method, in the coordinates $(L_{CA}, \theta_{CAh}, \theta_{CAv})$ in step ST12 illustrated in FIG. 6, (5) the horizontal angle $\theta_{CAh}$ and the vertical angle $\theta_{CAv}$ from the camera apparatus 11 to the sound collection region central position A are used, and are acquired by using a function of a well-known technique of the camera apparatus 11.

In addition, in the first computation method, (6) the height $H_A$ of the sound collection region central position A from the horizontal surface is a fixed value which is set in advance, and is a selected value or an input value with a size of a person as $H_A$, for example, in a case where there is the person around the sound collection region central position A when the position A' is designated with the finger FG of the user. Alternatively, when the position A' is designated with the finger FG of the user, a default value (for example, 1.5 m or 0.8 m) may be used in a case where the directionality control apparatus 3 determines that there is a person (for example, an adult or a child) at the designated position.

Figure 7:
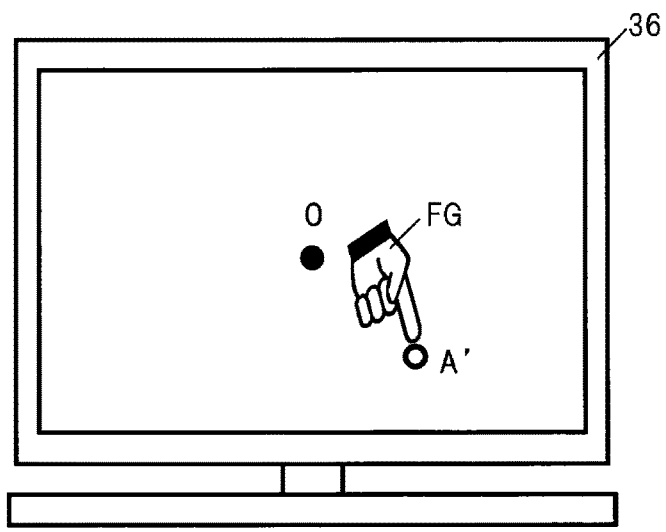
FIG. 7 is a diagram illustrating a positional relationship between a reference point O and the designated position A' for computing a sound collection direction of the microphone array apparatus on a screen of the display device in a first computation method.

FIG. 7 is a diagram illustrating a positional relationship between the reference point O and the designated position A' for computing a sound collection direction of the microphone array apparatus 2 on a screen of the display device 36 in the first computation method. The reference point O in the first computation method is present in the direction of the optical axis CX of the camera apparatus 11 and is thus located at the central point of the screen of the display device 36.

In addition, in the following description of the first computation method, the position A' designated with the finger FG of the user is different from the position of the reference point O and is a position in the lower right direction of the reference point O (refer to FIG. 7).

Figure 8:
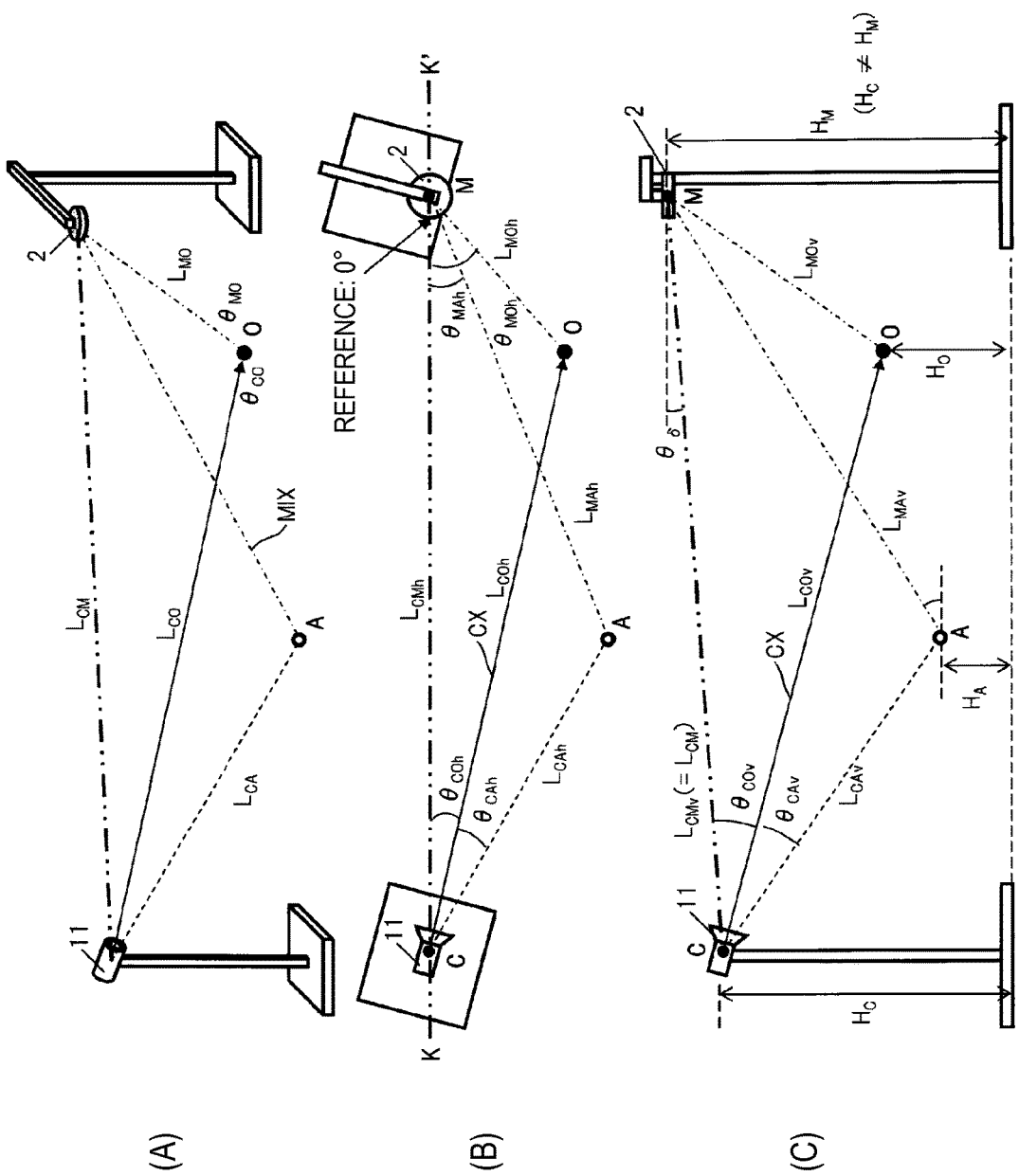

FIG. 8 illustrates each positional relationship between the camera apparatus 11 and the microphone array apparatus 2 of the directionality control system 10, the reference point O, and the sound collection region central position A in the first computation method. FIG. 8(A) is a perspective view. FIG. 8(B) is a horizontal direction plan view. FIG. 8(C) is a vertical direction sectional view taken along the line K-K' of FIG. 8(B).

Figure 9:
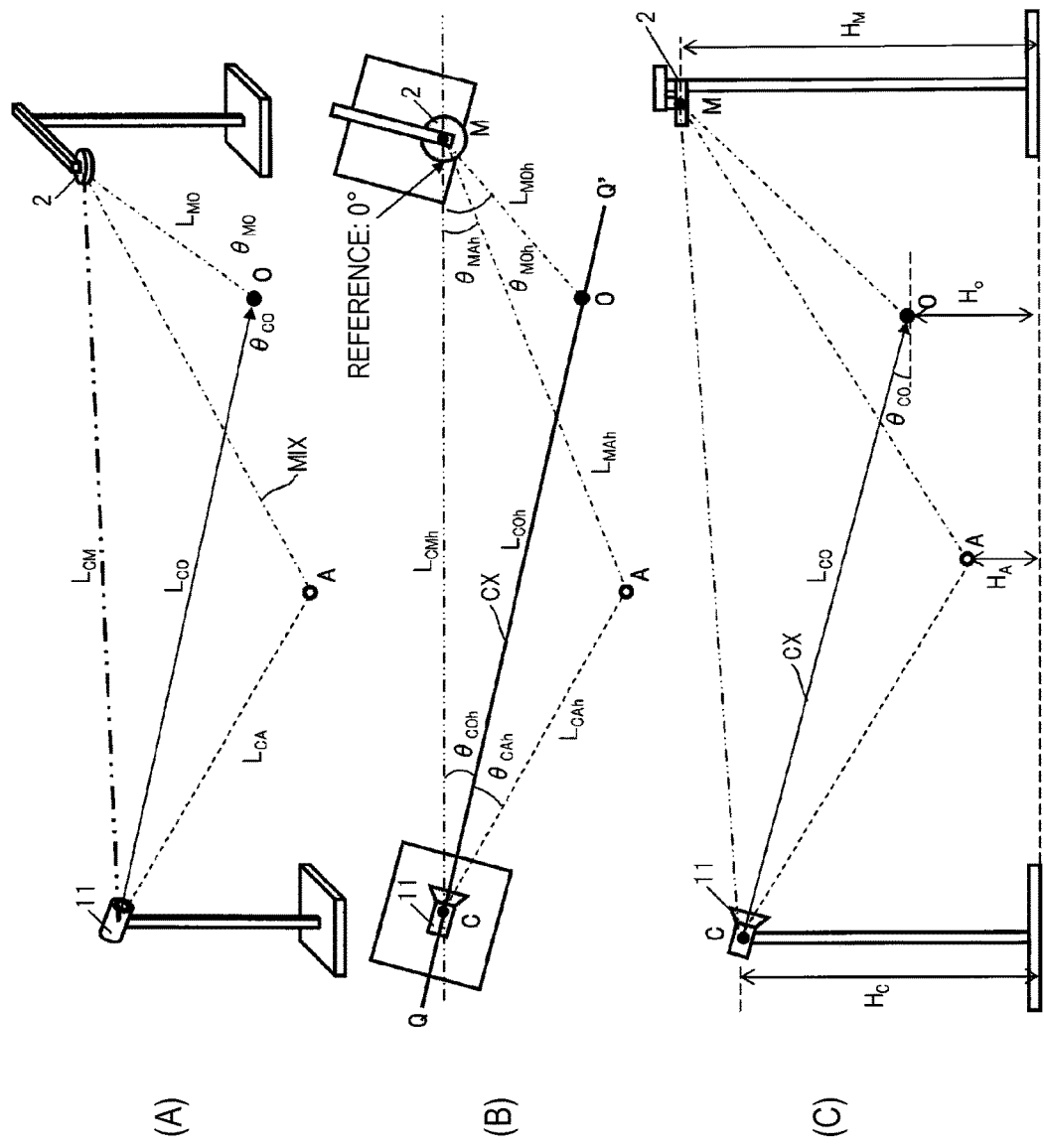

FIG. 9 illustrates each positional relationship between the camera apparatus 11 and the microphone array apparatus 2 of the directionality control system 10, the reference point O, and the sound collection region central position A in the first computation method. FIG. 9(A) is a perspective view. FIG. 9(B) is a horizontal direction plan view. FIG. 9(C) is a vertical direction sectional view taken along the line Q-Q' of FIG. 9(B).

Figure 10:
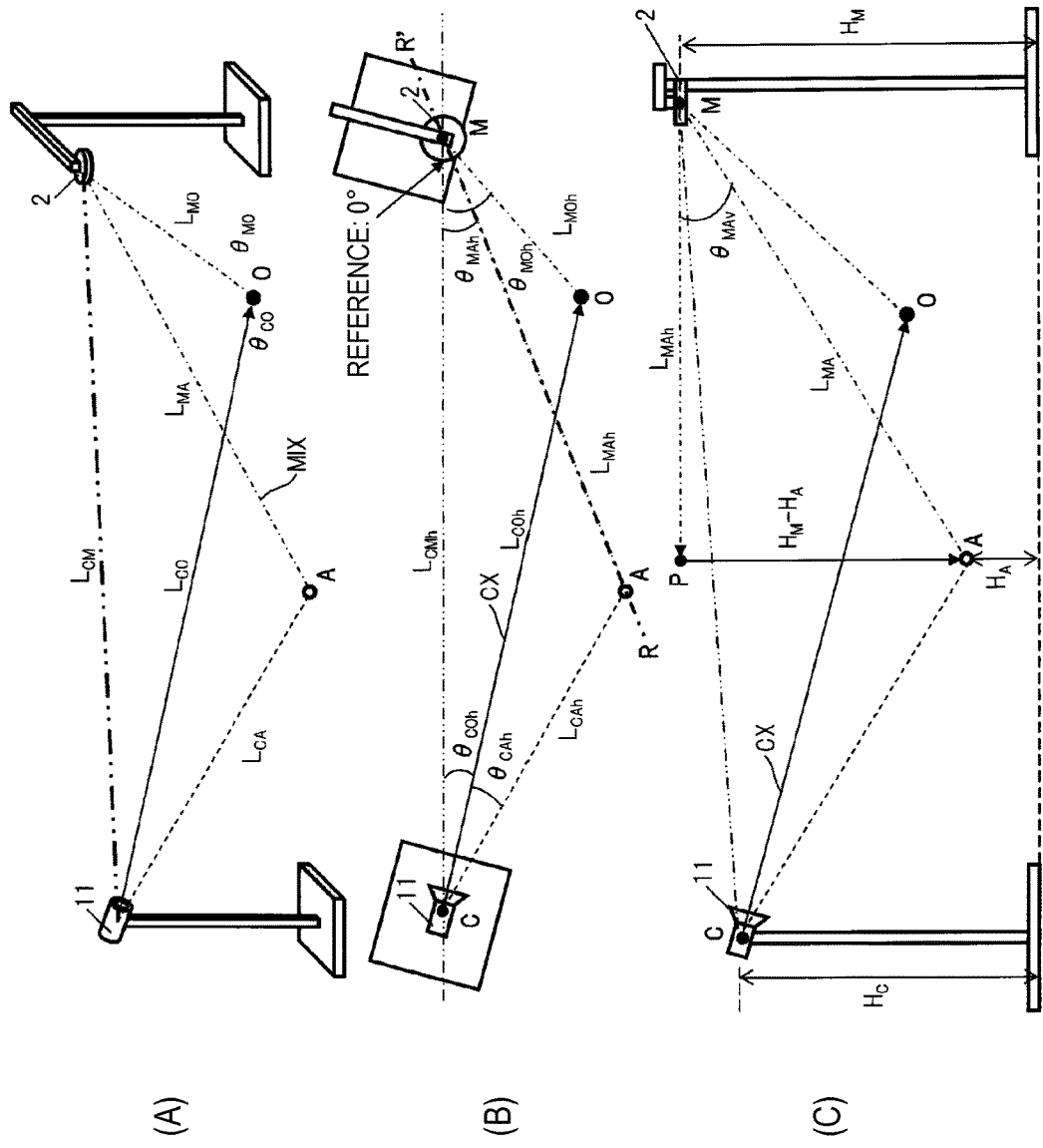

FIG. 10 illustrates each positional relationship between the camera apparatus 11 and the microphone array apparatus 2 of the directionality control system 10, the reference point O, and the sound collection region central position A in the first computation method. FIG. 10(A) is a perspective view. FIG. 10(B) is a horizontal direction plan view. FIG. 10(C) is a vertical direction sectional view taken along the line R-R' of FIG. 10(B).

Hereinafter, a detailed description will be made of the first computation method of the coordinates $(\theta_{MAh}, \theta_{MAv})$ indicating a sound collection direction of the microphone array apparatus 2 in the signal processing unit 33. In the first computation method, a reference line in a direction of 0 degrees of a horizontal angle of the microphone array apparatus 2 is directed toward the camera apparatus 11. In addition, a computation operation in the following description of each computation method will be described as being performed by the signal processing unit 33, but the signal processing unit 33 may be replaced with the coordinate transform processing section 34z.

The signal processing unit 33 computes a horizontal component distance $L_{COh}$ of the distance $L_{CO}$ from the camera apparatus 11 to the reference point O according to Equation (8) by using the distance $L_{CO}$ and the depression angle $\theta_{CO}$ from the camera apparatus 11 to the reference point O.

[Equation 8]

$$L_{COh} = L_{CO} \times \cos \theta_{CO} \quad (8)$$

The signal processing unit 33 computes a horizontal component distance $L_{MOh}$ of the distance $L_{MO}$ from the medical examination support system 2 to the reference point O according to Equation (9) by using the distance $L_{MO}$ and the depression angle $\theta_{MO}$ from the microphone array apparatus 2 to the reference point O.

[Equation 9]

$$L_{MOh} = L_{MO} \times \cos \theta_{MO} \quad (9)$$

The signal processing unit 33 computes a cosine value $\cos \theta_{COh}$ of a horizontal angle $\theta_{COh}$ of the depression angle $\theta_{CO}$ from the camera apparatus 11 to the reference point O according to Equation (10) based on the cosine theorem for the triangle COM illustrated in FIG. 8(B) by using the respective computation results of Equations (8) and (9).

[Equation 10]

$$\cos\theta_{COh} = \frac{L_{COh}^2 + L_{CMh}^2 - L_{MOh}^2}{2L_{COh} \times L_{CMh}} \quad (10)$$

The signal processing unit 33 computes a cosine value $\cos \theta_{MOh}$ of a horizontal angle $\theta_{MOh}$ of the depression angle $\theta_{MO}$ from the camera apparatus 11 to the reference point O according to Equation (11) based on the cosine theorem for the triangle COM illustrated in FIG. 8(B) by using the respective computation results of Equations (8) and (9).

[Equation 11]

$$\cos\theta_{MOh} = \frac{L_{MOh}^2 + L_{CMh}^2 - L_{COh}^2}{2L_{MOh} \times L_{CMh}} \quad (11)$$

The signal processing unit 33 computes a vertical component distance $L_{COv}$ of the distance $L_{CO}$ from the camera apparatus 11 to the reference point O according to Equation (12) by using the respective heights $H_C$ and $H_O$ of the camera apparatus 11 and the reference point O from the horizontal surface and the respective computation results of Equations (8) and (10).

[Equation 12]

$$L_{COv} = \sqrt{(L_{COh} \times \cos\theta_{COh})^2 + (H_C - H_O)^2} \quad (12)$$

The signal processing unit 33 computes a vertical component distance $L_{MOv}$ of the distance $L_{MO}$ from the microphone array apparatus 2 to the reference point O according to Equation (13) by using the respective heights $H_M$ and $H_O$ of the microphone array apparatus 2 and the reference point O from the horizontal surface and the respective computation results of Equations (9) and (11).

[Equation 13]

$$L_{MOv} = \sqrt{(L_{MOh} \times \cos\theta_{MOh})^2 + (H_M - H_O)^2} \quad (13)$$

The signal processing unit 33 computes a vertical component distance $L_{CMv}(=L_{CM})$ of the distance $L_{CM}$ from the camera apparatus 11 to microphone array apparatus 2 according to Equation (14) by using the respective heights $H_C$ and $H_M$ of the camera apparatus 11 and the microphone array apparatus 2 from the horizontal surface and the horizontal component distance $L_{CMh}$ of the distance $L_{CM}$ from the camera apparatus 11 to the microphone array apparatus 2.

[Equation 14]

$$L_{CMv} = L_{cm} = \sqrt{L_{CMh}^2 + (H_M - H_C)^2} \quad (14)$$

The signal processing unit 33 computes a cosine value $\cos\theta_{COv}$ of the vertical angle $\theta_{COv}$ of the depression angle $\theta_{CO}$ from the camera apparatus 11 to the reference point O according to Equation (15) based on the cosine theorem for the triangle COM illustrated in FIG. 8(C) by using the respective computation results of Equations (12) to (14).

[Equation 15]

$$\cos\theta_{COv} = \frac{L_{COv}^2 + L_{CMv}^2 - L_{MOv}^2}{2L_{COv} \times L_{CMv}} \quad (15)$$

The signal processing unit 33 computes a sine value $\sin\theta_\delta$ of an angle $\theta_\delta$ between a direction which is directed toward the microphone array apparatus 2 from the camera apparatus 11 illustrated in FIG. 8(C) and the horizontal surface according to Equation (16) by using the computation result of Equation (14) and the respective heights $H_C$ and $H_M$ of the camera apparatus 11 and the microphone array apparatus 2 from the horizontal surface.

[Equation 16]

$$\sin\theta_\delta = \frac{H_M - H_C}{L_{CMv}} \quad (16)$$

Next, the signal processing unit 33 computes a distance $L_{CA}$ from the camera apparatus 11 to the sound collection region central position A according to Equation (17) by using the respective computation results of Equations (15) and (16), the vertical angle $\theta_{CAv}$ from the camera apparatus 11 to the sound collection region central position A, the height $H_A$ of the sound collection region central position A from the horizontal surface, and the height $H_C$ of the camera apparatus 11 from the horizontal surface.

[Equation 17]

$$L_{CA} = \frac{H_C - H_A}{\sin(\theta_{COv} + \theta_{CAv} - \theta_\delta)} \quad (17)$$

The signal processing unit 33 computes a horizontal component distance $L_{CAh}$ of the distance $L_{CA}$ from the camera apparatus 11 to the sound collection region central position A according to Equation (18) by using the respective computation results of Equations (15) to (17) and the vertical angle $\theta_{CAv}$ from the camera apparatus 11 to the sound collection region central position A.

[Equation 18]

$$L_{CAh} = L_{CA} \times \cos(\theta_{COv} + \theta_{CAv} - \theta_\delta) = \frac{H_C - H_A}{\tan(\theta_{COv} + \theta_{CAv} - \theta_\delta)} \quad (18)$$

The signal processing unit 33 computes a horizontal component distance $L_{MAh}$ of the distance from the microphone array apparatus 2 to the sound collection region central position A according to Equation (19) based on the cosine theorem for the triangle CAM illustrated in FIG. 8(B) by using the respective computation results of Equations (10) and (18), the horizontal angle $\theta_{CAh}$ from the camera apparatus 11 to the sound collection region central position A, and the horizontal component distance $L_{CMh}$ of the distance $L_{CM}$ from the camera apparatus 11 to the microphone array apparatus 2.

[Equation 19]

$$L_{MAh} = \sqrt{(L_{CAh}^2 + L_{CMh}^2 - 2L_{CAh} \times L_{CMh} \times \cos(\theta_{COh} + \theta_{CAh})} \quad (19)$$

The signal processing unit 33 computes a cosine value $\cos\theta_{MAh}$ of the horizontal angle $\theta_{MAh}$ of the depression angle $\theta_{MA}$ from the microphone array apparatus 2 to the sound collection region central position A according to Equation (20) based on the cosine theorem for the triangle CAM illustrated in FIG. 8(B) by using the respective computation results of Equations (18) and (19), and the horizontal direction distance $L_{CMh}$ from the camera apparatus 11 to the microphone array apparatus 2.

Consequently, the signal processing unit 33 can compute the horizontal angle $\theta_{MAh}$ of the depression angle $\theta_{MA}$ from the microphone array apparatus 2 to the sound collection region central position A according to Equation (21).

[Equation 20]

$$\cos\theta_{MAh} = \frac{L_{MAh}^2 + L_{CMh}^2 - L_{CAh}^2}{2L_{MAh} \times L_{CMh}} \quad (20)$$

[Equation 21]

$$\theta_{MAh} = \arccos\left(\frac{L_{MAh}^2 + L_{CMh}^2 - L_{CAh}^2}{2L_{MAh} \times L_{CMh}}\right) \quad (21)$$

In addition, the signal processing unit 33 computes a tangent value $\tan\theta_{MAv}$ of the vertical angle $\theta_{MAv}$ of the depression angle $\theta_{MA}$ from the microphone array apparatus 2 to the sound collection region central position A according to Equation (22) based on a tangent for the triangle MAP illustrated in FIG. 10(C) by using the computation result of Equation (21), the height $H_M$ of the microphone array apparatus 2 from the horizontal surface and the height $H_A$ of the sound collection region central position A from the horizontal surface.

Consequently, the signal processing unit 33 can compute the vertical angle $\theta_{MAv}$ of the depression angle $\theta_{MA}$ from the microphone array apparatus 2 to the sound collection region central position A according to Equation (23).

[Equation 22]

$$\tan\theta_{MAv} = \frac{H_M - H_A}{L_{MAh}} \quad (22)$$

[Equation 23]

$$\theta_{MAv} = \arctan\left(\frac{H_M - H_A}{L_{MAh}}\right) \quad (23)$$

In the above-described way, in the first computation method, the reference point O is provided in the direction of the optical axis CX of the camera apparatus 11, and the directionality control apparatus 3 uses, as the respective input parameters, the distance $L_{CO}$ and the depression angle $\theta_{CO}$ between the camera apparatus 11 and the reference point O, the distance $L_{MO}$ and the depression angle $\theta_{MO}$ between the microphone array apparatus 2 and the reference point O, the horizontal component distance $L_{CMh}$ of the distance $L_{CM}$ between the camera apparatus 11 and the microphone array apparatus 2, and the respective heights $H_C$, $H_M$ and $H_O$ of the camera apparatus 11, the microphone array apparatus 2, and the reference point O from the horizontal surface.

Further, the directionality control apparatus 3 computes, as a sound collection direction, the coordinates ($\theta_{MAh},\theta_{MAv}$) indicating a direction which is directed toward the sound collection region central position A corresponding to the position A' designated with the finger FG of the user in a video of a predetermined region captured as a monitoring target of the camera apparatus 11, that is, a direction which is directed from the microphone array apparatus 2 toward the sound collection region central position A, with the position of the microphone array apparatus 2 as a reference, by using the respective input parameters.

Consequently, according to the first computation method, the directionality control system 10 of the present embodiment can form the sound collection directionality in the direction of the sound collection region central position A designated with the position of the microphone array apparatus 2 as a reference with high accuracy and can thus collect audio data in the corresponding direction with high accuracy.

(Second Computation Method)

In a second computation method, instead of the optical axis CX of the camera apparatus 11, a position of a marker MAK which is suspended vertically downward from the microphone array apparatus 2 by a string STR as the reference point O.

In addition, a length of the string STR is less than the height $H_M$ of the microphone array apparatus 2 from the horizontal surface. Further, the marker MAK is, for example, a ball in a color which can be easily recognized by the user when imaged by the camera apparatus 11.

The signal processing unit 33 computes the coordinates ($\theta_{MAh},\theta_{MAv}$) indicating a sound collection direction of the microphone array apparatus 2 based on:

(1) a distance $L_{CO}$ from the camera apparatus 11 to the marker MAK which is suspended vertically downward from the microphone array apparatus 2;

(2) a distance $L_{MO}$ from the microphone array apparatus 2 to the marker MAK;

(3) a horizontal angle $\theta_{CMh}$ (=$\theta_{COh}$) and a vertical angle $\theta_{COv}$ between a direction of the optical axis CX of the camera apparatus 11 and a direction which is directed from the camera apparatus 11 toward the marker MAK; and (4) a distance $L_{CA}$, a horizontal angle $\theta_{CAh}$, and a vertical angle $\theta_{CAv}$ from the camera apparatus 11 to the sound collection region central position A.

In the second computation method, the input parameters in step ST2 illustrated in FIG. 5 include:

(1) the distance $L_{CO}$ from the camera apparatus 11 to the marker MAK which is suspended vertically downward from the microphone array apparatus 2;

(2) the distance $L_{MO}$ from the microphone array apparatus 2 to the marker MAK; and (3) the horizontal angle $\theta_{CMh}$ and the vertical angle $\theta_{COv}$ between the direction of the optical axis CX of the camera apparatus 11 and the direction which is directed from the camera apparatus 11 toward the marker MAK.

(1) The distance $L_{CO}$ from the camera apparatus 11 to the marker MAK which is suspended vertically downward from the microphone array apparatus 2 is acquired by using a function of a well-known technique of the camera apparatus 11. For example, a focal length obtained when the camera apparatus 11 focuses and images the marker MAK may be used as $L_{CO}$.

(2) The distance $L_{MO}$ from the microphone array apparatus 2 to the marker MAK is the same as the length of the string STR.

(3) The horizontal angle $\theta_{CMh}$ and the vertical angle $\theta_{COv}$ between the direction of the optical axis CX of the camera apparatus 11 and the direction which is directed from the camera apparatus 11 toward the marker MAK is acquired by using a function of a well-known technique of the camera apparatus 11.

In addition, in the second computation method, (4) the distance $L_{CA}$, the horizontal angle $\theta_{CAh}$, and the vertical angle $\theta_{CAv}$ from the camera apparatus 11 to the sound collection region central position A are acquired by using a function of a well-known technique of the camera apparatus 11 in step ST12 illustrated in FIG. 6.

Figure 11:
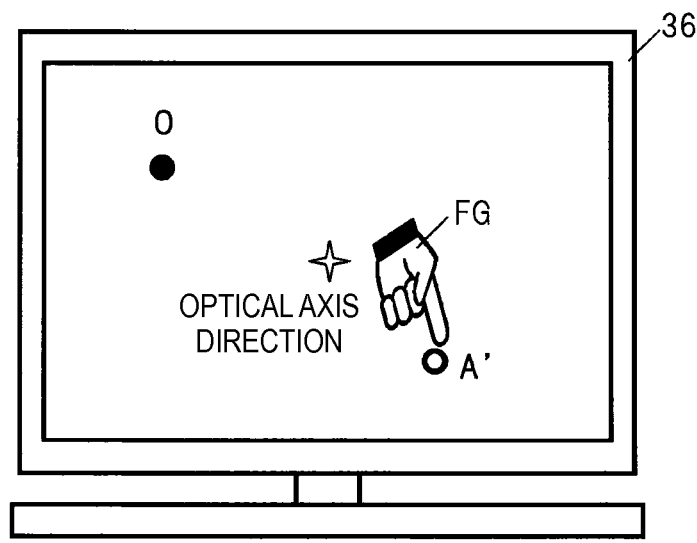
FIG. 11 is a diagram illustrating a positional relationship between the reference point O and the designated position A' for computing a sound collection direction of the microphone array apparatus on a screen of the display device in the second computation method.

FIG. 11 is a diagram illustrating a positional relationship between the reference point O and the designated position A' for computing a sound collection direction of the microphone array apparatus 2 on a screen of the display device 36 in the second computation method. The reference point O in the second computation method is not present in the direction of the optical axis CX of the camera apparatus 11 and thus is not present at the central point of the screen of the display device 36 and is located in the upper left direction from the central point of the screen of the display device 36, for example.

In addition, in the following description of the second computation method, the position A' designated with the finger FG of the user is different from the positions of the reference point O and the central point of the screen indicating the optical axis direction and is a position in the lower right direction of the reference point O (refer to FIG. 11).

Figure 12:
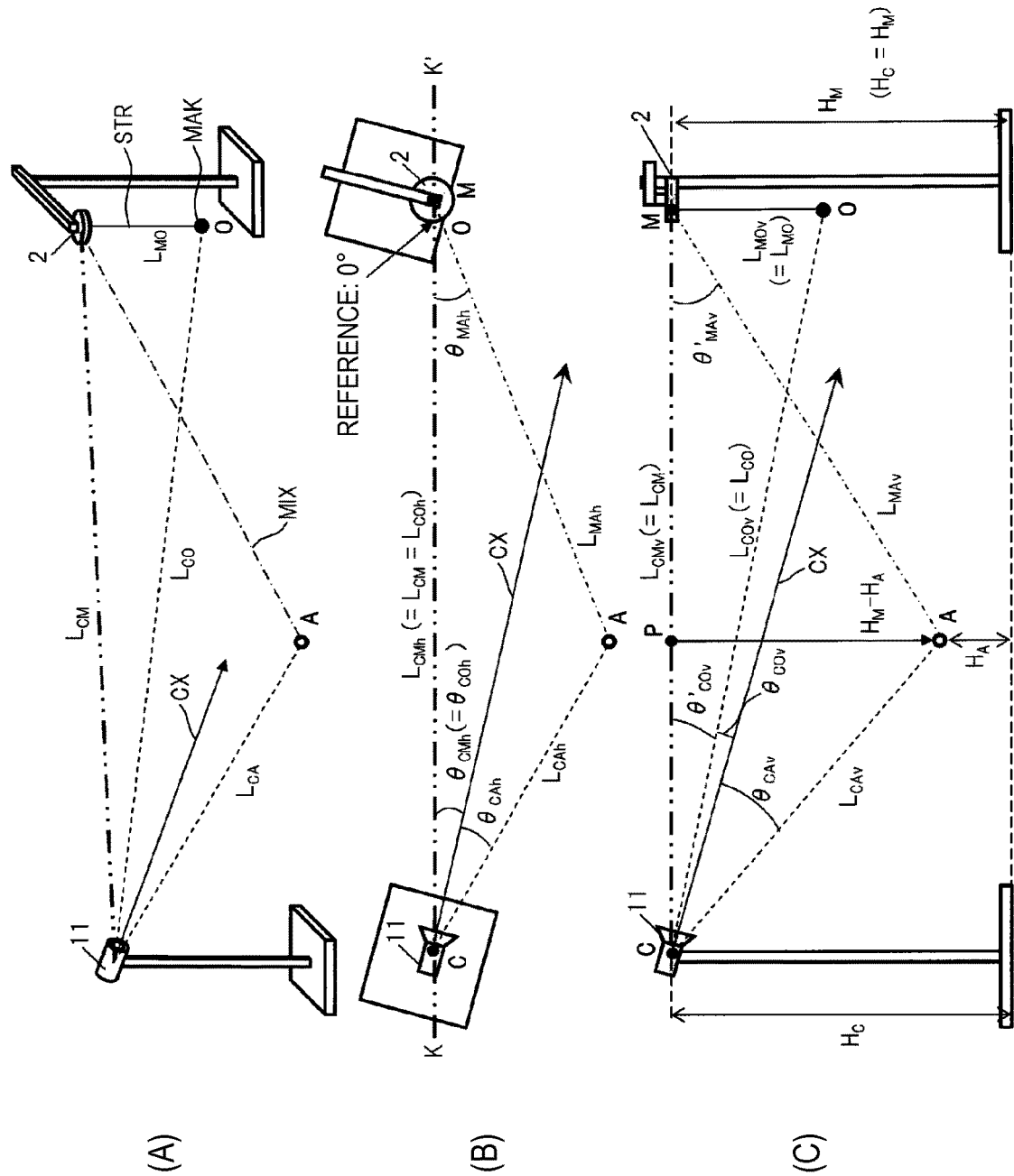

FIG. 12 illustrates each positional relationship between the camera apparatus 11 and the microphone array apparatus 2 of the directionality control system 10, a position of the marker MAK (reference point O), and the sound collection region central position A in the second computation method. FIG. 12(A) is a perspective view. FIG. 12(B) is a horizontal direction plan view. FIG. 12(C) is a vertical direction sectional view taken along the line K-K' of FIG. 12(B).

Figure 13:
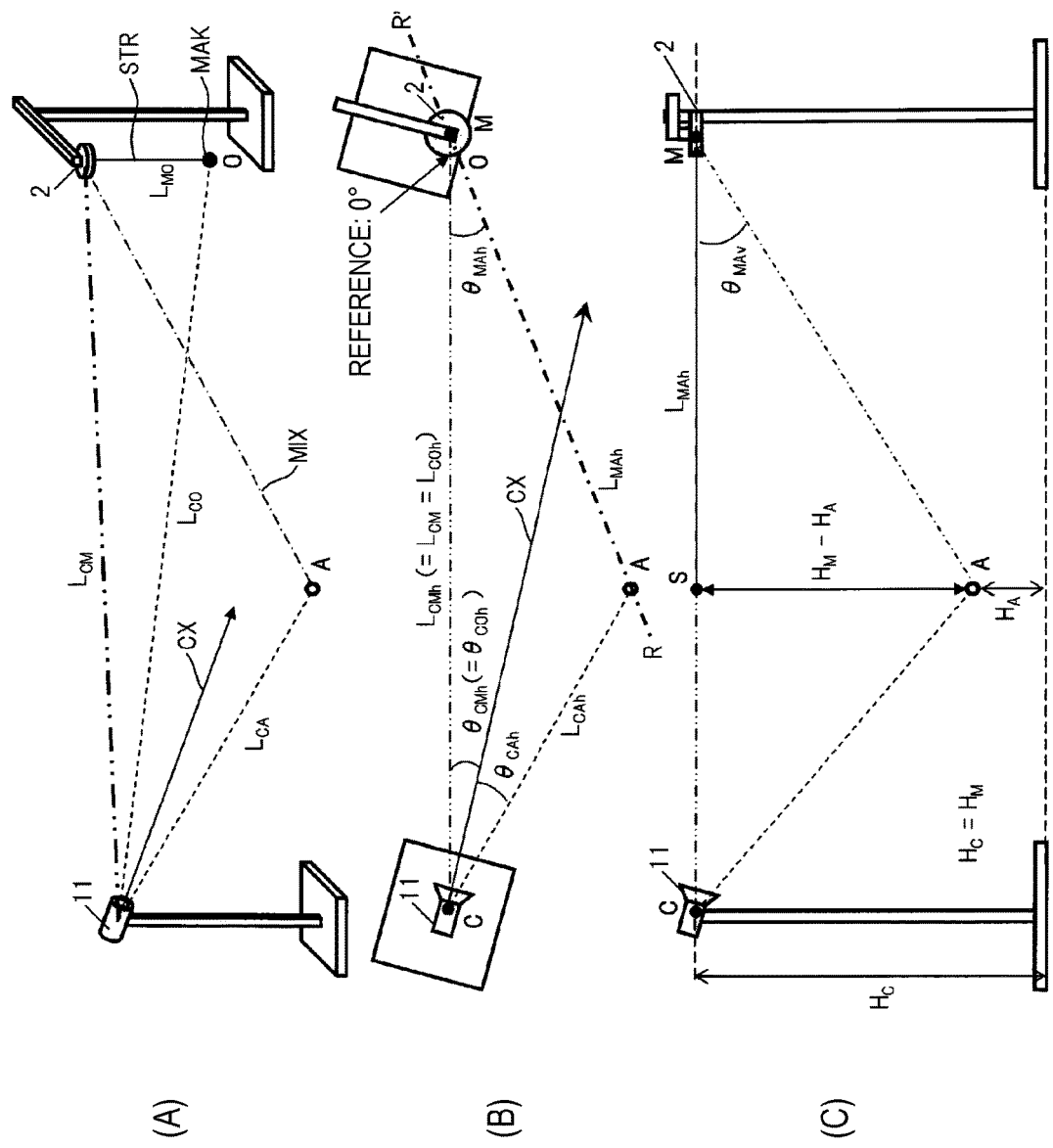

FIG. 13 illustrates each positional relationship between the camera apparatus 11 and the microphone array apparatus 2 of the directionality control system 10, the position of the marker MAK (reference point O), and the sound collection region central position A in the second computation method. FIG. 13(A) is a perspective view. FIG. 13(B) is a horizontal direction plan view. FIG. 13(C) is a vertical direction sectional view taken along the line R-R' of FIG. 13(B).

Hereinafter, a detailed description will be made of the second computation method of the coordinates $(\theta_{MAh}, \theta_{MAv})$ indicating a sound collection direction of the microphone array apparatus 2 in the signal processing unit 33. In the second computation method, a reference line in a direction of 0 degrees of a horizontal angle of the microphone array apparatus 2 is directed toward the camera apparatus 11, and the respective heights $H_C$ and $H_M$ of the camera apparatus 11 and the microphone array apparatus 2 from the horizontal surface are assumed to be the same as each other.

The signal processing unit 33 computes a sine value sin $\theta'_{COv}$ of an angle $\theta'_{COv}$ between a direction which is directed toward the marker MAK from the camera apparatus 11 and a direction which is directed toward the microphone array apparatus 2 from the camera apparatus 11 according to Equation (24) by using the distance $L_{CO}$ from the camera apparatus 11 to the marker MAK which is suspended vertically downward from the microphone array apparatus 2, and the distance $L_{MO}$ from the microphone array apparatus 2 to the marker MAK.

[Equation 24]

$$\sin\theta'_{COv} = \frac{L_{MO}}{L_{CO}} \quad (24)$$

The signal processing unit 33 computes a distance $L_{CM}$ between the camera apparatus 11 and the microphone array apparatus 2 according to Equation (25) by using the computation result of Equation (24) and the distance $L_{CO}$ from the camera apparatus 11 to the marker MAK which is suspended vertically downward from the microphone array apparatus 2.

[Equation 25]

$$L_{CM} = L_{CO} \times \cos\theta'_{COv} \quad (25)$$

The signal processing unit 33 computes a horizontal component distance $L_{CAh}$ of the distance $L_{CA}$ from the camera apparatus 11 to the sound collection region central position A according to Equation (26) by using the respective computation results of Equations (24) and (25), the distance $L_{CA}$ and the vertical angle $\theta_{CAv}$ from the camera apparatus 11 to the sound collection region central position A, and the vertical angle $\theta_{COv}$ between the direction of the optical axis CX of the camera apparatus 11 and the direction which is directed from the camera apparatus 11 toward the marker MAK.

[Equation 26]

$$L_{CAh} = L_{CA} \times \cos(\theta'_{COv} + \theta_{COv} + \theta_{CAv}) \quad (26)$$

The signal processing unit 33 computes a horizontal component distance $L_{MAh}$ of the distance from the microphone array apparatus 2 to the sound collection region central position A according to Equation (27) based on the cosine theorem for the triangle CAM illustrated in FIG. 12(B) by using the respective computation results of Equations (25) and (26), the horizontal angle $\theta_{CAh}$ from the camera apparatus 11 to the sound collection region central position A, and the horizontal angle $\theta_{CMh}$ between the direction of the optical axis CX of the camera apparatus 11 and the direction which is directed from the camera apparatus 11 toward the marker MAK.

[Equation 27]

$$L_{MAh} = \sqrt{(L_{CAh}^2 + L_{CMh}^2 - 2L_{CAh} \times L_{CMh} \times \cos(\theta_{CMh} + \theta_{CAh}))} \quad (27)$$

The signal processing unit 33 computes a cosine value cos $\theta_{MAh}$ of the horizontal angle $\theta_{MAh}$ of the depression angle $\theta_{MA}$ from the microphone array apparatus 2 to the sound collection region central position A according to Equation (28) based on the cosine theorem for the triangle CAM illustrated in FIG. 12(B) by using the respective computation results of Equations (25), (26) and (27), and the horizontal direction distance $L_{CMh}$ from the camera apparatus 11 to the microphone array apparatus 2.

Consequently, the signal processing unit 33 can compute the horizontal angle $\theta_{MAh}$ of the depression angle $\theta_{MA}$ from the microphone array apparatus 2 to the sound collection region central position A according to Equation (29).

[Equation 28]

$$\cos\theta_{MAh} = \frac{L_{MAh}^2 + L_{CM}^2 - L_{CAh}^2}{2L_{MAh} \times L_{CM}} \quad (28)$$

[Equation 29]

$$\theta_{MAh} = \arccos\left(\frac{L_{MAh}^2 + L_{CM}^2 - L_{CAh}^2}{2L_{MAh} \times L_{CM}}\right) \quad (29)$$

The signal processing unit 33 computes a vertical component distance $L_{CAv}$ of the distance $L_{CA}$ from the camera apparatus 11 to the sound collection region central position A according to Equation (30) by using the distance $L_{CA}$ and the horizontal angle $\theta_{CAh}$ from the camera apparatus 11 to the sound collection region central position A, and the horizontal angle $\theta_{CMh}$ between the direction of the optical axis CX of the camera apparatus 11 and the direction which is directed from the camera apparatus 11 toward the marker MAK.

[Equation 30]

$$L_{CAv} = L_{CA} \times \cos(\theta_{CMh} + \theta_{CAh}) \quad (30)$$

The signal processing unit 33 computes a vertical component distance $L_{MAv}$ from the microphone array apparatus 2 to the sound collection region central position A according to Equation (31) based on the cosine theorem for the triangle CAM illustrated in FIG. 12(B) by using the respective computation results of Equations (25), (26) and (30).

[Equation 31]

$$L_{MAv} = \sqrt{(L_{CAv}^2 + L_{CM}^2 - 2L_{CAv} \times L_{CM} \times \cos(\theta_{COv} + \theta'_{COv} + \theta_{CAv}))} \quad (31)$$

The signal processing unit 33 computes a cosine value cos $\theta'_{MAv}$ of the angle $\theta'_{MAv}$ between the direction which is directed from the microphone array apparatus 2 toward the camera apparatus 11 and the direction which is directed from the microphone array apparatus 2 toward the sound collection region central position A according to Equation (32)

based on the cosine theorem for the triangle MAP illustrated in FIG. 12(C) by using the respective computation results of Equations (25), (30) and (31).

[Equation 32]
$$\cos\theta'_{MAv} = \frac{L_{MAv}^2 + L_{CM}^2 - L_{CAv}^2}{2L_{MAv} \times L_{CM}} \qquad (32)$$

The signal processing unit 33 computes a sine value $\sin\theta'_{MAv}$ for the angle $\theta'_{MAv}$ between the direction which is directed from the microphone array apparatus 2 toward the camera apparatus 11 and the direction which is directed from the microphone array apparatus 2 toward the sound collection region central position A according to Equation (33) based on a sine for the triangle MAS illustrated in FIG. 13(C).

The signal processing unit 33 computes a tangent value $\tan\theta_{MAv}$ of the vertical angle $\theta_{MAv}$ of the depression angle $\theta_{MA}$ from the microphone array apparatus 2 to the sound collection region central position A according to Equation (34) by using the respective computation results of Equations (27) and (33).

Consequently, the signal processing unit 33 can compute the vertical angle $\theta_{MAv}$ of the depression angle $\theta_{MA}$ from the microphone array apparatus 2 to the sound collection region central position A according to Equation (35).

[Equation 33]
$$\sin\theta'_{MAv} = \frac{H_M - H_A}{L_{MAv}} \qquad (33)$$

[Equation 34]
$$\tan\theta_{MAv} = \frac{H_M - H_A}{L_{MAh}} \qquad (34)$$

[Equation 35]
$$\theta_{MAh} = \arctan\left(\frac{H_M - H_A}{L_{MAh}}\right) \qquad (35)$$

In the above-described way, in the second computation method, the marker MAK which is suspended vertically downward from the microphone array apparatus 2 by using the string is provided as the reference point O, and the directionality control apparatus 3 uses, as the respective input parameters, the distance $L_{CO}$ and the vertical angle $\theta_{COv}$ of the depression angle $\theta_{CO}$ from the camera apparatus 11 to the marker MAK, the angle $\theta_{CMh}$ between the direction of the optical axis CX of the camera apparatus 11 and the direction which is directed from the camera apparatus 11 toward the medical examination support system 2, and the distance $L_{MO}$ from the microphone array apparatus 2 to the marker MAK.

Further, the directionality control apparatus 3 computes, as a sound collection direction, the coordinates $(\theta_{MAh},\theta_{MAv})$ indicating a direction which is directed toward the sound collection region central position A corresponding to the position A' designated with the finger FG of the user in a video of a predetermined region captured as a monitoring target of the camera apparatus 11, that is, a direction which is directed from the microphone array apparatus 2 toward the sound collection region central position A, with the position of the microphone array apparatus 2 as a reference, by using the respective input parameters.

Consequently, according to the second computation method, the directionality control system 10 of the present embodiment can more easily compute the coordinates $(\theta_{MAh},\theta_{MAv})$ indicating a direction which is directed toward the sound collection region central position A from the microphone array apparatus 2 since the number of input parameters is smaller than that in the first computation method. In addition, the directionality control system 10 can form the sound collection directionality in the direction of the sound collection region central position A designated with the position of the microphone array apparatus 2 as a reference with high accuracy and can thus collect audio data in the corresponding direction with high accuracy.

In addition, in the second computation method, a position of the marker MAK may be a position of an intersection between the direction of the optical axis CX of the camera apparatus 11 and the vertically downward direction of the microphone array apparatus 2. In this case, since the angle $\theta_{COv}$ between the direction of the optical axis CX and the direction which is directed from the camera apparatus 11 toward the marker MAK is 0 (zero), an amount of computation of the coordinates $(\theta_{MAh},\theta_{MAv})$ indicating the direction which is directed from the microphone array apparatus 2 toward the sound collection region central position A is reduced in the signal processing unit 33.

Further, in the second computation method, in a case where the microphone array apparatus 2 has a function of performing irradiation with laser light, the microphone array apparatus 2 performs irradiation with laser light vertically downward without using the marker MAK, and the camera apparatus 11 analyzes a captured image of an irradiation point (for example, a point with a certain height in the vertically downward direction of the microphone array apparatus 2) of the laser light. Thus, the signal processing unit 33 can compute the coordinates $(\theta_{MAh},\theta_{MAv})$ indicating the direction which is directed from the microphone array apparatus 2 toward the sound collection region central position A in the same manner as in the above-described second computation method.

(Third Computation Method)

In a third computation method, a sound source is provided as the reference point O in the direction of the optical axis CX of the camera apparatus 11.

The signal processing unit 33 computes the coordinates $(\theta_{MAh},\theta_{MAv})$ indicating a sound collection direction of the microphone array apparatus 2 based on:

(1) a distance $L_{CM}$ from the camera apparatus 11 to the microphone array apparatus 2;

(2) a distance $L_{CO}$ from the camera apparatus 11 to a predetermined sound source position (reference point O) in the optical axis direction;

(3) a horizontal angle $\theta_{MOh}$ and a vertical angle $\theta_{MOv}$ from the microphone array apparatus 2 to the sound source position (reference point O);

(4) respective heights $H_C$, $H_M$ and $H_O$ of the camera apparatus 11, the microphone array apparatus 2, and the sound source position (reference point O) from a horizontal surface; and (5) a distance $L_{CA}$, a horizontal angle $\theta_{CAh}$, and a vertical angle $\theta_{CAv}$ from the camera apparatus 11 to the sound collection region central position A.

In the third computation method, the input parameters in step ST2 illustrated in FIG. 5 include:

(1) the distance $L_{CM}$ from the camera apparatus 11 to the microphone array apparatus 2;

(2) the distance $L_{CO}$ from the camera apparatus 11 to the predetermined sound source position (reference point O) in the optical axis direction;

(3) the horizontal angle $\theta_{MOh}$ and the vertical angle $\theta_{MOv}$ from the microphone array apparatus 2 to the sound source position (reference point O); and (4) the respective heights $H_C$, $H_M$ and $H_O$ of the camera apparatus 11, the microphone array apparatus 2, and the sound source position (reference point O) from the horizontal surface.

(1) The distance $L_{CM}$ from the camera apparatus 11 to the microphone array apparatus 2 is a fixed value defined when the camera apparatus 11 and the microphone array apparatus 2 are initially installed.

(2) The distance $L_{CO}$ from the camera apparatus 11 to the predetermined sound source position (reference point O) in the optical axis direction can be easily measured, for example, by the user causing a laser range finder to be directed toward the camera apparatus 11 at the position of the reference point O.

(3) The horizontal angle $\theta_{MOh}$ and the vertical angle $\theta_{MOv}$ from the microphone array apparatus 2 to the sound source position (reference point O) may be measured by using a function (for example, a sound source detection function) of a well-known technique of the microphone array apparatus 2.

(4) The respective heights $H_C$, $H_M$ and $H_O$ of the camera apparatus 11, the microphone array apparatus 2, and the reference point O from the horizontal surface are fixed values defined when the camera apparatus 11 and the microphone array apparatus 2 are initially installed, and are fixed values defined when the position of the reference point O is determined.

In addition, in the third computation method, (5) the distance $L_{CA}$, the horizontal angle $\theta_{CAh}$, and the vertical angle $\theta_{CAv}$ from the camera apparatus 11 to the sound collection region central position A are acquired by using a function of a well-known technique of the camera apparatus 11 in step ST12 illustrated in FIG. 6.

Further, in the third computation method, since the sound source serving as the reference point O is present in the direction of the optical axis CX of the camera apparatus 11, a positional relationship between the reference point O and the designated position A' for computing a sound collection direction of the microphone array apparatus 2 on a screen of the display device 36 is the positional relationship illustrated in FIG. 7, and thus description thereof will be omitted.

Figure 14:
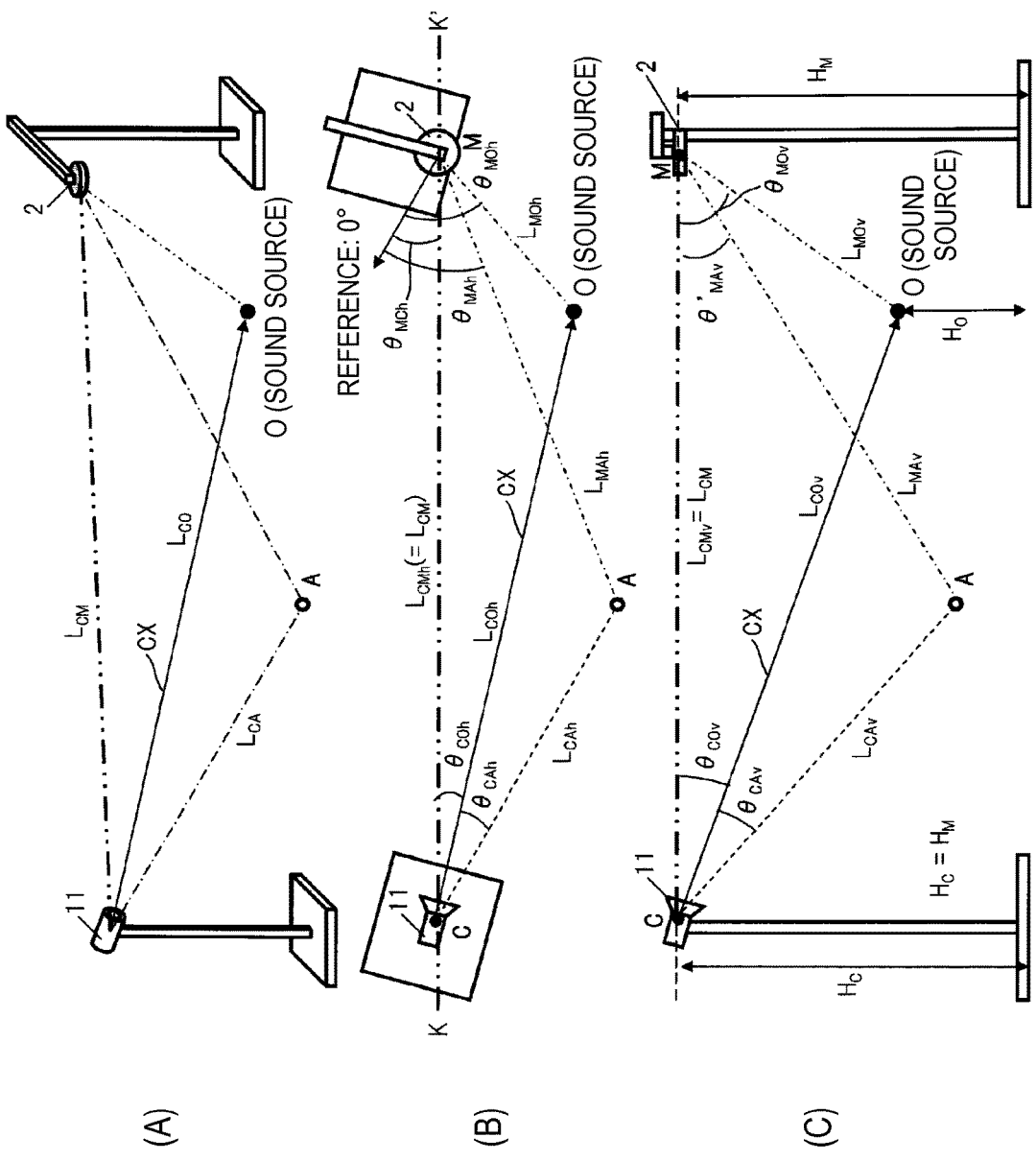

FIG. 14 illustrates each positional relationship between the camera apparatus 11 and the microphone array apparatus 2 of the directionality control system 10, the sound source position (reference point O), and the sound collection region central position A in the third computation method. FIG. 14(A) is a perspective view. FIG. 14(B) is a horizontal direction plan view. FIG. 14(C) is a vertical direction sectional view taken along the line K-K' of FIG. 14(B).

Figure 15:
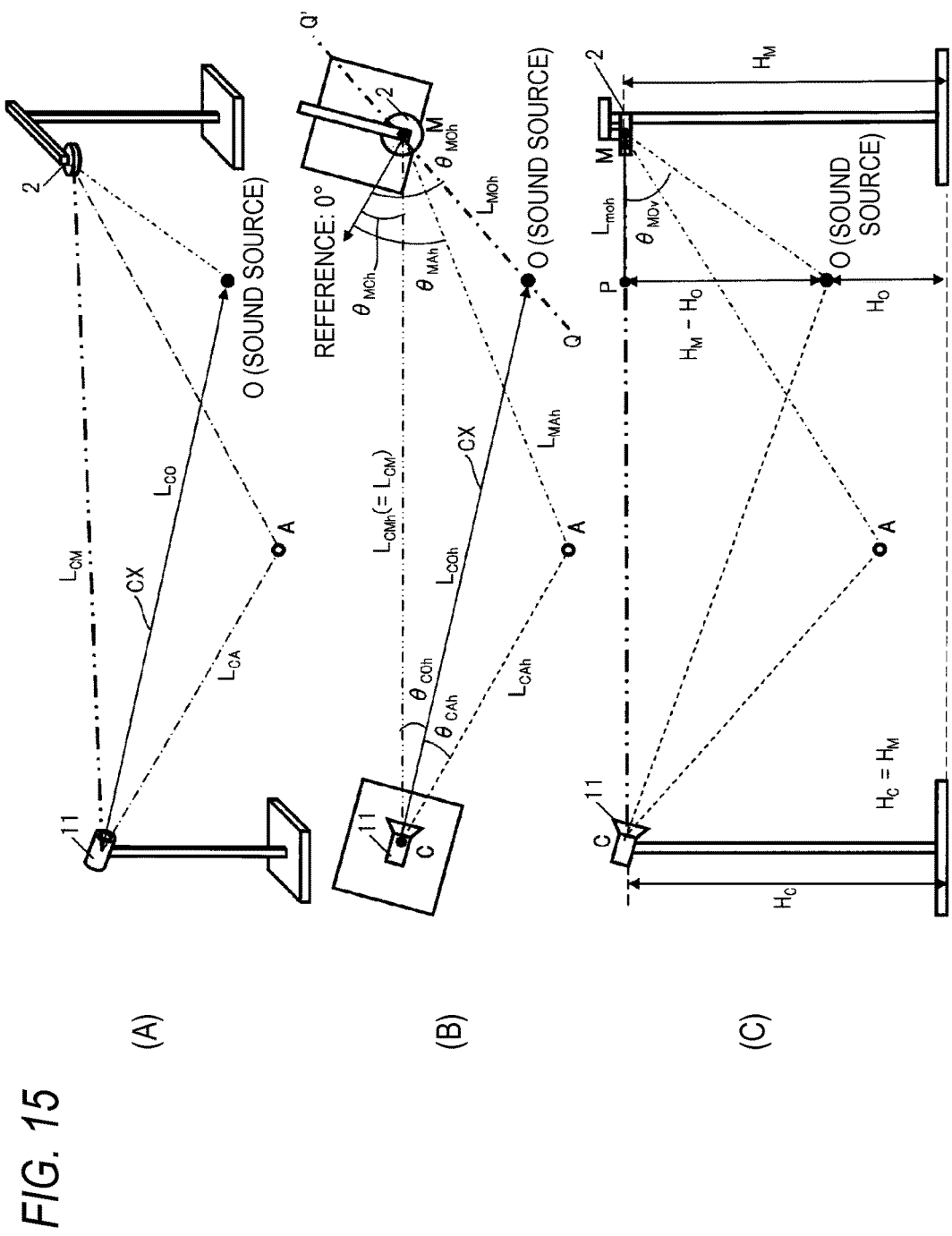

FIG. 15 illustrates each positional relationship between the camera apparatus 11 and the microphone array apparatus 2 of the directionality control system 10, the sound source position (reference point O), and the sound collection region central position A in the third computation method. FIG. 15(A) is a perspective view. FIG. 15(B) is a horizontal direction plan view. FIG. 15(C) is a vertical direction sectional view taken along the line Q-Q' of FIG. 15(B).

Figure 16:
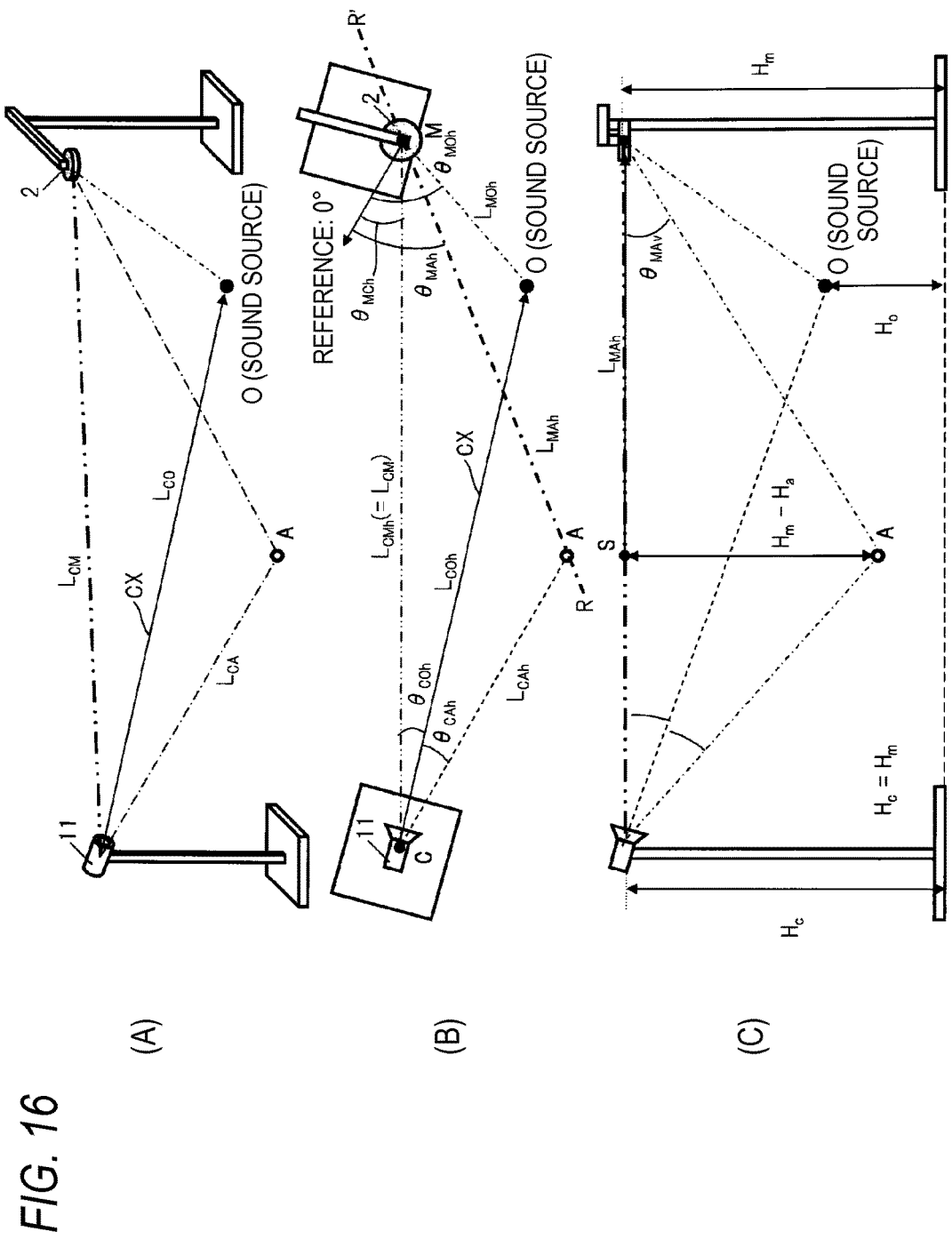

FIG. 16 illustrates each positional relationship between the camera apparatus 11 and the microphone array apparatus 2 of the directionality control system 10, the sound source position (reference point O), and the sound collection region central position A in the third computation method. FIG. 16(A) is a perspective view. FIG. 16(B) is a horizontal direction plan view. FIG. 16(C) is a vertical direction sectional view taken along the line R-R' of FIG. 16(B).

Hereinafter, a detailed description will be made of the third computation method of the coordinates $(\theta_{MAh}, \theta_{MAv})$ indicating a sound collection direction of the microphone array apparatus 2 in the signal processing unit 33. In the third computation method, a reference line in a direction of 0 degrees of a horizontal angle of the microphone array apparatus 2 is not directed toward the camera apparatus 11, and the respective heights $H_C$ and $H_M$ of the camera apparatus 11 and the microphone array apparatus 2 from the horizontal surface are assumed to be the same as each other.

First, the signal processing unit 33 computes a horizontal component distance $L_{COh}$ of the distance $L_{CO}$ from the camera apparatus 11 to the predetermined sound source position (reference point O) in the optical axis direction according to Equation (36) by using the distance $L_{CO}$ from the camera apparatus 11 to the predetermined sound source position (reference point O) in the optical axis direction, and the respective heights $H_C$ and $H_O$ of the camera apparatus 11 and the sound source position (reference point O) in the optical axis direction from the horizontal surface.

[Equation 36]

$$L_{COh} = \sqrt{(L_{CO})^2 - (H_C - H_O)^2} \qquad (36)$$

The signal processing unit 33 computes a horizontal component distance $L_{MOh}$ of the distance $L_{MO}$ from the microphone array apparatus 2 to the predetermined sound source position (reference point O) in the optical axis direction according to Equation (37) by using the vertical angle $\theta_{MOv}$ from the microphone array apparatus 2 to the sound source position (reference point O), and the respective heights $H_M$ and $H_O$ of the microphone array apparatus 2 and the sound source position (reference point O) from the horizontal surface.

[Equation 37]

$$L_{MOh} = \frac{(H_M - H_O)}{\tan\theta_{MOv}} \qquad (37)$$

The signal processing unit 33 computes a cosine value $\cos\theta_{COh}$ of a horizontal angle $\theta_{COh}$ of the depression angle $\theta_{CO}$ from the camera apparatus 11 to the sound source (reference point O) according to Equation (38) based on the cosine theorem for the triangle COM illustrated in FIG. 14(B) by using the respective computation results of Equations (36) and (37), and the distance $L_{CM}$ between the camera apparatus 11 and the microphone array apparatus 2, and, similarly, computes a cosine value $\cos(\theta_{MOh} - \theta_{MCh})$ of a horizontal angle $(\theta_{MOh} - \theta_{MCh})$ of the depression angle $(\theta_{MO} - \theta_{MC})$ in a direction which is directed toward the sound source (reference point O) from the reference line for the 0-degree direction of the microphone array apparatus 2 according to Equation (39).

Consequently, the signal processing unit 33 can compute an angle $\theta_{MCh}$ between the reference line for the 0-degree direction of the microphone array apparatus 2 and the direction which is directed from the microphone array apparatus 2 toward the camera apparatus 11 according to Equation (40).

[Equation 38]

$$\cos\theta_{COh} = \frac{L_{COh}^2 + L_{CM}^2 - L_{MOh}^2}{2L_{COh} \times L_{CM}} \quad (38)$$

[Equation 39]

$$\cos(\theta_{MOh} - \theta_{MCh}) = \frac{L_{MOh}^2 + L_{CM}^2 - L_{COh}^2}{2L_{CM} \times L_{MOh}} \quad (39)$$

[Equation 40]

$$\theta_{MCh} = \theta_{MOh} - \arccos\left(\frac{L_{MOh}^2 + L_{CM}^2 - L_{COh}^2}{2L_{CM} \times L_{MOh}}\right) \quad (40)$$

Next, the signal processing unit 33 computes a vertical component distance $L_{COv}$ of the distance $L_{CO}$ from the camera apparatus 11 to the sound source position (reference point O) according to Equation (41) by using the respective computation results of Equations (36) and (38) and the respective heights $H_C$ and $H_O$ of the camera apparatus 11 and the sound source (reference point O) from the horizontal surface.

[Equation 41]

$$L_{COv} = \sqrt{(L_{COh} \times \cos\theta_{COh})^2 + (H_C - H_O)^2} \quad (41)$$

The signal processing unit 33 computes a vertical component distance $L_{MOv}$ of the distance $L_{MO}$ from the microphone array apparatus 2 to the sound source (reference point O) according to Equation (42) by using the respective computation results of Equations (37) and (39) and the respective heights $H_M$ and $H_O$ of the microphone array apparatus 2 and the sound source position (reference point O) from the horizontal surface.

[Equation 42]

$$L_{MOv} = \sqrt{(L_{MOh} \times \cos(\theta_{MOh} - \theta_{MCh}))^2 + (H_M - H_O)^2} \quad (42)$$

The signal processing unit 33 computes a cosine value $\cos\theta_{COv}$ of the angle $\theta_{COv}$ between the direction which is directed from the camera apparatus 11 toward sound source (reference point O) and the direction which is directed from the camera apparatus 11 toward the microphone array apparatus 2 according to Equation (43) based on the cosine theorem for the triangle COM illustrated in FIG. 14(C) by using the respective computation results of Equations (41) and (42) and the distance $L_{CM}$ ($=L_{CMv}$) between the camera apparatus 11 and the microphone array apparatus 2.

[Equation 43]

$$\cos\theta_{COv} = \frac{L_{COv}^2 + L_{CMv}^2 - L_{MOv}^2}{2L_{COv} \times L_{CMv}} \quad (43)$$

Next, the signal processing unit 33 computes a horizontal component distance $L_{CAh}$ of the distance $L_{CA}$ from the camera apparatus 11 to the sound collection region central position A according to Equation (44) by using the computation result of Equation (43), and the distance $L_{CA}$ and the vertical angle $\theta_{CAv}$ from the camera apparatus 11 to the sound collection region central position A.

[Equation 44]

$$L_{CAh} = L_{CA} \times \cos(\theta_{COv} + \theta_{CAv}) \quad (44)$$

The signal processing unit 33 computes a horizontal component distance $L_{MAh}$ of the distance $L_{MA}$ from the microphone array apparatus 2 to the sound collection region central position A according to Equation (45) based on the cosine theorem for the triangle CAM illustrated in FIG. 14(B) by using the respective computation results of Equations (39) and (44), and the distance $L_{CM}$ from the camera apparatus 11 to the microphone array apparatus 2.

[Equation 45]

$$L_{MAh} = \sqrt{L_{CAh}^2 + L_{CM}^2 - 2L_{CAh} \times L_{CM} \times \cos(\theta_{COh} + \theta_{CAh})} \quad (45)$$

The signal processing unit 33 computes a cosine value $\cos(\theta_{MAh} - \theta_{MCh})$ of a horizontal angle $(\theta_{MAh} - \theta_{MCh})$ of the depression angle $(\theta_{MA} - \theta_{MC})$ in a direction which is directed toward the sound collection region central position A from the reference line for the 0-degree direction of the microphone array apparatus 2 according to Equation (46) based on the cosine theorem for the triangle CAM illustrated in FIG. 14(B) by using the respective computation results of Equations (44) and (45), and the distance $L_{CM}$ from the camera apparatus 11 to the microphone array apparatus 2.

Consequently, the signal processing unit 33 can compute a horizontal angle $\theta_{MAh}$ of the depression angle $\theta_{MA}$ in the direction which is directed from the reference line for the 0-degree direction of the microphone array apparatus 2 toward the sound collection region central position A according to Equation (47).

[Equation 46]

$$\cos(\theta_{MAh} - \theta_{MCh}) = \frac{L_{MAh}^2 + L_{CM}^2 - L_{CAh}^2}{2L_{CM} \times L_{MAh}} \quad (46)$$

[Equation 47]

$$\theta_{MAh} = \theta_{MCh} + \arccos\left(\frac{L_{MAh}^2 + L_{CM}^2 - L_{CAh}^2}{2L_{CM} \times L_{MAh}}\right) \quad (47)$$

Further, the signal processing unit 33 computes a vertical component distance $L_{CAh}$ of the distance $L_{CA}$ from the camera apparatus 11 to the sound collection region central position A according to Equation (48) by using the computation result of Equations (40), and the distance $L_{CA}$ and the horizontal angle $\theta_{CAh}$ from the camera apparatus 11 to the sound collection region central position A.

[Equation 48]

$$L_{CAv} = L_{CA} \times \cos(\theta_{MCh} + \theta_{CAh}) \quad (48)$$

The signal processing unit 33 computes a vertical component distance $L_{MAv}$ of the distance $L_{MA}$ from the microphone array apparatus 2 to the sound collection region central position A according to Equation (49) based on the cosine theorem for the triangle CAM illustrated in FIG. 14(C) by using the respective computation results of Equations (41) and (48), the horizontal angle $\theta_{CAh}$ from the camera apparatus 11 to the sound collection region central position A, and the distance $L_{CM}$ from the camera apparatus 11 to the microphone array apparatus 2.

[Equation 49]

$$L_{MAv} = \sqrt{L_{CAv}^2 + L_{CM}^2 - 2L_{CAv} \times L_{CM} \times \cos(\theta_{COv} + \theta_{CAv})} \quad (49)$$

The signal processing unit 33 computes a cosine value $\cos\theta'_{MAv}$ of the angle $\theta'_{MAv}$ between the direction which is directed from the microphone array apparatus 2 toward the sound collection region central position A and the direction which is directed from the microphone array apparatus 2 toward the camera apparatus 11 in the K-K' section illustrated in FIG. 14(B) according to Equation (50) based on the cosine theorem for the triangle CAM illustrated in FIG. 14(C) by using the respective computation results of Equations (48) and (49) and the distance $L_{CM}$ from the camera apparatus 11 to the microphone array apparatus 2.

[Equation 50]

$$\cos\theta'_{MAv} = \frac{L_{MAv}^2 + L_{CM}^2 - L_{CAv}^2}{2 L_{MAv} \times L_{CM}} \quad (50)$$

The signal processing unit 33 computes a difference ($H_M$-$H_A$) between the heights $H_M$ and $H_A$ of the microphone array apparatus 2 and the sound collection region central position A from the horizontal surface according to Equation (51) by using the respective computation results of Equations (49) and (50).

[Equation 51]

$$H_M - H_A = L_{MAv} \times \sin\theta'_{MAv} \quad (51)$$

The signal processing unit 33 computes a tangent value $\tan\theta_{MAv}$ of the vertical angle $\theta_{MAv}$ of the depression angle $\theta_{MA}$ which is directed toward the sound collection region central position A from the reference line for the 0-degree direction of the microphone array apparatus 2 according to Equation (52) based on a tangent for the triangle MSA illustrated in FIG. 16(C) by using the respective computation results of Equations (45) and (51).

Consequently, the signal processing unit 33 can compute the vertical angle $\theta_{MAv}$ of the depression angle $\theta_{MA}$ from the reference line for the 0-degree direction of the microphone array apparatus 2 to the sound collection region central position A according to Equation (53).

[Equation 52]

$$\tan\theta_{MAv} = \frac{H_M - H_A}{L_{MAh}} \quad (52)$$

[Equation 53]

$$\theta_{MAv} = \arctan\left(\frac{H_M - H_A}{L_{MAh}}\right) \quad (53)$$

In the above-described way, in the third computation method, the sound source is provided as the reference point O in the direction of the optical axis CX of the camera apparatus 11, and the directionality control apparatus 3 uses, as the respective input parameters, the distance $L_{CO}$ from the camera apparatus 11 to the sound source (reference point O), the horizontal angle $\theta_{MOh}$ and the vertical angle $\theta_{MOv}$ of the depression angle $\theta_{MO}$ from the microphone array apparatus 2 to the sound source (reference point O), the distance $L_{CM}$ from the camera apparatus 11 to the microphone array apparatus 2, and the respective heights $H_C$, $H_M$ and $H_O$ of the camera apparatus 11, the microphone array apparatus 2, and the reference point O from the horizontal surface.

Further, the directionality control apparatus 3 computes, as a sound collection direction, the coordinates ($\theta_{MAh}, \theta_{MAv}$) indicating a direction which is directed toward the sound collection region central position A corresponding to the position A' designated with the finger FG of the user in a video of a predetermined region captured as a monitoring target of the camera apparatus 11, that is, a direction which is directed from the microphone array apparatus 2 toward the sound collection region central position A, with the position of the microphone array apparatus 2 as a reference, by using the respective input parameters.

Consequently, according to the third computation method, even if the reference line for the 0-degree direction of the microphone array apparatus 2 is not set in advance in the direction toward the camera apparatus 11, the directionality control system 10 of the present embodiment can form the sound collection directionality in the direction of the sound collection region central position A designated with the position of the microphone array apparatus 2 as a reference with high accuracy and can thus collect audio data in the corresponding direction with high accuracy.

In addition, in each of the first to third computation methods, in order to simplify calculation of coordinates indicating a sound collection direction of the microphone array apparatus 2, a vertical angle and a horizontal angle representing the coordinates are computed in an approximate manner in some portions, but may be more accurately computed by using, for example, a geometric positional relationship.

(Fourth Computation Method)

Figure 17:
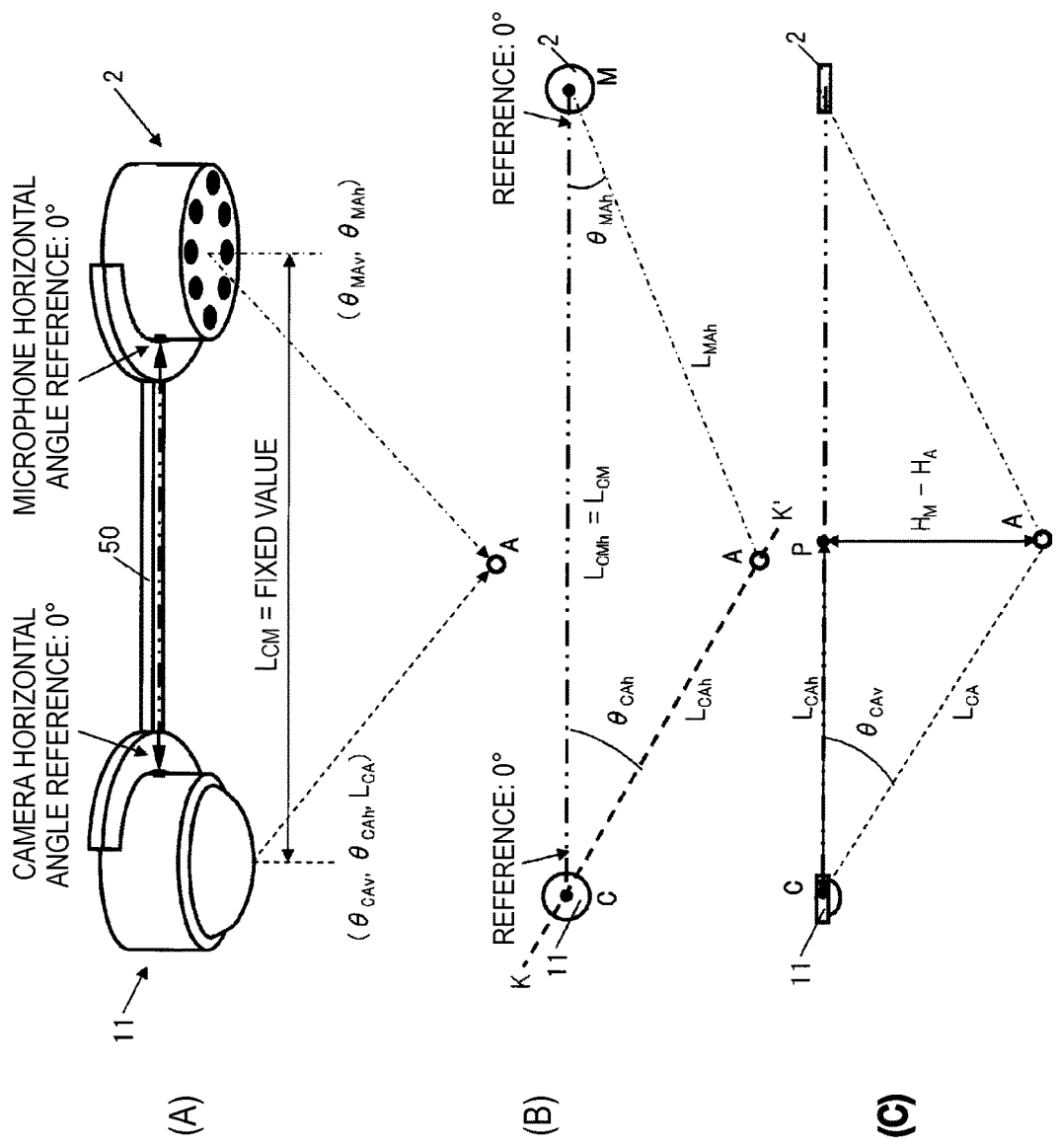
Figure 18:
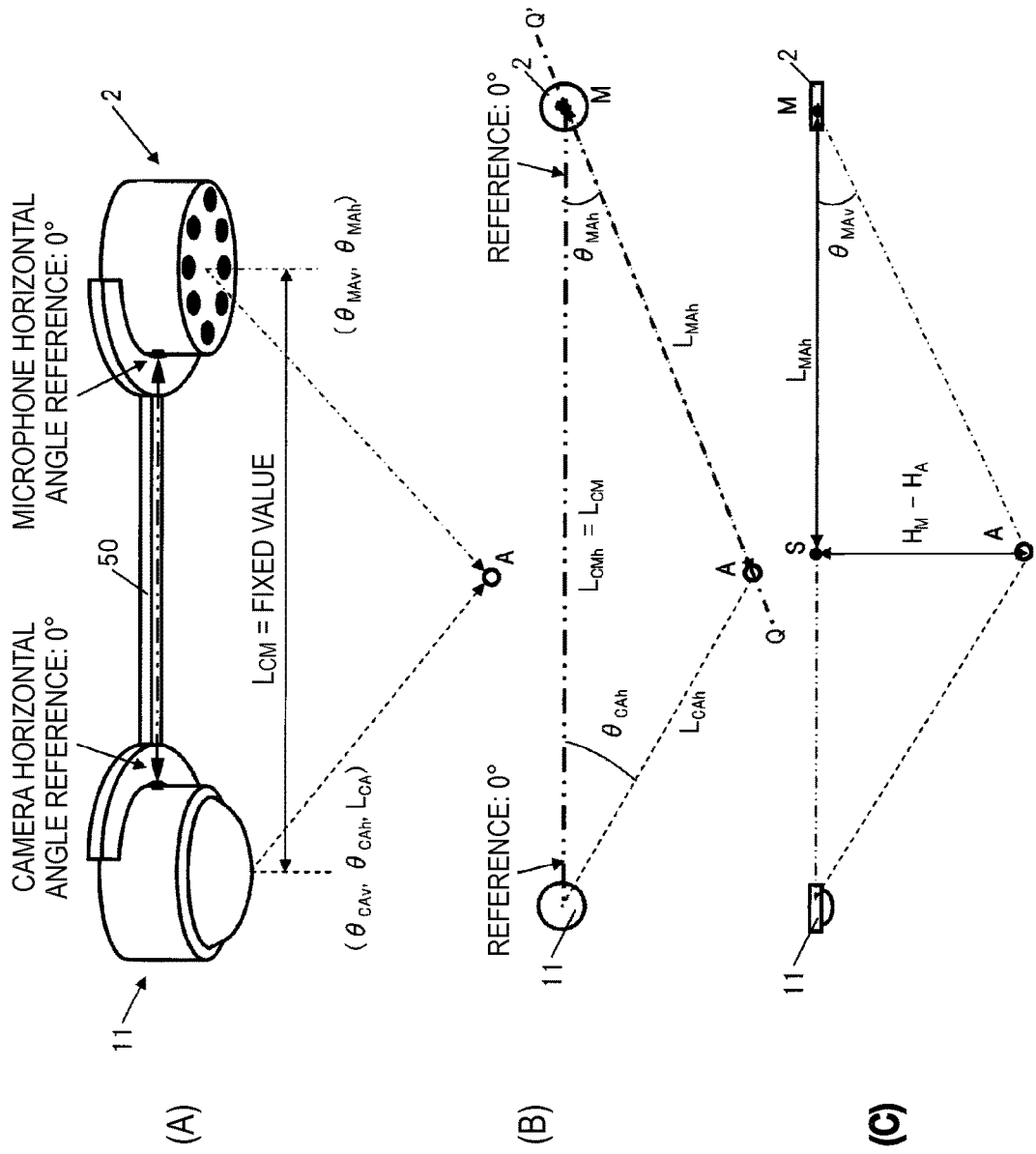

In a fourth computation method, the camera apparatus 11 and the microphone array apparatus 2 are connected and fixed to each other by using a dedicated tool 50 and are installed on, for example, an indoor ceiling surface (refer to FIG. 17 or 18).

The dedicated tool 50 connects and fixes the microphone array apparatus 2 and the camera apparatus 11 to each other so that, for example, a reference line for the 0-degree direction of the microphone array apparatus 2 opposes, for example, a reference line for the 0-degree direction of the camera apparatus 11 and heights thereof from a horizontal surface are the same as each other. In addition, a shape of the dedicated tool 50 is not particularly limited as long as the camera apparatus 11 and the microphone array apparatus 2 are connected and fixed to each other with a predetermined horizontal angle and vertical angle.

Since the camera apparatus 11 and the microphone array apparatus 2 are connected and fixed to each other by using the dedicated tool 50, in the fourth computation method, the distance $L_{CM}$ between the camera apparatus 11 and the microphone array apparatus 2 is a fixed value corresponding to a parameter of the dedicated tool.

The signal processing unit 33 computes the coordinates ($\theta_{MAh}, \theta_{MAv}$) indicating a sound collection direction of the microphone array apparatus 2 based on:

(1) a length of the dedicated tool 50; and (2) a distance $L_{CA}$, a horizontal angle $\theta_{CAh}$, and a vertical angle $\theta_{CAv}$ from the camera apparatus 11 to the sound collection region central position (point A).

In the fourth computation method, the input parameters in step ST2 illustrated in FIG. 5 include:

(1) the length of the dedicated tool 50, that is, information regarding the type of dedicated tool 50 to be used. For example, if the length of the dedicated tool 50 is 5 m, the distance $L_{CM}$ between the camera apparatus 11 and the microphone array apparatus 2 is also 5 m, and if the length of the dedicated tool 50 is 10 m, the distance $L_{CM}$ between the camera apparatus 11 and the microphone array apparatus 2 is also 10 m.

In addition, in the fourth computation method, (2) the distance $L_{CA}$, the horizontal angle $\theta_{CAh}$, and the vertical angle $\theta_{CAv}$ from the camera apparatus 11 to the sound collection region central position A are acquired by using a function of a well-known technique of the camera apparatus 11 in step ST12 illustrated in FIG. 6.

FIG. 17 illustrates a positional relationship between the camera apparatus 11, the microphone array apparatus 2, and the sound collection region central position A in the fourth computation method in a case where the microphone array apparatus 2 and the camera apparatus 11 are installed so as to be connected to each other by using the dedicated tool 50. FIG. 17(A) is a perspective view. FIG. 17(B) is a horizontal direction plan view. FIG. 17(C) is a vertical direction sectional view taken along the line K-K' of FIG. 17(B).

FIG. 18 illustrates a positional relationship between the camera apparatus 11, the microphone array apparatus 2, and the sound collection region central position A in the fourth computation method in a case where the microphone array apparatus 2 and the camera apparatus 11 are installed so as to be connected to each other by using the dedicated tool 50. FIG. 18(A) is a perspective view. FIG. 18(B) is a horizontal direction plan view. FIG. 18(C) is a vertical direction sectional view taken along the line Q-Q' of FIG. 18(B).

Hereinafter, a detailed description will be made of the fourth computation method of the coordinates $(\theta_{MAh}, \theta_{MAv})$ indicating a sound collection direction of the microphone array apparatus 2 in the signal processing unit 33.

The signal processing unit 33 computes a horizontal component distance $L_{CAh}$ of the distance $L_{CA}$ from the camera apparatus 11 to the sound collection region central position A according to Equation (54) by using the distance $L_{CA}$ and the vertical angle $\theta_{CAv}$ from the camera apparatus 11 to the sound collection region central position A.

[Equation 54]

$$L_{CAh} = L_{CA} \times \cos \theta_{CAv} \qquad (54)$$

The signal processing unit 33 computes a horizontal component distance $L_{MAh}$ of the distance from the microphone array apparatus 2 to the sound collection region central position A according to Equation (55) based on the cosine theorem for the triangle CAM illustrated in FIG. 17(B) by using the computation result of Equation (54), the horizontal angle $\theta_{CAh}$ from the camera apparatus 11 to the sound collection region central position (point A), and the distance $L_{CM}$ between the camera apparatus 11 and the microphone array apparatus 2.

[Equation 55]

$$L_{MAh} = \sqrt{(L_{CAh}^2 + L_{CM}^2 - 2L_{CAh} \times L_{CM} \times \cos\theta_{CAh})} \qquad (55)$$

The signal processing unit 33 computes a cosine value $\cos \theta_{MAh}$ of the horizontal angle $\theta_{MAh}$ of the depression angle $\theta_{MA}$ from the microphone array apparatus 2 to the sound collection region central position A according to Equation (56) based on the cosine theorem for the triangle CAM illustrated in FIG. 17(B) by using the respective computation results of Equations (54) and (55), and the distance $L_{CM}$ between the camera apparatus 11 and the microphone array apparatus 2.

Consequently, the signal processing unit 33 can compute the horizontal angle $\theta_{MAh}$ of the depression angle $\theta_{MA}$ from the microphone array apparatus 2 to the sound collection region central position A according to Equation (57).

[Equation 56]

$$\cos\theta_{MAh} = \frac{L_{MAh}^2 + L_{CM}^2 - L_{CAh}^2}{2L_{MAh} \times L_{CM}} \qquad (56)$$

[Equation 57]

$$\theta_{MAh} = \arccos\left(\frac{L_{MAh}^2 + L_{CM}^2 - L_{CAh}^2}{2L_{MAh} \times L_{CM}}\right) \qquad (57)$$

The signal processing unit 33 computes a difference $(H_M-H_A)$ between the heights $H_M$ and $H_A$ of the microphone array apparatus 2 and the sound collection region central position A from the horizontal surface according to Equation (58) based on a sine for the triangle CAP illustrated in FIG. 17(C).

[Equation 58]

$$H_M - H_A = H_C - H_A = L_{CA} \times \sin \theta_{CAv} \qquad (58)$$

The signal processing unit 33 computes a tangent value $\tan \theta_{MAv}$ of the vertical angle $\theta_{MAv}$ of the depression angle $\theta_{MA}$ which is directed toward the sound collection region central position A from the microphone array apparatus 2 according to Equation (59) based on a tangent for the triangle MAS illustrated in FIG. 18(C).

Consequently, the signal processing unit 33 can compute the vertical angle $\theta_{MAv}$ of the depression angle $\theta_{MA}$ from the microphone array apparatus 2 to the sound collection region central position A according to Equation (60).

[Equation 59]

$$\tan\theta_{MAv} = \frac{H_M - H_A}{L_{MAh}} \qquad (59)$$

[Equation 60]

$$\theta_{MAv} = \arctan\left(\frac{H_M - H_A}{L_{MAh}}\right) \qquad (60)$$

In the above-described way, in the fourth computation method, the microphone array apparatus 2 and the camera apparatus 11 are connected and fixed to each other by using the dedicated tool 50, and are installed on, for example, an indoor ceiling surface, and, in this state, the directionality control apparatus 3 uses the length of the dedicated tool 50, that is, the distance $L_{CM}$ between the microphone array apparatus 2 and the camera apparatus 11 as the input parameter.

Further, the directionality control apparatus 3 computes, as a sound collection direction, the coordinates $(\theta_{MAh}, \theta_{MAv})$ indicating a direction which is directed toward the sound collection region central position A corresponding to the position A' designated with the finger FG of the user in a video of a predetermined region captured as a monitoring target of the camera apparatus 11, that is, a direction which is directed from the microphone array apparatus 2 toward the sound collection region central position A, with the position of the microphone array apparatus 2 as a reference, by using the respective input parameter.

Consequently, according to the fourth computation method, the directionality control system 10 of the present embodiment can more easily compute the coordinates $(\theta_{MAh}, \theta_{MAv})$ indicating a direction which is directed from the microphone array apparatus 2 toward the sound collection region central position A since the number of input parameters is smaller than that in the first to third computation methods and the reference lines for the 0-degree direction of the camera apparatus 11 and the microphone array apparatus 2 oppose each other. In addition, the directionality control system 10 can form the sound collection directionality in the direction of the sound collection region central position A designated with the position of the microphone array apparatus 2 as a reference with high accuracy and can thus collect audio data in the corresponding direction with high accuracy.

In addition, in the above-described respective embodiments, a description has been made of a case where a timing at which the directionality control apparatus 3 starts to compute the coordinates ($\theta_{MAh}, \theta_{MAv}$) indicating a sound collection direction of the microphone array apparatus 2 is the time when any position A' or region B on a screen of the display device 36 is designated with the finger FG of the user, but the timing is not limited thereto.

For example, the timing may be the time when ranges of the angles of view CAR of the camera apparatuses 11 to 1n change due to the camera apparatuses 11 to 1n being rotated in panning directions, tilting directions, or the panning and tilting directions at predetermined intervals which are predefined. Consequently, if a sound collection direction is predefined, the directionality control system 10 can form the sound collection directionality in the predefined sound collection direction without the user designating a sound collection direction of the microphone array apparatus 2.

In the above-described respective computation methods, the description has been made based on the microphone array apparatus 2 being installed along the surface parallel to the horizontal surface. However, there is a case where a ceiling surface on which the microphone array apparatus 2 is installed may be obliquely tilted.

In this case, the horizontal angle $\theta_{MAh}$ and the vertical angle $\theta_{MAv}$ of a sound collection direction of the microphone array apparatus 2 are required to be corrected by an angle with which the ceiling surface is tilted since values thereof computed by the signal processing unit 33 according to the first to fourth computation methods cannot be used without being changed.

Figure 19:
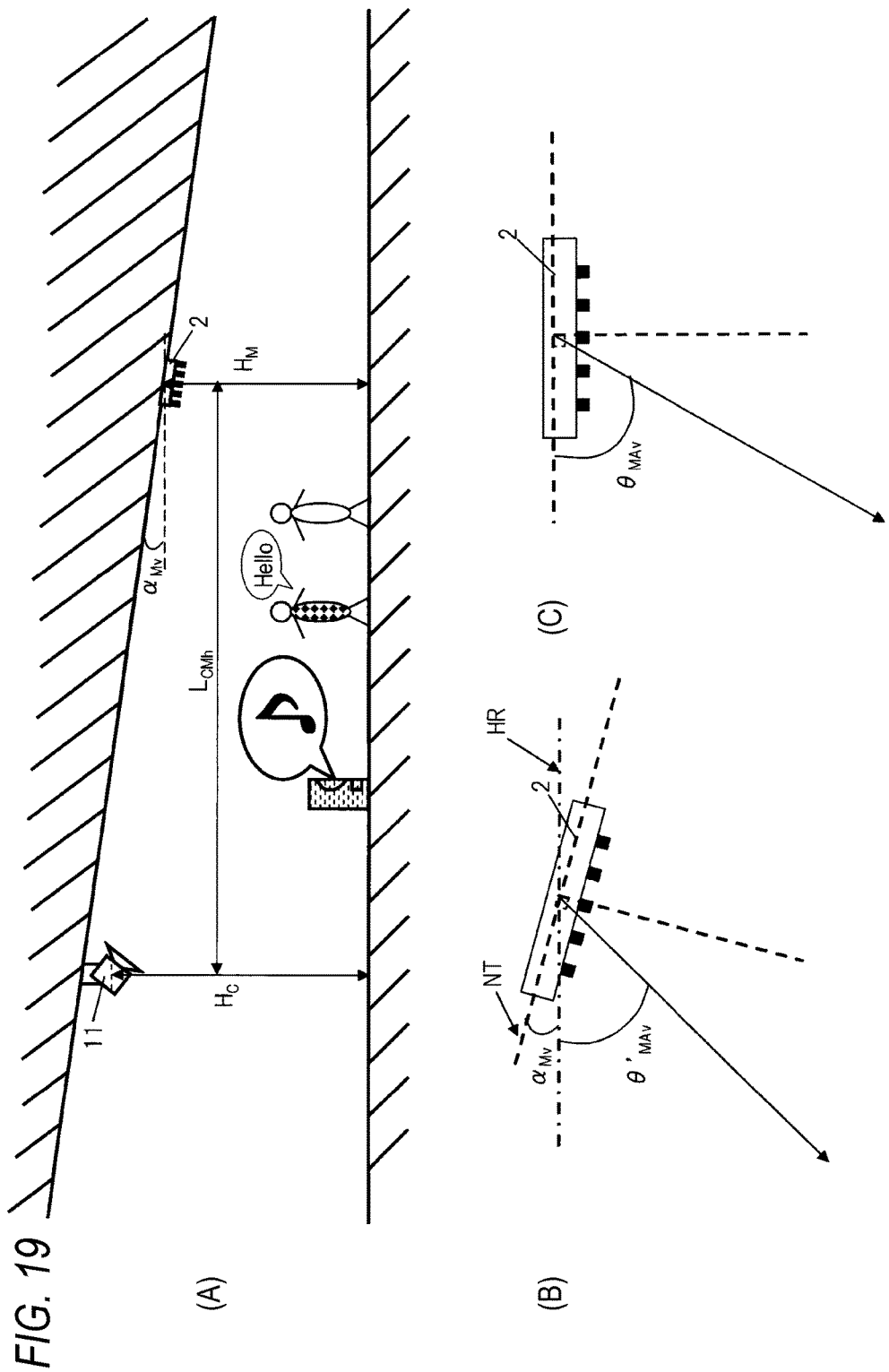
FIGS. 19(A) and 19(B) are diagrams illustrating a vertical angle of a sound collection direction in a case where a ceiling on which the microphone array apparatus and the camera apparatus are installed is tilted in a direction of $\alpha_{M_v}$ with respect to a horizontal surface.
FIG. 19(C) is a diagram illustrating the sound collection direction $\theta_{MAv}$ of the microphone array apparatus.

Hereinafter, with reference to FIG. 19, a description will be made of correction of, for example, vertical angle $\theta_{MAv}$ of the sound collection direction ($\theta_{MAh}, \theta_{MAv}$) of the microphone array apparatus 2 in the signal processing unit 33 in a case where the indoor ceiling surface on which the microphone array apparatus 2 is installed is not parallel to the horizontal surface but is obliquely tilted. FIGS. 19(A) and 19(B) are diagrams illustrating a vertical angle of a sound collection direction in a case where a ceiling on which the microphone array apparatus 2 and the camera apparatus 11 are installed is tilted in a direction of $\alpha_{Mv}$ with respect to the horizontal surface. FIG. 19(C) is a diagram illustrating the sound collection direction $\theta_{MAv}$ of the microphone array apparatus 2.

For example, a vertical angle of a sound collection direction of the microphone array apparatus 2 computed by the signal processing unit 33 according to each of the above-described first to fourth computation methods is a vertical angle $\theta'_{MAv}$ of a sound collection direction with respect to a plane HR parallel to the horizontal surface. In FIG. 19(B), a direction of the vertical angle $\theta'_{MAv}$ is not an angle with a longitudinal direction NT of the casing of the microphone array apparatus 2 as a reference.

For this reason, the signal processing unit 33 computes the vertical angle $\theta'_{MAv}$ and further computes the tilt angle $\alpha_{Mv}$ of the indoor ceiling surface. Specifically, the signal processing unit 33 computes a cosine value cos $\alpha_{Mv}$ of the tilt angle $\alpha_{Mv}$ of the indoor cesf according to Equation (61) by using the horizontal component distance $L_{CMh}$ of the distance $L_{CM}$ from the camera apparatus 11 to the microphone array apparatus 2 and the respective heights $H_C$ and $H_M$ of the camera apparatus 11 and the microphone array apparatus 2 from the horizontal surface.

Consequently, the signal processing unit 33 computes the tilt angle $\alpha_{Mv}$ of the indoor ceiling surface by using the computation result of Equation (61) (refer to Equation (62)).

[Equation 61]

$$\cos\alpha_{Mv} = \frac{L_{CMh}}{\sqrt{L_{CMh}^2 + (H_C - H_M)^2}} \quad (61)$$

[Equation 62]

$$\alpha_{Mv} = \arccos\left(\frac{L_{CMh}}{\sqrt{L_{CMh}^2 + (H_C - H_M)^2}}\right) \quad (62)$$

The signal processing unit 33 computes the vertical angle $\theta_{MAv}$ of the sound collection direction of the microphone array apparatus 2 according to Equation (63) by using the computation result of Equation (62) and the vertical angle $\theta'_{MAv}$ which is computed according to each of the above-described first to fourth computation methods.

[Equation 63]

$$\theta_{MAv} = \theta'_{MAv} + \alpha_{Mv} = \theta'_{MAv} + \arccos\left(\frac{L_{CMh}}{\sqrt{L_{CMh}^2 + (H_C - H_M)^2}}\right) \quad (63)$$

Consequently, even in a case where the indoor ceiling surface on which the microphone array apparatus 2 is installed is not parallel to the horizontal surface but is tilted with a predetermined angle, the directionality control apparatus 3 can appropriately compute a sound collection direction of the microphone array apparatus 2, can form the sound collection directionality in the direction of the sound collection region central position A designated with the position of the microphone array apparatus 2 as a reference with high accuracy, and can thus collect audio data in the corresponding direction with high accuracy.

Each of second to fifth embodiments described below relates to a calibration method of matching a reference direction of a horizontal angle of an imaging direction from the camera apparatus with a reference direction of a horizontal angle of a sound collection direction from the microphone array apparatus.

Here, there is a control apparatus which controls an operation of each of a camera apparatus and a microphone array apparatus and obtains audio data in a direction in which the camera apparatus performs imaging (for example, refer to a reference Patent Literature 1). The control apparatus disclosed in Patent Literature 1 controls an operation of each, for example, the camera apparatus which is installed in a conference room which is available to a TV conference system and can acquire omnidirectional images and the microphone array apparatus which can change a sound collection region.

The control apparatus disclosed in the reference Patent Literature 1 detects a direction of a speaker based on voice, compresses a data amount by cutting out only a region centering on the speaker from an omnidirectional image, and directs a beam direction of the microphone array apparatus toward the speaker so as to reduce noise other than conversations of the speaker.

(Reference Patent Literature 1) Japanese Patent No. 4252377

For example, in a case where the camera apparatus and the microphone array apparatus are integrally assembled and are disposed on the same axis, an optical axis of the camera apparatus and a physical central axis of the microphone array apparatus are common to each other. Therefore, in a case where the microphone array apparatus collects conversation voice of a subject in a video captured by the camera apparatus, a vertical angle of coordinates (horizontal angle, vertical angle) indicating a sound collection direction of the microphone array apparatus is the same as a vertical angle of coordinates (horizontal angle, vertical angle) indicating an imaging direction of the camera apparatus.

However, in a case where the camera apparatus and the microphone array apparatus are integrally assembled and are disposed on the same axis, and the camera apparatus and the microphone array apparatus are used through a combination of separate operations thereof, the horizontal angle of of the coordinates (horizontal angle, vertical angle) indicating the sound collection direction of the microphone array apparatus is the same as the horizontal angle of the coordinates (horizontal angle, vertical angle) indicating the imaging direction of the camera apparatus only when reference directions (for example, a 0° direction) of the horizontal angles of the microphone array apparatus and the camera apparatus match each other.

In the above-described reference Patent Literature 1, the camera apparatus and the microphone array apparatus are integrally connected to each other via a cylinder which is acoustically transparent, but it is not disclosed that reference directions of the horizontal angles of the camera apparatus and the microphone array apparatus match each other. In addition, the camera apparatus and the microphone array apparatus do not have a structure in which the apparatuses can be used separately from each other.

Therefore, when the camera apparatus and the microphone array apparatus which operate separately from each other are used integrally with each other, if the reference directions of the horizontal angles of the camera apparatus and the microphone array apparatus do not match each other, an imaging region of the camera apparatus in the panning direction and a sound collection region of the microphone array apparatus do not match each other. For this reason, there is a problem in that conversation voice of a subject in a video captured by the camera apparatus is not appropriately collected by the microphone array apparatus.

Therefore, in each of the second to fifth embodiments related to the present invention, in order to solve the above-described problem, a description will be made of examples of a calibration method of matching a reference directions of a horizontal angle of coordinates indicating an imaging region of the camera apparatus with a reference direction of a horizontal angle of coordinates indicating a sound collection direction of the microphone array apparatus in a case where the camera apparatus and the microphone array apparatus are integrally used.

Hereinafter, each of the second to fifth embodiments of a calibration method related to the present invention will be described with reference to the drawings. The following calibration method of each embodiment is, for example, a method of matching a horizontal angle of coordinates indicating an imaging region of an omnidirectional camera apparatus and a horizontal angle of coordinates indicating a sound collection direction of an omnidirectional microphone array apparatus in a sound collection system in which the omnidirectional camera apparatus and the omnidirectional microphone array apparatus are integrally disposed on the same axis. The sound collection system of each embodiment is installed on an installation surface (for example, a ceiling surface of an event hall) in a predetermined sound collection space.

(Second Embodiment)

A calibration method of the second embodiment will be described with reference to FIGS. 20(A), 20(B) and 20(C). FIG. 20(A) is a schematic diagram illustrating a calibration method in a sound collection system 1Z of the second embodiment. FIG. 20(B) is a plan view in which an omnidirectional camera apparatus 3z is viewed from a vertically lower side. FIG. 20(C) is a plan view in which an omnidirectional microphone array apparatus 5 is viewed from the vertically lower side.

The omnidirectional camera apparatus 3z includes a casing into which an optical system (for example, a fish-eye lens) and an imaging unit (for example, an image sensor) (not illustrated) are built and which is covered with a dome-shaped transparent cover 3a, and is fitted into an inner circumferential space inside an opening 13 which is formed at the center of a casing of the omnidirectional microphone array apparatus 5. The omnidirectional camera apparatus 3z, which has a function of, for example, a monitoring camera, is connected to a host computer (not illustrated) of a central control room via a network (not illustrated), and displays omnidirectional videos on a monitor (not illustrated). In addition, the omnidirectional camera apparatus 3z may cut out a video in a designated direction and may display the video on the monitor (not illustrated) in response to a remote operation from the host computer.

The omnidirectional microphone array apparatus 5 includes a ring-shaped casing 17 in which the casing of the omnidirectional camera apparatus 3z is fitted into the inner circumferential space inside the opening 13, and a plurality of microphone units 18 are disposed in a concentric shape around the opening 13 in a circumferential direction of the casing 17. The microphone unit 18 employs, for example, a high-quality small-sized electret condenser microphone (ECM), and this is also the same for the following respective embodiments. The omnidirectional microphone array apparatus 5 forms the directionality in a predetermined sound collection direction, and emphasizes and collects sound in the sound collection direction in which the directionality is formed.

In addition, in the respective embodiments including the present embodiment, configurations and operations of the omnidirectional camera apparatus and the omnidirectional microphone array apparatus are the same as the above-described content, but different content in each embodiment will be described as necessary.

Here, in a case of installing the sound collection system 1Z in which the omnidirectional microphone array apparatus 5 and the omnidirectional camera apparatus 3z are integrally attached to each other in an i direction on the same axis, it is necessary to match reference directions (for example, a 0° direction) of horizontal angles of the omnidirectional camera apparatus 3z and the omnidirectional microphone array apparatus 5 with each other in order to align an imaging region of the omnidirectional camera apparatus 3z with a sound collection direction of the omnidirectional microphone array apparatus 5.

In the present embodiment, in order to match the reference directions of the horizontal angles of the omnidirectional camera apparatus 3z and the omnidirectional microphone array apparatus 5 with each other on a plane perpendicular to the i direction on the same axis, a key 11y as an example of an engagement member which protrudes upwardly in FIG. 20(B) is formed on an outer circumference of the cover 3a of the omnidirectional camera apparatus 3z. The key 11y is formed in a reference direction g of the horizontal angle of coordinates (horizontal angle, vertical angle) indicating the imaging region of the omnidirectional camera apparatus 3z, that is, in a direction of the horizontal angle of 0°.

A key groove 15 as an engagement groove to the key 11y is fitted when the cover 3a of the omnidirectional camera apparatus 3z is inserted into the opening 13 is formed at a circumferential edge of the opening 13 of the omnidirectional microphone array apparatus 5. The key groove 15 is formed in a reference direction h of the horizontal angle of the coordinates (horizontal angle, vertical angle) indicating the sound collection direction of the omnidirectional microphone array apparatus 5, that is, in the direction of the horizontal angle of 0°. In addition, in the present embodiment, a sectional shape of each of the key 11y and the key groove 15 is a rectangular shape but may be a polygonal shape or a semicircular shape other than the rectangular shape.

In a case where the omnidirectional camera apparatus 3z and the omnidirectional microphone array apparatus 5 are installed in the i direction on the same axis, the omnidirectional camera apparatus 3z is fitted into the inner circumferential space inside the opening 13 of the omnidirectional microphone array apparatus 5 so that the key 11y is fitted to the key groove 15, and thus the omnidirectional camera apparatus 3z and the omnidirectional microphone array apparatus 5 are integrally combined with each other.

In the above-described way, in the calibration method of the present embodiment, the omnidirectional camera apparatus 3z is fitted into the inner circumferential space inside the opening 13 of the omnidirectional microphone array apparatus 5 so that, for example, the key 11y is fitted to the key groove 15, and thus it is possible to easily match the reference direction g of the horizontal angle of the omnidirectional camera apparatus 3z with the reference direction h of the horizontal angle of the omnidirectional microphone array apparatus 5 and therefore to alleviate a restriction when the omnidirectional camera apparatus 3z and the omnidirectional microphone array apparatus 5 are installed. As a result, in the sound collection system 1Z of the present embodiment, the omnidirectional microphone array apparatus 5 can collect sound in the sound collection direction with high accuracy by using the same horizontal angle as the horizontal angle of the coordinates (horizontal angle, vertical angle) indicating the imaging region of the omnidirectional camera apparatus 3z.

In addition, the present embodiment relates to a case where the omnidirectional camera apparatus 3z and the omnidirectional microphone array apparatus 5 are integrally provided by fitting the omnidirectional camera apparatus 3z into the inner circumferential space inside the opening 13 of the omnidirectional microphone array apparatus 5.

Further, the omnidirectional camera apparatus 3z illustrated in the present embodiment is a camera apparatus which includes a fish-eye lens and can capture an image in all directions, but may be a camera apparatus with a hemispheric transparent dome shape which has a rotation function in a panning direction, a rotation function in a tilting direction, and a zooming function.

(Third Embodiment)

Next, a calibration method of the third embodiment will be described with reference to FIGS. 21(A), 21(B) and 21(C). FIG. 21(A) is a schematic diagram illustrating a calibration method in a sound collection system 1A of the third embodiment. FIG. 21(B) is a plan view in which an omnidirectional camera apparatus 3AZ is viewed from a vertically lower side. FIG. 21(C) is a plan view in which an omnidirectional microphone array apparatus 5A is viewed from the vertically lower side.

In addition, in the respective embodiments including the present embodiment, the same constituent elements as those in the above-described second embodiment are given the same reference numerals so that description thereof will be omitted or made briefly, and different content will be described.

In the present embodiment, for example, a triangular marker 21z illustrated in FIG. 21(A) is added to the outer circumference of the cover 3a of the omnidirectional camera apparatus 3AZ. In addition, a shape of the marker 21z is not limited to a triangular shape and may be, for example, a rectangular shape. The marker 21z is added in the reference direction g of the horizontal angle of coordinates (horizontal angle, vertical angle) indicating the imaging region of the omnidirectional camera apparatus 3AZ, that is, in a direction of the horizontal angle of 0°.

Further, a similar triangular marker 23z is added at a position facing the marker 21z when the cover 3a of the omnidirectional camera apparatus 3AZ is inserted into the opening 13 on the circumferential edge of the opening 13 of the omnidirectional microphone array apparatus 5A. In addition, a shape of the marker 23z is not limited to a triangular shape and may be, for example, a rectangular shape. The marker 23z is added in the reference direction h of the horizontal angle of the omnidirectional microphone array apparatus 5A, that is, in the direction of the horizontal angle of 0°.

In a case where the omnidirectional camera apparatus 3AZ and the omnidirectional microphone array apparatus 5A are installed in the i direction on the same axis, the omnidirectional camera apparatus 3AZ is fitted into the inner circumferential space inside the opening 13 of the omnidirectional microphone array apparatus 5A so that the tip of the marker 21z faces the tip of the marker 23z, and thus the omnidirectional camera apparatus 3AZ and the omnidirectional microphone array apparatus 5A are integrally combined with each other.

In the above-described way, in the calibration method of the present embodiment, the omnidirectional camera apparatus 3AZ is fitted into the inner circumferential space inside the opening 13 of the omnidirectional microphone array apparatus 5A so that, for example, the respective tips of the markers 21z and 23 face each other, and thus it is possible to easily match the reference direction g of the horizontal angle of the omnidirectional camera apparatus 3AZ with the reference direction h of the horizontal angle of the omnidirectional microphone array apparatus 5A. Further, in the calibration method of the present embodiment, it is possible to alleviate a restriction when the omnidirectional camera apparatus 3AZ and the omnidirectional microphone array apparatus 5A are installed. As a result, in the sound collection system 1A of the present embodiment, the omnidirectional microphone array apparatus 5A can collect sound in the sound collection direction with high accuracy by using the same horizontal angle as the horizontal angle of the coordinates (horizontal angle, vertical angle) indicating the imaging region of the omnidirectional camera apparatus 3AZ.

In addition, in the present embodiment, the omnidirectional camera apparatus 3AZ may not be fitted into the inner circumferential space inside the opening 13 of the omnidirectional microphone array apparatus 5A unlike the above-described second embodiment, and, for example, a female screw portion formed in advance on the inside of the opening 13 of the omnidirectional microphone array apparatus 5A is screwed with a male screw portion formed on the outer circumference of the cover 3a of the omnidirectional camera apparatus 3AZ so that the omnidirectional camera apparatus 3AZ and the omnidirectional microphone array apparatus 5A are integrally combined with each other.

(Fourth Embodiment)

Figure 22:
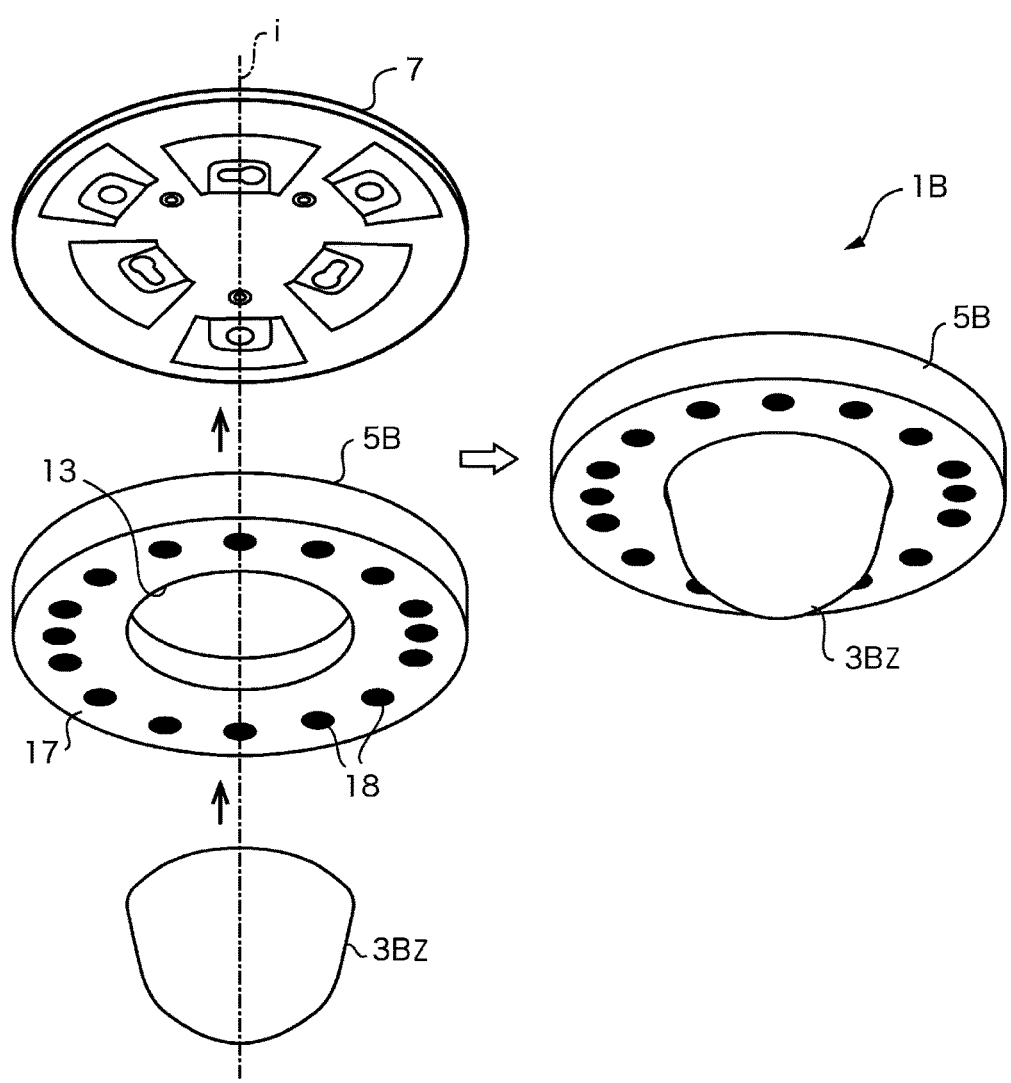
FIG. 22 is a schematic diagram illustrating a calibration method in a sound collection system of a fourth embodiment.

Next, a calibration method of the fourth embodiment will be described with reference to FIGS. 22, 23(A) and 23(B). FIG. 22 is a schematic diagram illustrating a calibration method in a sound collection system 1B of the fourth embodiment. FIG. 23(A) is a plan view illustrating an omnidirectional camera apparatus and an omnidirectional microphone array apparatus are attached to an attachment member 7. FIG. 23(B) is a sectional view taken along the line E-E in FIG. 23(A).

In the sound collection system of each of the above-described second and third embodiments, the omnidirectional microphone array apparatus and the omnidirectional camera apparatus are directly attached to a predetermined installation surface.

In the sound collection system 1B of the present embodiment, the attachment member 7 (attachment tool) is first attached and fixed to a predetermined installation surface (for example, a ceiling surface 8), and both an omnidirectional microphone array apparatus 5B and an omnidirectional camera apparatus 3BZ are attached to the attachment member 7 (refer to FIG. 22). Consequently, in the sound collection system 1B of the present embodiment, the omnidirectional microphone array apparatus 5B and the omnidirectional camera apparatus 3BZ are integrally combined with each other.

FIG. 23(A) illustrates an attachment state of the omnidirectional camera apparatus 3BZ and the omnidirectional microphone array apparatus 5B when viewed from a surface of the attachment member 7, that is, when viewed from the ceiling surface 8 as an example of the predetermined installation surface in a downward direction illustrated in FIG. 23(B). The attachment member 7 is a metallic member which has an uneven surface and is formed in a substantially disc shape. In addition, the attachment member 7 may be a member made of ceramics or a synthetic resin (for example, plastic or elastomer).

Engagement pieces 7a which protrude in the i direction on the same axis and are used for attaching and fixing the omnidirectional camera apparatus 3BZ are formed at three concentric locations on the surface of the attachment member 7, that is, the surface of the attachment member 7 facing the ceiling surface 8. Further, engagement pieces 7b which protrude in the i direction on the same axis and are used for attaching and fixing the omnidirectional microphone array apparatus 5B are formed at three concentric locations which have diameters larger than those of the concentric locations where the engagement pieces 7a are formed, on the surface of the attachment member 7.

Figure 24:
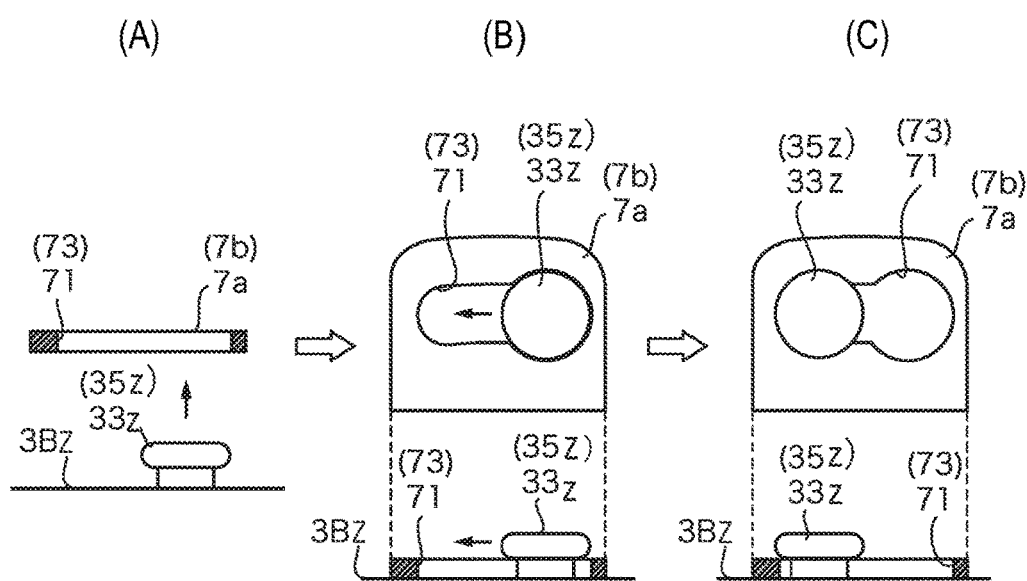
FIG. 24(A) is a side view illustrating a state in which fixation pins are being engaged with engagement holes.
FIG. 24(B) is a plan view and a side view illustrating a state in which the fixation pins inserted into the engagement holes are moved.
FIG. 24(C) is a plan view and a side view illustrating a state in which the fixation pins are engaged with the engagement holes.

FIG. 24(A) is a side view illustrating a state in which fixation pins 33z and 35z are being engaged with engagement holes 71 and 73. FIG. 24(B) is a plan view and a side view illustrating a state in which the fixation pins 33z and 35z inserted into the engagement holes 71 and 73 are moved. FIG. 24(C) is a plan view and a side view illustrating a state in which the fixation pins 33z and 35 are engaged with the engagement holes 71 and 73.

Each of the engagement pieces 7a is provided with the engagement hole 71 which is engaged with the fixation pin 33z provided on a bottom of the omnidirectional camera apparatus 3BZ and is formed in a gourd shape of which a diameter of one end is larger than a diameter of the other end. Similarly, each of the engagement pieces 7b is provided with the engagement hole 73 which is engaged with the fixation pin 35z provided on a bottom of the omnidirectional microphone array apparatus 5B and is formed in a gourd shape of which a diameter of one end is larger than a diameter of the other end.

Each of the fixation pins 33z and 35z includes a head having a thickness (diameter) between one end and the other end of each of the engagement holes 71 and 73 and a body thinner than the head.

Each of fan-shaped hole portions 7c and 7d is formed at three locations so as to expand outside the engagement pieces 7a and the engagement pieces 7b on the surface of the attachment member 7. Shapes and positions of the fan-shapes hole portions 7c and 7d are designed so that the reference directions g and h of the horizontal angles of the omnidirectional camera apparatus 3BZ and the omnidirectional microphone array apparatus 5B match each other when the omnidirectional camera apparatus 3BZ and the omnidirectional microphone array apparatus 5B are attached to the attachment member 7.

Screw holes 7e into which screws 31z are inserted are formed at three locations at the center of the surface of the attachment member 7. The screws 31z are screwed with the ceiling surface 8 via the screw holes 7e and thus the attachment member 7 is fixed to the ceiling surface 8.

When the omnidirectional camera apparatus 3BZ and the omnidirectional microphone array apparatus 5B are attached to the attachment member 7, first, the omnidirectional camera apparatus 3BZ is attached to the attachment member 7. In this case, the fixation pin 33z is engaged with the engagement hole 71 formed at the engagement piece 7a (refer to FIG. 24(A)).

In other words, as illustrated in FIG. 24(A), the fixation pin 33z which protrudes from the bottom of the omnidirectional camera apparatus 3BZ is inserted into one end side of the engagement hole 71 with a larger diameter. In addition, as illustrated in FIG. 24(B), the fixation pin 33z is moved in the engagement hole 71 by rotating the omnidirectional camera apparatus 3BZ in a state in which the head of the fixation pin 33z protrudes out of the engagement hole 71. Further, as illustrated in FIG. 24(C), the fixation pin 33z is engaged with the engagement hole 71 in a state in which the head of the fixation pin 33z is moved to the other end side of the engagement hole 71, and thus the omnidirectional camera apparatus 3BZ is fixed in the i direction on the same axis.

After the omnidirectional camera apparatus 3BZ is attached to the attachment member 7, the omnidirectional microphone array apparatus 5B attached to the attachment member 7 from the inside of the opening 13 of the omnidirectional microphone array apparatus 5B so as to expose the omnidirectional camera apparatus 3BZ. In this case, the fixation pin 35z is engaged with the engagement hole 73 formed at the engagement piece 7b. In addition, a procedure of fixing the fixation pin 35z to the engagement hole 73 is the same as the procedure of fixing the fixation pin 33z to the engagement hole 71.

In the above-described way, in the calibration method of the present embodiment, the omnidirectional camera apparatus 3BZ and the omnidirectional microphone array apparatus 5B are integrally attached to the attachment member 7 which is attached and fixed to the ceiling surface 8. Consequently, in the calibration method of the present embodiment, the omnidirectional camera apparatus 3BZ and the omnidirectional microphone array apparatus 5B can be easily installed in a state in which the reference directions of the horizontal angles of the omnidirectional camera apparatus 3BZ and the omnidirectional microphone array apparatus 5B match each other. Therefore, in the sound collection system 1B of the present embodiment, the omnidirectional microphone array apparatus 5B can collect sound in the sound collection direction with high accuracy by using the same horizontal angle as the horizontal angle of the coordinates (horizontal angle, vertical angle) indicating the imaging region of the omnidirectional camera apparatus 3BZ.

(Fifth Embodiment)

Figure 26:
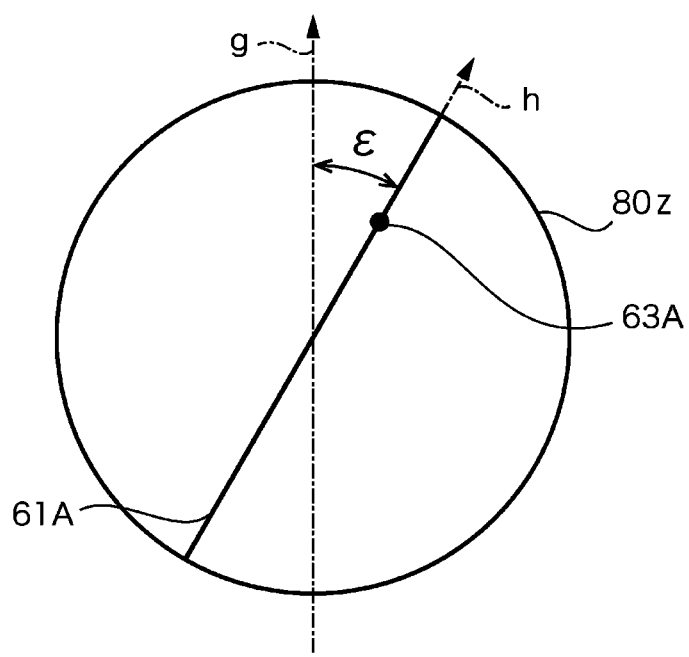
FIG. 26 is a diagram illustrating a state in which the tool is reflected in an image captured by an omnidirectional camera apparatus.

Next, a calibration method of the fifth embodiment will be described with reference to FIGS. 25(A), 25(B) and 25(C) and FIG. 26. FIG. 25(A) is a side view illustrating a state in which a tool 61 is being attached to an omnidirectional microphone array apparatus 5C in the calibration method of the fifth embodiment. FIG. 25(B) is a diagram illustrating a state in which attachment of the tool 61 to the omnidirectional microphone array apparatus 5C is completed. FIG. 25(C) is an exterior perspective view of a sound collection system 1C in which attachment of the tool 61 to the omnidirectional microphone array apparatus 5C is completed. FIG. 26 is a diagram illustrating a state in which the tool 61 is reflected in an image 80z captured by an omnidirectional camera apparatus 3CZ.

In the calibration method of the present embodiment, configurations of the omnidirectional camera apparatus 3CZ and the omnidirectional microphone array apparatus 5C in the sound collection system 1C and a procedure of attaching the apparatuses to an installation surface are the same as the configurations and the attachment procedure of the omnidirectional camera apparatus 3AZ and the omnidirectional microphone array apparatus 5A in the third embodiment, and thus description thereof will be omitted.

The tool 61 indicating the reference direction h of the horizontal angle of the omnidirectional microphone array apparatus 5C is attached to both ends which oppose to each other in a casing 17 of the omnidirectional microphone array apparatus 5C. In the present embodiment, a wire is hung so as to cross over a casing of the omnidirectional camera apparatus 3CZ as the tool 61. Both tip ends of the wire are attached to holes which are formed in advance in the casing 17 of the omnidirectional microphone array apparatus 5C, and thus the tool 61 is attached to the omnidirectional microphone array apparatus 5C.

In addition, a mark 63 indicating a reference direction (for example, a 0° direction) of a horizontal angle is added to a part of the tool 61. The mark 63 may be colored differently from other parts of the tool 61. A material of the tool 61 is not particularly limited, such as ceramics, synthetic resin (for example, plastic or elastomer), and metal, and a shape thereof is not limited to a spherical shape and may be a columnar shape or other shapes.

In the present embodiment, as illustrated in FIGS. 25(A) and 25(B), after the omnidirectional camera apparatus 3CZ is fitted into the inner circumferential space inside the opening 13 of the omnidirectional microphone array apparatus 5C, the tool 61 is attached to opposing both ends of the casing 17 of the omnidirectional microphone array apparatus 5C.

In addition, in the present embodiment, as illustrated in FIG. 25(C), the omnidirectional camera apparatus 3CZ captures a subject in a predetermined imaging region, for example, in all directions (360°) in a state in which the tool 61 is attached so as to cross over the casing of the omnidirectional camera apparatus 3CZ. In this case, the omnidirectional camera apparatus 3CZ may cover a background portion of a captured image with a specific color so that objects other than the tool 61 are not reflected much in the captured image.

Further, the tool 61 is not limited to a single wire. As long as the mark 63 indicating a reference of a horizontal angle is fixed to a predetermined position and is recognized in a video captured by the camera apparatus, the tool may be made of a sheet metal regardless of a shape thereof, and may have a three-legged shape.

Further, the tool 61 may be formed in an opaque dome shape covering the entire casing of the omnidirectional camera apparatus 3 and including an opening which is used as a mark in a reference direction of a horizontal angle of the omnidirectional microphone array apparatus 5C.

A tool image 61A indicating the reference direction h is reflected through the center of the captured image 80z in the circular captured image 80z obtained by the omnidirectional camera apparatus 3CZ illustrated in FIG. 26. A mark image 63A of the mark 63 indicating the reference direction h (for example, a direction of 0°) of the horizontal angle of the omnidirectional microphone array apparatus 5C is reflected so as to overlap the tool image 61A. The mark image 63A may be recognized through image processing in the omnidirectional camera apparatus 3CZ, and may be recognized with the naked eyes by an operator of the sound collection system 1C.

In the captured image 80z, the reference direction g of the horizontal angle of the omnidirectional camera apparatus 3CZ shows a vertical direction in FIG. 26. Therefore, based on the captured image 80z, the omnidirectional camera apparatus 3CZ can compute an angle difference between the reference direction h of the horizontal angle of the omnidirectional microphone array apparatus 5C shown as the tool image 61A and the reference direction g of the horizontal angle of the omnidirectional camera apparatus 3CZ, as a deviation amount c of the horizontal angle.

Therefore, in a case where the omnidirectional camera apparatus 3CZ and the omnidirectional microphone array apparatus 5C are connected to each other via a network (not illustrated), the omnidirectional microphone array apparatus 5C may set the reference direction h of the horizontal angle of the omnidirectional microphone array apparatus 5 to a value which is deviated relative to the reference direction g of the horizontal angle of the omnidirectional camera apparatus 3CZ by the deviation amount c. In other words, the omnidirectional microphone array apparatus 5C can appropriately compute coordinates of a sound collection direction by using an angle which is reversely returned by the deviation amount c of a horizontal angle as a horizontal angle of coordinates (horizontal angle, vertical angle) indicating an actual sound collection direction.

In the above-described way, in the calibration method of the present embodiment, the omnidirectional microphone array apparatus 5C can match a horizontal angle indicating an imaging direction of the omnidirectional camera apparatus 3CZ with a horizontal angle indicating a sound collection direction of the omnidirectional microphone array apparatus 5C by using the deviation amount c of the horizontal angle computed by the omnidirectional camera apparatus 3CZ, and can thus adjust coordinates (horizontal angle, vertical angle) of the sound collection direction of the omnidirectional microphone array apparatus 5C.

Hereinafter, configurations, operations, and effects of the above-described calibration methods will be described.

According to an embodiment of the present invention, there is provided a calibration method including a step of positioning a camera apparatus which captures a video of a predetermined imaging region and a microphone array apparatus which collects sound of the imaging region on the same axis; a step of attaching the camera apparatus to a circumferential edge of an opening which is formed at a center of the casing of the microphone array apparatus; and a step of matching reference directions of horizontal angles of the camera apparatus and the microphone array apparatus with each other on a plane perpendicular to the same axis by attaching the camera apparatus to inside of the opening.

In the above-described method, it is possible to easily match the reference direction g of the horizontal angle of the omnidirectional camera apparatus $3z$ with the reference direction h of the horizontal angle of the omnidirectional microphone array apparatus 5 and therefore to alleviate a restriction when the omnidirectional camera apparatus $3z$ and the omnidirectional microphone array apparatus 5 are installed. As a result, in the sound collection system 1Z of the present embodiment, the omnidirectional microphone array apparatus 5 can collect sound in the sound collection direction with high accuracy by using the same horizontal angle as the horizontal angle of the coordinates (horizontal angle, vertical angle) indicating the imaging region of the omnidirectional camera apparatus $3z$.

In addition, in the calibration method according to the embodiment of the present invention, in the matching step, the reference direction of the horizontal angle of the microphone array apparatus matches the reference direction of the horizontal angle of the camera apparatus by engaging an engagement member formed on an outer circumference of a casing of the camera apparatus with an engagement groove formed at the circumferential edge of the opening.

In the above-described method, the omnidirectional camera apparatus $3z$ is fitted into the inner circumferential space inside the opening 13 of the omnidirectional microphone array apparatus 5 so that, for example, the key $11y$ is fitted to the key groove 15, and thus it is possible to easily match the reference direction of the horizontal angle of the omnidirectional camera apparatus $3z$ with the reference direction of the horizontal angle of the omnidirectional microphone array apparatus 5.

Further, in the calibration method according to the embodiment of the present invention, in the matching step, the reference direction of the horizontal angle of the microphone array apparatus matches the reference direction of the horizontal angle of the camera apparatus by opposing a first marker portion added to the circumferential edge of the opening to a second marker portion added on the casing of the camera apparatus.

In the above-described method, the omnidirectional camera apparatus 3AZ is fitted into the inner circumferential space inside the opening 13 of the omnidirectional microphone array apparatus 5A so that, for example, the respective tips of the markers 21 and 23 face each other, and thus it is possible to easily match the reference direction g of the horizontal angle of the omnidirectional camera apparatus 3AZ with the reference direction h of the horizontal angle of the omnidirectional microphone array apparatus 5A.

Further, in the calibration method according to the embodiment of the present invention, in the attachment step, the casing of the camera apparatus is attached to a predetermined attachment tool, and the casing of the microphone array apparatus is attached to the predetermined attachment tool by inserting the casing of the camera apparatus attached to the predetermined attachment tool into the inside of the opening so that the casing of the camera apparatus is fitted into the inside thereof.

In the above-described calibration method, the omnidirectional camera apparatus 3BZ and the omnidirectional microphone array apparatus 5B are integrally attached to the attachment member 7 which is attached and fixed to the ceiling surface 8, and thus the reference directions of the horizontal angles of the omnidirectional camera apparatus 3BZ and the omnidirectional microphone array apparatus 5B can match each other.

In addition, according to another embodiment of the present invention, there is provided a calibration method including a step of positioning a camera apparatus which captures a video of a predetermined imaging region and a microphone array apparatus which collects sound of the imaging region on the same axis; a step of attaching the camera apparatus to a circumferential edge of an opening which is formed at a center of the casing of the microphone array apparatus; a step of attaching a tool indicating a reference direction of a horizontal angle of the microphone array apparatus to both opposing ends of a casing of the microphone array apparatus; a step of causing the camera apparatus to capture an image of the tool; a step of computing a deviation amount between a reference direction of a horizontal angle of the camera apparatus and a reference direction of a horizontal angle of the microphone array apparatus; and a step of matching the reference directions of the horizontal angles of the camera apparatus and the microphone array apparatus with each other on a plane perpendicular to the same axis by adjusting a horizontal angle of a sound collection direction of the microphone array apparatus by using the computed deviation amount.

In the calibration method of the present embodiment, the omnidirectional microphone array apparatus 5C can match a horizontal angle indicating an imaging direction of the omnidirectional camera apparatus 3CZ with a horizontal angle indicating a sound collection direction of the omnidirectional microphone array apparatus 5C by using the deviation amount c of the horizontal angle computed by the omnidirectional camera apparatus 3CZ, and can thus adjust coordinates (horizontal angle, vertical angle) of the sound collection direction of the omnidirectional microphone array apparatus 5C.

In the above-described respective embodiments, a reference direction of a horizontal angle has been described as a direction in which a horizontal angle is 0°, but any angle may be set as a reference direction.

Further, each microphone disposed inside the casing of the omnidirectional microphone array apparatus in the above-described respective embodiments may employ a nondirectional microphone, a bidirectional microphone, a unidirectional microphone, a sharply directional microphone, a super-directional microphone (for example, a shotgun microphone), or a combination thereof.

A sixth embodiment described below relates to a directionality control system and a horizontal deviation angle computation method, in which a direction connecting a camera apparatus to a microphone array apparatus is set as each reference direction, a deviation angle between a front direction (0° direction) of the camera apparatus and the reference direction of the camera apparatus and a deviation angle between a front direction (0° direction) of the microphone array apparatus and the reference direction of the microphone array apparatus, and thus calibration of a horizontal angle is performed.

In the above-described monitoring system, in a case where the camera apparatus and the microphone array apparatus are disposed at different positions as separate apparatuses, an optical axis of the camera apparatus is different from a physical central axis of the microphone array apparatus. For this reason, in a case where the microphone array apparatus collects conversation voice of a subject who is present in an imaging direction of the camera apparatus, it is necessary to adjust, to appropriate values, coordinates (horizontal angle, vertical angle) indicating the direction (hereinafter, simply referred to as a "sound collection direction") in which the microphone array apparatus collects the conversation voice and coordinates (horizontal angle, vertical angle) indicating the imaging direction of the camera apparatus.

In order to perform the adjustment, for example, a front direction (for example, a 0° direction) of a horizontal angle of coordinates (hereinafter, referred to as "imaging direction coordinates") indicating the imaging direction of the camera apparatus is required to be a known value in the camera apparatus, and a front direction (for example, a 0° direction) of a horizontal angle of coordinates (hereinafter, referred to as "sound collection direction coordinates") indicating a sound collection direction of the microphone array apparatus is required to be a known value in the microphone array apparatus.

Also in order that a positional relationship between the camera apparatus and the microphone array apparatus are required to be appropriately specified, and a direction of the microphone array apparatus with the camera apparatus as a reference and a direction of the camera apparatus with the microphone array apparatus as a reference are known values, for example, when the microphone array apparatus is installed, a front direction (for example, a 0° direction) of a horizontal angle of the microphone array apparatus is preferably directed toward the camera apparatus.

However, Patent Literature 1 does not disclose that a direction of the microphone array apparatus with the camera apparatus as a reference and a direction of the camera apparatus with the microphone array apparatus as a reference are computed in a case where a front direction (for example, a 0° direction) of a horizontal angle of the camera apparatus and a front direction (for example, a 0° direction) of a horizontal angle of the microphone array apparatus are unknown. Therefore, it is not clear an angle from which direction each horizontal angle is, and thus a positional relationship between the camera apparatus and the microphone array apparatus cannot be appropriately specified.

Therefore, for example, since a sound collection direction of the microphone array apparatus is not directed in a direction in which a subject is present while the microphone array apparatus collects voice of the subject, there is a problem in that it is hard for the microphone array apparatus to appropriately collect conversation voice of the subject who is present in an imaging direction of the camera apparatus.

In addition, in most cases where the camera apparatus is installed later at a location where the microphone array apparatus has been installed, it is hard to install the camera apparatus so that a front direction (for example, a 0° direction) of a horizontal angle of the microphone array apparatus is directed toward the camera apparatus. Further, in a case where the microphone array apparatus is additionally installed later at a location where a plurality of camera apparatuses have been installed, there is a problem in which a front direction (for example, a 0° direction) of a horizontal angle of the microphone array apparatus cannot match directions of the plurality of camera apparatuses.

Therefore, in the sixth embodiment related to the present invention, in order to solve the above-described problems, a description will be made of examples of a directionality control system and a horizontal deviation angle computation method, in which a horizontal deviation angle indicating an angle between a 0° direction of each horizontal angle of imaging direction coordinates of the camera apparatus and sound collection direction coordinates of the microphone array apparatus and mutual reference directions connecting both the apparatuses to each other is computed, and thus the microphone array apparatus can appropriately collect conversation voice of a subject who is present in an imaging direction of the camera apparatus.

Hereinafter, with reference to the drawings, a description will be made of the sixth embodiment related to the directionality control system and the horizontal deviation angle computation method according to the present invention. The directionality control system of the present embodiment is used as a monitoring system (including a manned monitoring system and an unmanned monitoring system) provided in, for example, a factory, a public facility (for example, a library or an event hall), or a store (for example, a retail store or a bank).

In addition, the present invention can be expressed as respective apparatuses (for example, a directionality control apparatus to be described later) constituting the directionality control system, or a horizontal deviation angle computation method including respective operations (steps) performed by each apparatus (for example, a directionality control apparatus to be described later) constituting the directionality control system.

Figure 27:
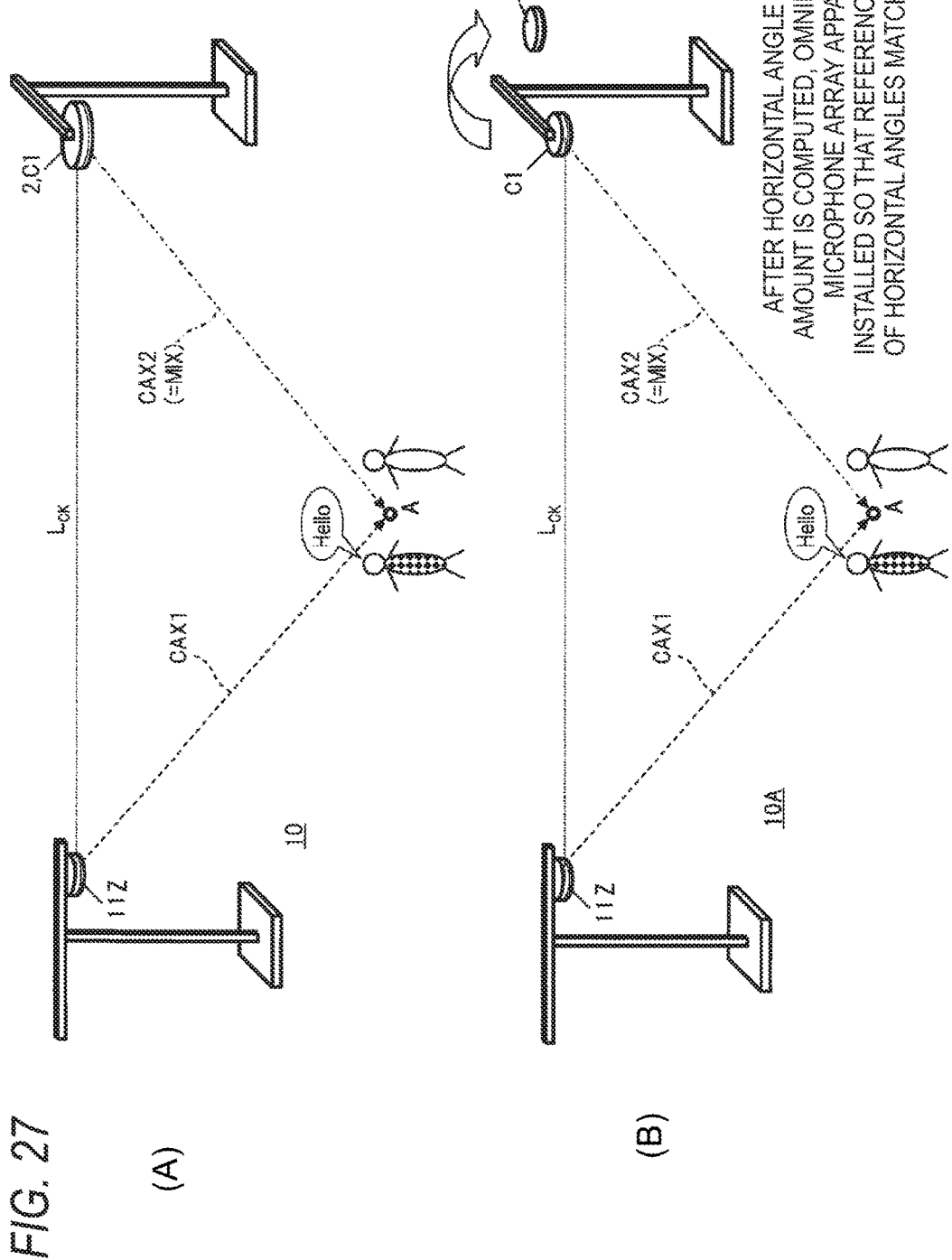
FIG. 27(A) is a schematic diagram of a sound collection system of a sixth embodiment in a case where a calibration omnidirectional camera apparatus and an omnidirectional microphone array apparatus are integrally installed.
FIG. 27(B) is a schematic diagram of a sound collection system of the sixth embodiment in a case where the omnidirectional microphone array apparatus is installed so that a reference direction of a horizontal angle of a sound collection direction of the omnidirectional microphone array apparatus matches a reference direction of a horizontal angle of an imaging direction of the calibration omnidirectional camera apparatus.

(Sixth Embodiment)
Configuration of Directionality Control System
FIG. 27(A) is a schematic diagram of a directionality control system 10 of the present embodiment in a case where a calibration omnidirectional camera apparatus C1 and an omnidirectional microphone array apparatus 2 are integrally installed. FIG. 27(B) is a schematic diagram of a directionality control system 10A of the present embodiment in a case where the omnidirectional microphone array apparatus 2 is installed so that a reference direction of a horizontal angle of a sound collection direction of the omnidirectional microphone array apparatus 2 matches a reference direction of a horizontal angle of an imaging direction of the calibration omnidirectional camera apparatus C1.

The directionality control system 10 illustrated in FIG. 27(A) includes an omnidirectional camera apparatus 11z as a first imaging part which images subjects (for example, two people in FIG. 27(A); this is also the same for the following description), the calibration omnidirectional camera apparatus C1 as a second imaging part which images the same subjects as those imaged by the omnidirectional camera apparatus 11z, and the omnidirectional microphone array apparatus 2 as a sound collection part which collects voice of the same subjects (for example, conversation voice of the two people). In the directionality control system 10 illustrated in FIG. 27(A), for example, a columnar opening 21a (refer to FIG. 2(D)) formed at the center of a casing of the omnidirectional microphone array apparatus 2, and the calibration omnidirectional camera apparatus C1 is fitted into an inner circumferential space inside the opening 21a so that the omnidirectional microphone array apparatus 2 and the calibration omnidirectional camera apparatus C1 are integrally formed with each other.

The omnidirectional camera apparatus 11z functions as, for example, a monitoring camera, includes a casing into which an optical system (for example, a fish-eye lens or a wide angle lens) and an imaging system (for example, an image sensor) (not illustrated) are built, and is installed on a predetermined installation surface (for example, a ceiling surface of a room of an event hall or a stand). The omnidirectional camera apparatus 11z is connected to a host computer (not illustrated) of a central control room via a network (not illustrated), and performs a panning direction operation, a tilting direction operation, a zooming operation, an imaging operation, and a distance-measuring operation and an angle-measuring operation related to an actual position corresponding to a designated position (for example, a designated position A' to be described later) in a captured image in response to a remote operation from the host computer. The omnidirectional camera apparatus 11z images, for example, a subject which is present in a first imaging direction CAX1 which is directed from the omnidirectional camera apparatus 11z toward a sound collection position (or a sound position) A which will be described later (refer to FIG. 27(A)).

The calibration omnidirectional camera apparatus C1 functions as, for example, a calibration camera which computes front direction (for example, a 0° direction) of each horizontal angle of imaging direction coordinates of the omnidirectional camera apparatus 11z and sound collection direction coordinates of the omnidirectional microphone array apparatus 2, and a horizontal deviation angle relative to mutual reference directions connecting the omnidirectional camera apparatus 11z and the omnidirectional microphone array apparatus 2 to each other. The calibration omnidirectional camera apparatus C1 includes a casing into which an optical system (for example, a fish-eye lens or a wide angle lens) and an imaging system (for example, an image sensor) (not illustrated) are built, and is installed on a predetermined installation surface (for example, a ceiling surface of a room of an event hall or a stand). The calibration omnidirectional camera apparatus C1 is connected to the host computer (not illustrated) of the central control room via a network (not illustrated), and performs a panning direction operation, a tilting direction operation, a zooming operation, an imaging operation, and a distance-measuring operation and an angle-measuring operation related to an actual position corresponding to a designated position (for example, a designated position A' to be described later) in a captured image in response to a remote operation from the host computer. The calibration omnidirectional camera apparatus C1 images, for example, a subject which is present in a second imaging direction CAX2 which is directed from the calibration omnidirectional camera apparatus C1 toward the sound collection position A which will be described later (refer to FIG. 27(A)).

The omnidirectional microphone array apparatus 2 of the directionality control system 10 illustrated in FIG. 27(A) includes, for example, a doughnut-shaped or ring-shaped casing 21 (refer to FIG. 2(D)) in which a casing of the calibration omnidirectional camera apparatus C1 is fitted into an inner circumferential space inside the opening 21a. In the omnidirectional microphone array apparatus 2, a plurality of microphone units 22 are disposed in a concentric shape around the opening 21a in a circumferential direction of the casing 21. The microphone unit 18 employs, for example, a high-quality small-sized electret condenser microphone (ECM), and this is also the same for the following description. The omnidirectional microphone array apparatus 2 forms, for example, the sound collection directionality in a sound collection direction MIX which is directed from the omnidirectional microphone array apparatus 2 toward the sound collection position A, and collects voice of a subject present in the sound collection direction MIX.

On the other hand, in the directionality control system 10A illustrated in FIG. 27(B), the calibration omnidirectional camera apparatus C1 and the omnidirectional microphone array apparatus 2 are not integrally formed with each other, and the calibration omnidirectional camera apparatus C1 and the microphone array apparatus 2 operate separately from each other. For this reason, in the directionality control system 10A illustrated in FIG. 27(B), after a directionality control apparatus 3 which will be described later computes a horizontal deviation angle, the calibration omnidirectional camera apparatus C1 is detached, and the omnidirectional microphone array apparatus 2 is installed so that a horizontal angle 0° direction of an imaging direction CAX2 (a second front direction; refer to FIG. 31(B) or 32(B)) of the calibration omnidirectional camera apparatus C1 matches a horizontal angle 0° direction of the omnidirectional microphone array apparatus 2.

Consequently, in the same manner as in the directionality control system 10 illustrated in FIG. 27(A), the omnidirectional microphone array apparatus 2 can use the horizontal angle 0° direction (second front direction) of the calibration omnidirectional camera apparatus C1 in common, and can thus appropriately form the sound collection directionality in the sound collection direction MIX which is directed toward the sound collection position A and can appropriately collect voice of a subject present in the sound collection direction MIX. Hereinafter, a description will be made of a configuration of the directionality control system of the present invention by using the directionality control system 10 illustrated in FIG. 27(A), but the same effect can also be achieved through replacement with the directionality control system 10A illustrated in FIG. 27(B).

In addition, in the present embodiment, the omnidirectional camera apparatus 11z including a fish-eye lens or a wide angle lens is used, but a pan-tilt-zoom (PTZ) camera apparatus which includes a standard lens or a telephoto lens and mechanically performs operation in a panning direction and a tilting direction and a zooming operation may be used.

FIG. 28(A) is a block diagram illustrating an example of a configuration of the directionality control system 10 illustrated in FIG. 27(A). FIG. 28(B) is a block diagram illustrating an example of a configuration of the directionality control system 10A illustrated in FIG. 27(B). The directionality control system 10 illustrated in FIG. 28(A) includes the omnidirectional camera apparatus 11z, the omnidirectional microphone array apparatus 2, the calibration omnidirectional camera apparatus C1, the directionality control apparatus 3, and a recorder apparatus 4. The omnidirectional camera apparatus 11z, the omnidirectional microphone array apparatus 2, the calibration omnidirectional camera apparatus C1, the directionality control apparatus 3, and the recorder apparatus 4 are connected to each other via a network NW. The network NW may be a wired network (for example, an intranet or the Internet), and may be a wireless network (for example, a wireless local area network (LAN)), which is also the same for the following description.

In addition, the directionality control system 10A illustrated in FIG. 28(B) has the same configuration as the configuration of the directionality control system 10 illustrated in FIG. 28(A) except for the calibration omnidirectional camera apparatus C1 and the omnidirectional microphone array apparatus 2 are formed as separate apparatuses.

The omnidirectional camera apparatus 11z is connected to the network NW, measures and acquires input parameters (for example, a distance $L_{CK}$ between the omnidirectional camera apparatus 11z and the calibration omnidirectional camera apparatus C1) for computing a sound collection direction ($\theta_{MAh}, \theta_{MAv}$) of the omnidirectional microphone array apparatus 2, which will be described later, and transmits the measured input parameters and captured image data to the directionality control apparatus 3 or the recorder apparatus 4 via the network NW.

The calibration omnidirectional camera apparatus C1 is connected to the network NW, similarly, measures and acquires input parameters (for example, the distance $L_{CK}$ between the omnidirectional camera apparatus 11z and the calibration omnidirectional camera apparatus C1) for computing the sound collection direction ($\theta_{MAh}, \theta_{MAv}$) of the omnidirectional microphone array apparatus 2, which will be described later, and transmits the measured input parameters and captured image data to the directionality control apparatus 3 or the recorder apparatus 4 via the network NW.

The microphone array apparatus 2 are connected to the network NW and includes at least microphone units 22 and 23 in which microphones are provided at equal intervals (refer to FIGS. 2(A) to 2(E)) and a control unit (not illustrated) which controls an operation of each of the microphone units 22 and 23.

The omnidirectional microphone array apparatus 2 collects sound in a sound collection direction in which a subject serving as a sound collection target is present by using each of the microphone units 22 and 23, and transmits audio data collected by each of the microphone units 22 and 23 to the directionality control apparatus 3 or the recorder apparatus 4 via the network NW.

The omnidirectional microphone array apparatus 2 forms sound collection directionality of each of the microphone units 22 and 23 in the sound collection direction ($\theta_{MAh}, \theta_{MAv}$) which is computed by a coordinate computation section 34x of a signal processing unit 33 of the directionality control apparatus 3 in response to a directionality formation instruction from the directionality control apparatus 3 which will be described later.

Consequently, the omnidirectional microphone array apparatus 2 can relatively increase a volume level of audio data collected from the sound collection direction ($\theta_{MAh}, \theta_{MAv}$) in which the sound collection directionality is formed, and can relatively reduce a volume level of audio data collected from a direction in which the sound collection directionality is not formed. In addition, a method of computing the sound collection direction ($\theta_{MAh}, \theta_{MAv}$) will be described later.

An exterior of the omnidirectional microphone array apparatus 2 has been described with reference to FIG. 2, and thus description thereof will be omitted. In addition, each of the microphone units 22 and 23 of the omnidirectional microphone array apparatus 2 may employ a nondirectional microphone, a bidirectional microphone, a unidirectional microphone, a sharply directional microphone, a super-directional microphone (for example, a shotgun microphone), or a combination thereof.

The directionality control apparatus 3 is connected to the network NW, and may be, for example, a stationery personal computer (PC) installed in a monitoring system control room (not illustrated), and may be a mobile phone, a tablet terminal, or a smart phone, which can be carried by a user.

The directionality control apparatus 3 includes at least a communication unit 31, an operation unit 32, a signal processing unit 33, a display device 36, a speaker device 37, and a memory 38. The signal processing unit 33 includes a horizontal deviation angle computation section 34w, a coordinate computation section 34x, and an output control section 34c.

The communication unit 31 outputs image data or audio data which is transmitted from the omnidirectional camera apparatus 11z, the calibration omnidirectional camera apparatus C1, or the microphone array apparatus 2, to the signal processing unit 33 via the network NW.

The operation unit 32 is a user interface (UI) for notifying the signal processing unit 33 of the content of a user's input operation, and is, for example, a pointing device such as a mouse or a keyboard. In addition, the operation unit 32 may be configured by using a touch panel or a touch pad which is disposed so as to correspond to, for example, a screen of the display device 36 and allows an input operation to be performed with the finger FG of the user or a stylus pen.

Figure 29:
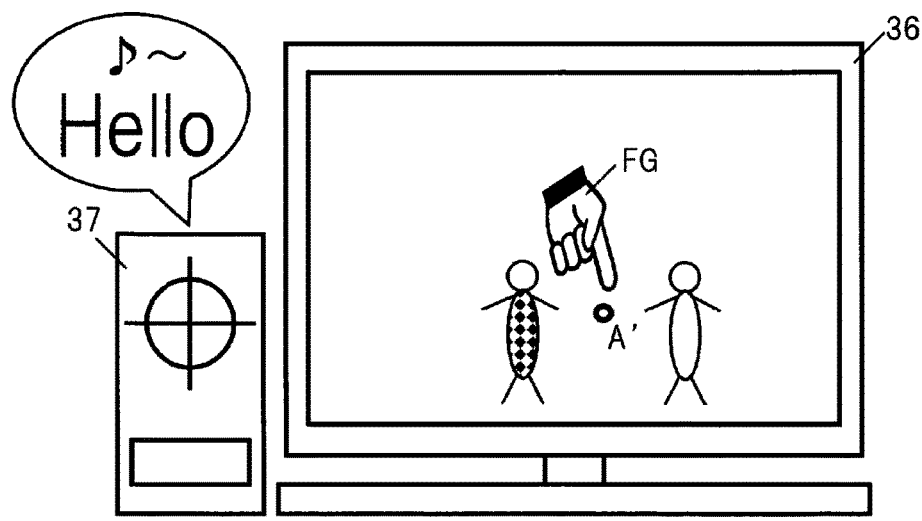
FIG. 29 is a diagram illustrating a state in which collected audio data is output from the speaker device when a direction which is directed from the omnidirectional microphone array apparatus toward the sound collection position A corresponding to the designated position A' designated with the finger of the user in an image displayed on the display device is a sound collection direction.

The operation unit 32 acquires coordinate data indicating a region where the user desires to increase or decrease a volume level, that is, a designated position A' illustrated in FIG. 29 and outputs the coordinate data to the signal processing unit 33 in response to the user's input operation.

The signal processing unit 33 is configured by using, for example, a central processing unit (CPU), a micro processing unit (MPU), or a digital signal processor (DSP), and performs a control process for collectively controlling operations of the respective units of the directionality control apparatus 3, data input and output processes with other respective units, a data computation (calculation) process, and a data storage process.

Figure 31:
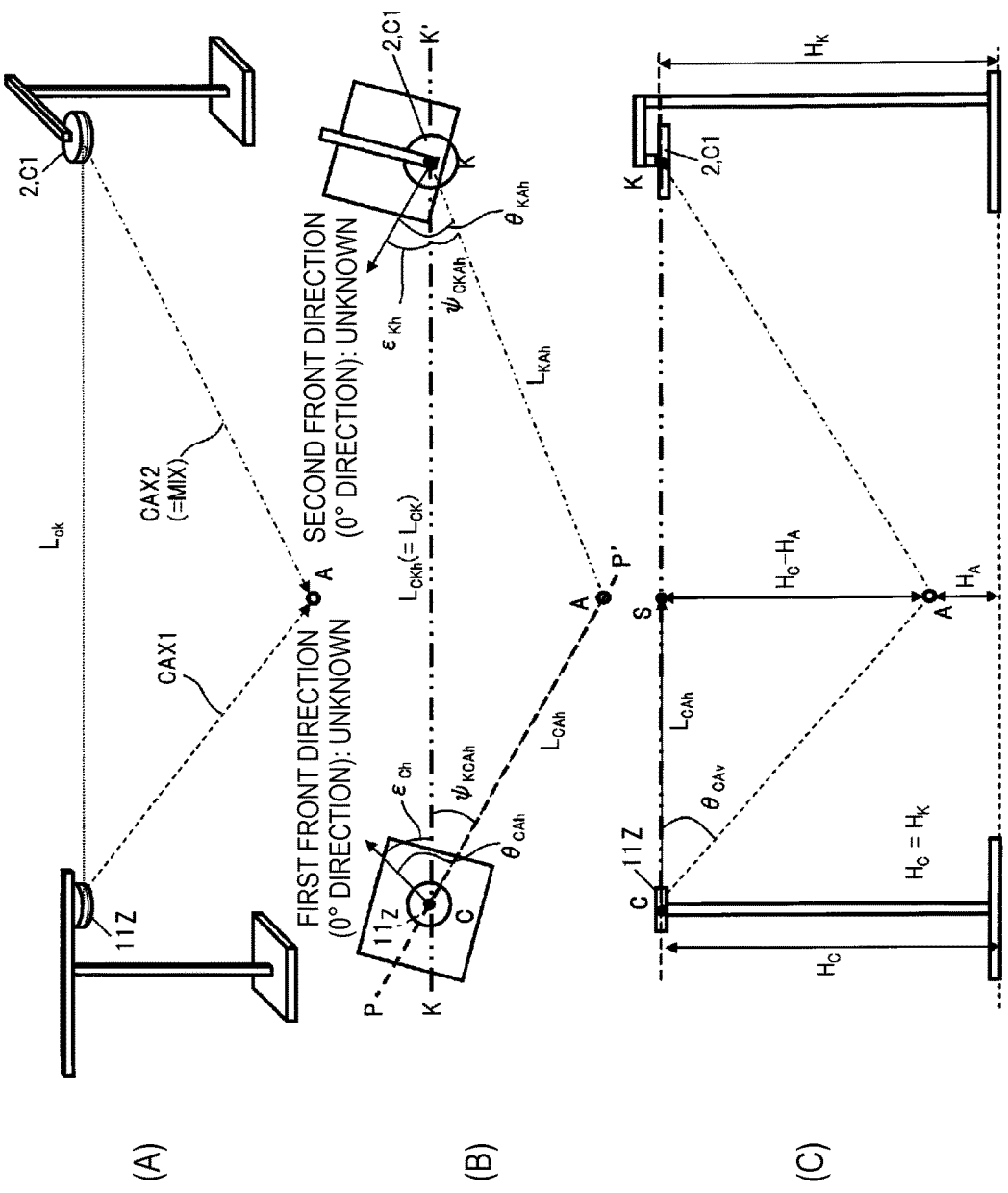

The horizontal deviation angle computation section 34w as a deviation angle computation part computes a first horizontal deviation angle $\epsilon_{Ch}$ of the omnidirectional camera apparatus 11z in a first front direction (horizontal angle 0° direction) and a second horizontal deviation angle $\epsilon_{Kh}$ of the calibration omnidirectional camera apparatus C1 in a second front direction (horizontal angle 0° direction) relative to a reference position (a line K-K' illustrated in FIG. 31(B)) connecting the omnidirectional camera apparatus 11z to the calibration omnidirectional camera apparatus C1, based on direction angle information of the first imaging direction CAX1 which is directed from the omnidirectional camera apparatus 11z to the sound collection position A corresponding to the designated position A', direction angle information of the second imaging direction CAX2 which is directed from the calibration omnidirectional camera apparatus C1 to the sound collection position A, and a distance between the omnidirectional camera apparatus 11z and the calibration omnidirectional camera apparatus C1, in response to a user's designation of any position (=designated position A') in image data displayed on the display device 36. A specific computation method in the horizontal deviation angle computation section 34w will be described later with reference to FIGS. 31 and 32.

The coordinate computation section 34x computes a horizontal angle $\theta_{MAh}$ and a vertical angle $\theta_{MAv}$ of the sound collection direction MIX which is directed from the omnidirectional microphone array apparatus 2 toward the sound collection position A based on the first horizontal deviation angle $\epsilon_{Ch}$ and the second horizontal deviation angle $\epsilon_{Kh}$ computed by the horizontal deviation angle computation section 34w, as coordinates (sound collection direction coordinates) indicating a sound collection direction in which the omnidirectional microphone array apparatus 2 collects voice of a subject.

In the sound collection direction ($\theta_{MAh}, \theta_{MAv}$), $\theta_{MAh}$ indicates a horizontal angle of the sound collection direction MIX which is directed from the omnidirectional microphone array apparatus 2 toward the sound collection position A, and $\theta_{MAv}$ indicates a vertical angle of the sound collection direction MIX which is directed from the omnidirectional microphone array apparatus 2 toward the sound collection position A.

Since a relationship between coordinate axes of the omnidirectional camera apparatus 11z and coordinate axes of the microphone array apparatus 2 is known based on the first horizontal deviation angle $\epsilon_{Ch}$, the second horizontal deviation angle $\epsilon_{Kh}$, and the distance La therebetween, the directionality control apparatus 3 computes the sound collection direction $(\theta_{MAh}, \theta_{MAv})$ in response to designation of a sound collection position in image data displayed on the display device 36.

In addition, the sound collection position A is a field position which corresponds to the designated position A' which is designated with the finger FG of the user or a stylus pen on a screen of the display device 36 via the operation unit 32, and is an actual monitoring target (refer to FIGS. 27(A) and 29).

The output control section 34c controls operations of the display device 36 and the speaker device 37, so as to cause the display device 36 to reproduce and output video data transmitted from the omnidirectional camera apparatus 11z, and to cause the speaker device 37 to output audio data transmitted from the omnidirectional microphone array apparatus 2 as sound. In addition, the output control section 34c controls an operation of the omnidirectional microphone array apparatus 2 so as to cause the omnidirectional microphone array apparatus 2 to form the sound collection directionality of audio data in the sound collection direction MIX corresponding to sound collection direction coordinates $(\theta_{MAh}, \theta_{MAv})$ computed by, for example, the coordinate computation section 34x.

The display device 36 as a display part displays image data captured by the omnidirectional camera apparatus 11z or the calibration omnidirectional camera apparatus C1 on a screen.

The speaker device 37 as a sound output part outputs, as sound, audio data collected by the omnidirectional microphone array apparatus 2 or audio data which is collected by the omnidirectional microphone array apparatus 2 after the sound collection directionality is formed in the sound collection direction $(\theta_{MAh}, \theta_{MAv})$ computed by the coordinate computation section 34x. In addition, the display device 36 and the speaker device 37 may be configured separately from the directionality control apparatus 3.

The memory 38 is configured by using, for example, a random access memory (RAM), and functions as a work memory when the respective units of the directionality control apparatus 3 operate.

The recorder apparatus 4 records image data captured by the omnidirectional camera apparatus 11z or the calibration omnidirectional camera apparatus C1 and audio data collected by the omnidirectional microphone array apparatus 2. The recorder apparatus 4 records the image data captured by the omnidirectional camera apparatus 11z and the audio data collected by the omnidirectional microphone array apparatus 2 in correlation with each other.

Next, a summary of an operation of the directionality control system 10 of the present embodiment will be described with reference to FIGS. 27(A) and 29. FIG. 29 is a diagram illustrating a state in which collected audio data is output from the speaker device 37 when a direction which is directed from the omnidirectional microphone array apparatus 2 toward the sound collection position A corresponding to the designated position A' designated with the finger of the user in an image displayed on the display device 36 is a sound collection direction.

In the directionality control system 10, the omnidirectional camera apparatus 11z images the subjects (for example, two people) illustrated in FIG. 27(A). The microphone array apparatus 2 collects ambient sound including conversation voice of the subjects. In FIG. 27(A), the two people are having conversations. For example, image data captured by omnidirectional camera apparatus 11z is displayed on the display device 36 of the directionality control apparatus 3 (refer to FIG. 29).

Here, if the designated position A' on the display device 36, that is, a central position or a substantially central position the two people having conversations is designated with the finger FG of the user, the directionality control apparatus 3 acquires coordinate data $(\theta_{CAh}, \theta_{CAv})$ of the first imaging direction CAX1 indicating the designated position A'.

The directionality control apparatus 3 computes sound collection direction coordinates $(\theta_{MAh}, \theta_{MAv})$ indicating a direction which is directed from the installation position of the omnidirectional microphone array apparatus 2 toward the sound collection position A, that is, a sound collection direction, as a sound collection direction of the omnidirectional microphone array apparatus 2 based on a relationship between a coordinate system of the omnidirectional camera apparatus 11z and a coordinate system of the omnidirectional microphone array apparatus 2, which is computed through calibration. The omnidirectional microphone array apparatus 2 forms the sound collection directionality in the direction which is directed from the omnidirectional microphone array apparatus 2 toward the sound collection position A by using the coordinate data $(\theta_{MAh}, \theta_{MAv})$ computed by the directionality control apparatus 3.

Therefore, the omnidirectional microphone array apparatus 2 can increase a volume level of the conversation (Hello) of the two people present in the direction in which the sound collection directionality is formed more than a volume level of sound output from other objects which are not present in the direction in which the sound collection directionality is formed.

Consequently, the directionality control apparatus 3 causes the speaker device 37 to output sound with a volume level of the conversation (Hello) of the two people present in the direction in which the sound collection directionality is formed higher than a volume level of sound output from other objects which are not present in the direction in which the sound collection directionality is formed (refer to FIG. 29).

Figure 30:
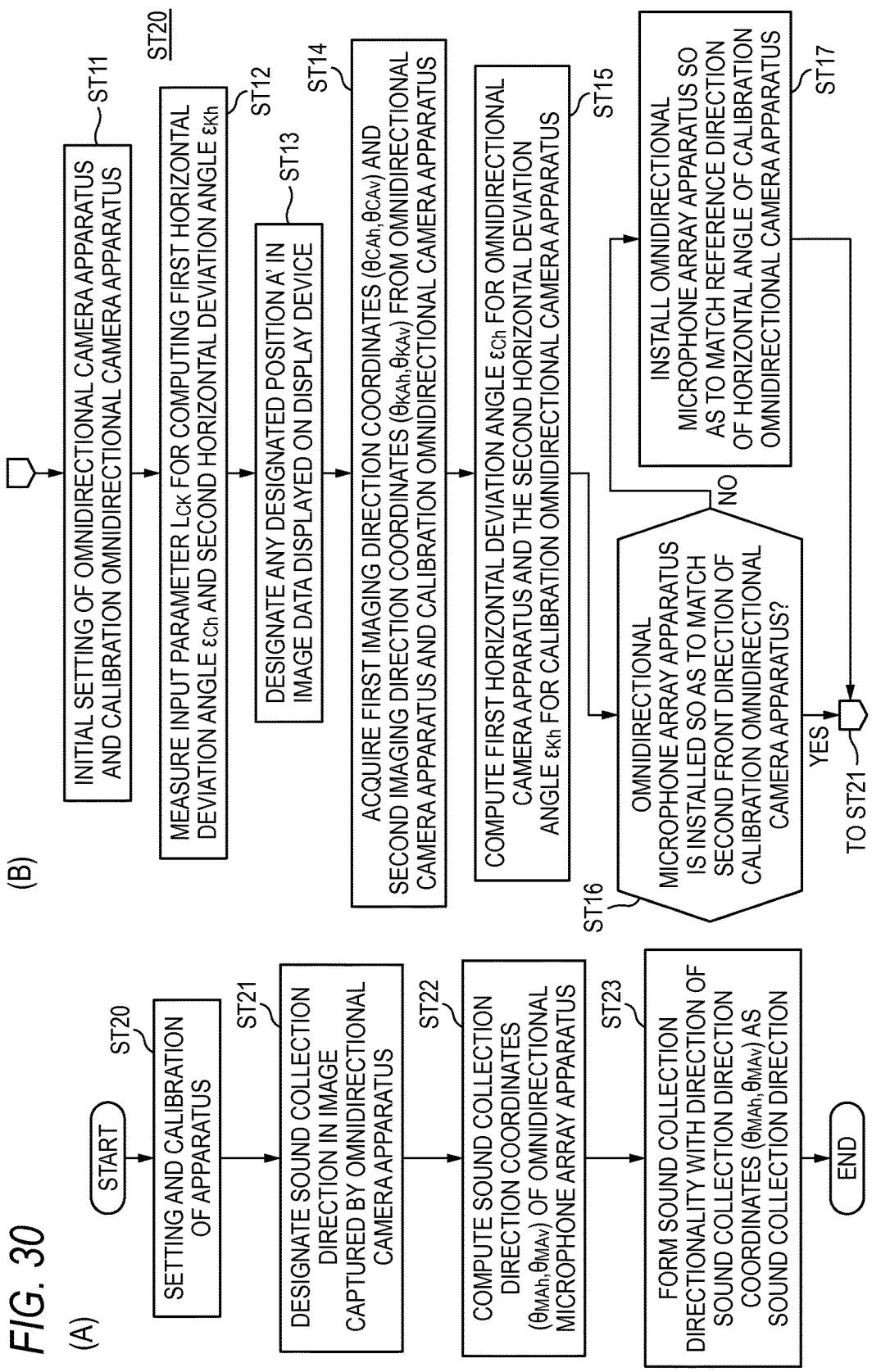
FIG. 30(A) is a flowchart illustrating an operation procedure related to computation of a first horizontal deviation angle $\epsilon_{Ch}$ and a second horizontal deviation angle $\epsilon_{Kh}$, and formation of the sound collection directionality in the sound collection system of the sixth embodiment.
FIG. 30(B) is a flowchart specifically illustrating an operation procedure of calibration in step ST20 illustrated in FIG. 30(A).

Next, a specific operation procedure of the directionality control system 10 or the directionality control system 10A of the present embodiment will be described with reference to FIGS. 30(A) and 30(B). FIG. 30(A) is a flowchart illustrating an operation procedure related to computation of the first horizontal deviation angle $\epsilon_{Ch}$ and the second horizontal deviation angle $\epsilon_{Kh}$ and formation of the sound collection directionality in the directionality control system 10 or 10A of the present embodiment. FIG. 30(B) is a flowchart specifically illustrating an operation procedure of calibration in step S20 illustrated in FIG. 30(A).

In description of the calibration illustrated in FIG. 30(B), initial setting includes an operation of installing or attaching the omnidirectional camera apparatus 11z, the calibration omnidirectional camera apparatus C1, the omnidirectional microphone array apparatus 2 constituting the directionality control system 10 or the directionality control system 10A on or to a predetermined installation surface. Hereinafter, for simplification of description of the calibration illustrated in FIG. 30(B), for example, an operation procedure of the directionality control system 10 illustrated in FIG. 27(A) will be described, and an operation procedure of the directionality control system 10A will be described as necessary in a case where there is content which is different from that of the operation procedure of the directionality control system 10 illustrated in FIG. 27(A).

In FIG. 30(A), the omnidirectional camera apparatus 11z, the calibration omnidirectional camera apparatus C1, the omnidirectional microphone array apparatus 2 are installed, and calibration for defining a relationship between coordinate axes of the omnidirectional camera apparatus 11z and the omnidirectional microphone array apparatus 2 is performed (step ST20). In addition, details of the operation in step S20 will be described later with reference to FIG. 30(B).

After the calibration is completed in step ST20, a position where sound is desired to be collected from a video (or an image) captured by the omnidirectional camera apparatus 11z is designated on a screen of the display device 36 (step ST21).

The coordinate computation section 34x of the directionality control apparatus 3 computes a horizontal angle and a vertical angle ($\theta_{CAh}$ and $\theta_{CAv}$) of the first imaging direction CAX1 designated in step ST21 as coordinates (sound collection direction coordinates, that is, ($\theta_{MAh}, \theta_{MAv}$)) indicating a sound collection direction in which a voice of a subject is collected by the omnidirectional microphone array apparatus 2, by using an input parameter $L_{CK}$ measured in step ST12 (which will be described later) and the first horizontal deviation angle $\epsilon_{Ch}$ and the second horizontal deviation angle $\epsilon_{Kh}$ computed in step ST15 (step ST22).

The output control section 34c of the directionality control apparatus 3 forms the sound collection directionality of each of the microphone units 22 and 23 in the sound collection direction indicated by the sound collection direction coordinates ($\theta_{MAh}, \theta_{MAv}$) computed in step ST22 (step ST23).

Consequently, the omnidirectional microphone array apparatus 2 can relatively increase a volume level of audio data collected from the sound collection direction defined by the sound collection coordinates ($\theta_{MAh}, \theta_{MAv}$) in which the sound collection directionality is formed, and can relatively reduce a volume level of audio data collected from a direction in which the sound collection directionality is not formed.

In addition, in the directionality control system 10 of the present embodiment, a timing at which the omnidirectional microphone array apparatus 2 collects sound is not limited to the time right after step ST20, and may be, for example, the time after power is supplied to the omnidirectional microphone array apparatus 2.

The calibration in step S20 will be described in detail. In FIG. 30(B), the omnidirectional camera apparatus 11z, the calibration omnidirectional camera apparatus C1, and the omnidirectional microphone array apparatus 2 constituting the directionality control system 10 are initially installed so as to be fixed to a predetermined installation surface (for example, a ceiling surface of a room of an event hall or a stand) (step ST11; refer to FIG. 31(A)).

In step ST11, the calibration omnidirectional camera apparatus C1 and the omnidirectional microphone array apparatus 2 are integrally installed as follows, for example.

Specifically, first, an attachment tool (not illustrated; for example, an attachment tool made of metal, an attachment tool made of ceramics, or an attachment tool made of a synthetic resin (for example, plastic or elastomer)) is attached and fixed to a predetermined installation surface (for example, a stand).

After the attachment tool is attached to the predetermined installation surface, both of the calibration omnidirectional camera apparatus C1 and the omnidirectional microphone array apparatus 2 are attached to the attachment tool. As described above, the calibration omnidirectional camera apparatus C1 is fitted into the inner circumferential space inside the opening 21a formed at the center of the casing of the omnidirectional microphone array apparatus 2 so that the omnidirectional microphone array apparatus 2 and the calibration omnidirectional camera apparatus C1 are integrally formed with each other. In addition, the calibration omnidirectional camera apparatus C1 and the microphone array apparatus 2 are integrally formed with each other so that a front direction (0° direction) of each horizontal angle is used in common.

Therefore, since a horizontal angle and a vertical angle of the second imaging direction CAX2 of the calibration omnidirectional camera apparatus C1 are the same as a horizontal angle and a vertical angle of a sound collection direction of the omnidirectional microphone array apparatus 2, if the second front direction is determined by computing at least the second horizontal deviation angle $\epsilon_{Kh}$, sound collection direction coordinates in the omnidirectional microphone array apparatus 2 can be appropriately computed.

After the omnidirectional camera apparatus 11z, the calibration omnidirectional camera apparatus C1, and the omnidirectional microphone array apparatus 2 are initially installed, there is the measurement of an input parameter (for example, the distance $L_{CK}$) which is required for the horizontal deviation angle computation section 34w to compute the first horizontal deviation angle $\epsilon_{Ch}$ and the second horizontal deviation angle $\epsilon_{Kh}$ (step ST12). The distance $L_{CK}$ indicates a distance between the omnidirectional camera apparatus 11z and the calibration omnidirectional camera apparatus C1.

The process in step ST12 includes a case where the user measures the distance $L_{CK}$ by using a measuring device (for example, a laser range finder), or a case where the omnidirectional camera apparatus 11z measures and acquires the distance $L_{CK}$ by using functions of well-known techniques of the omnidirectional camera apparatus 11z. Hereinafter, for simplification of description, it is assumed that the user measures the distance $L_{CK}$ by using a measuring device (for example, a laser range finder) in step S12. The signal processing unit 33 acquires data regarding the distance $L_{CK}$ which is an input parameter output from the operation unit 32 in response to a user's input operation.

After step ST12, the directionality control apparatus 3 receives designation of any designated position A' in image data which is being displayed on a screen of the display device 36, via the operation unit 32 (step ST13). The directionality control apparatus 3 transmits a notification indicating that the designation of the designated position A' in the image data which is being displayed on the screen of the display device 36 has been received, to the omnidirectional camera apparatus 11z and the calibration omnidirectional camera apparatus C1.

After step ST13, in a case where the omnidirectional camera apparatus 11z receives the notification indicating that the designation of the designated position A' has been received from the directionality control apparatus 3, the omnidirectional camera apparatus 11z measures and acquires coordinate data including a horizontal angle and a vertical angle ($\theta_{CAh}, \theta_{CAv}$) of the first imaging direction CAX1 which is directed toward the sound collection position A corresponding to the designated position A' on the screen designated in step ST13, with the installation position of the omnidirectional camera apparatus 11z as a start point (step ST14). However, in the coordinate data including the horizontal angle and the vertical angle ($\theta_{CAh}, \theta_{CAv}$) obtained in step ST14, the horizontal angle $\theta_{CAh}$ is data in a state in which it is not determined which direction is the first front direction.

Further, in a case where the calibration omnidirectional camera apparatus C1 receives the notification indicating that the designation of the designated position A' has been received from the directionality control apparatus 3, the calibration omnidirectional camera apparatus C1 measures and acquires coordinate data including a horizontal angle and a vertical angle ($\theta_{KAh}, \theta_{KAv}$) of the second imaging direction CAX2 which is directed toward the sound collection position A corresponding to the designated position A' on the image data designated in step ST13, with the installation position of the calibration omnidirectional camera apparatus C1 as a start point (step ST14). Similarly, in the coordinate data including the horizontal angle and the vertical angle ($\theta_{KAh}, \theta_{KAv}$) obtained in step ST14, the horizontal angle $\theta_{KAh}$ is data in a state in which it is not determined which direction is the second front direction.

The omnidirectional camera apparatus 11z transmits the coordinate data including the horizontal angle and the vertical angle ($\theta_{CAh}, \theta_{CAv}$) of the first imaging direction CAX1 to the directionality control apparatus 3. The calibration omnidirectional camera apparatus C1 transmits the coordinate data including the horizontal angle and the vertical angle ($\theta_{KAh}, \theta_{KAv}$) of the second imaging direction CAX2 to the directionality control apparatus 3.

The horizontal deviation angle computation section 34w of the directionality control apparatus 3 computes the first horizontal deviation angle $\epsilon_{Ch}$ and the second horizontal deviation angle $\epsilon_{Kh}$ based on the input parameter $L_{CK}$ measured in step S12, and the coordinate data including the horizontal angle and the vertical angle ($\theta_{CAh}, \theta_{CAv}$) of the first imaging direction CAX1 and the coordinate data including the horizontal angle and the vertical angle ($\theta_{KAh}, \theta_{KAv}$) of the second imaging direction CAX2 measured in step S14 (step ST15). Details of the operation in step S15 will be described later with reference to FIGS. 31 and 32.

Consequently, the directionality control apparatus 3 can determine which direction is the first front direction (horizontal angle of 0°) of a horizontal angle of the omnidirectional camera apparatus 11z and can further determine which direction is the second front direction (horizontal angle of 0°) of a horizontal angle of the calibration omnidirectional camera apparatus C1 before computing sound collection direction coordinates of the omnidirectional microphone array apparatus 2.

Here, in the initial installation in step ST11, in a case where the omnidirectional microphone array apparatus 2 is installed so that a front direction (for example, a 0° direction) of a horizontal angle of a sound collection direction of the omnidirectional microphone array apparatus 2 matches a front direction (for example, a 0° direction) of a horizontal angle of the calibration omnidirectional camera apparatus C1 (YES in step ST16), the calibration is completed, and the operation procedure proceeds to step ST21.

On the other hand, in a case where the omnidirectional microphone array apparatus 2 is not installed so that a reference direction (for example, a 0° direction) of a horizontal angle of a sound collection direction of the omnidirectional microphone array apparatus 2 matches a front direction (for example, a 0° direction) of a horizontal angle of the calibration omnidirectional camera apparatus C1 in the initial installation in step ST11 (NO in step ST16), the operation procedure of the directionality control system 10 proceeds to step ST21.

In other words, in step ST17, the omnidirectional microphone array apparatus 2 is installed so that a front direction (for example, a 0° direction) of a horizontal angle of a sound collection direction of the omnidirectional microphone array apparatus 2 matches a front direction (for example, a 0° direction) of a horizontal angle of the calibration omnidirectional camera apparatus C1 (step ST17).

In step ST17, the omnidirectional microphone array apparatus 2 is installed as follows, for example, so that a reference direction (for example, a 0° direction) of a horizontal angle of a sound collection direction of the omnidirectional microphone array apparatus 2 matches a reference direction of a horizontal angle of the second imaging direction CAX2 of the calibration omnidirectional camera apparatus C1.

Specifically, for example, a triangular or triangular marker (not illustrated) is added to an outer circumference of the casing of the calibration omnidirectional camera apparatus C1. The marker is added in a direction indicating the front direction (0° direction) of a horizontal angle of the second imaging direction of the calibration omnidirectional camera apparatus C1. In addition, for example, a marker with the same shape (not illustrated) is added at a position facing the marker of calibration omnidirectional camera apparatus C1 on a circumferential edge of the opening 21a formed at the center of the casing of the omnidirectional microphone array apparatus 2.

Therefore, if the omnidirectional microphone array apparatus 2 is installed so that the marker of the calibration omnidirectional camera apparatus C1 faces the marker of the omnidirectional microphone array apparatus 2, the omnidirectional microphone array apparatus 2 is installed so that a front direction (for example, a 0° direction) of a horizontal angle of a sound collection direction of the omnidirectional microphone array apparatus 2 matches a front direction of a horizontal angle of the second imaging direction CAX2 of the calibration omnidirectional camera apparatus C1.

(Method of Computing Coordinates ($\theta_{MAh}, \theta_{MAv}$) Indicating Sound Collection Direction of Omnidirectional Microphone Array Apparatus 2)

Next, with reference to FIGS. 31 and 32, a detailed description will be made of a method of computing the first horizontal deviation angle $\epsilon_{Ch}$ and the second horizontal deviation angle $\epsilon_{Kh}$ in the horizontal deviation angle computation section 34w of the directionality control apparatus 3.

FIG. 31 is a diagram illustrating each positional relationship between the omnidirectional camera apparatus 11z, the calibration omnidirectional camera apparatus C1, and the sound collection position A in the present embodiment. FIG. 31(A) is a perspective view. FIG. 31(B) is a plan view in which FIG. 7(A) is viewed in a vertically downward direction from an upper side. FIG. 31(C) is a vertical direction sectional view taken along the line K-K' of FIG. 7(B).

Figure 32:
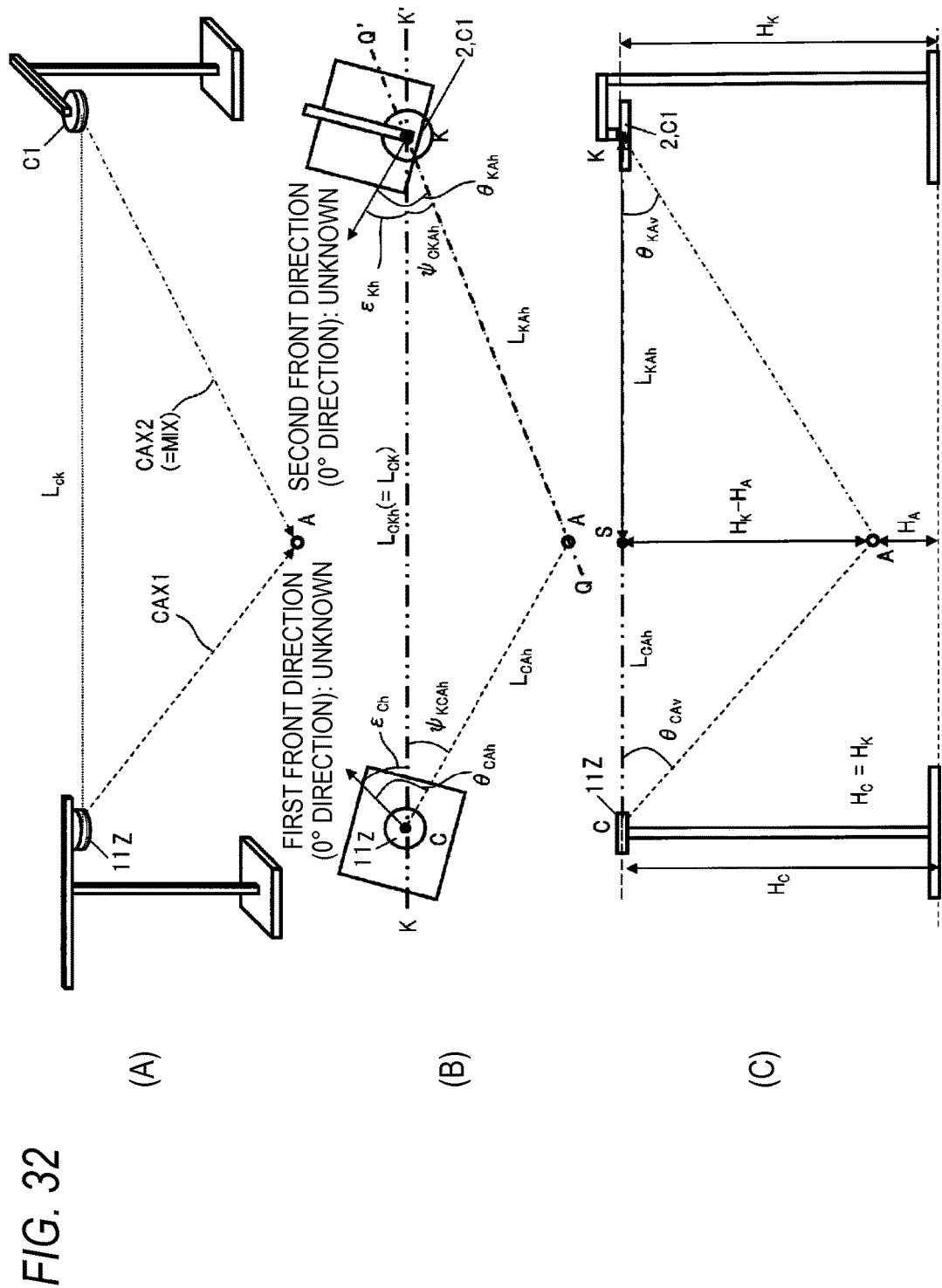

FIG. 32 is a diagram illustrating each positional relationship between the omnidirectional camera apparatus 11z, the calibration omnidirectional camera apparatus C1, and the sound collection position A in the present embodiment. FIG. 32(A) is a perspective view. FIG. 32(B) is a plan view in which FIG. 32(A) is viewed in a vertically lower direction from an upper side. FIG. 32(C) is a vertical direction sectional view taken along the line K-K' of FIG. 32(B).

The horizontal deviation angle computation section 34w computes the first horizontal deviation angle $\epsilon_{Ch}$ and the second horizontal deviation angle $\epsilon_{Kh}$ in response to designation of any designated position A' from the user in image data displayed on the display device 36 based on:

(1) the distance $L_{CK}$ between the omnidirectional camera apparatus 11z and the calibration omnidirectional camera apparatus C1 measured in step ST12;

(2) the coordinates including the horizontal angle and the vertical angle ($\theta_{CAh},\theta_{CAv}$) of the first imaging direction CAX1 measured in step ST14;

(3) the coordinates including the horizontal angle and the vertical angle ($\theta_{KAh},\theta_{KAv}$) of the second imaging direction CAX2 measured in the initial installation of step ST14;

(4) the respective heights $H_C$ and $H_K$ of the omnidirectional camera apparatus 11z and the calibration omnidirectional camera apparatus C1 from the horizontal surface measured in the initial installation of step ST11; and (5) the height $H_A$ of the sound collection position A from the horizontal surface.

(4) The respective heights $H_C$, HK and $H_M$ of the omnidirectional camera apparatus 11z, the calibration omnidirectional camera apparatus C1, and the omnidirectional microphone array apparatus 2 from the horizontal surface are fixed values defined when the omnidirectional camera apparatus 11z, the calibration omnidirectional camera apparatus C1, and the omnidirectional microphone array apparatus 2 are initially installed. For example, the respective heights $H_C$, HK and $H_M$ of the omnidirectional camera apparatus 11z, the calibration omnidirectional camera apparatus C1, and the omnidirectional microphone array apparatus 2 from the horizontal surface are the same as each other.

(5) The height $H_A$ of the sound collection position A from the horizontal surface is a predefined fixed value, and, for example, in a case where there is a person around the sound collection position A when the designated position A' is designated with the finger FG of the user, the height $H_A$ thereof is a selected value or an input value corresponding to a size of the person. Alternatively, when the position A' is designated with the finger FG of the user, a default value (for example, 1.5 m or 0.8 m) may be used in a case where the directionality control apparatus 3 determines that there is a person (for example, an adult or a child) at the designated position.

Hereinafter, a detailed description will be made of a method of computing the first horizontal deviation angle $\epsilon_{Ch}$ and the second horizontal deviation angle $\epsilon_{Kh}$ in the horizontal deviation angle computation section 34w. First, as the premise for describing the present computation method, the first front direction indicating a front direction (0° direction) of a horizontal angle which is required to define a horizontal angle of the first imaging direction CAX1 of the omnidirectional camera apparatus 11z is not known, that is, unknown (refer to FIG. 31(B) or 32(B)). Similarly, the second front direction indicating a front direction (0° direction) of a horizontal angle which is required to define a horizontal angle of the second imaging direction CAX2 of the calibration omnidirectional camera apparatus C1 is not known, that is, unknown (refer to FIG. 31(B) or 32(B)).

The horizontal deviation angle computation section 34w computes a horizontal component distance $L_{CAh}$ of the distance from the omnidirectional camera apparatus 11z to the sound collection position A according to Equation (64) by using the height $H_C$ of the omnidirectional camera apparatus 11z from the horizontal surface, the height $H_A$ of the sound collection position A from the horizontal surface, and the vertical angle $\theta_{CAv}$ of the first imaging direction CAX1 in the triangle CAS illustrated in FIG. 31(C).

[Equation 64]

$$L_{CAh} = \frac{H_C - H_A}{\tan(\theta_{CAv})} \quad (64)$$

The horizontal deviation angle computation section 34w computes a horizontal component distance $L_{KAh}$ of the distance from the calibration omnidirectional camera apparatus C1 to the sound collection position A according to Equation (65) by using the height HK of the calibration omnidirectional camera apparatus C1 from the horizontal surface, the height $H_A$ of the sound collection position A from the horizontal surface, and the vertical angle $\theta_{KAv}$ of the second imaging direction CAX2 in the triangle KAS illustrated in FIG. 32(C).

[Equation 65]

$$L_{KAh} = \frac{H_K - H_A}{\tan(\theta_{KAv})} \quad (65)$$

The horizontal deviation angle computation section 34w computes a cosine value $\cos \psi_{KCAh}$ of a horizontal angle $\psi_{KCAh}$ formed between a straight line connecting the omnidirectional camera apparatus 11z and the calibration omnidirectional camera apparatus C1 to each other and a straight line K-K' from the omnidirectional camera apparatus 11z to the sound collection position A according to Equation (66) based on the cosine theorem for the triangle KCA illustrated in FIG. 31(B) by using the distance $L_{CK}$, and the distances $L_{CAh}$ and $L_{KAh}$ which are computed according to Equations (64) and (65)

[Equation 66]

$$\cos\psi_{KCAh} = \frac{L_{CK}^2 + L_{CAh}^2 - L_{KAh}^2}{2L_{CK} \times L_{CAh}} \quad (66)$$

The horizontal deviation angle computation section 34w computes the horizontal angle $\psi_{KCAh}$ according to Equation (67) by using the computation result of Equation (66).

[Equation 67]

$$\psi_{KCAh} = \arccos\left(\frac{L_{CK}^2 + L_{CAh}^2 - L_{KAh}^2}{2L_{CK} \times L_{CAh}}\right) \quad (67)$$

The horizontal deviation angle computation section 34w computes a cosine value $\cos \psi_{CKAh}$ of a horizontal angle $\psi_{CKAh}$ formed between the straight line connecting the omnidirectional camera apparatus 11z and the calibration omnidirectional camera apparatus C1 to each other and a straight line K-K' from the calibration omnidirectional camera apparatus C1 to the sound collection position A according to Equation (68) based on the cosine theorem for the triangle KCA illustrated in FIG. 31(B) by using the distance $L_{CK}$, and the distances $L_{CAh}$ and $L_{KAh}$ which are computed according to Equations (64) and (65).

[Equation 68]

$$\cos\psi_{CKAh} = \frac{L_{CK}^2 + L_{KAh}^2 - L_{CAh}^2}{2L_{CK} \times L_{KAh}} \quad (68)$$

The horizontal deviation angle computation section 34w computes the horizontal angle $\psi_{KCAh}$ according to Equation (69) by using the computation result of Equation (68).

[Equation 69]

$$\psi_{CKAh} = \arccos\left(\frac{L_{CK}^2 + L_{KAh}^2 - L_{CAh}^2}{2L_{CK} \times L_{KAh}}\right) \quad (69)$$

The horizontal deviation angle computation section 34w computes the first horizontal deviation angle $\epsilon_{Ch}$ according to Equation (70) by using the horizontal angle $\theta_{CAh}$ of the first imaging direction CAX1, and the horizontal angle $\psi_{KCAh}$ computed according to Equation (67).

[Equation 70]

$$\epsilon_{Ch} = \theta_{CAh} - \psi_{KCAh} \quad (70)$$

The horizontal deviation angle computation section 34w computes the second horizontal deviation angle $\epsilon_{Kh}$ according to Equation (71) by using the horizontal angle $\theta_{KAh}$ of the second imaging direction CAX2, and the horizontal angle $\psi_{CKAh}$ computed according to Equation (68).

[Equation 71]

$$\epsilon_{Kh} = \theta_{KAh} - \psi_{CKAh} \quad (71)$$

In the above-described way, in the directionality control system 10 or the directionality control system 10A of the present embodiment, the omnidirectional camera apparatus 11z and the calibration omnidirectional camera apparatus C1 capture images of the same subject, and the omnidirectional microphone array apparatus 2 collects voice of the subject whose image is captured. If any designated position A' is designated in image data which is obtained by the omnidirectional camera apparatus 11z and is displayed on the display device 36, the horizontal deviation angle computation section 34w of the directionality control apparatus 3 computes the first horizontal deviation angle $\epsilon_{Ch}$ which is a deviation angle of a front direction of the omnidirectional camera apparatus 11z relative to mutual reference directions connecting the omnidirectional camera apparatus 11z and the calibration omnidirectional camera apparatus C1 to each other, and the second horizontal deviation angle $\epsilon_{Kh}$ which is a deviation angle formed between the second front direction of a horizontal angle of the calibration omnidirectional camera apparatus C1 and the reference direction of the calibration omnidirectional camera apparatus C1.

Consequently, in the directionality control system 10, the directionality control apparatus 3 can compute sound collection direction coordinates of the omnidirectional microphone array apparatus 2 which is attached so as to surround the casing of the calibration omnidirectional camera apparatus C1 or the omnidirectional microphone array apparatus 2 which is attached at a position of the calibration omnidirectional camera apparatus C1 so as to match a reference direction of a horizontal angle of the calibration omnidirectional camera apparatus C1, based on imaging direction coordinates which are directed from the omnidirectional camera apparatus 11z to the sound collection position A.

In other words, the directionality control apparatus 3 can determine to what extent a deviation of the first front direction of a horizontal angle of the omnidirectional camera apparatus 11z occurs relative to a reference direction of the omnidirectional camera apparatus 11z, and can further determine to what extent a deviation of the second front direction of a horizontal angle of the calibration omnidirectional camera apparatus C1 occurs relative to a reference direction of the calibration omnidirectional camera apparatus C1, before computing sound collection direction coordinates of the omnidirectional microphone array apparatus 2. Therefore, in the directionality control system 10, a horizontal angle and a vertical angle of the second imaging direction CAX2 of the calibration omnidirectional camera apparatus C1 are respectively the same as a horizontal angle and a vertical angle of a sound collection direction of the omnidirectional microphone array apparatus 2. Thus, if the first horizontal deviation angle $\epsilon_{Ch}$ and the second horizontal deviation angle $\epsilon_{Kh}$ are computed, the sound collection direction coordinates of the omnidirectional microphone array apparatus 2 can be appropriately computed based on the computed distance $L_{ck}$.

In other words, the directionality control apparatus 3 can appropriately compute sound collection direction coordinates which are directed from omnidirectional microphone array apparatus 2 to a certain sound collection position in image data captured by the omnidirectional camera apparatus 11z.

Hereinafter, configurations, operations, and effects of the above-described directionality control system and horizontal deviation angle calibration method related of the present invention will be described.

According to an embodiment of the present invention, there is provided a directionality control system including a first imaging part that captures an image of a subject; a second imaging part that captures an image of the subject; a sound collection part that collects voice of the subject; a display part that displays image data captured by the first imaging part; and a deviation amount computation part that computes a first horizontal deviation angle of a horizontal angle of a first imaging direction which is directed from the first imaging part toward a sound collection position corresponding to a designated position in the image data relative to a first reference horizontal angle, and a second horizontal deviation angle of a horizontal angle of a second imaging direction which is directed from the second imaging part toward the sound collection position relative to a second reference direction, in response to designation of any position in the displayed image data.

In the above-described configuration, the omnidirectional camera apparatus 11z and the calibration omnidirectional camera apparatus C1 capture images of the same subject, and the omnidirectional microphone array apparatus 2 collects voice of the subject whose image is captured. If any designated position A' is designated in image data which is obtained by the omnidirectional camera apparatus 11z and is displayed on the display device 36, the horizontal deviation angle computation section 34w of the directionality control apparatus 3 computes the first horizontal deviation angle $\epsilon_{Ch}$ which is a deviation angle of the first front direction (for example, a 0° direction) of a horizontal angle of the omnidirectional camera apparatus 11z relative to mutual reference directions connecting the omnidirectional camera apparatus 11z and the calibration omnidirectional camera apparatus C1 to each other, and the second horizontal deviation angle $\epsilon_{Kh}$ which is a deviation angle formed between the second front direction of a horizontal angle of the calibration omnidirectional camera apparatus C1 and the reference direction of the calibration omnidirectional camera apparatus C1.

Consequently, in the directionality control system 10, the directionality control apparatus 3 can compute sound collection direction coordinates of the omnidirectional microphone array apparatus 2 which is attached so as to surround the casing of the calibration omnidirectional camera apparatus C1 or the omnidirectional microphone array apparatus 2 which is attached at a position of the calibration omnidirectional camera apparatus C1 so as to match a reference direction of a horizontal angle of the calibration omnidirectional camera apparatus C1, based on imaging direction coordinates which are directed from the omnidirectional camera apparatus 11z to the sound collection position A, and can thus compute each deviation amount between a front direction (for example, a 0° direction) of a horizontal angle of the sound collection direction coordinates and the mutual reference directions. Therefore, in the directionality control system 10, the directionality control apparatus 3 can appropriately compute sound collection direction coordinates which are directed from omnidirectional microphone array apparatus 2 to a certain sound collection position in image data captured by the omnidirectional camera apparatus 11z.

In addition, in the directionality control system according to the embodiment of the present invention, the deviation amount computation part computes the first horizontal deviation angle and the second horizontal deviation angle based on a distance from the first imaging part to the second imaging part, a horizontal angle and a vertical angle which are directed from the first imaging part toward the sound collection position, a horizontal angle and a vertical angle which are directed from the second imaging part toward the sound collection position, a height of the first imaging part from a horizontal surface, a height of the second imaging part from the horizontal surface, and a height of the sound collection position from the horizontal surface.

In the above-described configuration, the horizontal deviation angle computation section 34w of the directionality control apparatus 3 computes the first horizontal deviation angle $\epsilon_{Ch}$ and the second horizontal deviation angle $\epsilon_{Kh}$ based on the distance $L_{CK}$ between the omnidirectional camera apparatus 11z and the calibration omnidirectional camera apparatus C1, the coordinates including the horizontal angle $\theta_{CAh}$ and the vertical angle $\theta_{CAv}$ which are directed from the omnidirectional camera apparatus 11z toward the sound collection position A, the coordinates including the horizontal angle $\theta_{KAh}$ and the vertical angle $\theta_{KAv}$ which are directed from the calibration omnidirectional camera apparatus C1 toward the sound collection position A, the height $H_C$ of the omnidirectional camera apparatus 11z from the horizontal surface, the height $H_K$ of the calibration omnidirectional camera apparatus C1 from the horizontal surface, and the height $H_A$ of the sound collection position A from the horizontal surface. Consequently, the directionality control apparatus 3 can easily compute the first horizontal deviation angle $\epsilon_{Ch}$ and the second horizontal deviation angle $\epsilon_{Kh}$.

Further, in the directionality control system according to the embodiment of the present invention, the directionality control system further includes a coordinate computation part that computes a horizontal angle and a vertical angle of a direction which is directed from the sound collection part to the sound collection position as coordinates indicating a sound collection direction in which the sound collection part collects the voice of the subject based on the first horizontal deviation angle and the second horizontal deviation angle.

In this above-described configuration, the coordinate computation section 34x of the directionality control apparatus 3 can compute a horizontal angle and a vertical angle of sound collection direction coordinates of the omnidirectional microphone array apparatus 2 which is attached so as to surround the casing of the calibration omnidirectional camera apparatus C1 or the omnidirectional microphone array apparatus 2 which is attached at a position of the calibration omnidirectional camera apparatus C1 so as to match a reference direction of a horizontal angle of the calibration omnidirectional camera apparatus C1, based on the first horizontal deviation angle $\epsilon_{Ch}$ and the second horizontal deviation angle $\epsilon_{Kh}$ computed by the horizontal deviation angle computation section 34w.

In addition, in the directionality control system according to the embodiment of the present invention, the directionality control system further includes an output control part that causes the sound collection part to form sound collection directionality of audio data in the sound collection direction corresponding to the computed coordinates indicating the sound collection direction.

In the above-described configuration, the output control section 34c of the directionality control apparatus 3 causes the omnidirectional microphone array apparatus 2 to form the sound collection directionality of audio data in the sound collection direction MIX corresponding to the sound collection direction coordinates of the omnidirectional microphone array apparatus 2 computed by the coordinate computation section 34x. Consequently, the directionality control apparatus 3 can cause the omnidirectional microphone array apparatus 2 to appropriately collect conversation voice of a subject who is present in an imaging direction of the omnidirectional camera apparatus 11z.

Further, in the directionality control system according to the embodiment of the present invention, a columnar opening is formed at a center of a casing of the sound collection part, and the sound collection part and the second imaging part are integrally formed with each other as a result of the second imaging part being fitted into an inner circumferential space of the opening.

In the above-described configuration, the columnar opening is formed at the center of the casing of the omnidirectional microphone array apparatus 2, and the omnidirectional microphone array apparatus 2 and the calibration omnidirectional camera apparatus C1 are integrally formed with each other as a result of the calibration omnidirectional camera apparatus C1 being fitted into the inner circumferential space of the opening 21a. Consequently, the omnidirectional microphone array apparatus 2 can use a horizontal angle and a vertical angle of the second imaging direction CAX2 which is directed from the calibration omnidirectional camera apparatus C1 toward the sound collection position A in common as a horizontal angle and a vertical angle of the sound collection direction MIX of the omnidirectional microphone array apparatus 2.

Further, according to another embodiment of the present invention, there is provided a horizontal deviation angle computation method for a directionality control system including a first imaging part, a second imaging part, and a sound collection part, the method including a step of causing the first imaging part to capture an image of a subject; a step of causing the second imaging part to capture an image of the subject; a step of causing the sound collection part to collect voice of the subject; a step of displaying image data captured by the first imaging part on a display part; and a step of computing a first horizontal deviation angle of a horizontal angle of a first imaging direction which is directed from the first imaging part toward a sound collection position corresponding to a designated position in the image data relative to a first reference angle, and a second horizontal deviation angle of a horizontal angle of a second imaging direction which is directed from the second imaging part toward the sound collection position relative to a second reference direction, in response to designation of any position in the image data displayed on the display part.

In the above-described method, the omnidirectional camera apparatus 11z and the calibration omnidirectional camera apparatus C1 capture images of the same subject, and the omnidirectional microphone array apparatus 2 collects voice of the subject whose image is captured. If any designated position A' is designated in image data which is obtained by the omnidirectional camera apparatus 11z and is displayed on the display device 36, the horizontal deviation angle computation section 34w of the directionality control apparatus 3 computes the first horizontal deviation angle $\epsilon_{Ch}$ which is a deviation angle of the first front direction (for example, a 0° direction) of a horizontal angle of the omnidirectional camera apparatus 11z relative to mutual reference directions connecting the omnidirectional camera apparatus 11z and the calibration omnidirectional camera apparatus C1 to each other, and the second horizontal deviation angle $\epsilon_{Kh}$ which is a deviation angle formed between the second front direction of a horizontal angle of the calibration omnidirectional camera apparatus C1 and the reference direction of the calibration omnidirectional camera apparatus C1.

Consequently, in the directionality control system 10, the directionality control apparatus 3 can compute sound collection direction coordinates of the omnidirectional microphone array apparatus 2 which is attached so as to surround the casing of the calibration omnidirectional camera apparatus C1 or the omnidirectional microphone array apparatus 2 which is attached at a position of the calibration omnidirectional camera apparatus C1 so as to match a reference direction of a horizontal angle of the calibration omnidirectional camera apparatus C1, based on imaging direction coordinates which are directed from the omnidirectional camera apparatus 11z to the sound collection position A, and can thus compute each deviation amount between a front direction (for example, a 0° direction) of a horizontal angle of the sound collection direction coordinates and the mutual reference directions. Therefore, in the directionality control system 10, the directionality control apparatus 3 can appropriately compute sound collection direction coordinates which are directed from omnidirectional microphone array apparatus 2 to a certain sound collection position in image data captured by the omnidirectional camera apparatus 11z.

Each of seventh to tenth embodiments described below relates to a directionality control system and a directionality control method, in which a height of a target object present in a sound collection space as a sound source from a reference surface is determined, and sound collection directionality of sound collected by a microphone array apparatus is formed by using the height of the target object from the reference surface.

Patent Literature 1 is based on, for example, a camera apparatus, a microphone array apparatus, and a target object (for example, a person) being present on the same plane assuming usage forms in a television conference system. However, in the above-described monitoring system, the camera apparatus, the microphone array apparatus, and the target object (for example, a person) are all seldom present on the same plane in practice.

Figure 46:
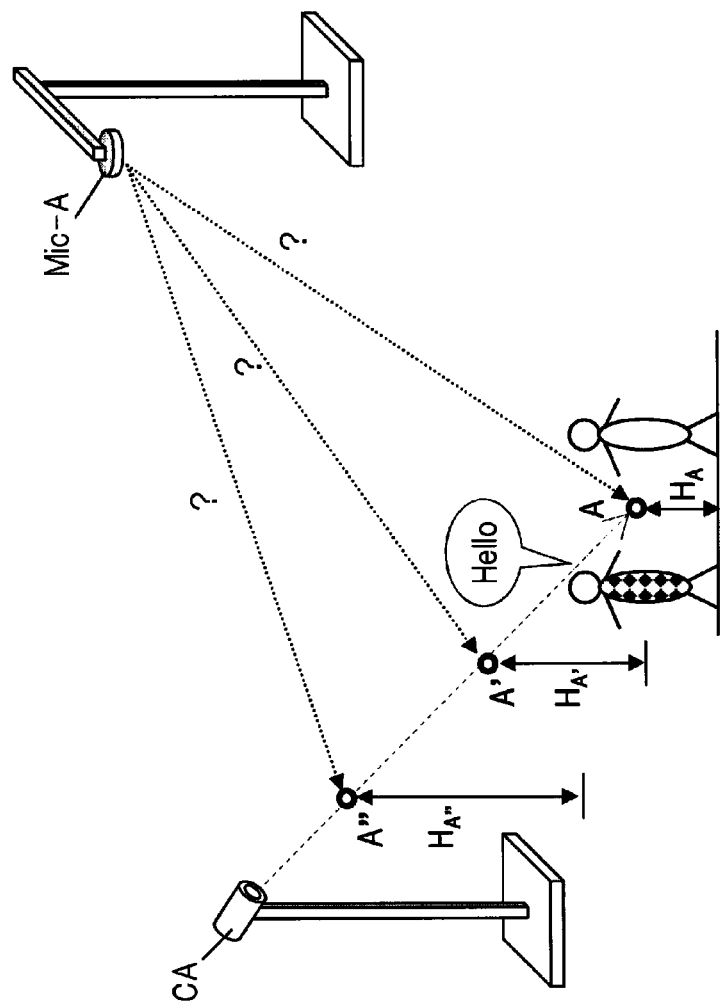
FIG. 46 is a diagram for explaining a problem in a monitoring system of the related art.

For example, as illustrated in FIG. 46, since a camera apparatus CA and a microphone array apparatus Mic-A are frequently installed on an upper side (for example, a ceiling surface of a store) relative to target objects (two people) as sound collection targets, the camera apparatus CA, the microphone array apparatus Mic-A, the target objects (two people) are present on stereoscopic three-dimensional coordinates. FIG. 46 is a diagram for explaining a problem in the monitoring system of the related art.

Therefore, in the monitoring system illustrated in FIG. 46, in a case where the microphone array apparatus Mic-A collects conversations of the target objects (two people) imaged by the camera apparatus CA, if a method of Patent Literature 1 is used, there is a problem in that coordinates (horizontal angle, vertical angle) indicating a direction in which the microphone array apparatus Mic-A collect sounds cannot be appropriately computed.

In addition, in the monitoring system illustrated in FIG. 46, in a case where the microphone array apparatus Mic-A collects conversations of the target objects (two people) which are currently being imaged by the camera apparatus CA, even if horizontal angles and vertical angles indicating directions which are directed from the camera apparatus CA toward the target objects are respectively the same as each other, if heights of target object sound positions (hereinafter, simply referred to as "target sound source positions" or "sound positions") from a reference surface (for example, a floor surface) are different from each other, there is a problem in that a sound collection directional direction which is directed from the microphone array apparatus Mic-A toward a target sound source position is not uniquely specified.

For example, in FIG. 46, a point A, a point A', and a point A" are positions where horizontal angles and vertical angles from the camera apparatus CA are the same as each other, but if one of heights $H_A$, $H_A'$ and $H_A''$ of the point A, the point A', and the point A" from a reference surface (for example, a floor surface) is not defined, sound collection directional directions which are directed from the microphone array apparatus Mic-A toward the point A, the point A', and the point A" are all different from each other. In other words, it is hard for the microphone array apparatus Mic-A to collect the conversations of the target objects (two people) who are subjects of the camera apparatus CA with high accuracy.

Therefore, in each of the seventh to tenth embodiments of the present invention, in order to solve the above-described problems, a description will be made of examples of a directionality control system and a directionality control method, in which a height of a target sound source position present in a sound collection space from a reference surface is determined, and sound collection directionality is formed in a sound collection directional direction which is directed from a microphone array apparatus toward the target sound source position based on the height of the target sound source position from the reference surface.

Hereinafter, with reference to the drawings, description will be made of each of the seventh to tenth embodiments of a directionality control system and a directionality control method related to the present invention. The directionality control system of each embodiment is used as a monitoring system (including a manned monitoring system and an unmanned monitoring system) provided in, for example, a factory, a company, a public facility (for example, an event hall), or a store (for example, a retail store), but an installation location is not particularly limited. In the following respective embodiments, description will be made assuming that the directionality control system of each embodiment is installed in, for example, a store.

In addition, the present invention can be expressed as respective apparatuses (for example, a directionality control apparatus to be described later) constituting the directionality control system, or a directionality control method including respective operations (steps) performed by each apparatus constituting the directionality control system.

(Seventh Embodiment)
(Configuration of Directionality Control System)

Figure 33:
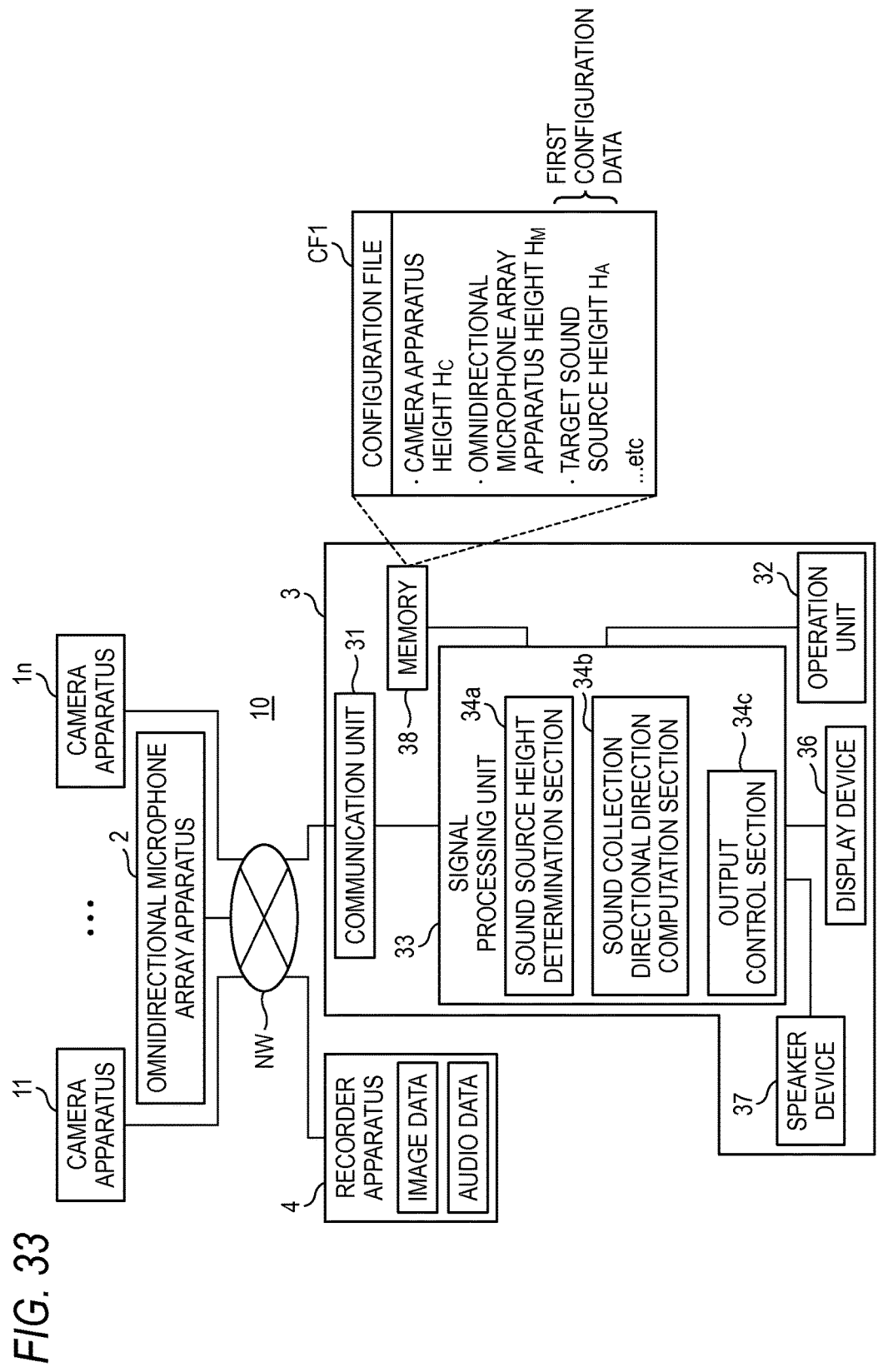
FIG. 33 is a block diagram illustrating configurations of a sound collection system of a seventh embodiment.

FIG. 33 is a block diagram illustrating configurations of a directionality control system 10 of the seventh embodiment. The directionality control system 10 illustrated in FIG. 33 includes at least one camera apparatuses 11 to 1n, an omnidirectional microphone array apparatus 2, a directionality control apparatus 3, and a recorder apparatus 4. Here, n indicates the number of camera apparatuses, and is an integer of 1 or higher. The camera apparatuses 11 to 1n, the omnidirectional microphone array apparatus 2, the directionality control apparatus 3, and the recorder apparatus 4 are connected to each other via a network NW. The network NW may be a wired network (for example, an intranet or the Internet), and may be a wireless network (for example, a wireless local area network (LAN)), which is also the same for the following embodiments. The camera apparatuses 11 to 1n as at least one imaging part includes a casing into which an optical system (for example, a wide angle lens) and an imaging system (for example, an image sensor) (not illustrated) are built, and is fixed to and installed on, for example, a ceiling surface of the store or a stand (refer to FIG. 34(A)) so as to function as a monitoring camera.

Figure 34:
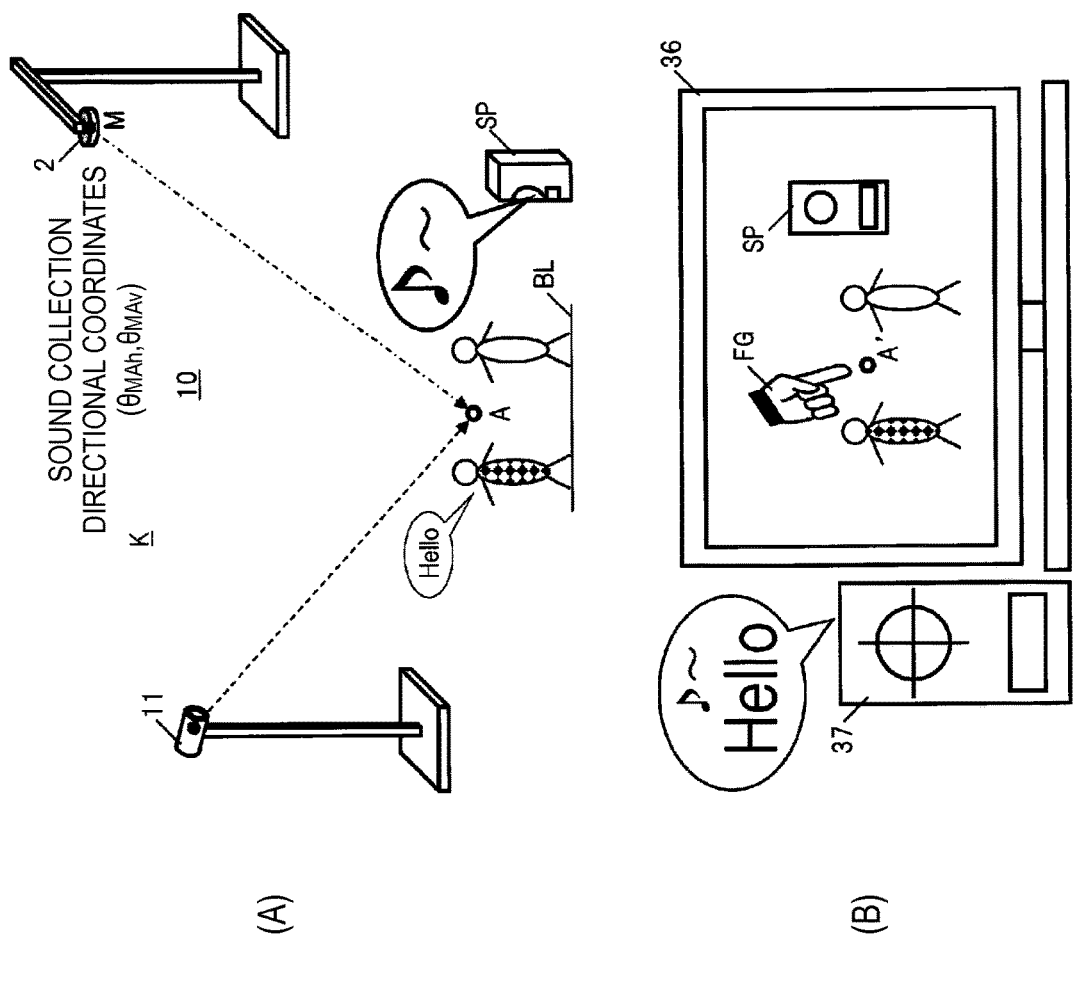
FIG. 34(A) is a diagram illustrating a state in which the camera apparatus images target objects and a state in which the omnidirectional microphone array apparatus collects conversations of the target objects who are present in a sound collection directional direction and music output from a speaker device which is not present in the sound collection directional direction, in a sound collection space K in which the sound collection system is installed.
FIG. 34(B) is a diagram illustrating a state in which voice (for example, "Hello") collected in a sound collection directional direction which is directed from the omnidirectional microphone array apparatus toward the target sound source position A corresponding to the designated position A' which is designated with the finger FG of the user in video data displayed on the display device is output so that a volume level thereof is higher than a volume level of music (for example, "♪") output from the speaker device.

The camera apparatuses 11 to 1n are connected to the directionality control apparatus 3 of a central control room (not illustrated) via the network NW, and performs a panning direction operation, a tilting direction operation, a zooming operation, an imaging operation, and a distance-measuring operation and an angle-measuring operation related to an actual target sound source position A corresponding to a designated position (for example, a designated position A' illustrated in FIG. 34(B) to be described later) in a captured video in response to a remote operation from the directionality control apparatus 3.

In addition, the camera apparatuses 11 to 1n capture a video (including a still image and a moving image; this is also the same for the following description) of a target object which is present in a predefined angle of view centering on an optical axis. The camera apparatuses 11 to 1n transmit the captured video data, and input parameters for computing a horizontal angle $\theta_{MAv}$ and a vertical angle $\theta_{MAv}$ of a sound collection directional direction which will be described later to the directionality control apparatus 3 or the recorder apparatus 4 via the network NW.

Figure 2:
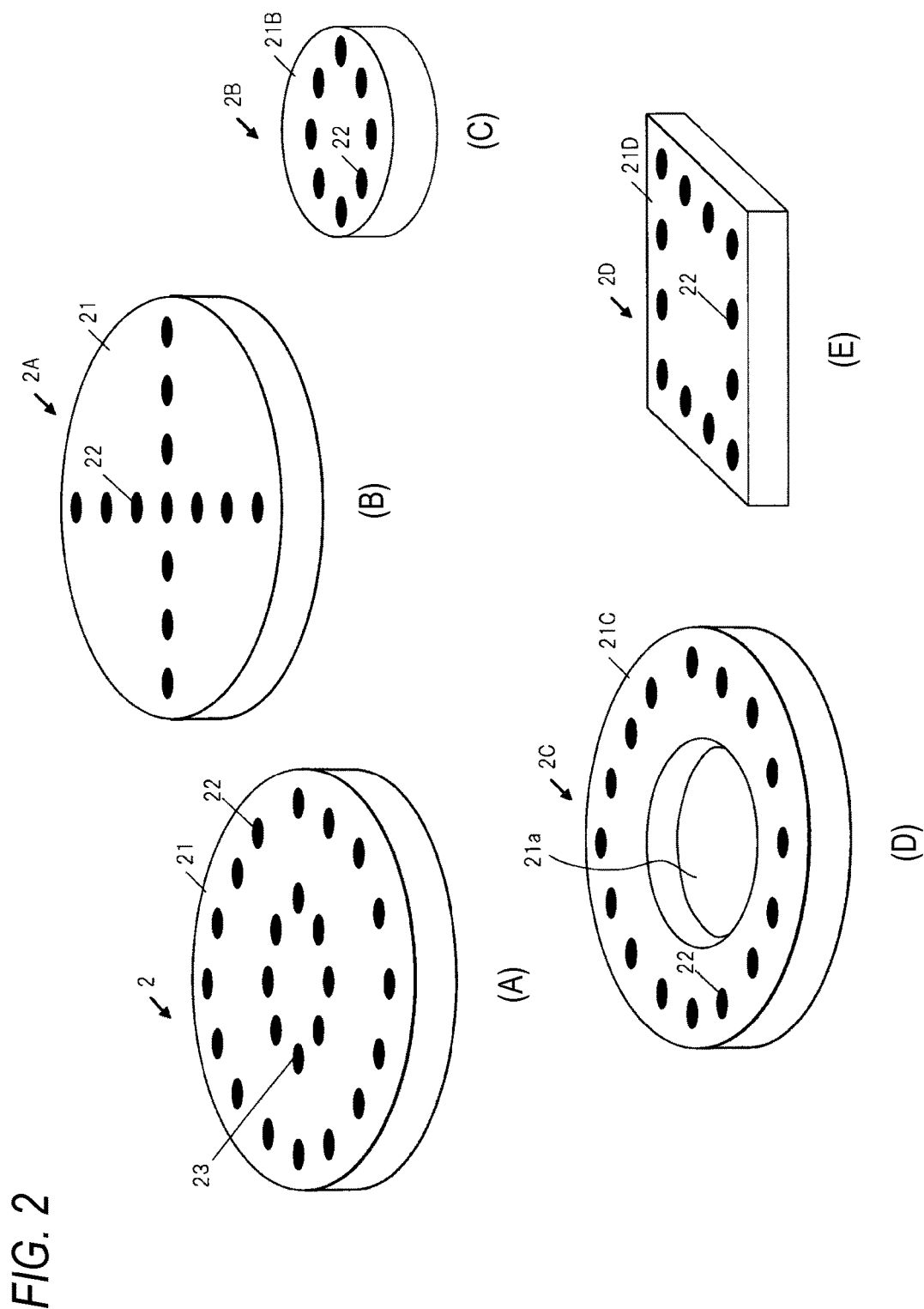
FIGS. 2(A) to 2(E) are exterior views of microphone array apparatuses.

The omnidirectional microphone array apparatus 2 as a sound collection part includes, for example, a doughnut-shaped or ring-shaped (annular) casing 21C (refer to FIG. 2(D)) in which an opening 21a is formed at its center, and is fixed to and installed on, for example, a ceiling surface of the store or a predetermined stand (refer to FIG. 34(A)). The omnidirectional microphone array apparatus 2 forms sound collection directionality for collecting sound with high accuracy in a sound collection directional direction which is directed from an installation position M of the omnidirectional microphone array apparatus 2 toward a target sound source position A, and collects conversation voice (for example, "Hello") of target objects (two people) present in the sound collection directional direction with high accuracy. In addition, a shape of the casing of the omnidirectional microphone array apparatus 2 is not limited to a doughnut shape or a ring shape (annular shape), and description thereof will be omitted since the description thereof has been made with reference to FIG. 2.

In the omnidirectional microphone array apparatus 2, a plurality of microphone units 22 are disposed in a concentric shape around the opening 21a in a circumferential direction of the casing 21C. The microphone unit 22 employs, for example, a high-quality small-sized electret condenser microphone (ECM), and this is also the same for the following respective embodiments.

The omnidirectional microphone array apparatus 2 is connected to the network NW and includes at least microphone units 22 and 23 in which microphones are provided at equal intervals (refer to FIGS. 2(A) to 2(E)) and a control unit (not illustrated) which controls an operation of each of the microphone units 22 and 23.

The omnidirectional microphone array apparatus 2 collects sound in a sound collection directional direction in which a target object (sound source) as a sound collection target is present by using each of the microphone units 22 and 23, performs predetermined sound processing on audio data collected by each of the microphone units 22 and 23, and transmits a processed result to the directionality control apparatus 3 or the recorder apparatus 4 via the network NW.

The omnidirectional microphone array apparatus 2 forms sound collection directionality of each of the microphone units 22 and 23 in sound collection directional coordinates $(\theta_{MAh}, \theta_{MAv})$ which are computed by a sound collection directional direction computation section 34b of a signal processing unit 33 of the directionality control apparatus 3 in response to a directionality formation instruction from the directionality control apparatus 3 which will be described later.

Consequently, the omnidirectional microphone array apparatus 2 can relatively increase a volume level of sound collected from the sound collection directional coordinates $(\theta_{MAh}, \theta_{MAv})$ in which the sound collection directionality is formed, and can relatively reduce a volume level of sound collected from a direction in which the sound collection directionality is not formed. In addition, a method of computing the sound collection directional coordinates $(\theta_{MAh}, \theta_{MAv})$ will be described later.

The directionality control apparatus 3 is connected to the network NW, and may be, for example, a stationery personal computer (PC) installed in a central control room (not illustrated) of a company, and may be a mobile phone, a tablet terminal, or a smart phone, which can be carried by a user.

The directionality control apparatus 3 includes at least a communication unit 31, an operation unit 32, a signal processing unit 33, a display device 36, a speaker device 37, and a memory 38. The signal processing unit 33 includes at least a sound source height determination section 34a, a sound collection directional direction computation section 34b, and an output control section 34c.

The communication unit 31 outputs video data or audio data which is transmitted from the camera apparatuses 11 to 1n or the omnidirectional microphone array apparatus 2, to the signal processing unit 33 via the network NW.

The operation unit 32 is a user interface (UI) for notifying the signal processing unit 33 of the content of a user's input operation, and is, for example, a pointing device such as a mouse or a keyboard. In addition, the operation unit 32 may be configured by using a touch panel or a touch pad which is disposed so as to correspond to, for example, a screen of the display device 36 and allows an input operation to be performed with the finger FG of the user or a stylus pen.

The operation unit 32 acquires coordinate data indicating a location where the user desires to increase or decrease a volume level, that is, a designated position A' illustrated in FIG. 34(B) and outputs the coordinate data to the signal processing unit 33 in response to the user's input operation.

The signal processing unit 33 is configured by using, for example, a central processing unit (CPU), a micro processing unit (MPU), or a digital signal processor (DSP), and performs a control process for collectively controlling operations of the respective units of the directionality control apparatus 3, data input and output processes with other respective units, a data computation (calculation) process, and a data storage process.

The sound source height determination section 34a as a height determination part determines a height $H_A$ of the target sound source position A from a floor surface BL, corresponding to the designated position A' if the designated position A' is designated with the finger FG of the user or a stylus pen in video data captured by, for example, the camera apparatus 11 as video data displayed on the display device 36. In the following respective embodiments, as long as there is no particular description, for example, a reference surface is the floor surface BL in the store.

Specifically, if the designated position A' in the video data displayed on the display device 36 is designated with the finger FG of the user, the sound source height determination section 34a reads data regarding the height of the target sound source position A from the floor surface BL, corresponding to coordinate data regarding the designated position A', from a configuration file CF1. The sound source height determination section 34a determines the read data regarding the height of the target sound source position A from the floor surface BL, corresponding to the coordinate data regarding the designated position A' as a height $H_A$ of the target sound source position A corresponding to the designated position A' from the floor surface BL.

The sound collection directional direction computation section 34b computes coordinates $(\theta_{MAh}, \theta_{MAv})$ (hereinafter, simply referred to as "sound collection directional coordinates") indicating a sound collection directional direction which is directed from the installation position M of the omnidirectional microphone array apparatus 2 toward the target sound source position A corresponding to the designated position A' in response to the designation of the designated position A' in the video data displayed on the display device 36.

In the sound collection directional coordinates $(\theta_{MAh}, \theta_{MAv})$, $\theta_{MAh}$ indicates a horizontal angle of the sound collection directional direction which is directed from the omnidirectional microphone array apparatus 2 toward the target sound source position A, and $\theta_{MAv}$ indicates a vertical angle of the sound collection directional direction which is directed from the omnidirectional microphone array apparatus 2 toward the target sound source position A. In addition, the target sound source position A is a field position which corresponds to the designated position A' which is designated with the finger FG of the user or a stylus pen in the video data displayed on the display device 36 via the operation unit 32, and is an actual monitoring target.

The output control section 34c as a control part controls operations of the camera apparatuses 11 to 1n, the omnidirectional microphone array apparatus 2, the display device 36, and the speaker device 37, so as to reproduce and output video data transmitted from the camera apparatuses 11 to 1n on the display device 36 and to output audio data transmitted from the omnidirectional microphone array apparatus 2 from the speaker device 37 as sound. The output control section 34c causes the omnidirectional microphone array apparatus 2 to form sound collection directionality of audio data in a sound collection directional direction corresponding to sound collection direction coordinates $(\theta_{MAh}, \theta_{MAv})$ computed by the sound collection directional direction computation section 34b.

The display device 36 as a display part displays video data captured by the camera apparatuses 11 to 1n on a screen thereof.

The speaker device 37 as a sound output part outputs, as sound, audio data collected by the omnidirectional microphone array apparatus 2 or audio data which is collected by the omnidirectional microphone array apparatus 2 after the sound collection directionality is formed in the sound collection directional coordinates $(\theta_{MAh}, \theta_{MAv})$ computed by the sound collection directional direction computation section 34b. In addition, the display device 36 and the speaker device 27 may be configured separately from the directionality control apparatus 3.

The memory 38 as a storage part is configured by using, for example, a random access memory (RAM), and functions as a program memory, a data memory, and a work memory when the respective units of the directionality control apparatus 3 operate. In addition, the memory 38 stores the configuration file CF1 illustrated in FIG. 33. The configuration file CF1 includes at least data regarding the height $H_C$ of, for example, the camera apparatus 11 from the floor surface BL, data regarding the height $H_M$ of the omnidirectional microphone array apparatus 2 from the floor surface BL, and data (first configuration data) regarding the height $H_A$ of the target sound source position A corresponding to a predetermined designated position A' in video data which is being captured by, for example, the camera apparatus 11 from the floor surface BL.

The recorder apparatus 4 records the video data captured by the camera apparatuses 11 to 1n and the audio data collected by the omnidirectional microphone array apparatus 2 in correlation with each other.

Next, a summary of an operation of the directionality control system 10 of the present embodiment will be described with reference to FIGS. 34(A) and 34(B). FIG. 34(A) is a diagram illustrating a state in which the camera apparatus 11 images target objects (two people) and a state in which the omnidirectional microphone array apparatus 2 collects conversations of the target objects (two people) who are present in a sound collection directional direction and music output from a speaker device SP which is not present in the sound collection directional direction, in a sound collection space K in which the directionality control system 10 is installed.

FIG. 34(B) is a diagram illustrating a state in which voice (for example, "Hello") collected in a sound collection directional direction which is directed from the omnidirectional microphone array apparatus 2 toward the target sound source position A corresponding to the designated position A' which is designated with the finger FG of the user in video data displayed on the display device 36 is output so that a volume level thereof is higher than a volume level of music (for example, "♪") output from the speaker device SP.

In the directionality control system 10 illustrated in FIG. 34(A), the camera apparatus 11 images subjects (for example, two people illustrated in FIG. 34(A)) reflected in a range of an angle of view unique to the camera apparatus 11. The omnidirectional microphone array apparatus 2 collects sound around the installation position M of the omnidirectional microphone array apparatus 2 in the sound collection space K. In FIG. 34(A), the two people as target objects are having conversations, and "Hello" is an example of conversation content. Video data captured by the camera apparatus 11 is displayed on the display device 36 of the directionality control apparatus 3 (refer to FIG. 34(B)), and, for example, the two people as target objects and the speaker device SP are displayed thereon.

In FIG. 34(B), if the designated position A' on the display device 36 is designated with the finger FG of the user, the directionality control apparatus 3 reads the data regarding the height $H_A$ of the target sound source position A corresponding to coordinate data indicating the designated position A' from the floor surface BL from the configuration file CF1, and computes the sound collection directional coordinates ($\theta_{MAh}, \theta_{MAv}$) which are directed from the installation position M of the omnidirectional microphone array apparatus 2 toward the target sound source position A by using the read data regarding the height $H_A$. The omnidirectional microphone array apparatus 2 forms the sound collection directionality in the direction which is directed from the installation position M of the omnidirectional microphone array apparatus 2 toward the target sound source position A by using the coordinate data regarding the sound collection directional coordinates ($\theta_{MAh}, \theta_{MAv}$) computed by the directionality control apparatus 3.

Figure 35:
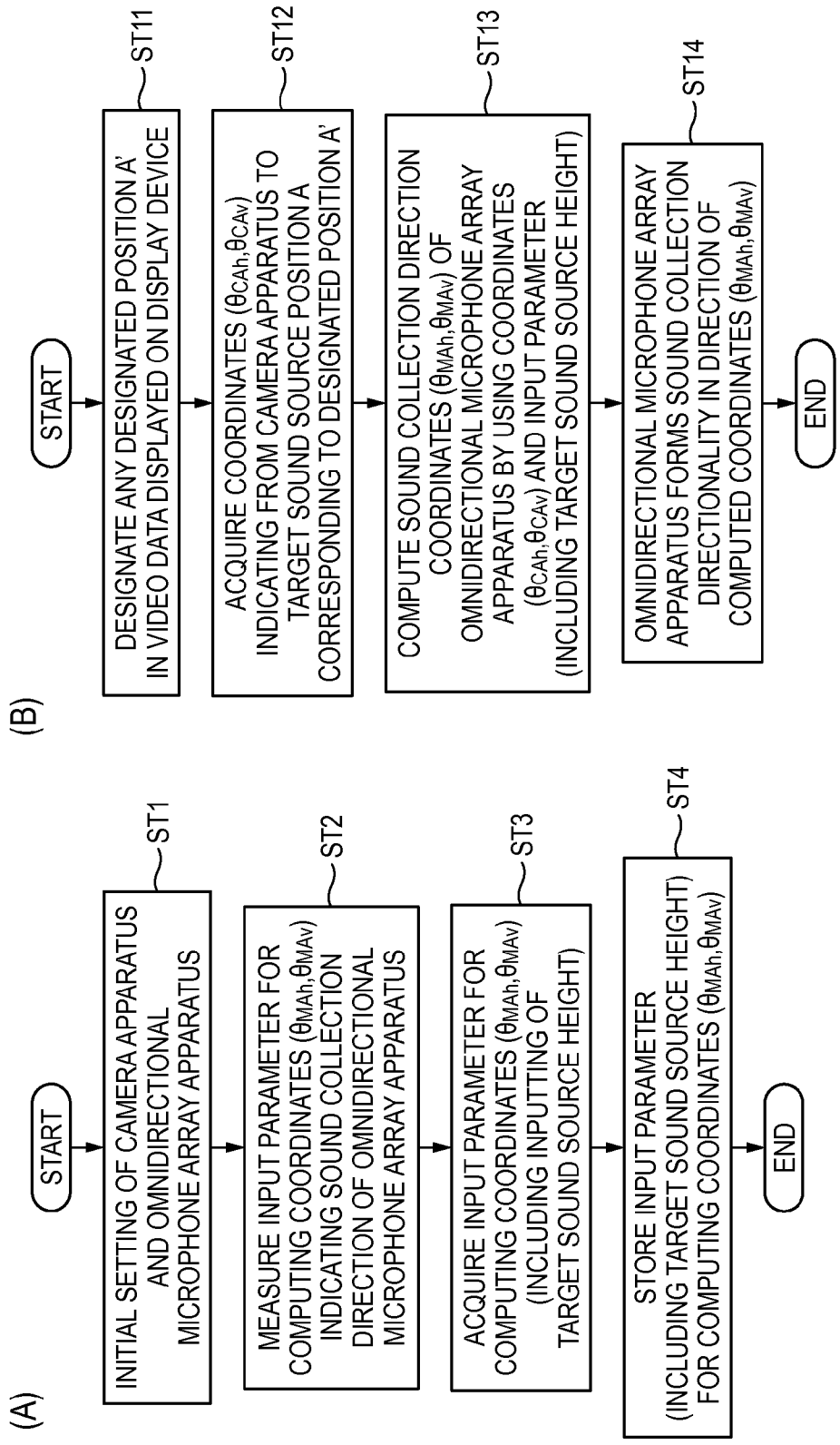
FIG. 35(A) is a flowchart illustrating an operation procedure of initial setting in the sound collection system of the seventh embodiment.
FIG. 35(B) is a flowchart illustrating an operation procedure following the initial setting in the sound collection system of the seventh embodiment.

Next, an operation procedure of initial setting performed in the directionality control system 10 of the present embodiment will be described with reference to FIG. 35(A). FIG. 35(A) is a flowchart illustrating an operation procedure of the initial setting in the directionality control system 10 of the seventh embodiment. The initial setting includes, for example, an operation in which the camera apparatuses 11 to 1n or the omnidirectional microphone array apparatus 2 is initially installed, and an operation in which the sound collection directional direction computation section 34b acquires input parameters which are required to compute a sound collection directional direction, which is also the same for the following respective embodiments.

In FIG. 35(A), the camera apparatus 11 and the omnidirectional microphone array apparatus 2 constituting the directionality control system 10 are initially installed so as to be fixed at predetermined positions (for example, a ceiling surface of the store or a stand) (step ST1). The camera apparatus 11 and the omnidirectional microphone array apparatus 2 are respectively installed at different positions (refer to FIG. 34(A)).

After the camera apparatus 11 and the omnidirectional microphone array apparatus 2 are initially installed, the sound collection directional direction computation section 34b measures each input parameter which is required to compute sound collection directional coordinates ($\theta_{MAh}, \theta_{MAv}$) (step ST2). The process in step ST2 includes a case where the user measures the input parameter by using a measuring device (for example, a laser range finder), and a case where the camera apparatus 11 measures and acquires the input parameter by using functions of well-known techniques of the camera apparatus 11. Each input parameter in step ST2 differs in each method of computing sound collection directional coordinates, and thus detailed content thereof will be described with reference to FIGS. 36 to 38.

After step ST2, each input parameter measured in step ST2 is input to the signal processing unit 33 of the directionality control apparatus 3 from the camera apparatus 11 or is input to the signal processing unit 33 from the operation unit 32 (step ST3). For example, the camera apparatus 11 transmits an input parameter acquired by using functions of well-known techniques of the camera apparatus 11, to the communication unit 31 of the directionality control apparatus 3. The communication unit 31 outputs the input parameter transmitted by the camera apparatus 11, to the signal processing unit 33. In addition, the operation unit 32 outputs data regarding the height $H_A$ of the target sound source position A from the floor surface BL as an example of the input parameter to the signal processing unit 33 in response to a user's input operation.

The signal processing unit 33 generates the configuration file CF1 including the respective input parameters acquired in step ST3 and preserves the configuration file CF1 in the memory 38 (step ST4). In the above-described way, the operation of the initial setting in the directionality control system 10 is finished.

Next, an operation procedure following the initial setting in the directionality control system 10 of the present embodiment will be described with reference to FIG. 35(B). FIG. 35(B) is a flowchart illustrating an operation procedure following the initial setting in the directionality control system 10 of the seventh embodiment.

In FIG. 35(B), the directionality control apparatus 3 receives designation of the designated position A' in video data which is being displayed on the display device 36 illustrated in FIG. 34(B), via the operation unit 32 (step ST11). The directionality control apparatus 3 transmits a notification indicating that the designation of the designated position A' in the video data which is being displayed on the display device 36 has been received, to the camera apparatus 11.

After step ST11, in a case where the camera apparatus 11 receives the notification indicating that the designation of the designated position A' has been received from the directionality control apparatus 3, the camera apparatus 11 acquires coordinate data including a horizontal angle and a vertical angle ($\theta_{CAh}, \theta_{CAv}$) to the target sound source position A corresponding to the position A' designated in step ST11, with an installation position C of the camera apparatus 11 as a start point (step ST12).

The camera apparatus 11 transmits the coordinate data including the horizontal angle and the vertical angle ($\theta_{CAh}, \theta_{CAv}$) to the target sound source position A corresponding to the position A' designated in step ST11 with the installation position C of the camera apparatus 11 as a start point, to the directionality control apparatus 3.

The sound source height determination section 34a of the signal processing unit 33 of the directionality control apparatus 3 reads data regarding the height of the target sound source position A from the floor surface BL, corresponding to the coordinate data regarding the designated position A', from the configuration file CF1 stored in the memory 38 in step ST4. The sound source height determination section 34a determines the read data regarding the height of the target sound source position A from the floor surface BL, corresponding to the coordinate data regarding the designated position A' as a height $H_A$ of the target sound source position A corresponding to the designated position A' from the floor surface BL.

Further, the sound collection directional direction computation section 34b of the signal processing unit 33 of the directionality control apparatus 3 computes the sound collection directional coordinates ($\theta_{MAh}, \theta_{MAv}$) which are directed from the installation position M of the omnidirectional microphone array apparatus 2 toward the target sound source position A by using the coordinate data including the horizontal angle and the vertical angle ($\theta_{CAh}, \theta_{CAv}$) from the camera apparatus 11 to the target sound source position A, and the respective input parameters (including the height $H_A$ of the target sound source position A corresponding to the designated position A' from the floor surface BL) read from the configuration file CF1 (step ST13). A process of computing the sound collection directional coordinates ($\theta_{MAh}$, $\theta_{MAv}$) will be described in detail with reference to FIGS. 36 and 37.

The directionality control apparatus 3 transmits a directionality formation instruction including the sound collection directional coordinates ($\theta_{MAh}$, $\theta_{MAv}$) computed in step ST13 to the omnidirectional microphone array apparatus 2. The omnidirectional microphone array apparatus 2 forms the sound collection directionality of each of the microphones 22 and 23 in a sound collection directional direction indicated by the sound collection directional coordinates ($\theta_{MAh}$, $\theta_{MAv}$) computed by the directionality control apparatus 3 in response to the directionality formation instruction from the directionality control apparatus 3 (step ST14).

Consequently, the microphone array apparatus 2 can increase a volume level of audio data which is collected from the sound collection directional direction indicated by the sound collection directional coordinates ($\theta_{MAh}$, $\theta_{MAv}$) in which the sound collection directionality is formed, and can reduce a volume level of audio data which is collected from a direction in which the sound collection directionality is not formed. In the above-described way, the operation following the initial setting in the directionality control system 10 is finished.

In addition, in the directionality control system 10 of the present embodiment, a timing at which the omnidirectional microphone array apparatus 2 collects sound is not limited to the time right after step ST14, and may be, for example, the time after power is supplied to the omnidirectional microphone array apparatus 2.

(Method of Computing Coordinates ($\theta_{MAh}$, $\theta_{MAv}$) Indicating Sound Collection Directional Direction of Omnidirectional Microphone Array Apparatus 2)

Figure 36:
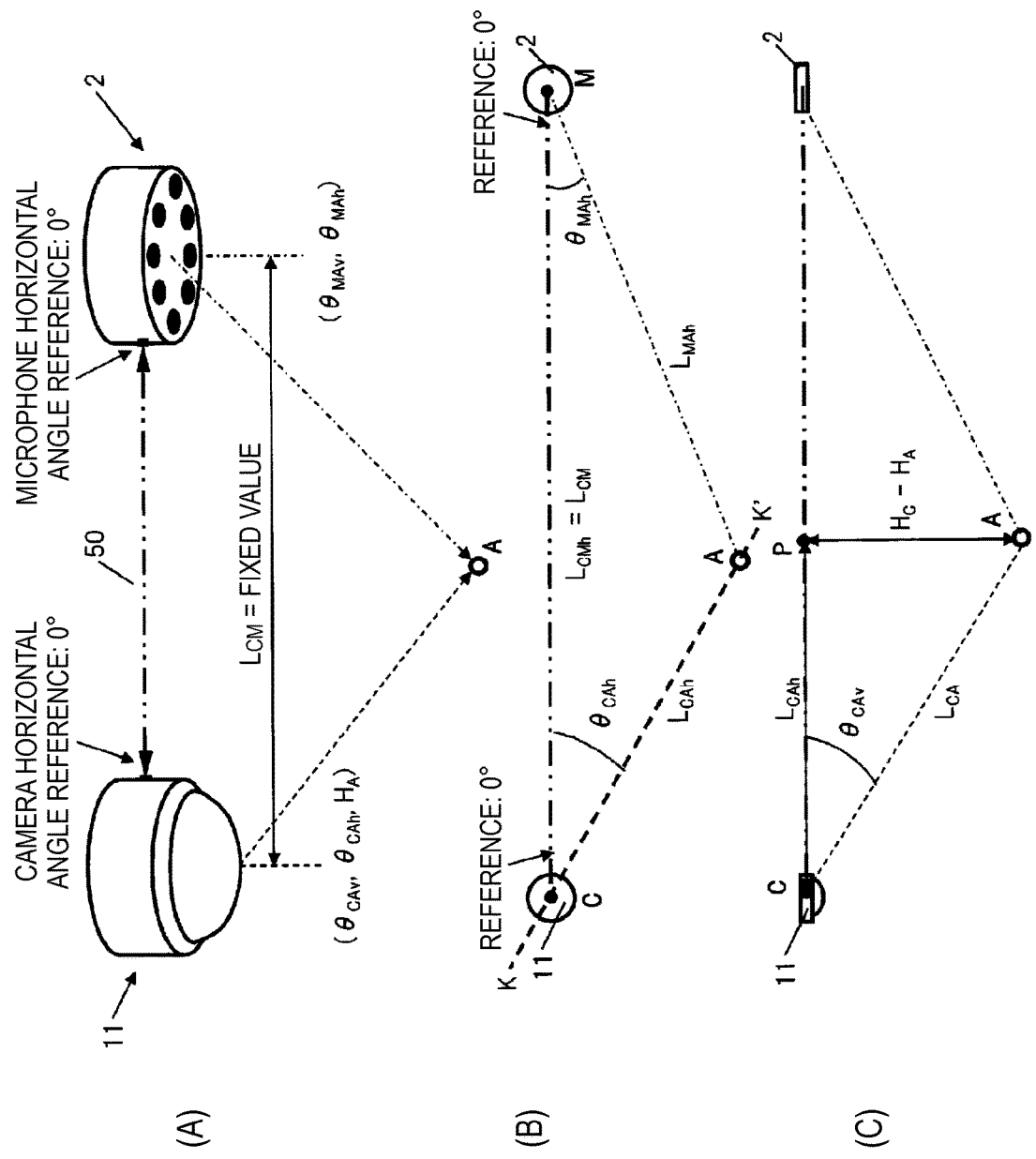
Figure 37:
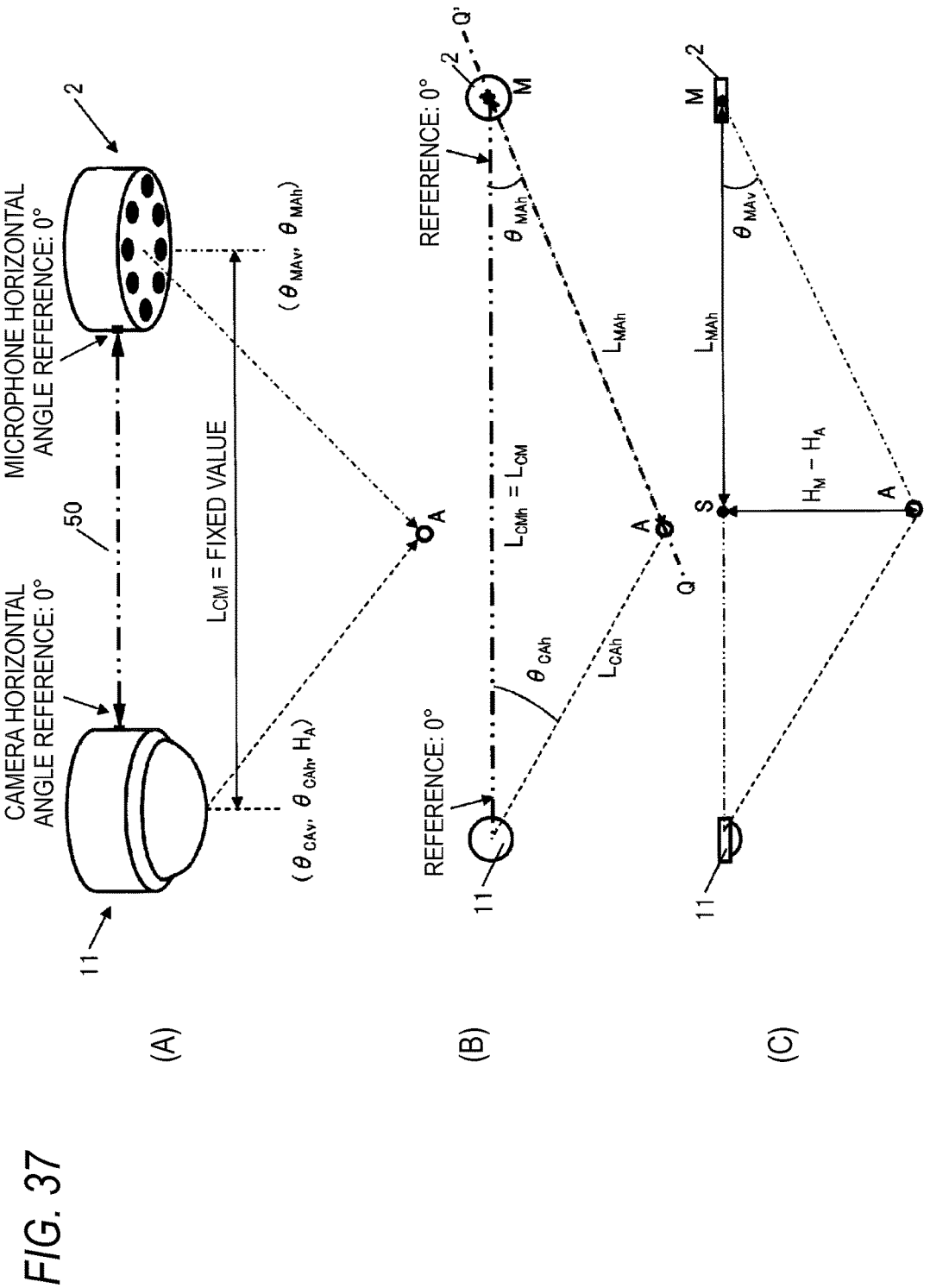
Figure 38:
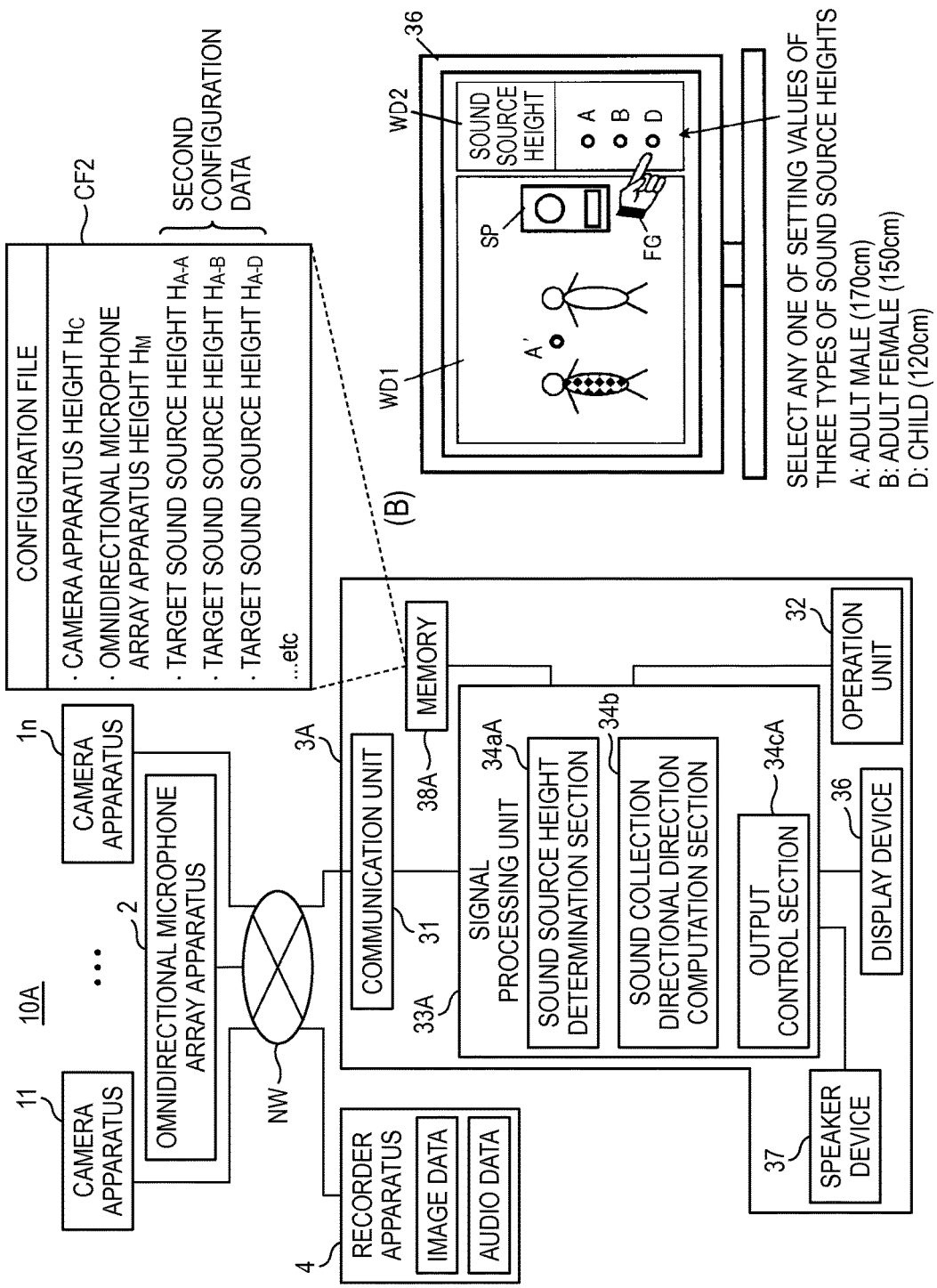
FIG. 38(A) is a block diagram illustrating a configuration of a sound collection system of an eighth embodiment.
FIG. 38(B) is a diagram illustrating a display screen WD1 of video data, and a selection screen WD2 which allows a height of the target sound source position from a floor surface to be selected, displayed on the display device.

Here, with reference to FIGS. 36 and 37, a detailed description will be made of a method of computing the sound collection directional coordinates ($\theta_{MAh}$, $\theta_{MAv}$) of the omnidirectional microphone array apparatus 2 in the sound collection directional direction computation section 34b of the signal processing unit 33 of the directionality control apparatus 3.

FIG. 36(A) is a perspective view illustrating each position of the camera apparatus 11, the omnidirectional microphone array apparatus 2, a reference point O, and the target sound source position A. FIG. 36(B) is a horizontal direction plan view in which FIG. 36(A) is viewed in a vertically lower direction from a vertically upper direction. FIG. 36(C) is a vertical direction sectional view taken along the line K-K' of FIG. 36(B).

FIG. 37(A) is a perspective view illustrating each position of the camera apparatus 11, the omnidirectional microphone array apparatus 2, the reference point O, and the target sound source position A. FIG. 37(B) is a horizontal direction plan view in which FIG. 37(A) is viewed in a vertically lower direction from a vertically upper direction. FIG. 37(C) is a vertical direction sectional view taken along the line Q-Q' of FIG. 37(B).

The sound collection directional direction computation section 34b computes the sound collection directional coordinates ($\theta_{MAh}$, $\theta_{MAv}$) of the omnidirectional microphone array apparatus 2 based on:

(1) a distance $L_{CM}$ between the camera apparatus 11 and the omnidirectional microphone array apparatus 2;

(2) a horizontal angle $\theta_{CAh}$ and a vertical angle $\theta_{CAv}$ from the camera apparatus 11 to the target sound source position A;

(3) respective heights $H_C$ and $H_M$ ($H_C=H_M$) of the camera apparatus 11 and the omnidirectional microphone array apparatus 2 from the floor surface BL; and (4) a height $H_A$ of the target sound source position A from the floor surface BL.

In the present computation method, the input parameters in step ST2 illustrated in FIG. 35(A) include:

(1) the distance $L_{CM}$ between the camera apparatus 11 and the omnidirectional microphone array apparatus 2;

(3) the respective heights $H_C$ and $H_M$ ($H_C=H_M$) of the camera apparatus 11 and the omnidirectional microphone array apparatus 2 from the floor surface BL.

In addition, among the respective input parameters in the present computation method, (1) the distance $L_{CM}$ between the camera apparatus 11 and the omnidirectional microphone array apparatus 2 is a fixed value measured, for example, in the initial setting in step ST1 illustrated in FIG. 35(A).

(3) The respective heights $H_C$ and $H_M$ ($H_C=H_M$) of the camera apparatus 11 and the omnidirectional microphone array apparatus 2 from the floor surface BL are fixed values measured, for example, in the initial setting in step ST1 illustrated in FIG. 35(A). In addition, for simplification of description, the description will be made assuming that the heights $H_C$ and $H_M$ of the camera apparatus 11 and the omnidirectional microphone array apparatus 2 from the floor surface BL are the same as each other, but the heights may be different from each other.

In addition, among the respective input parameters in the present computation method, (2) the horizontal angle $\theta_{CAh}$ and the vertical angle $\theta_{CAv}$ from the camera apparatus 11 to the target sound source position A are acquired by using a function of a well-known technique of the camera apparatus 11 in step ST12 illustrated in FIG. 35(B).

Further, in the present computation method, (4) the height $H_A$ of the target sound source position A from the floor surface BL is a fixed value determined by the sound source height determination section 34a of the signal processing unit 33 of the directionality control apparatus 3, that is, a fixed value (predetermined value) written in the configuration file CF1 in step ST4 illustrated in FIG. 35(A).

Hereinafter, a detailed description will be made of a method of computing the sound collection directional coordinates ($\theta_{MAh}$, $\theta_{MAv}$) of the omnidirectional microphone array apparatus 2 in the sound collection directional direction computation section 34b.

The sound collection directional direction computation section 34b computes a horizontal component distance $L_{CAh}$ of the distance $L_{CA}$ from the camera apparatus 11 to the target sound source position A according to Equation (58) by using the respective heights $H_C$ and $H_M$ of the camera apparatus 11 and the omnidirectional microphone array apparatus 2 from the floor surface BL, and the vertical angle $\theta_{CAv}$ from the camera apparatus 11 to the target sound source position A, in the triangle CAP illustrated in FIG. 36(C).

The sound collection directional direction computation section 34b computes a horizontal component distance $L_{MAh}$ of the distance from the omnidirectional microphone array apparatus 2 to the target sound source position A according to Equation (72) based on the cosine theorem for the triangle CAM illustrated in FIG. 36(B) by using the computation result of Equation (64), the horizontal angle $\theta_{CAh}$ from the camera apparatus 11 to the target sound source position A, and the distance $L_{CM}$ from the camera apparatus 11 to the omnidirectional microphone array apparatus 2.

[Equation 72]

$$L_{MAh}=\sqrt{(L_{CAh}^2+L_{CM}^2-2L_{CAh}\times L_{CM}\times\cos\theta_{CAh}}\qquad(72)$$

The sound collection directional direction computation section 34b computes a cosine value cos $\theta_{MAh}$ of the horizontal angle $\theta_{MAh}$ of the depression angle $\theta_{MA}$ from the omnidirectional microphone array apparatus 2 to the target sound source position A according to Equation (73) based on the cosine theorem for the triangle CAM illustrated in FIG. 36(B) by using the respective computation results of Equations (64) and (72), and the distance $L_{CM}$ from the camera apparatus 11 to the omnidirectional microphone array apparatus 2.

Consequently, the sound collection directional direction computation section 34b can compute the horizontal angle $\theta_{MAh}$ of the depression angle $\theta_{ma}$ from the omnidirectional microphone array apparatus 2 to the target sound source position A according to Equation (74).

[Equation 73]

$$\cos\theta_{MAh}=\frac{L_{MAh}^2+L_{CM}^2-L_{CAh}^2}{2L_{MAh}\times L_{CM}}\qquad(73)$$

[Equation 74]

$$\theta_{MAh}=\arccos\left(\frac{L_{MAh}^2+L_{CM}^2-L_{CAh}^2}{2L_{MAh}\times L_{CM}}\right)\qquad(74)$$

In addition, the sound collection directional direction computation section 34b computes a tangent value tan $\theta_{MAv}$ of the vertical angle $\theta_{MAv}$ of the depression angle $\theta_{MA}$ which is directed from the omnidirectional microphone array apparatus 2 toward the target sound source position A according to Equation (75) based on a tangent for the triangle MAS illustrated in FIG. 37(C).

Consequently, the sound collection directional direction computation section 34b can compute the vertical angle $\theta_{MAv}$ of the depression angle $\theta_{MA}$ from the omnidirectional microphone array apparatus 2 to the target sound source position A according to Equation (76).

[Equation 75]

$$\tan\theta_{MAv}=\frac{H_M-H_A}{L_{MAh}}\qquad(75)$$

[Equation 76]

$$\theta_{MAv}=\arctan\left(\frac{H_M-H_A}{L_{MAh}}\right)\qquad(76)$$

In the above-described way, in the directionality control system 10 of the present embodiment, the sound source height determination section 34a of the directionality control apparatus 3 determines the height $H_A$ of the target sound source position A corresponding to the designated position A' in designated video data from the floor surface BL in response to the designation of the designated position A' performed by the user on a display screen of the video data displayed on the display device 36. The sound collection directional direction computation section 34b of the directionality control apparatus 3 computes sound collection directional coordinates indicating a sound collection directional direction which is directed from the omnidirectional microphone array apparatus 2 toward the target sound source position A corresponding to the designated position A' based on the height $H_A$ of the target sound source position A from the floor surface BL. The output control section 34c of the directionality control apparatus 3 causes the omnidirectional microphone array apparatus 2 form the sound collection directionality in the sound collection directional direction indicated by the computed sound collection directional coordinates.

Consequently, in the directionality control system 10, the directionality control apparatus 3 can uniquely determine the height $H_A$ of the target sound source position A of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A based on the height $H_A$ of the target sound source position A from the floor surface BL. In addition, the directionality control apparatus 3 can cause the omnidirectional microphone array apparatus 2 to form the sound collection directionality in the computed sound collection directional direction.

Further, in the directionality control system 10 of the present embodiment, the memory 38 of the directionality control apparatus 3 stores the configuration file CF1 including, for example, the first configuration data in which the target sound source position A corresponding to the designated position A' in video data designated in response to a user's input operation is correlated with a height (fixed value) of the target sound source position A from the floor surface BL in advance.

Therefore, the sound source height determination section 34a can easily determine, for example, the height $H_A$ of the target sound source position A from the floor surface BL, corresponding to the designated position A' which is designated in response to a user's input operation based on the first configuration data of the configuration file CF1.

(Eighth Embodiment)

In the eighth embodiment, a directionality control apparatus 3A displays options of a height of the target sound source position A from the floor surface BL on the display device 36, and, for example, prompts the user to select any one of the options. The directionality control apparatus 3A determines a height of the target sound source position A from the floor surface BL in response to the selection of any one of the options.

FIG. 38(A) is a block diagram illustrating a configuration of a directionality control system 10A of the eighth embodiment. FIG. 38(B) is a diagram illustrating a display screen WD1 of video data, and a selection screen WD2 which allows the height $H_A$ of the target sound source position A from the floor surface BL to be selected, displayed on the display device 36. The directionality control system 10A illustrated in FIG. 38(A) includes at least one camera apparatuses 11 to 1n, an omnidirectional microphone array apparatus 2, a directionality control apparatus 3A, and a recorder apparatus 4.

The directionality control apparatus 3A includes a communication unit 31, an operation unit 32, a signal processing unit 33A, a display device 36, a speaker device 37, and a memory 38A. The signal processing unit 33A includes at least a sound source height determination section 34aA, a sound collection directional direction computation section 34b, and an output control section 34cA. Each unit which constitutes the directionality control system 10A illustrated in FIG. 38(A) and which performs the same operation as the operation of each unit constituting the directionality control system 10 illustrated in FIG. 33 is given the same reference numeral so that description thereof will be omitted or made briefly, and different content will be described.

In the present embodiment, the memory 38A stores a configuration file CF2 illustrated in FIG. 38(A). The configuration file CF2 includes, for example, at least data regarding the height $H_C$ of, for example, the camera apparatus 11 from the floor surface BL, data regarding the height $H_M$ of the omnidirectional microphone array apparatus 2 from the floor surface BL, and a plurality of types of height data (second configuration data) as options regarding the height $H_A$ of the target sound source position A corresponding to a predetermined designated position A' in video data which is being captured by, for example, the camera apparatus 11 from the floor surface BL.

For example, as illustrated in FIGS. 38(A) and 38(B), in the second configuration data, a target sound source height $H_{A-A}$ is 170 cm which is an average height assuming an adult male, a target sound source height $H_{A-B}$ is 150 cm which is an average height assuming an adult female, and a target sound source height $H_{A-A}$ is 120 cm which is a height assuming a child. The output control section 34cA of the signal processing unit 33A reads the configuration file CF2 from the memory 38A, and displays the selection screen WD2 including options for selecting the height $H_A$ of the target sound source position A from the floor surface BL, corresponding to the designated position A' which is designated with the finger FG of the user, on the display device 36.

The sound source height determination section 34aA of the signal processing unit 33A determines a target sound source height (for example, the target sound source height $H_{A-A}$) corresponding to the option selected on the selection screen WD2 with the finger FG of the user as the height $H_A$ of the target sound source position A from the floor surface BL, corresponding to the designated position A' which is designated with the finger FG of the user on the display screen WD1 of the video data illustrated in FIG. 38(B).

Next, an operation procedure of initial setting performed in the directionality control system 10A of the present embodiment will be described with reference to FIG. 39(A). FIG. 39(A) is a flowchart illustrating an operation procedure of the initial setting in the directionality control system 10A of the eighth embodiment. In the flowchart illustrated in FIG. 39(A), the same step numbers are given to steps having the same content as that in the flowchart illustrated in FIG. 35(A) so that description thereof will be omitted or made briefly, different content will be described.

In FIG. 39(A), after step ST2, each input parameter measured in step ST2 is input to the signal processing unit 33A of the directionality control apparatus 3A from the camera apparatus 11 or is input to the signal processing unit 33A from the operation unit 32 (step ST3A). For example, the operation unit 32 outputs a plurality of types of height data (second configuration data) as options regarding the height $H_A$ of the target sound source position A from the floor surface BL as an example of the input parameter to the signal processing unit 33A in response to a user's input operation.

The signal processing unit 33A generates the configuration file CF2 including the respective input parameters acquired in step ST3 and preserves the configuration file CF2 in the memory 38A (step ST4). In the above-described way, the operation of the initial setting in the directionality control system 10A is finished.

Next, an operation procedure following the initial setting in the directionality control system 10A of the present embodiment will be described with reference to FIG. 39(B). FIG. 39(B) is a flowchart illustrating an operation procedure following the initial setting in the directionality control system 10A of the eighth embodiment. In the flowchart illustrated in FIG. 39(B), the same step numbers are given to steps having the same content as that in the flowchart illustrated in FIG. 35(B) so that description thereof will be omitted or made briefly, different content will be described.

In FIG. 39(B), after step ST12, the output control section 34cA reads the configuration file CF2 from the memory 38A, and displays the selection screen WD2 including options for selecting the height $H_A$ of the target sound source position A from the floor surface BL, corresponding to the designated position A' which is designated with the finger FG of the user, on the display device 36 (refer to FIG. 38(B)).

Here, it is assumed that any one of a plurality of options for selecting the height $H_A$ of the target sound source position A from the floor surface BL is selected with the finger FG of the user on the selection screen WD2 (step ST15). The sound source height determination section 34aA determines a target sound source height (for example, the target sound source height $H_{A-A}$) corresponding to the option selected on the selection screen WD2 with the finger FG of the user as the height $H_A$ of the target sound source position A from the floor surface BL, corresponding to the designated position A' which is designated with the finger FG of the user on the display screen WD1 of the video data illustrated in FIG. 38(B).

The sound collection directional direction computation section 34b of the signal processing unit 33A of the directionality control apparatus 3A computes the sound collection directional coordinates $(\theta_{MAh}, \theta_{MAv})$ which are directed from the installation position M of the omnidirectional microphone array apparatus 2 toward the target sound source position A by using the coordinate data including the horizontal angle and the vertical angle $(\theta_{CAh}, \theta_{CAv})$ from the camera apparatus 11 to the target sound source position A, and the height $H_A$ of the target sound source position A from the floor surface BL determined according to the option selected in step ST15 (step ST13A). The computation content in step ST13A and the operation content in step ST14 are the same as the computation content and the operation content in the seventh embodiment, and thus description thereof will be omitted. In the above-described way, the operation following the initial setting in the directionality control system 10A is finished.

As mentioned above, in the directionality control system 10A of the present embodiment, the memory 38A of the directionality control apparatus 3A stores the configuration file CF2 including height data (second configuration data) regarding a plurality of types of heights $H_{A-A}$, $H_{A-B}$, $H_{A-D}$, . . . , as heights of the target sound source position A from the floor surface BL. The output control section 34cA of the directionality control apparatus 3A displays options of the plurality of types of height data of the second configuration data included in the configuration file CF2 as heights of the target sound source position A from the floor surface BL on the display device 36.

Therefore, the sound source height determination section 34aA of the directionality control apparatus 3A can easily determine the height $H_A$ of the target sound source position A from the floor surface BL, corresponding to the designated position A' which is designated, for example, in response to a user's input operation, in accordance with selection of any one of displayed options of a plurality of types of height data.

In addition, also in the directionality control system 10A of the present embodiment, in the same manner as in the directionality control system 10 of the seventh embodiment, the directionality control apparatus 3A can uniquely determine the height $H_A$ of the target sound source position A of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A based on the height $H_A$ of the target sound source position A from the floor surface BL. In addition, the directionality control apparatus 3 can cause the omnidirectional microphone array apparatus 2 to form the sound collection directionality in the computed sound collection directional direction.

(Ninth Embodiment)

In the ninth embodiment, a directionality control apparatus 3B displays an entry form screen WD3 which allows the user to input a height of the target sound source position A from the floor surface BL on the display device 36 by himself or herself, and, for example, prompts the user to input a height. The directionality control apparatus 3B determines data which is input to the entry form screen WD3 as the height $H_A$ of the target sound source position A from the floor surface BL.

Figure 40:
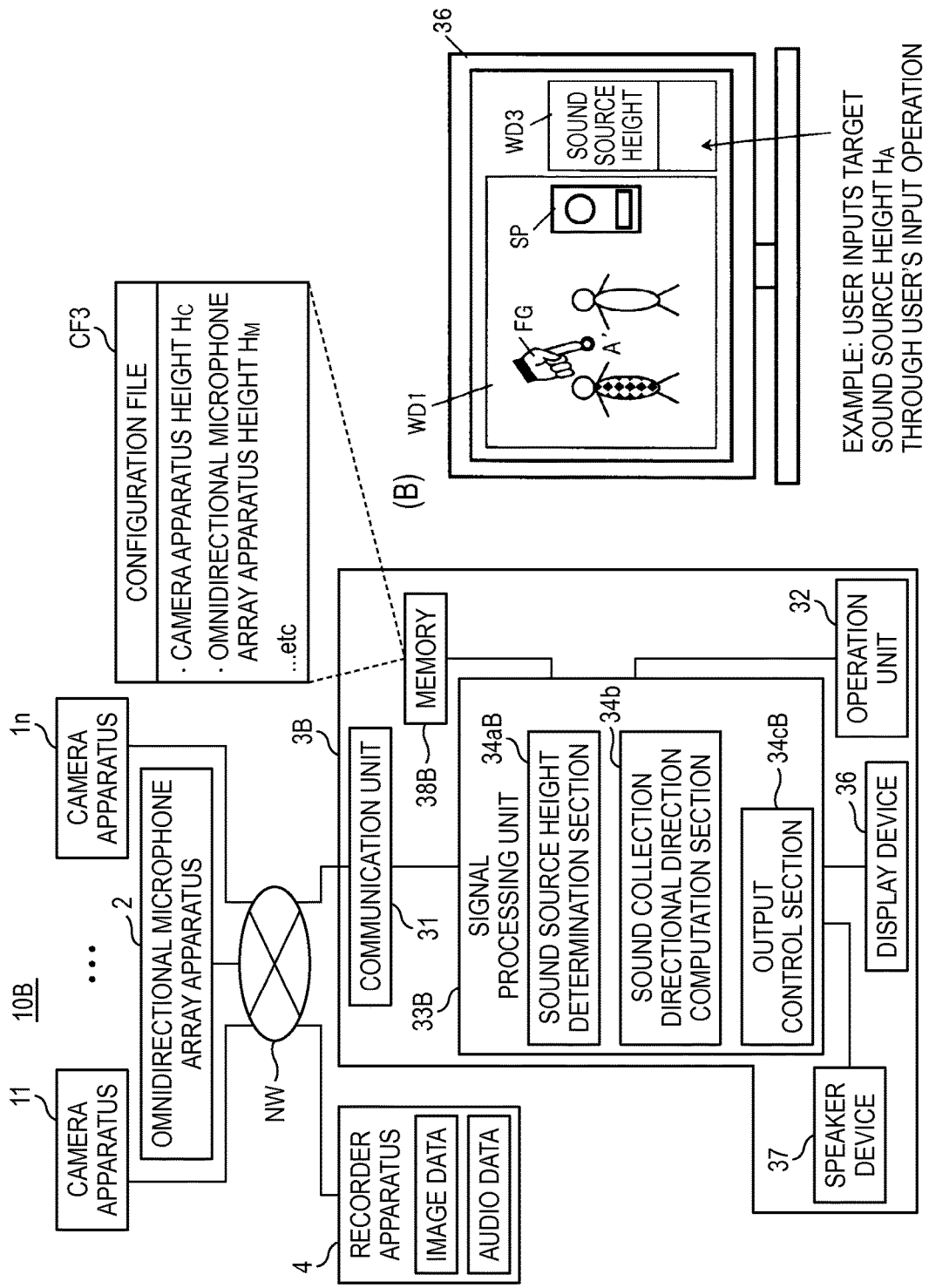
FIG. 40(A) is a block diagram illustrating a configuration of a sound collection system of a ninth embodiment.
FIG. 40(B) is a diagram illustrating a display screen WD1 of video data, and a entry form screen WD3 which allows a height of the target sound source position from the floor surface to be input, displayed on the display device.

FIG. 40(A) is a block diagram illustrating a configuration of a directionality control system 10B of the ninth embodiment. FIG. 40(B) is a diagram illustrating a display screen WD1 of video data, and the entry form screen WD3 which allows a height of the target sound source position A from the floor surface BL to be input, displayed on the display device 36. The directionality control system 10B illustrated in FIG. 40(A) includes at least one camera apparatuses 11 to 1n, an omnidirectional microphone array apparatus 2, a directionality control apparatus 3B, and a recorder apparatus 4.

The directionality control apparatus 3B includes a communication unit 31, an operation unit 32, a signal processing unit 33B, a display device 36, a speaker device 37, and a memory 38B. The signal processing unit 33B includes at least a sound source height determination section 34aB, a sound collection directional direction computation section 34b, and an output control section 34cB. Each unit which constitutes the directionality control system 10B illustrated in FIG. 40(A) and which performs the same operation as the operation of each unit constituting the directionality control system 10 illustrated in FIG. 33 is given the same reference numeral so that description thereof will be omitted or made briefly, and different content will be described.

In the present embodiment, the memory 38B stores a configuration file CF3 illustrated in FIG. 40(A). The configuration file CF2 includes, for example, at least data regarding the height $H_C$ of, for example, the camera apparatus 11 from the floor surface BL, and data regarding the height $H_M$ of the omnidirectional microphone array apparatus 2 from the floor surface BL, which is also the same for the following tenth embodiment.

The output control section 34cB of the signal processing unit 33B displays the entry form screen WD3 which allows the user by himself or herself to input a height of the target sound source position A from the floor surface BL, corresponding to the designated position A' which is designated with the finger FG of the user, on the display device 36.

The sound source height determination section 34aB of the signal processing unit 33B determines a numerical value of the height of the target sound source position A from the floor surface BL, input on the entry form screen WD3, as the height $H_A$ of the target sound source position A from the floor surface BL, desired by the user.

Next, an operation procedure of initial setting performed in the directionality control system 10B of the present embodiment will be described with reference to FIG. 41(A). FIG. 41(A) is a flowchart illustrating an operation procedure of the initial setting in the directionality control system 10B of the ninth embodiment. In the flowchart illustrated in FIG. 41(A), the same step numbers are given to steps having the same content as that in the flowchart illustrated in FIG. 35(A) so that description thereof will be omitted or made briefly, different content will be described.

In FIG. 41(A), after step ST2, each input parameter measured in step ST2 is input to the signal processing unit 33B of the directionality control apparatus 3B from the camera apparatus 11 or is input to the signal processing unit 33B from the operation unit 32 (step ST3B). In addition, in step ST3B, the input parameter does not include the height $H_A$ of the target sound source position A from the floor surface BL unlike in the step ST3 illustrated in FIG. 35(A) or step ST3A illustrated in FIG. 40(A).

The signal processing unit 33B generates the configuration file CF3 including the respective input parameters acquired in step ST3B and preserves the configuration file CF3 in the memory 38A (step ST4). In the above-described way, the operation of the initial setting in the directionality control system 10B is finished.

Next, an operation procedure following the initial setting in the directionality control system 10B of the present embodiment will be described with reference to FIG. 41(B). FIG. 41(B) is a flowchart illustrating an operation procedure following the initial setting in the directionality control system 10B of the ninth embodiment. In the flowchart illustrated in FIG. 41(B), the same step numbers are given to steps having the same content as that in the flowchart illustrated in FIG. 35(B) so that description thereof will be omitted or made briefly, different content will be described.

In FIG. 41(B), after step ST12, the output control section 34cB displays the entry form screen WD3 which allows the user by himself or herself to input a height of the target sound source position A from the floor surface BL, corresponding to the designated position A' which is designated with the finger FG of the user, on the display device 36 (refer to FIG. 40(B)).

Here, it is assumed that a numerical value corresponding to a height of the target sound source position A from the floor surface BL is input by the user through the user's input operation (for example, inputting using the finger FG or inputting using a keyboard (not illustrated)) on the entry form screen WD3 (step ST16). The sound source height determination section 34aB determines the numerical value corresponding to the height of the target sound source position A from the floor surface BL, input on the entry form screen WD3, as the height $H_A$ of the target sound source position A from the floor surface BL.

The sound collection directional direction computation section 34b of the signal processing unit 33B of the directionality control apparatus 3B computes the sound collection directional coordinates $(\theta_{MAh}, \theta_{MAv})$ which are directed from the installation position M of the omnidirectional microphone array apparatus 2 toward the target sound source position A by using the coordinate data including the horizontal angle and the vertical angle $(\theta_{CAh}, \theta_{CAv})$ from the camera apparatus 11 to the target sound source position A, and the height $H_A$ of the target sound source position A from the floor surface BL determined according to the input value on the entry form screen WD3 in step ST16 (step ST13B). The computation content in step ST13B and the operation content in step ST14 are the same as the computation content and the operation content in the seventh embodiment, and thus description thereof will be omitted. In the above-described way, the operation following the initial setting in the directionality control system 10B is finished.

As mentioned above, in the directionality control system 10B of the present embodiment, the output control section 34cB of the directionality control apparatus 3B displays the entry form screen WD3 which allows the user to input a height of the target sound source position A from the floor surface BL by himself or herself, on the display device 36.

Therefore, the sound source height determination section 34aB of the directionality control apparatus 3B can accurately determine a height of the target sound source position A from the floor surface BL, desired by the user, in response to inputting of a height of the target sound source position A from the floor surface BL on the displayed entry form screen WD3. Consequently, the sound collection directional direction computation section 34b of the directionality control apparatus 3B can accurately compute sound collection directional coordinates of a sound collection directional direction which is directed from the omnidirectional microphone array apparatus 2 toward the target sound source position A corresponding to the designated position A'.

In addition, also in the directionality control system 10B of the present embodiment, in the same manner as in the directionality control system 10 of the seventh embodiment, the directionality control apparatus 3B can uniquely determine the height $H_A$ of the target sound source position A of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A based on the height $H_A$ of the target sound source position A from the floor surface BL. In addition, the directionality control apparatus 3B can cause the omnidirectional microphone array apparatus 2 to form the sound collection directionality in the computed sound collection directional direction.

(Tenth Embodiment)

In the tenth embodiment, if a first designated position A1' around a target object (for example, a person), and a second designated position A2' on the floor surface BL located in a vertically lower direction of (directly under) the second designated position A1' are designated on a display screen WD4 of video data displayed on the display device 36, for example, with the finger FG of the user, a directionality control apparatus 3C computes a height of a target sound source position A1 from the floor surface BL, corresponding to the first designated position A1'. The directionality control apparatus 3C determines the computed height as a height $H_{A1}$ of the target sound source position A1 from the floor surface BL.

Figure 42:
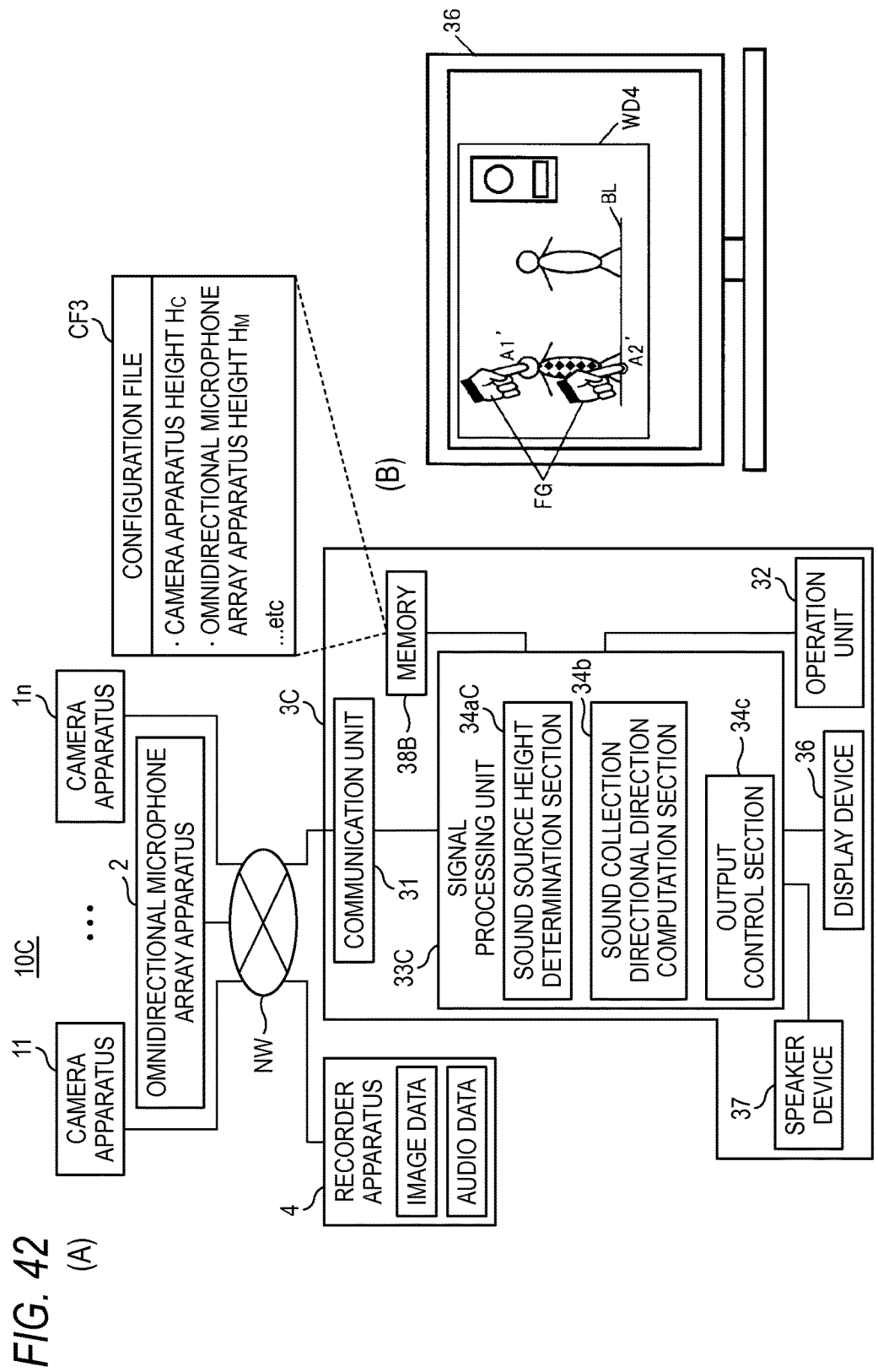
FIG. 42(A) is a block diagram illustrating a configuration of a sound collection system of a tenth embodiment.
FIG. 42(B) is a diagram illustrating a state in which a first designated position A1' and a second designated position A2' are designated on a display screen WD4 of video data displayed on the display device.

FIG. 42(A) is a block diagram illustrating a configuration of a directionality control system 10C of the tenth embodiment. FIG. 42(B) is a diagram illustrating a state in which the first designated position A1' and the second designated position A2' are designated on the display screen WD4 of video data displayed on the display device 36. The directionality control system 10C illustrated in FIG. 42(A) includes at least one camera apparatuses 11 to 1n, an omnidirectional microphone array apparatus 2, a directionality control apparatus 3B, and a recorder apparatus 4.

The directionality control apparatus 3C includes a communication unit 31, an operation unit 32, a signal processing unit 33C, a display device 36, a speaker device 37, and a memory 38B. The signal processing unit 33C includes at least a sound source height determination section 34aC, a sound collection directional direction computation section 34b, and an output control section 34c. Each unit which constitutes the directionality control system 10C illustrated in FIG. 42(A) and which performs the same operation as the operation of each unit constituting the directionality control system 10 illustrated in FIG. 33 is given the same reference numeral so that description thereof will be omitted or made briefly, and different content will be described.

If the first designated position A1' and the second designated position A2' on the floor surface BL corresponding to the first designated position A1' are designated on the display screen WD4 of video data displayed on the display device 36, for example, with the finger FG of the user, the height determination section 34aC of the signal processing unit 33C computes a height of the target sound source position A1 from the floor surface BL, corresponding to the first designated position A1'.

Figure 43:
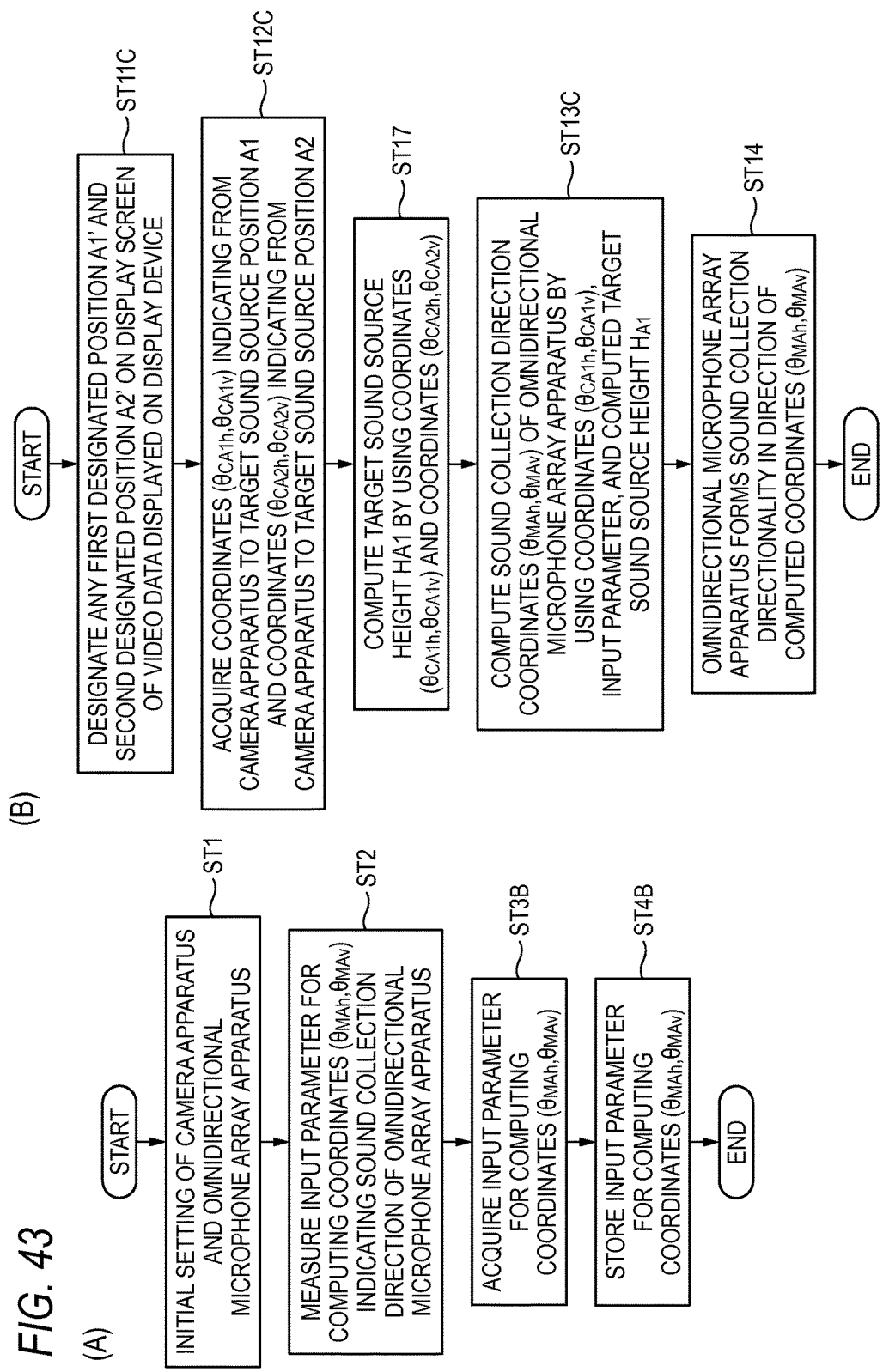
FIG. 43(A) is a flowchart illustrating an operation procedure of initial setting in the sound collection system of the tenth embodiment.
FIG. 43(B) is a flowchart illustrating an operation procedure following the initial setting in the sound collection system of the tenth embodiment.

In addition, an operation procedure (refer to FIG. 43(A)) of initial setting in the directionality control system 10C of the present embodiment is the same as the operation procedure of initial setting in the directionality control system 10B of the tenth embodiment illustrated in FIG. 41(A), and thus description thereof will be omitted. FIG. 43(A) is a flowchart illustrating an operation procedure of the initial setting in the directionality control system 10C of the tenth embodiment.

Next, an operation procedure following the initial setting in the directionality control system 10C of the present embodiment will be described with reference to FIG. 43(B). FIG. 43(B) is a flowchart illustrating an operation procedure following the initial setting in the directionality control system 10C of the tenth embodiment. In the flowchart illustrated in FIG. 43(B), the same step numbers are given to steps having the same content as that in the flowchart illustrated in FIG. 35(B) so that description thereof will be omitted or made briefly, different content will be described.

In FIG. 43(B), the directionality control apparatus 3C receives, via the operation unit 32, designation of the first designated position A1' and the second designated position A2' on the display screen WD4 of video data displayed on the display device 36 illustrated in FIG. 42(B) (step ST11C). The directionality control apparatus 3C transmits a notification indicating that the designation of the first designated position A1' and the second designated position A2' on the display screen WD4 of the video data displayed on the display device 36 has been received, to the camera apparatus 11.

After step ST11C, if the notification indicating that the designation of the first designated position A1' and the second designated position A2' has been received is received from the directionality control apparatus 3C, the camera apparatus 11 acquires coordinate data including a horizontal angle and a vertical angle ($\theta_{CA1h}, \theta_{CA1v}$) to the target sound source position A1 corresponding to the first designated position A1' designated in step ST11C, and coordinate data including a horizontal angle and a vertical angle ($\theta_{CA2h}, \theta_{CA2v}$) to a position A2 corresponding to the second designated position A2' designated in step ST11C, with an installation position C of the camera apparatus 11 as a start point (step ST12C).

The camera apparatus 11 transmits, to the directionality control apparatus 3C, the coordinate data including the horizontal angle and the vertical angle $(\theta_{CA1h}, \theta_{CA1v})$ to the target sound source position A1 corresponding to the first designated position A1' and the coordinate data including the horizontal angle and the vertical angle $(\theta_{CA2h}, \theta_{CA2v})$ to the position A2 corresponding to the second designated position A2', designated in step ST11C with the installation position C of the camera apparatus 11 as a start point.

The height determination section 34aC of the signal processing unit 33C of the directionality control apparatus 3C computes the height $H_{A1}$ of the target sound source position A1 from the floor surface BL, corresponding to the first designated position A1' which is designated with the finger FG of the user, by using the coordinate data including $(\theta_{CA1h}, \theta_{CA1v})$ and the coordinate data including $(\theta_{CA2h}, \theta_{CA2v})$, transmitted from the camera apparatus 11 (step ST17). Details of step ST17 will be described with reference to FIGS. 44 and 45.

The sound collection directional direction computation section 34b of the signal processing unit 33C of the directionality control apparatus 3C computes the sound collection directional coordinates $(\theta_{MAh}, \theta_{MAv})$ which are directed from the installation position M of the omnidirectional microphone array apparatus 2 toward the target sound source position A by using the coordinate data including the horizontal angle and the vertical angle $(\theta_{CAh}, \theta_{CAv})$ from the camera apparatus 11 to the target sound source position A1, and the height $H_{A1}$ of the target sound source position A1 from the floor surface BL determined computed in step ST17 (step ST13C). The computation content in step ST13C and the operation content in step ST14 are the same as the computation content and the operation content in the seventh embodiment, and thus description thereof will be omitted. In the above-described way, the operation following the initial setting in the directionality control system 10C is finished.

(Method of Computing Height $H_{A1}$ of Target Sound Source Position A1 from Floor Surface BL)

Figure 44:
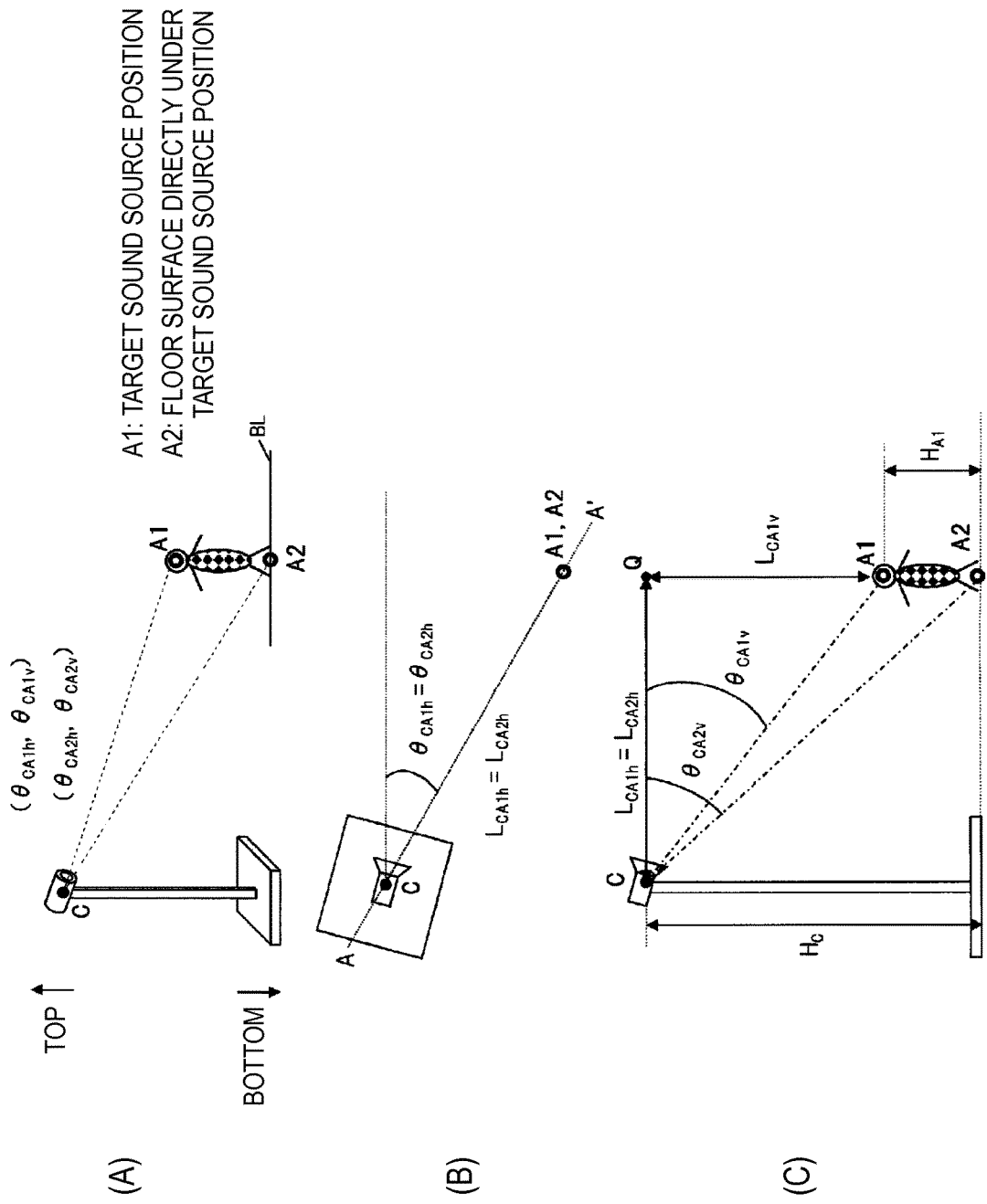
FIG. 44(A) is a diagram illustrating distances and directions from the camera apparatus to the target sound source position A1 of a target object (person) present on the floor surface BL and the position A2 on the floor surface BL located in the vertically lower direction from the target sound source position A1.
FIG. 44(B) is a plan view in which the camera apparatus, the target sound source position A1, and the position A2 on the floor surface BL are viewed in a vertically lower direction from a vertically upper direction.
FIG. 44(C) is a sectional view taken along the line A-A' of FIG. 44(B).
Figure 45:
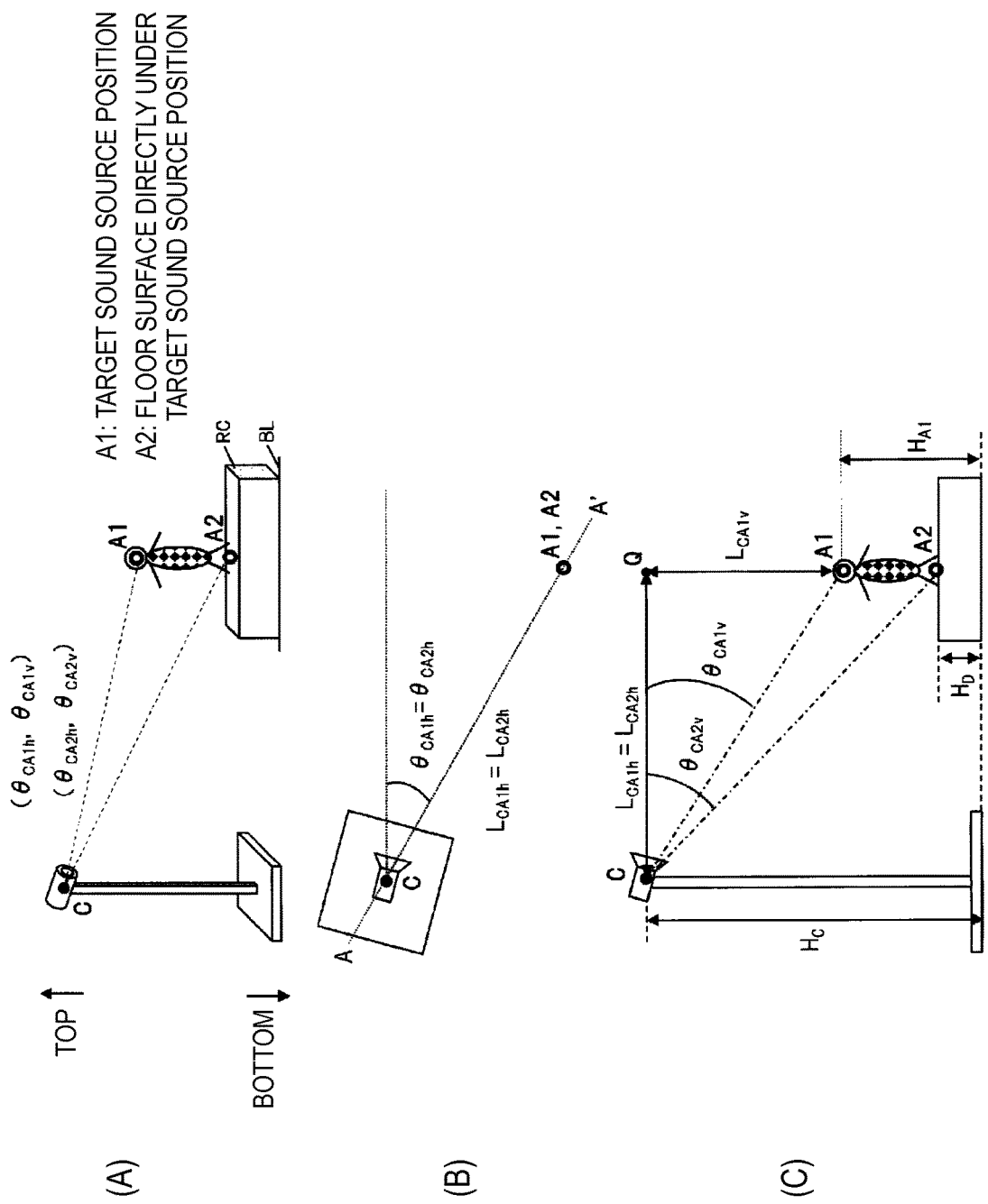
FIG. 45(A) is a diagram illustrating a distance and a direction from the camera apparatus 11 to the target sound source position A1 of a target object (person) present on a stand RC placed on the floor surface BL and the position A2 on a stand RC located in the vertically lower direction from the target sound source position A1.
FIG. 45(B) is a plan view in which the camera apparatus 11, the target sound source position A1, and the position A2 on the stand RC are viewed in a vertically lower direction from a vertically upper direction.
FIG. 45(C) is a sectional view taken along the line A-A' of FIG. 45(B).

Here, with reference to FIGS. 44 and 45, detailed description will be made of a method (hereinafter, referred to as the "present height computation method") in which the sound source height determination section 34aC of the signal processing unit 33C of the directionality control apparatus 3C computes the height $H_{A1}$ of the target sound source position A1 from the floor surface BL.

FIG. 44(A) is a diagram illustrating distances and directions from the camera apparatus 11 to the target sound source position A1 of a target object (person) present on the floor surface BL and the position A2 on the floor surface BL located in the vertically lower direction from the target sound source position A1. FIG. 44(B) is a plan view in which the camera apparatus 11, the target sound source position A1, and the position A2 on the floor surface BL are viewed in a vertically lower direction from a vertically upper direction. FIG. 44(C) is a sectional view taken along the line A-A' of FIG. 44(B).

FIG. 45(A) is a diagram illustrating a distance and a direction from the camera apparatus 11 to the target sound source position A1 of a target object (person) present on a stand RC placed on the floor surface BL and the position A2 on the stand RC located in the vertically lower direction from the target sound source position A1. FIG. 45(B) is a plan view in which the camera apparatus 11, the target sound source position A1, and the position A2 on the stand RC are viewed in a vertically lower direction from a vertically upper direction. FIG. 45(C) is a sectional view taken along the line A-A' of FIG. 45(B).

The sound source height determination section 34aC computes the height $H_{A1}$ of the target sound source position A1 from the floor surface BL, corresponding to the first designated position A1' based on:

(1) a height $H_C$ of the camera apparatus 11 from the floor surface BL;

(2) a distance (horizontal component) $L_{CA1h}$ and an angle (vertical angle) $\theta_{CA1v}$ from the camera apparatus 11 to the target sound source position A1; and (3) a distance (horizontal component) $L_{CA2h}$ and an angle (vertical angle) $\theta_{CA2v}$ from the camera apparatus 11 to the position A2 on the floor surface BL.

In the present height computation method, the input parameter in step ST2 illustrated in FIG. 43(A) includes the height $H_C$ of the camera apparatus 11 from the floor surface BL. The angle (vertical angle) $\theta_{CA1v}$ from the camera apparatus 11 to the sound collection region central position A1 and the angle (vertical angle) $\theta_{CA2v}$ from the camera apparatus 11 to the position A2 on the floor surface BL can be obtained from the camera apparatus 11 in step ST12C.

Hereinafter, detailed description will be made of a method (the present height computation method) in which the sound source height determination section 34aC computes the height $H_{A1}$ of the target sound source position A1 from the floor surface BL.

The sound source height determination section 34aC computes a tangent value $\tan\theta_{CA1v}$ of a vertical angle $\theta_{CA1v}$ of an imaging direction which is directed from the camera apparatus 11 toward the target sound source position A1 according to Equation (77) based on a tangent for the triangle CA1Q illustrated in FIG. 44(C). In Equation (77), $L_{CA1h}$ indicates a horizontal component of the distance from the camera apparatus 11 to the target sound source position A1.

[Equation 77]

$$\tan\theta_{CA1v} = \frac{H_C - H_{A1}}{L_{CA1h}} \qquad (77)$$

Similarly, the sound source height determination section 34aC computes a tangent value $\tan\theta_{CA2v}$ of a vertical angle $\theta_{CA2v}$ of an imaging direction which is directed from the camera apparatus 11 toward the position A2 on the floor surface BL according to Equation (78) based on a tangent for the triangle CA2Q illustrated in FIG. 44(C). In Equation (78), $L_{CA2h}$ indicates a horizontal component of the distance from the camera apparatus 11 to the position A2 on the floor surface BL.

[Equation 78]

$$\tan\theta_{CA2v} = \frac{H_C}{L_{CA2h}} \qquad (78)$$

Here, the target sound source position A1 and the position A2 on the floor surface BL have different coordinates in the vertically upper direction or the vertically lower direction illustrated in FIG. 44(A) but have the same horizontal component coordinates. Therefore, as illustrated in FIG. 44(B), the horizontal component $L_{CA1h}$ of the distance $L_{CA1}$ from the camera apparatus 11 to the target sound source position A1 is the same as the horizontal component $L_{CA2h}$ of the distance $L_{CA2}$ from the camera apparatus 11 to the position A2 on the floor surface BL (refer to Equation (79)).

[Equation 79]

$$L_{CA1h} = L_{CA2h} \quad (79)$$

Therefore, the sound source height determination section 34aC computes the height $H_{A1}$ of the target sound source position A1 from the floor surface BL according to Equation (80) by using the respective computation results of Equations (77) to (79).

[Equation 80]

$$H_{A1} = H_C\left(1 - \frac{\tan\theta_{CA1v}}{\tan\theta_{CA2v}}\right) \quad (80)$$

In addition, a description will also be made of a method of computing the height $H_{A1}$ of the target sound source position A1 from the floor surface BL in a case where a target object (person) is not present on the floor surface BL but is present on the stand RC with a predetermined height HD (refer to FIG. 45(A)).

The sound source height determination section 34aC computes a tangent value $\tan\theta_{CA1v}$ of a vertical angle $\theta_{CA1v}$ of an imaging direction which is directed from the camera apparatus 11 toward the target sound source position A1 according to Equation (81) based on a tangent for the triangle CA1Q illustrated in FIG. 45(C). In Equation (81), $L_{CA1h}$ indicates a horizontal component of the distance from the camera apparatus 11 to the target sound source position A1.

[Equation 81]

$$\tan\theta_{CA1v} = \frac{H_C - H_{A1}}{L_{CA1h}} \quad (81)$$

Similarly, the sound source height determination section 34aC computes a tangent value $\tan\theta_{CA2v}$ of a vertical angle $\theta_{CA2v}$ of an imaging direction which is directed from the camera apparatus 11 toward the position A2 on the stand RC according to Equation (82) based on a tangent for the triangle CA2Q illustrated in FIG. 45(C). In Equation (82), $L_{CA2h}$ indicates a horizontal component of the distance from the camera apparatus 11 to the position A2 on the stand RC.

[Equation 82]

$$\tan\theta_{CA2v} = \frac{H_C - H_D}{L_{CA2h}} \quad (82)$$

Here, the target sound source position A1 and the position A2 on the stand RC have different coordinates in the vertically upper direction or the vertically lower direction illustrated in FIG. 45(A) but have the same horizontal component coordinates. Therefore, as illustrated in FIG. 45(B), the horizontal component $L_{CA1h}$ of the distance $L_{CA1}$ from the camera apparatus 11 to the target sound source position A1 is the same as the horizontal component $L_{CA2h}$ of the distance $L_{CA2}$ from the camera apparatus 11 to the position A2 on the stand RC (refer to Equation (79)).

Therefore, the sound source height determination section 34aC computes the height $H_{A1}$ of the target sound source position A1 from the floor surface BL according to Equation (83) by using the respective computation results of Equations (79), (81) and (82).

[Equation 83]

$$H_{A1} = H_C - (H_C - H_D)\left(\frac{\tan\theta_{CA1v}}{\tan\theta_{CA2v}}\right) \quad (83)$$

In the above-described way, in the directionality control system 10C of the present embodiment, the sound source height determination section 34aC of the directionality control apparatus 3C can accurately compute a height of the target sound source position A1 from the floor surface BL, corresponding to the first designated position A1', in response to designation of the first designated position A1' and the second designated position A2' on the floor surface BL corresponding to the first designated position A1' in video data displayed on the display device 36.

Therefore, in the directionality control apparatus 3C, a configuration file in which a target sound source position corresponding to a position designated in a video data is correlated with a height of the target sound source position from the floor surface BL in advance is not required to be created, and a height of the target sound source position A1 from the floor surface BL, desired by the user, can be accurately computed in response to a simple designation operation such as designation of two positions without displaying options of a height of a target sound source position A from the floor surface BL or an entry form on the display device 36.

In addition, also in the directionality control system 10C of the present embodiment, in the same manner as in the directionality control system 10 of the seventh embodiment, the directionality control apparatus 3C can uniquely determine the height $H_A$ of the target sound source position A1 of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A1 based on the height $H_{A1}$ of the target sound source position A1 from the floor surface BL.

In addition, the directionality control apparatus 3C can cause the omnidirectional microphone array apparatus 2 to form the sound collection directionality in the computed sound collection directional direction.

Hereinafter, configurations, operations, and effects of the above-described directionality control system and directionality control method related to the present invention will be described.

According to an embodiment of the present invention, there is provided a directionality control system including at least one imaging part that captures a video; a sound collection part that collects sound; a display part that displays video data captured by the at least one imaging part; a height determination part that determines a height of a target sound source position from a reference surface, corresponding to a position designated in the video data in response to designation of the position in the video data; a sound collection directional direction computation part that computes a sound collection directional direction which is directed from the sound collection part toward the target sound source position based on the height of the target sound source position from the reference surface; and a control part that causes the sound collection part to form sound collection directionality of the sound in the computed sound collection directional direction.

In the above-described configuration, the sound source height determination section 34a of the directionality control apparatus 3 determines the height $H_A$ of the target sound source position A from the floor surface BL, corresponding to the designated position A' in video data in response to a user's designation of the designated position A' in the video data displayed on the display device 36. The sound collection directional direction computation section 34b of the directionality control apparatus 3 computes a sound collection directional direction which is directed from the omnidirectional microphone array apparatus 2 toward the target sound source position A corresponding to the designated position A' based on the height $H_A$ of the target sound source position A from the floor surface BL. The output control section 34c of the directionality control apparatus 3 causes the omnidirectional microphone array apparatus 2 to form the sound collection directionality in the computed sound collection directional direction.

Consequently, in the directionality control system 10, the directionality control apparatus 3 can uniquely determine the height $H_A$ of the target sound source position A of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A based on the height $H_A$ of the target sound source position A from the floor surface BL. In addition, the directionality control apparatus 3 can cause the omnidirectional microphone array apparatus 2 to form the sound collection directionality in the computed sound collection directional direction.

In addition, in the directionality control system according to the embodiment of the present invention, the directionality control system further includes a storage part that stores first configuration data in which a target sound source position corresponding to a position designated in the video data is correlated with a height of the target sound source position from a reference surface in advance, and the height determination part determines a height of the target sound source position from the reference surface, corresponding to the designated position based on the first configuration data.

In the above-described configuration, the memory 38 of the directionality control apparatus 3 stores the configuration file CF1 including, for example, the first configuration data in which the target sound source position A corresponding to the designated position A' in video data designated in response to a user's input operation is correlated with a height of the target sound source position A from the floor surface BL in advance.

Therefore, the sound source height determination section 34a can easily determine, for example, the height $H_A$ of the target sound source position A from the floor surface BL, corresponding to the designated position A' which is designated in response to a user's input operation based on the first configuration data of the configuration file CF1.

In addition, in the directionality control system according to the embodiment of the present invention, the directionality control system further includes a storage part that stores second configuration data including a plurality of types of height data as heights of the target sound source position A from the reference surface, the control part displays options of the plurality of types of height data of the second configuration data as a height of the target sound source position from the reference surface, and the height determination part determines a height of the target sound source position from the reference surface, corresponding to the designated position in response to selection of any one of the options of the plurality of types of height data.

In the above-described configuration, the memory 38A of the directionality control apparatus 3A stores the configuration file CF2 including height data (second configuration data) regarding a plurality of types of heights $H_{A-A}$, $H_{A-B}$, $H_{A-D}$, ..., as heights of the target sound source position A from the floor surface BL. The output control section 34cA of the directionality control apparatus 3A displays options of the plurality of types of height data of the second configuration data included in the configuration file CF2 as heights of the target sound source position A from the floor surface BL on the display device 36.

Therefore, the sound source height determination section 34aA of the directionality control apparatus 3A can easily determine the height $H_A$ of the target sound source position A from the floor surface BL, corresponding to the designated position A' which is designated, for example, in response to a user's input operation, in accordance with selection of any one of displayed options of a plurality of types of height data.

Further, in the directionality control system according to the embodiment of the present invention, the control part displays an entry form of a height of the target sound source position from the reference surface, and the height determination part determines a height of the target sound source position from the reference surface, corresponding to the designated position in response to inputting of the height of the target sound source position from the reference surface on the displayed entry form.

The output control section 34cB of the directionality control apparatus 3B displays the entry form screen WD3 which allows the user to input a height of the target sound source position A from the floor surface BL, on the display device 36.

Therefore, the sound source height determination section 34aB of the directionality control apparatus 3B can accurately determine a height of the target sound source position A from the floor surface BL, desired by the user, in response to inputting of a height of the target sound source position A from the floor surface BL on the displayed entry form screen WD3. Consequently, the sound collection directional direction computation section 34b of the directionality control apparatus 3B can accurately compute a sound collection directional direction which is directed from the omnidirectional microphone array apparatus 2 toward the target sound source position A corresponding to the designated position A'.

In addition, in the directionality control system according to the embodiment of the present invention, in response to designation of a first designated position and a second designated position on the reference surface corresponding to the first designated position in the displayed video data, the height determination part computes a height of the target sound source position from the reference surface, corresponding to the first designated position.

In the above-described configuration, the sound source height determination section 34aC of the directionality control apparatus 3C can accurately compute a height of the target sound source position A1 from the floor surface BL, corresponding to the first designated position A1', in response to designation of the first designated position A1' and the second designated position A2' on the floor surface BL corresponding to the first designated position A1' in video data displayed on the display device 36.

Therefore, in the directionality control apparatus 3C, a configuration file in which a target sound source position corresponding to a position designated in a video data is correlated with a height of the target sound source position from the floor surface BL in advance is not required to be created, and a height of the target sound source position A1 from the floor surface BL, desired by the user, can be accurately computed in response to a simple designation operation such as designation of two positions without displaying options of a height of a target sound source position A from the floor surface BL or an entry form on the display device 36.

In addition, in the directionality control system according to the embodiment of the present invention, the height determination part computes a height of the target sound source position from the reference surface, corresponding to the first designated position, based on a height of the at least one imaging part from the reference surface, a distance and an angle from the at least one imaging part to the target sound source position corresponding to the first designated position, and a distance and an angle from the at least one imaging part to a position of the reference surface corresponding to the second designated position.

In the above-described configuration, the sound source height determination section 34aC of the directionality control apparatus 3C can accurately compute a height of the target sound source position A1 from the floor surface BL, corresponding to the first designated position A1', based on the height $H_C$ of the camera apparatus 11 from the floor surface BL, the distance $L_{CA1h}$ and the angle $\theta_{CA1v}$ from the camera apparatus 11 to the target sound source position A1 corresponding to the first designated position A1', and the distance $L_{CA2h}$ and the angle $\theta_{CA2v}$ from the camera apparatus 11 to the position A2 of the floor surface BL corresponding to the second designated position A2'.

According to another embodiment of the present invention, there is provided a directionality control method for a directionality control system including at least one imaging part that captures a video and a sound collection part that collects sound, the method including a step of displaying video data captured by the at least one imaging part; a step of determining a height of a target sound source position from a reference surface, corresponding to a position designated in the video data in response to designation of the position in the video data; a step of computing a sound collection directional direction which is directed from the sound collection part toward the target sound source position based on the height of the target sound source position from the reference surface; and a step of causing the sound collection part to form sound collection directionality of the sound in the computed sound collection directional direction.

In the above-described method, the sound source height determination section 34a of the directionality control apparatus 3 determines the height $H_A$ of the target sound source position A from the floor surface BL, corresponding to the designated position A' in video data in response to a user's designation of the designated position A' in the video data displayed on the display device 36. The sound collection directional direction computation section 34b of the directionality control apparatus 3 computes a sound collection directional direction which is directed from the omnidirectional microphone array apparatus 2 toward the target sound source position A corresponding to the designated position A' based on the height $H_A$ of the target sound source position A from the floor surface BL. The output control section 34c of the directionality control apparatus 3 causes the omnidirectional microphone array apparatus 2 to form the sound collection directionality in the computed sound collection directional direction.

Consequently, in the directionality control system 10, the directionality control apparatus 3 can uniquely determine the height $H_A$ of the target sound source position A of a target object from the floor surface BL, present in an imaging direction in which the camera apparatus 11 performs imaging in the sound collection space K, and can thus accurately compute a sound collection directional direction which is directed from the omnidirectional microphone array apparatus 2 toward the target sound source position A based on the height $H_A$ of the target sound source position A from the floor surface BL. In addition, the directionality control apparatus 3 can cause the omnidirectional microphone array apparatus 2 to form the sound collection directionality in the computed sound collection directional direction.

An eleventh embodiment described below relates to a directionality control system and a directionality control method, in which sound collection directionality of a microphone array apparatus which collects sound is controlled.

Patent Literature 1 is based on, for example, a camera apparatus, a microphone array apparatus, and a subject (for example, a speaker) being present on the same plane assuming usage forms in a television conference system. However, in the above-described monitoring system, the comera apparatus, the microphone array apparatus, and the subject (for example, a staff of a store, or a visitor) are all seldom present on the same plane in practice.

For example, since the camera apparatus and the microphone array apparatus are often installed on an upper side (for example, a ceiling surface of a store) of a subject, the camera apparatus, the microphone array apparatus, and the subject are not present on a planar two-dimensional coordinate but are present on a stereoscopic three-dimensional coordinate in most cases.

Therefore, in the above-described surveillance system, in a case where the microphone array apparatus collects sounds of conversations of subjects in an image which is currently captured by the camera apparatus, there is a problem in that it is hard to use coordinates (horizontal angle, vertical angle) computed according to a method disclosed in Patent Literature 1 and indicating a direction in which the microphone array apparatus collects sound, without changing the coordinates.

For this reason, if a control system disclosed in Patent Literature 1 in which only a panning direction of the camera, that is, only a horizontal angle is used to change a sound collection region of the microphone array apparatus is applied to the above-described monitoring system, the microphone array apparatus is unlikely to collect sound in an imaging direction of the camera apparatus.

In addition, in the above-described monitoring system, in a case where the camera apparatus and the microphone array apparatus are integrally assembled with each other, an optical axis of the camera apparatus and a physical central axis of the microphone array apparatus are common to each other. Thus, in a case where the microphone array apparatus collects conversations of a subject present in an imaging direction of the camera apparatus, coordinates (horizontal angle, vertical angle) indicating a direction (hereinafter, referred to as a "sound collection direction") in which the microphone array collects sound are the same as coordinates (horizontal angle, vertical angle) indicating an imaging direction of the camera apparatus.

However, in a case where the camera apparatus and the microphone array apparatus are disposed at different positions separately from each other, the optical axis of the camera is different from the physical central axis of the microphone array. For this reason, in a case where the microphone array apparatus collects conversations of a subject in videos which are currently being captured by the camera, there is a problem in that coordinates (horizontal angle, vertical angle) indicating of a sound collection direction of the microphone array apparatus are not the same as coordinates (horizontal angle, vertical angle) indicating an imaging direction of the camera apparatus.

Therefore, in the eleventh embodiment related to the present invention, in order to solve the above-described problems of the related art, a description will be made of examples of a directionality control system and a directionality control method, in which sound collection directionality is formed in a sound collection direction which is directed toward a target sound source position (or a sound position) corresponding to a designated position in a captured image obtained by a camera apparatus with a microphone array apparatus as a reference, and sound in the sound collection direction is collected with high accuracy.

(Eleventh Embodiment)

Hereinafter, as the eleventh embodiment of a directionality control system and a directionality control method related to the present invention, for example, an embodiment (hereinafter, referred to as the "present embodiment") of a sound collection system and a sound collection control method will be described with reference to the drawings. The sound collection system of the present embodiment is used as a monitoring system (including a manned monitoring system and an unmanned monitoring system) provided in, for example, a factory, a public facility (for example, a library or an event hall), or a store (for example, a retail store or a bank).

In addition, the present invention can be expressed as respective apparatuses (for example, a directionality control apparatus to be described later) constituting the sound collection system, or a sound collection control method including respective operations (steps) performed by each apparatus constituting the sound collection system.

(Configuration of Sound Collection System)

Figure 47:
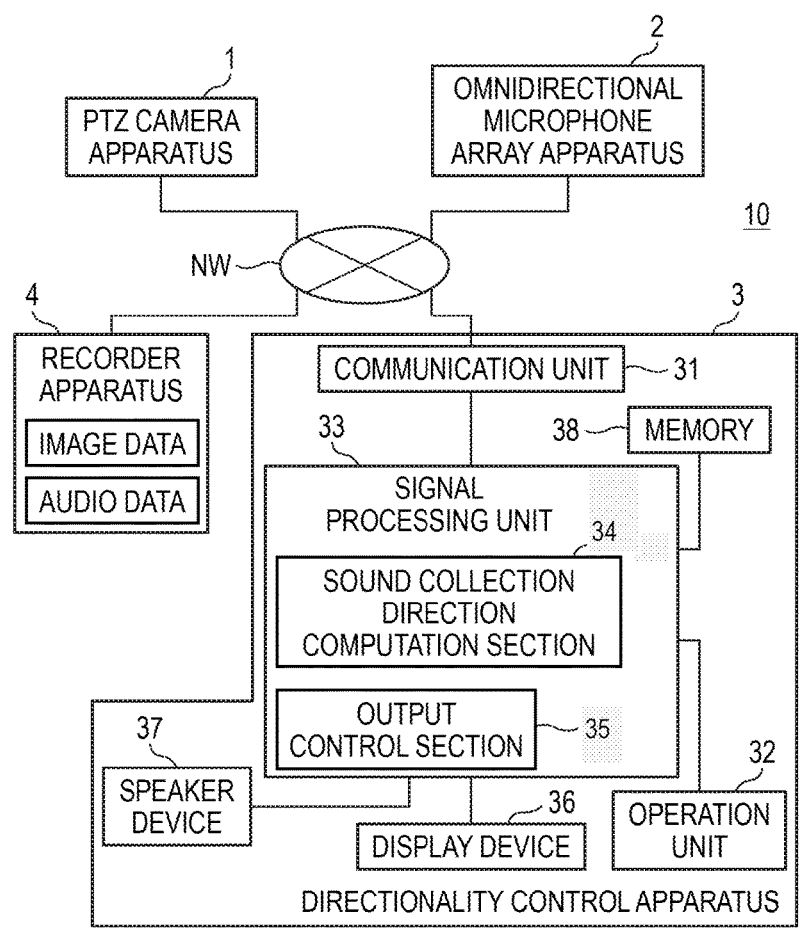
FIG. 47 is a block diagram illustrating a configuration of a sound collection system of an eleventh embodiment.

FIG. 47 is a block diagram illustrating a configuration of a sound collection system 10 of the present embodiment. The sound collection system 10 illustrated in FIG. 47 includes a pan-tilt-zoom (PTZ) camera apparatus 1, an omnidirectional microphone array apparatus 2, a directionality control apparatus 3, and a recorder apparatus 4. The PTZ camera apparatus 1, the omnidirectional microphone array apparatus 2, the directionality control apparatus 3, and the recorder apparatus 4 are connected to each other via a network NW. The network NW may be a wired network (for example, an intranet or the Internet), and may be a wireless network (for example, a wireless local area network (LAN)). In the sound collection system 10 illustrated in FIG. 47, for simplification of description, only a single PTZ camera apparatus 1 is illustrated, but a plurality of PTZ camera apparatuses may be employed.

Hereinafter, the respective apparatuses constituting the sound collection system 10 will be described.

Figure 48:
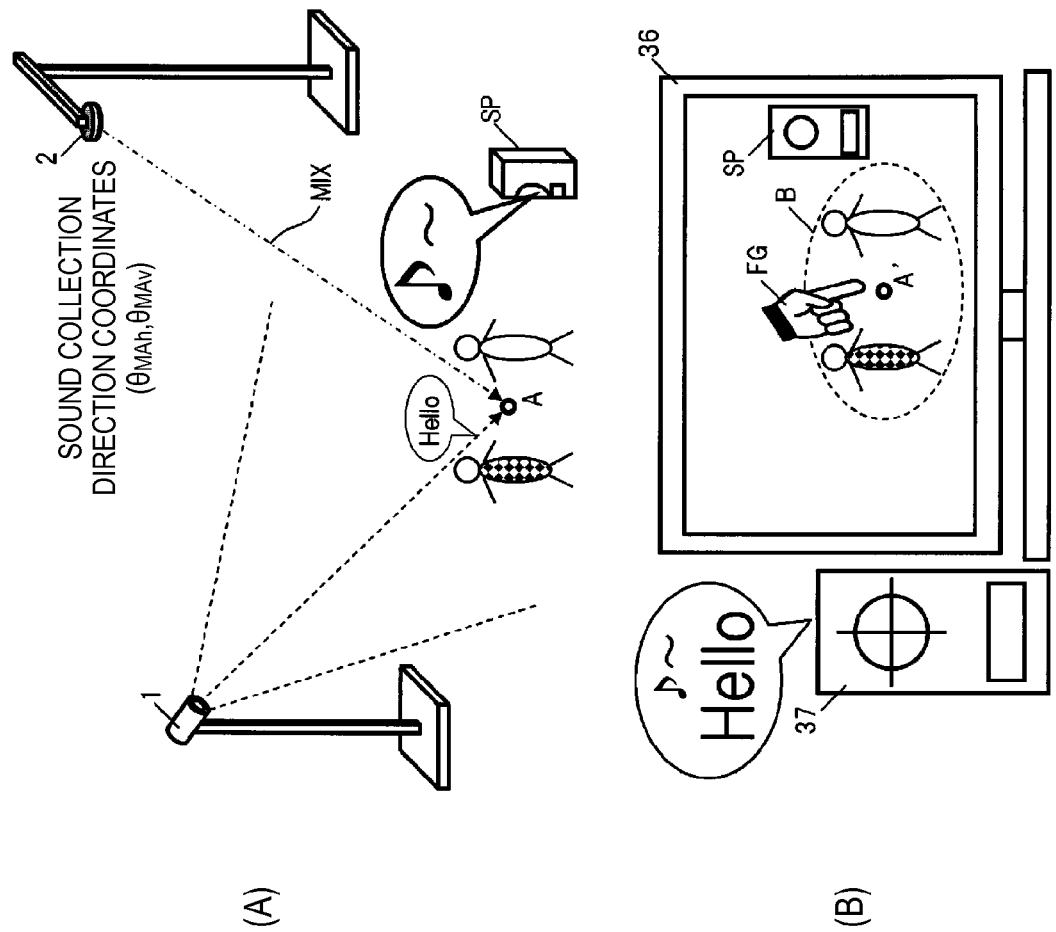
FIG. 48(A) is a diagram illustrating an operation summary of a sound collection system of the eleventh embodiment.
FIG. 48(B) is a diagram illustrating a state in which a volume level of voice of a person who is present in a sound collection direction which is directed from the omnidirectional microphone array apparatus toward the target sound source position A corresponding to the designated position A' which is designated in captured image data displayed on the display device is output so as to be higher than a volume level of sound output from a speaker device which is not present in the sound collection direction.

The PTZ camera apparatus 1 as an example of an imaging part is fixed to and installed on, for example, a ceiling surface of the store or a stand (refer to FIG. 48(A)). The PTZ camera apparatus 1 functions as, for example, a monitoring camera in a monitoring system, and captures an image of a target object (for example, a person) present in a predetermined sound collection region (for example, a predetermined region in the store) by using a casing driving function in a panning direction or a tilting direction, and a zooming function (for example, zoom-in and zoom-out) which well-known techniques through a remote operation from a monitoring control room (not illustrated) which is connected thereto via the network NW. The PTZ camera apparatus 1 transmits captured image data obtained through imaging, to the directionality control apparatus 3 or the recorder apparatus 4 via the network NW.

If at least one of calibration markers MAK and MAK3, a calibration floor marker MAK2 (which will be described later), and the omnidirectional microphone array apparatus 2 is designated in captured image data displayed on the display device 36 with the finger FG of the user, the PTZ camera apparatus 1 receives coordinate data regarding the position designated in the image capturing device from the directionality control apparatus 3. The PTZ camera apparatus 1 computes parameters of a distance and a direction from an installation position of the PTZ camera apparatus 1 to at least one of the calibration markers MAK and MAK3, the calibration floor marker MAK2, and the omnidirectional microphone array apparatus 2. A process of computing the parameters of a distance and a direction in the PTZ camera apparatus 1 is a well-known technique, and thus description thereof will be omitted.

In addition, if any position (for example, a designated position A') is designated with the finger FG of the user in the captured image data displayed on the display device 36, the PTZ camera apparatus 1 receives coordinate data regarding the designated position A' in the captured image data from the directionality control apparatus 3. The PTZ camera apparatus 1 computes parameters of a distance and a direction from the installation position of the PTZ camera apparatus 1 to an actual field position (target sound source position A) corresponding to the designated position A'. The PTZ camera apparatus 1 transmits parameters of a distance and a direction from the installation position of the PTZ camera apparatus 1 to at least one of the calibration markers MAK and MAK3, the calibration floor marker MAK2, the microphone array apparatus 2, the omnidirectional microphone array apparatus 2, and the target sound source position A, to the directionality control apparatus 3.

The omnidirectional microphone array apparatus 2 as an example of a sound collection part is fixed to and installed on, for example, a ceiling surface of a store or a stand (refer to FIG. 48(A)). The omnidirectional microphone array apparatus 2 includes at least microphone units 22 and 23 in which microphones are uniformly provided (refer to FIGS. 2(A) to 2(E)) and a control unit (not illustrated) which controls an operation of each of the microphone units 22 and 23.

The omnidirectional microphone array apparatus 2 forms sound collection directionality of each of the microphone units 22 and 23 in a sound collection direction indicted by sound collection direction coordinates $(\theta_{MAh}, \theta_{MAv})$ included in a directionality formation instruction in response to the directionality formation instruction (which will be described later) transmitted from the directionality control apparatus 3. The omnidirectional microphone array apparatus 2 performs predetermined sound processing on audio data collected by each of the microphone units 22 and 23, and transmits audio data obtained through the predetermined sound processing to the directionality control apparatus 3 or the recorder apparatus 4 via the network NW.

Consequently, the omnidirectional microphone array apparatus 2 can relatively increase a volume level of audio data in a sound collection direction in which the sound collection directionality is formed, and can relatively reduce a volume level of audio data in a direction in which the sound collection directionality is not formed. In addition, a method of computing the sound collection direction coordinates ($\theta_{MAh}, \theta_{MAv}$) will be described later.

In addition, exteriors of the microphone array apparatus 2 will be described later with reference to FIGS. 2(A) to 2(E). Further, the microphone constituting each of the microphone units 22 and 23 of the omnidirectional microphone array apparatus 2 may employ a nondirectional microphone, a bidirectional microphone, a unidirectional microphone, a sharply directional microphone, a super-directional microphone (for example, a shotgun microphone), or a combination thereof.

The directionality control apparatus 3 may be, for example, a stationery personal computer (PC) installed in a monitoring control room (not illustrated), and may be a data communication terminal such as a mobile phone, a personal digital assistant (PDA), a tablet terminal, or a smart phone, which can be carried by a user.

The directionality control apparatus 3 includes at least a communication unit 31, an operation unit 32, a signal processing unit 33, a display device 36, a speaker device 37, and a memory 38. The signal processing unit 33 includes at least a sound collection direction computation section 34 and an output control section 35.

The communication unit 31 receives captured image data transmitted from the PTZ camera apparatus 1 or audio data transmitted from the microphone array apparatus 2, and outputs the data to the signal processing unit 33.

The operation unit 32 is a user interface (UI) for notifying the signal processing unit 33 of the content of a user's input operation, and is, for example, a pointing device such as a mouse or a keyboard. In addition, the operation unit 32 may be configured by using a touch panel or a touch pad which is disposed so as to correspond to, for example, a screen of the display device 36 and allows an input operation to be performed with the finger FG of the user or a stylus pen.

The operation unit 32 outputs coordinate data regarding a region where the user desires to increase a volume level, that is, the designated position A' which is designated with the finger FG of the user in a sound collection in region B illustrated in FIG. 48(B) in captured image data (refer to FIG. 48(B)) obtained by the PTZ camera apparatus 1 and displayed on the display device 36, to the signal processing unit 33.

In addition, if at least one of the calibration markers MAK and MAK3, the calibration floor marker MAK2 (which will be described later), and the omnidirectional microphone array apparatus 2 is designated with the finger FG of the user in the captured image data obtained by the PTZ camera apparatus 1 and displayed on the display device 36, the operation unit 32 outputs coordinate data regarding the designated position to the signal processing unit 33.

The signal processing unit 33 is configured by using, for example, a central processing unit (CPU), a micro processing unit (MPU), or a digital signal processor (DSP), and performs a control process for collectively controlling operations of the respective units of the directionality control apparatus 3, data input and output processes with other respective units, a data computation (computation) process, and a data storage process.

If the coordinate data regarding at least one of the calibration markers MAK and MAK3, the calibration floor marker MAK2, and the omnidirectional microphone array apparatus 2 displayed on the display device 36 is acquired from the operation unit 32 during calibration (will be described later), the sound collection direction computation section 34 transmits the coordinate data to the PTZ camera apparatus 1 via the communication unit 31. The sound collection direction computation section 34 acquires parameters of a distance and a direction from the installation position of the PTZ camera apparatus 1 to at least one of the calibration markers MAK and MAK3, the calibration floor marker MAK2, and the omnidirectional microphone array apparatus 2 from the communication unit 31.

The sound collection direction computation section 34 computes a calibration parameter which differs for each calibration method (which will be described later) by using the parameters of the distance and the direction from the installation position of the PTZ camera apparatus 1 to at least one of the calibration markers MAK and MAK3, the calibration floor marker MAK2, and the omnidirectional microphone array apparatus 2.

In addition, if the coordinate data regarding the designated position A' is acquired from the operation unit 32 when computing the sound collection direction coordinates ($\theta_{MAh}, \theta_{MAv}$) (which will be described later), the sound collection direction computation section 34 transmits the coordinate data to the PTZ camera apparatus 1 via the communication unit 31. The sound collection direction computation section 34 acquires parameters of a distance and a direction from the installation position of the PTZ camera apparatus 1 to the target sound source position A from the communication unit 31.

The sound collection direction computation section 34 computes the sound collection direction coordinates ($\theta_{MAh}, \theta_{MAv}$) indicating a sound collection direction which is directed from an installation position of the omnidirectional microphone array apparatus 2 toward the target sound source position A (which will be described later) by using the parameters (which will be described later) of the distance and the direction from the installation position of the PTZ camera apparatus 1 to the target sound source position A, and calibration parameters (which will be described later) computed during the calibration. In the sound collection direction coordinates ($\theta_{MAh}, \theta_{MAv}$), $\theta_{MAh}$ indicates a horizontal angle of a sound collection direction which is directed from the installation position of the omnidirectional microphone array apparatus 2 toward the target sound source position A, and $\theta_{MAv}$ indicates a vertical angle of the sound collection direction which is directed from the omnidirectional microphone array apparatus 2 toward the target sound source position A.

In addition, in the following description, the target sound source position is defined as a field position which corresponds to the position A' designated by the user (for example, with the finger FG of the user or a stylus pen) in captured image data displayed on the display device 36 and obtained by the PTZ camera apparatus 1, and is an actual monitoring target. Further, for simplification of description of the present embodiment, a single target sound source position will be described, but a plurality of target sound source positions corresponding to designated positions which are designated by the user may be employed.

The output control section 35 controls operations of the display device 36 and the speaker device 37, so as to display captured image data transmitted from the PTZ camera apparatus 1 on the display device 36, and to output audio data transmitted from the omnidirectional microphone array apparatus 2, from the speaker device 37 as sound. Further, the output control section 35 controls an operation of the omnidirectional microphone array apparatus 2, for example, so as to cause the omnidirectional microphone array apparatus 2 to form the sound collection directionality of sound collected by the omnidirectional microphone array apparatus 2 in a sound collection direction MIX indicated by the sound collection direction coordinates ($\theta_{MAh}, \theta_{MAv}$) computed by the sound collection direction computation section 34, or the output control section 35 forms the sound collection directionality of sound collected by the omnidirectional microphone array apparatus 2 (refer to FIG. 48(A)).

The display device 36 as an example of a display part is configured by using, for example, a liquid crystal display (LCD) or an organic electroluminescent (EL) element, and displays captured image data obtained by the PTZ camera apparatus 1 under the control of the output control section 35.

The speaker device 37 as an example of a sound output part outputs, as sound, audio data of sound collected by the omnidirectional microphone array apparatus 2 or audio data of sound which is collected after the sound collection directionality is formed in a sound collection direction indicated by the sound collection direction coordinates ($\theta_{MAh}, \theta_{MAv}$). In addition, the display device 36 and the speaker device 37 may be configured separately from the directionality control apparatus 3.

The memory 38 as an example of a storage part is configured by using, for example, a random access memory (RAM), and functions as a work memory when the respective units of the directionality control apparatus 3 operate.

The recorder apparatus 4 stores image data captured by the PTZ camera apparatus 1 and audio data of sound collected by the omnidirectional microphone array apparatus 2 in correlation with each other.

Next, a summary of an operation of the sound collection system 10 of the present embodiment will be described with reference to FIGS. 48(A) and 48(B). FIG. 48(A) is a diagram illustrating an operation summary of the sound collection system 10 of the present embodiment. FIG. 48(B) is a diagram illustrating a state in which a volume level of voice of a person who is present in a sound collection direction which is directed from the omnidirectional microphone array apparatus 2 toward the target sound source position A corresponding to the designated position A' which is designated in captured image data displayed on the display device 36 is output so as to be higher than a volume level of sound output from a speaker device SP which is not present in the sound collection direction.

In the sound collection system 10 illustrated in FIG. 48(A), the PTZ camera apparatus 1 images target objects (for example, two people) present near the target sound source position A and the speaker device SP which is installed at a position far from the target sound source position A. In addition, the omnidirectional microphone array apparatus 2 collects sound in a sound collection region in which the sound collection system 10 is installed. In FIG. 48(A), the two people who are sound collection target objects are having conversations, and the speaker device SP is outputting music (♪~) as sound. Image data captured by the PTZ camera apparatus 1 is displayed on the display device 36 of the directionality control apparatus 3 (refer to FIG. 48(B)).

Here, if the position A' which is a substantially central position of the two people who are target objects is designated, for example, with the finger FG of the user in captured image data displayed on the display device 36, the directionality control apparatus 3 computes sound collection direction coordinates ($\theta_{MAh}, \theta_{MAv}$) indicating a sound collection direction which is directed from the installation position of the omnidirectional microphone array apparatus 2 toward the target sound source position A by using coordinate data indicating the position A'. The omnidirectional microphone array apparatus 2 forms sound collection directionality (sound collection direction MIX) in the sound collection direction which is directed from the microphone array apparatus 2 toward the target sound source position A by using the sound collection direction coordinates ($\theta_{MAh}, \theta_{MAv}$) computed by the directionality control apparatus 3.

Therefore, the omnidirectional microphone array apparatus 2 can increase a volume level of a conversation (Hello) of the two people present in the direction in which the sound collection directionality (sound collection direction MIX) is formed higher than a volume level of the music (♪~) output from the speaker device SP which is not present in the direction in which the sound collection directionality (sound collection direction MIX) is formed.

Consequently, the directionality control apparatus 3 causes the speaker device 37 to output sound with a volume level of the conversation (Hello) of the two people present in the direction in which the sound collection directionality (sound collection direction MIX) is formed higher than a volume level of the music (♪~) output from the speaker device SP which is not present in the direction in which the sound collection directionality (sound collection direction MIX) is formed (refer to FIG. 48(B)).

Figure 49:
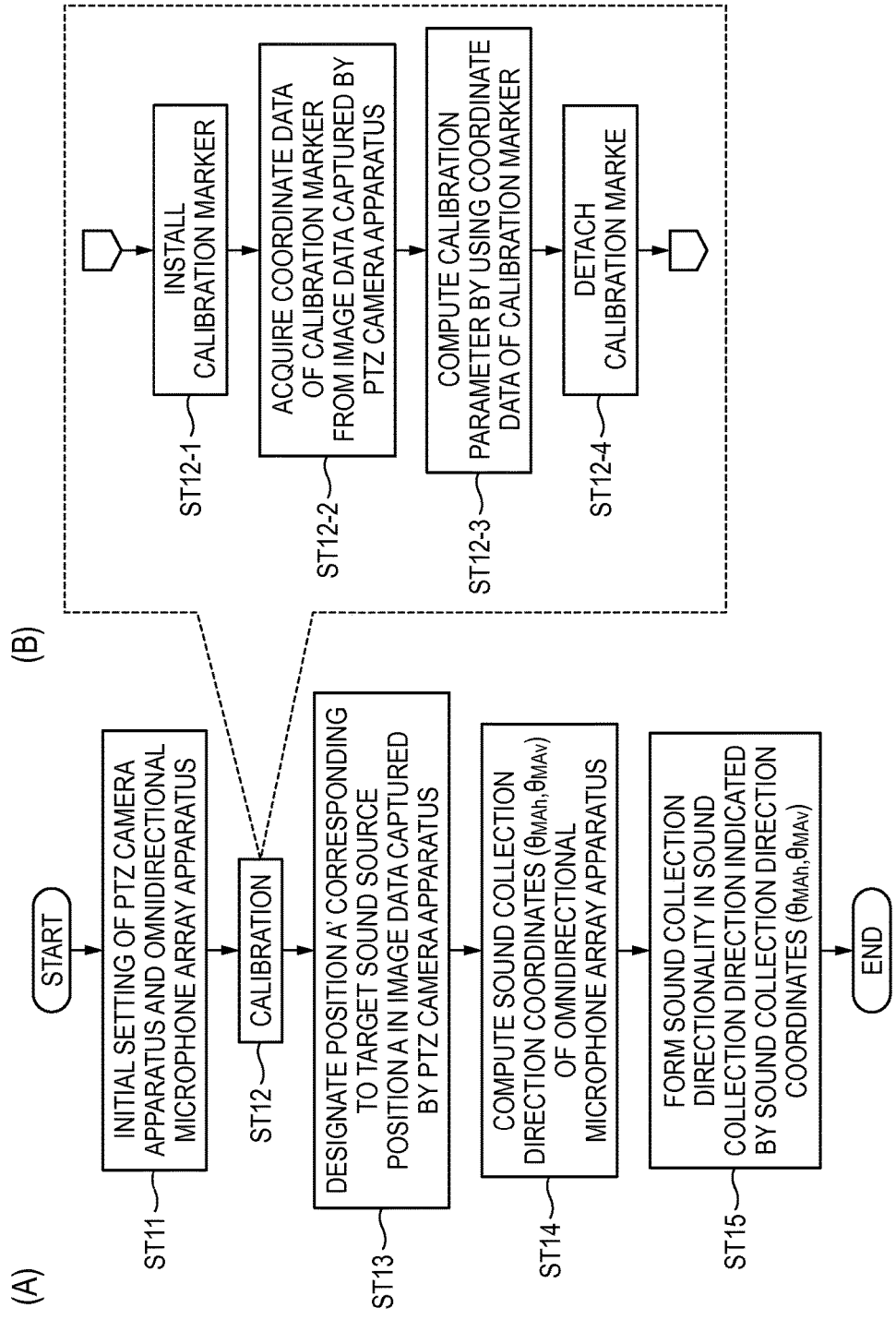
FIG. 49(A) is a flowchart illustrating the entire operation procedure in the sound collection system of the eleventh embodiment.
FIG. 49(B) is a flowchart specifically illustrating a calibration operation procedure in the sound collection system of the eleventh embodiment.

Next, with reference to FIGS. 49(A) and 49(B), a description will be made of a specific operation procedure in the sound collection system 10 of the present embodiment. FIG. 49(A) is a flowchart illustrating the entire operation procedure in the sound collection system 10 of the present embodiment. FIG. 49(B) is a flowchart specifically illustrating a calibration operation procedure in the sound collection system 10 of the present embodiment. Here, the calibration is required for the directionality control apparatus 3 to compute sound collection direction coordinates ($\theta_{MAh}, \theta_{MAv}$) and is defined as an operation of computing or acquiring predetermined different calibration parameters for each calibration method.

In FIG. 49(A), the PTZ camera apparatus 1 and the omnidirectional microphone array apparatus 2 constituting the sound collection system 10 of the present embodiment are initially installed so as to be fixed at predetermined positions (for example, a ceiling surface of a room of an event hall or a stand) (step ST11).

After the PTZ camera apparatus 1 and the omnidirectional microphone array apparatus 2 are initially installed, the sound collection direction computation section 34 performs a process of computing or acquiring a calibration parameter which is required to compute the sound collection direction coordinates ($\theta_{MAh}, \theta_{MAv}$), that is, calibration (step ST12).

Here, processing content of the calibration will be described with reference to FIG. 49(B). In the present embodiment, a plurality of calibration methods will be described with reference to FIG. 50 and the subsequent drawings, and, in FIG. 49(B), the content which is common to the calibration methods will be described. In addition, in each calibration method, at least one of the calibration markers MAK and MAK3 or the calibration floor marker MAK2 is used, but, in FIG. 49(B), a description will be made of a case where, for example, the calibration marker MAK is used.

In FIG. 49(B), the calibration marker MAK is installed (step ST12-1). The calibration marker MAK, which is a solid object or a circular object such as a marker (for example, a ball or a paper sheet) used for each calibration method, is installed so as to be included in an imaging viewing angle of the PTZ camera apparatus 1 and is thus displayed on the display device 36.

After step ST12-1, if the calibration marker MAK displayed on the display device 36 is designated with the finger FG of the user, the operation unit 32 acquires coordinate data regarding the designated position and outputs the coordinate data to the signal processing unit 33 (step ST12-2).

If the coordinate data regarding the calibration marker MAK displayed on the display device 36 is acquired from the operation unit 32, the sound collection direction computation section 34 transmits the coordinate data to the PTZ camera apparatus 1 via the communication unit 31. The PTZ camera apparatus 1 computes parameters of a distance and a direction from the installation position of the PTZ camera apparatus 1 to the calibration marker MAK, and transmits the parameters to the directionality control apparatus 3. The communication unit 31 receives the parameters of the distance and the direction from the installation position of the PTZ camera apparatus 1 to the calibration marker MAK from the PTZ camera apparatus 1, and outputs the parameters to the signal processing unit 33. The sound collection direction computation section 34 acquires the parameters of the distance and the direction from the installation position of the PTZ camera apparatus 1 to the calibration marker MAK from the communication unit 31.

The sound collection direction computation section 34 computes a calibration parameter which differs for each calibration method (which will be described later) by using the parameters of the distance and the direction from the installation position of the PTZ camera apparatus 1 to the calibration marker MAK (step ST12-3). After step ST12-3, the calibration marker MAK installed in step ST12-1 is detached (step ST12-4). In addition, the sound collection direction computation section 34 temporarily preserves the calibration parameter computed in step ST12-3 in the memory 38. In the above-described way, the calibration process shown in step ST12 is completed.

In FIG. 49(A), the operation unit 32 acquires coordinate data regarding a region where the user desires to increase a volume level, that is, the designated position A' corresponding to the target sound source position A in the captured image data (refer to FIG. 48(B)) obtained by the PTZ camera apparatus 1 and displayed on the display device 36, and outputs the coordinate data to the signal processing unit 33 (step ST13).

If the coordinate data regarding the designated position A' is acquired from the operation unit 32, the sound collection direction computation section 34 transmits the coordinate data to the PTZ camera apparatus 1 via the communication unit 31. The PTZ camera apparatus 1 receives the coordinate data regarding the designated position A' in the captured image data from the directionality control apparatus 3, and computes parameters of a distance and a direction from the installation position of the PTZ camera apparatus 1 to the target sound source position A corresponding to the designated position A'. The PTZ camera apparatus 1 transmits the parameters of the distance and the direction from the installation position of the PTZ camera apparatus 1 to the target sound source position A corresponding to the designated position A', to the directionality control apparatus 3. The sound collection direction computation section 34 acquires the parameters of the distance and the direction from the installation position of the PTZ camera apparatus 1 to the target sound source position A from the communication unit 31.

The sound collection direction computation section 34 computes the sound collection direction coordinates ($\theta_{MAh}$, $\theta_{MAv}$) indicating a sound collection direction which is directed from the installation position of the omnidirectional microphone array apparatus 2 toward the target sound source position A by using the parameters of the distance and the direction from the installation position of the PTZ camera apparatus 1 to the target sound source position A and the calibration parameter computed during the calibration in step ST12 (step ST14).

The output control section 35 generates an directionality formation instruction for forming directionality of sound in the sound collection direction indicated by the coordinate data of the sound collection direction coordinates ($\theta_{MAh}$, $\theta_{MAv}$) computed in step ST14, and transmits the directionality formation instruction including the coordinate data of the sound collection direction coordinates ($\theta_{MAh}$, $\theta_{MAv}$) to the omnidirectional microphone array apparatus 2 via the communication unit 31. The omnidirectional microphone array apparatus 2 forms the sound collection directionality of each of the microphone units 22 and 23 in the sound collection direction MIX indicated by the sound collection direction coordinates ($\theta_{MAh}$, $\theta_{MAv}$) included in the directionality formation instruction in response to the directionality formation instruction transmitted from the directionality control apparatus 3 (step ST15). In the above-described way, the operation of the sound collection system 10 of the present embodiment is finished.

In addition, the omnidirectional microphone array apparatus 2 has been described as the omnidirectional microphone array apparatus 2 performing the process of forming the sound collection directionality shown in step ST15 in response to the directionality formation instruction transmitted from the directionality control apparatus 3, but the directionality control apparatus 3 may performing the process of forming the sound collection directionality shown in step ST15. Specifically, the output control section 35 performs the directionality forming process described with reference to FIG. 3 by using the coordinate data of the sound collection direction coordinates ($\theta_{MAh}$, $\theta_{MAv}$) computed in step ST14 and the audio data of sound collected by the omnidirectional microphone array apparatus 2. Consequently, the directionality control apparatus 3 can easily obtain audio data in which the sound collection directionality is formed in the sound collection direction MIX indicated by the sound collection direction coordinates ($\theta_{MAh}$, $\theta_{MAv}$) with high accuracy.

In addition, in the sound collection system 10 of the present embodiment, a timing at which the omnidirectional microphone array apparatus 2 collects sound is not limited to the time right after step ST14, and may be, for example, the time after power is supplied to the omnidirectional microphone array apparatus 2 after the initial setting is performed in step ST11.

(Method of Computing Sound Collection Direction Coordinates ($\theta_{MAh}$, $\theta_{MAv}$) According to Calibration Method)

Next, with reference to FIGS. 50 to 79, a detailed description will be made of a method of computing a calibration parameter which differs for each calibration method and the sound collection directional direction coordinates ($\theta_{MAh}$, $\theta_{MAv}$) in the sound collection direction computation section 34 of the directionality control apparatus 3. Herein, a description will be made of a total of ten computation methods, that is, ten methods of computing calibration parameters, and a description will be made of a total of four methods of computing the sound collection direction coordinates ($\theta_{MAh}$, $\theta_{MAv}$). In addition, any one of the total of ten methods of computing calibration parameters corresponds to any one of the total of four methods of computing the sound collection direction coordinates ($\theta_{MAh}, \theta_{MAv}$).

(First Method of Computing Sound Collection Direction Coordinates According to First Calibration Method)

First, with reference to FIG. 50, FIGS. 51(A) to 51(C), FIGS. 52(A) to 52(C), and FIGS. 53(A) to 53(C), a description will be made of a first calibration method, and a first method of computing sound collection direction coordinates after computing a calibration parameter according to the first calibration method.

Figure 50:
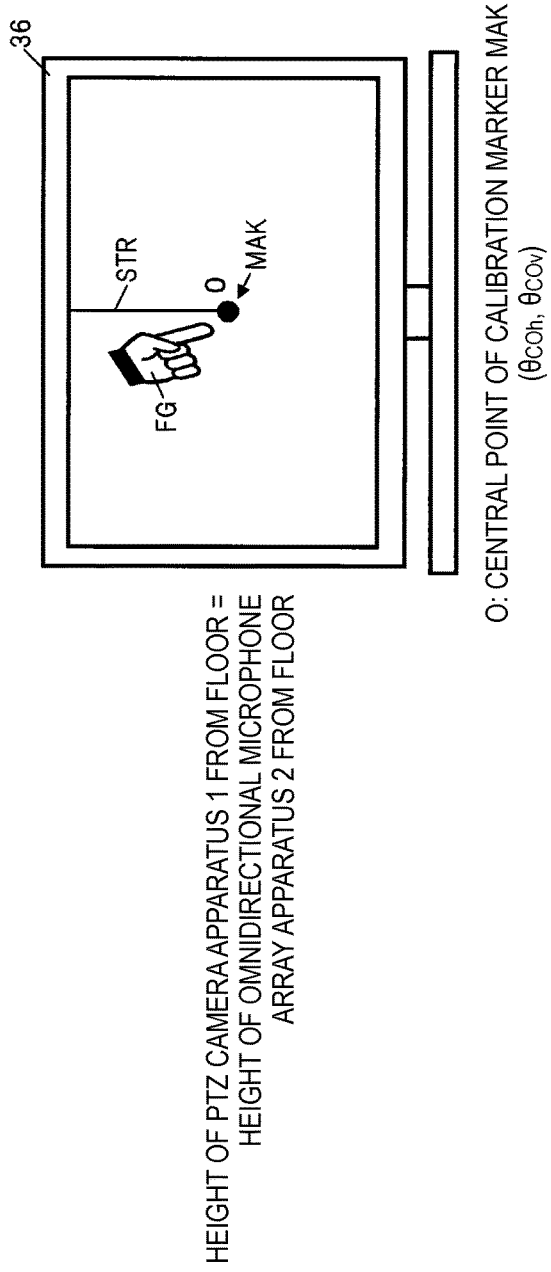
FIG. 50 is a diagram illustrating a first calibration method in the eleventh embodiment.
Figure 51:
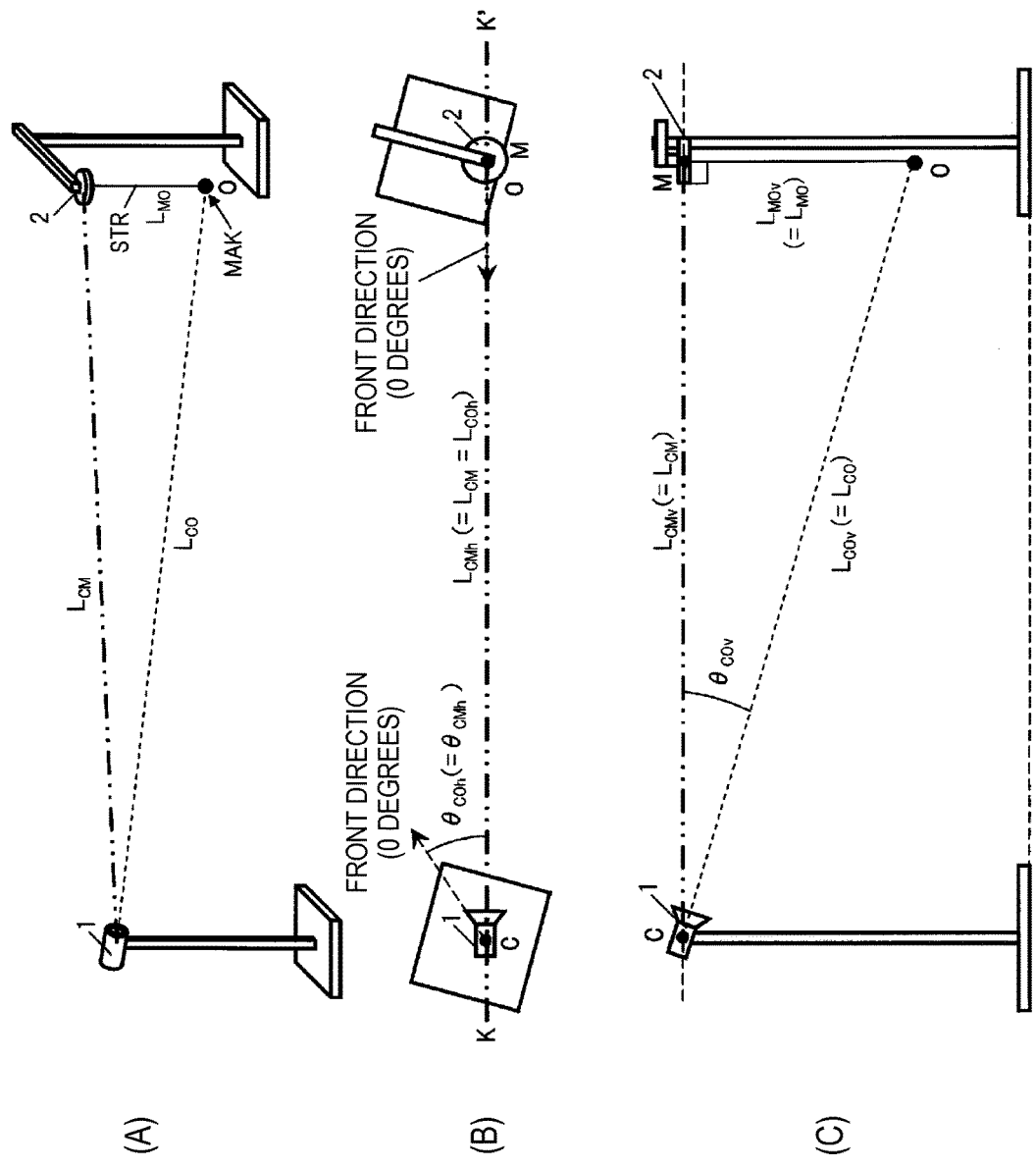
FIG. 51(A) is a diagram illustrating a positional relationship between a PTZ camera apparatus 1, an omnidirectional microphone array apparatus 2, and a calibration marker MAK in the first calibration method.
FIG. 51(B) is a horizontal direction plan view of FIG. 51(A)
FIG. 51(C) is a vertical direction sectional view taken along the line K-K' of FIG. 51(B).
Figure 52:
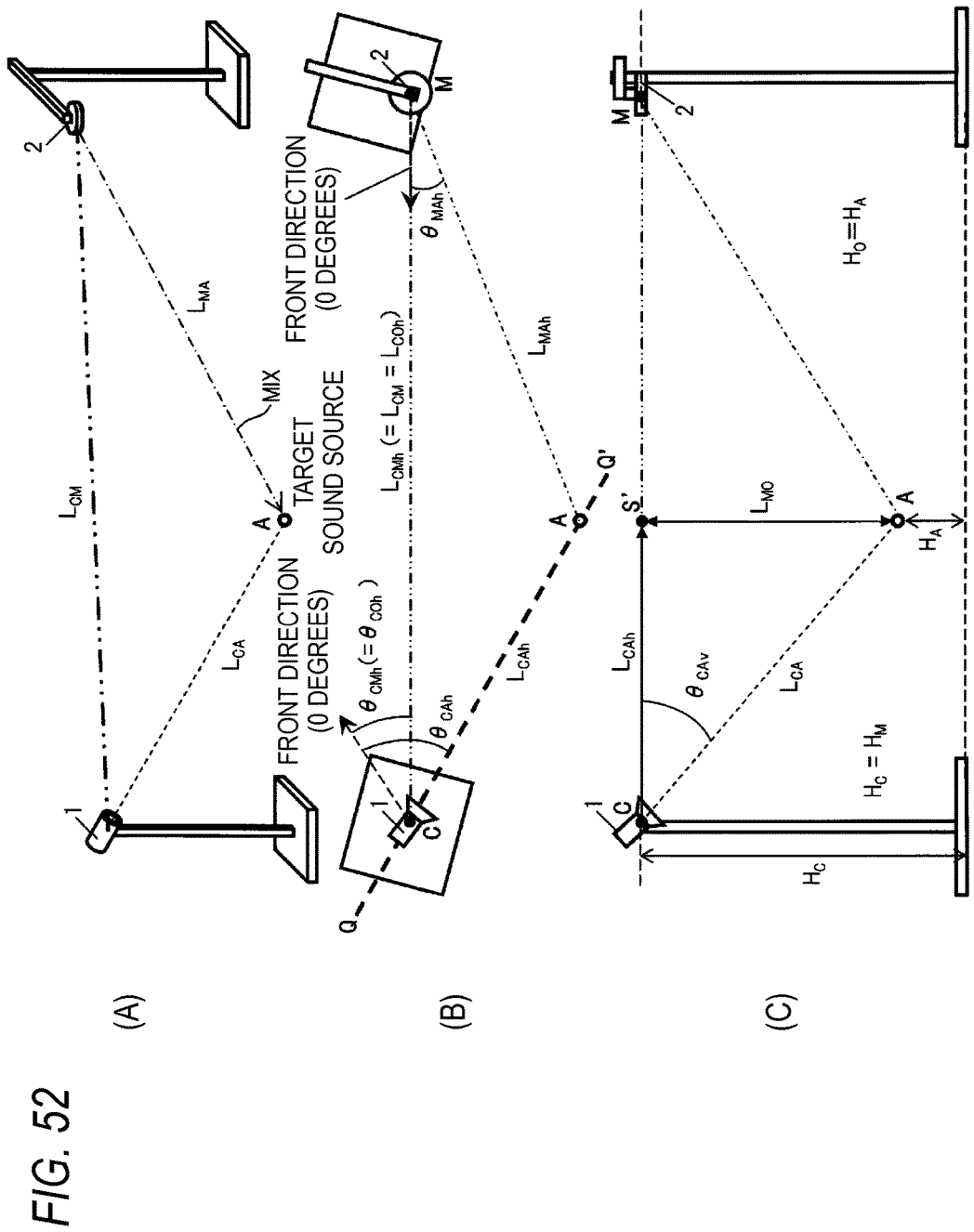
FIG. 52(A) is a diagram illustrating a positional relationship between the PTZ camera apparatus 1, the omnidirectional microphone array apparatus 2, and the target sound source position A in the first calibration method.
FIG. 52(B) is a horizontal direction plan view of FIG. 52(A)
FIG. 52(C) is a vertical direction sectional view taken along the line Q-Q' of FIG. 52(B).
Figure 53:
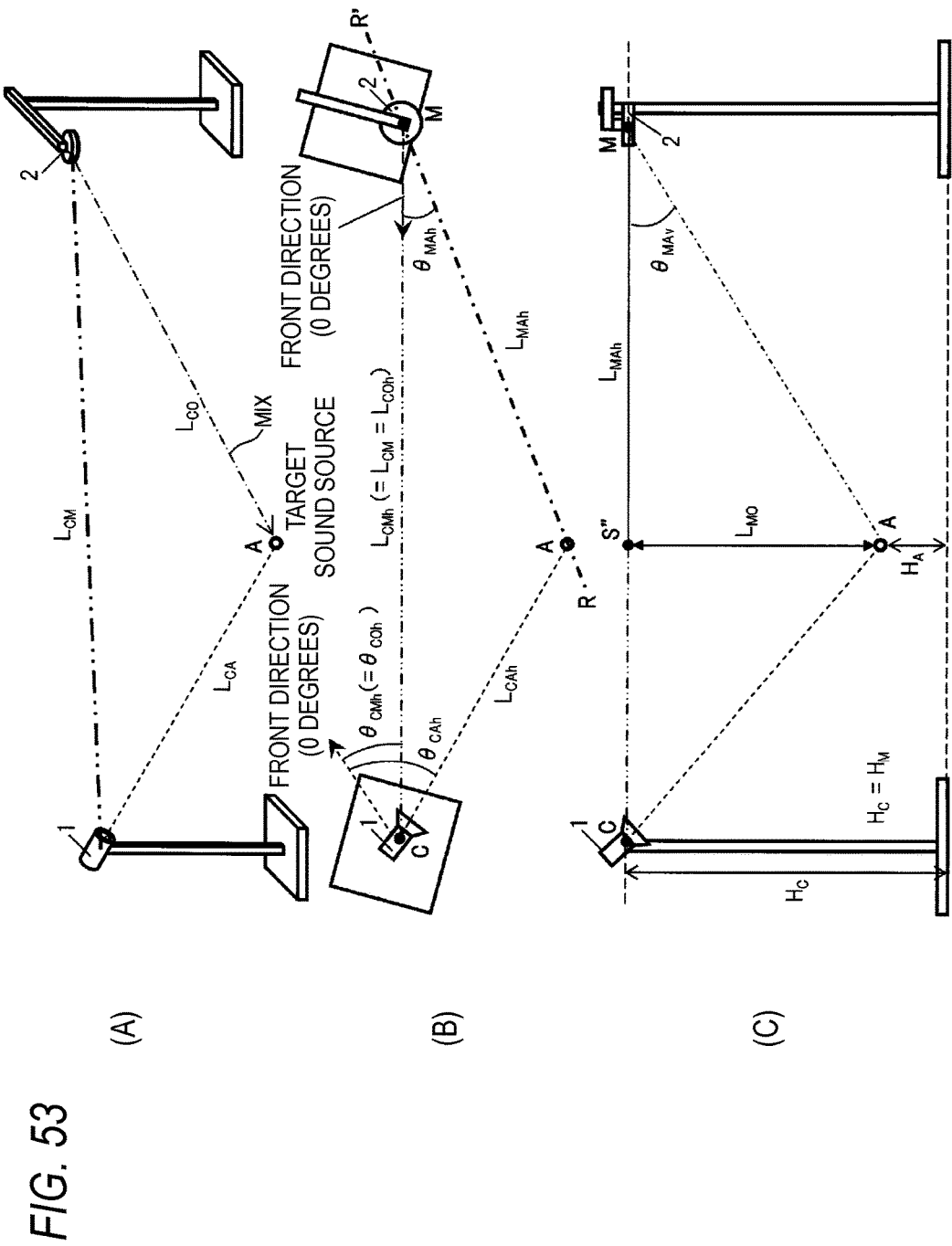
FIG. 53(A) is a diagram illustrating a positional relationship between the PTZ camera apparatus 1, the omnidirectional microphone array apparatus 2, and the target sound source position A in the first calibration method.
FIG. 53(B) is a horizontal direction plan view of FIG. 53(A)
FIG. 53(C) is a vertical direction sectional view taken along the line R-R' of FIG. 53(B).

FIG. 50 is a diagram illustrating the first calibration method in the eleventh embodiment. FIG. 51(A) is a diagram illustrating a positional relationship between the PTZ camera apparatus 1, the omnidirectional microphone array apparatus 2, and the calibration marker MAK in the first calibration method. FIG. 51(B) is a horizontal direction plan view of FIG. 51(A). FIG. 51(C) is a vertical direction sectional view taken along the line K-K' of FIG. 51(B).

FIG. 52(A) is a diagram illustrating a positional relationship between the PTZ camera apparatus 1, the omnidirectional microphone array apparatus 2, and the target sound source position A in the first calibration method. FIG. 52(B) is a horizontal direction plan view of FIG. 52(A). FIG. 52(C) is a vertical direction sectional view taken along the line Q-Q' of FIG. 52(B). FIG. 53(A) is a diagram illustrating a positional relationship between the PTZ camera apparatus 1, the omnidirectional microphone array apparatus 2, and the target sound source position A in the first calibration method. FIG. 53(B) is a horizontal direction plan view of FIG. 53(A). FIG. 53(C) is a vertical direction sectional view taken along the line R-R' of FIG. 53(B).

In the first calibration method, the PTZ camera apparatus 1 is driven in a panning direction and a tilting direction and then focuses and zooms the calibration marker MAK, and thus the calibration marker MAK is located at a central point of a screen of the display device 36 (refer to FIG. 50).

In the first calibration method, respective heights of the PTZ camera apparatus 1 and the omnidirectional microphone array apparatus 2 from a horizontal surface (for example, a floor in the store; this is also the same for the following description, and the floor is an example of the horizontal surface) are the same as each other, and the calibration marker MAK which is a solid object is suspended vertically downward directly under a predetermined position (for example, the center of a casing of the omnidirectional microphone array apparatus 2; this is also the same for the following description) of the omnidirectional microphone array apparatus 2 by using a string STR or a cord (refer to FIG. 51(A)). A distance $L_{MO}$ from the omnidirectional microphone array apparatus 2 to the calibration marker MAK is constant. A calibration parameter in the first calibration method is a horizontal direction distance $L_{CMh}$ between the PTZ camera apparatus 1 and the omnidirectional microphone array apparatus 2.

If a central point O (refer to FIG. 50) of the calibration marker MAK displayed on the display device 36 is designated with the finger FG of the user, the sound collection direction computation section 34 computes the horizontal direction distance $L_{CMh}$ between the PTZ camera apparatus 1 and the omnidirectional microphone array apparatus 2 by using the distance $L_{MO}$ between the omnidirectional microphone array apparatus 2 and the calibration marker MAK. With reference to FIGS. 51(B) and 51(C), a detailed description will be made of a method of computing the horizontal direction distance $L_{CMh}$ in the sound collection direction computation section 34.

In the following description of each calibration method, it is assumed that a front direction in which a horizontal angle from the PTZ camera apparatus 1 is 0 degrees is not a direction which is directed from the PTZ camera apparatus 1 toward the omnidirectional microphone array apparatus 2, and a front direction in which a horizontal angle from the omnidirectional microphone array apparatus 2 is 0 degrees is a direction which is directed from the omnidirectional microphone array apparatus 2 toward the PTZ camera apparatus 1 (refer to FIG. 51(B)).

In description of the following first to fifth calibration methods, the respective heights of the PTZ camera apparatus 1 and the omnidirectional microphone array apparatus 2 from the floor are the same as each other (refer to FIG. 51(C)). For this reason, both a vertical angle $\theta_{CMv}$ which is directed from the PTZ camera apparatus 1 toward the omnidirectional microphone array apparatus 2 and a vertical angle $\theta_{CMv}$ which is directed from the omnidirectional microphone array apparatus 2 toward the PTZ camera apparatus 1 are zero ($\theta_{CMv} = \theta_{MCv} = 0$).

If the central point O (refer to FIG. 50) of the calibration marker MAK displayed on the display device 36 is designated with the finger FG of the user, the sound collection direction computation section 34 acquires a horizontal angle $\theta_{COh}$ and a vertical angle $\theta_{COv}$ which are directed from the PTZ camera apparatus 1 toward the calibration marker MAK. Data of the horizontal angle $\theta_{COh}$ and the vertical angle $\theta_{COv}$ is computed by the PTZ camera apparatus 1 and is then transmitted from the PTZ camera apparatus 1 to the directionality control apparatus 3. In addition, since the calibration marker MAK is suspended vertically downward directly under a predetermined position of the omnidirectional microphone array apparatus 2, the horizontal angle $\theta_{COh}$ which is directed from the PTZ camera apparatus 1 toward the calibration marker MAK is the same as a horizontal angle $\theta_{CMh}$ which is directed from the PTZ camera apparatus 1 toward the omnidirectional microphone array apparatus 2 ($\theta_{COh} = \theta_{CMh}$).

The sound collection direction computation section 34 computes the horizontal direction distance $L_{CMh}$ between the PTZ camera apparatus 1 and the omnidirectional microphone array apparatus 2 according to Equation (78) by using the vertical angle $\theta_{COv}$ which is directed from the PTZ camera apparatus 1 to the calibration marker MAK, and the distance $L_{MO}$ from the omnidirectional microphone array apparatus 2 to the calibration marker MAK in the triangle COM illustrated in FIG. 51(C). In addition, since the calibration marker MAK is suspended vertically downward directly under a predetermined position of the omnidirectional microphone array apparatus 2, the horizontal direction distance $L_{COh}$ which is directed from the PTZ camera apparatus 1 toward the calibration marker MAK is the same as the horizontal direction distance $L_{CMh}$ between the PTZ camera apparatus 1 and the omnidirectional microphone array apparatus 2 ($L_{COh} = L_{CMh}$).

[Equation 84]

$$L_{COh} = L_{CMh} = L_{MO}/\tan\theta_{COv} \qquad (84)$$

Next, in the first method of computing the sound collection direction coordinates ($\theta_{MAh}, \theta_{MAv}$), respective heights of the calibration marker MAK and the target sound source position A from the floor are the same as each other ($H_O = H_A$), and the respective heights of the PTZ camera apparatus 1 and the omnidirectional microphone array apparatus 2 from the floor are the same as each other.

Specifically, the sound collection direction computation section 34 computes the sound collection direction coordinates ($\theta_{MAh}, \theta_{MAv}$) indicating a sound collection direction which is directed from the omnidirectional microphone array apparatus 2 toward the target sound source position A by using:

(1) the horizontal angle $\theta_{CMh}$ which is directed from the PTZ camera apparatus 1 toward the omnidirectional microphone array apparatus 2;

(2) the horizontal direction distance $L_{CMh}$ between the PTZ camera apparatus 1 and the omnidirectional microphone array apparatus 2;

(3) the horizontal angle $\theta_{MCh}$ which is directed from the omnidirectional microphone array apparatus 2 toward the PTZ camera apparatus 1; and (4) a horizontal angle $\theta_{CAh}$ and a vertical angle $\theta_{CAv}$ which are directed from the PTZ camera apparatus 1 toward the target sound source position A. With reference to FIGS. 52(B) and 52(C) and FIGS. 53(B) and 53(C), a detailed description will be made of the first method of computing the sound collection direction coordinates ($\theta_{MAh}, \theta_{MAv}$) in the sound collection direction computation section 34.

(1) As the horizontal angle $\theta_{CMh}$ which is directed from the PTZ camera apparatus 1 toward the omnidirectional microphone array apparatus 2, a value computed by the PTZ camera apparatus 1 in the first calibration method is used ($\theta_{CMh} = \theta_{COh}$).

(2) The horizontal direction distance $L_{CMh}$ between the PTZ camera apparatus 1 and the omnidirectional microphone array apparatus 2 is a calibration parameter in the first calibration method (refer to Equation (84)).

(3) The horizontal angle $\theta_{MCh}$ which is directed from the omnidirectional microphone array apparatus 2 toward the PTZ camera apparatus 1 is a predefined value (zero) obtained based on a positional relationship between the PTZ camera apparatus 1 and the omnidirectional microphone array apparatus 2 in the first calibration method.

(4) As the horizontal angle $\theta_{CAh}$ and the vertical angle $\theta_{CAv}$ from the PTZ camera apparatus 1 to the target sound source position A, values are used which are computed by the PTZ camera apparatus 1 in response to designation of the designated position A' in captured image data displayed on the display device 36.

The sound collection direction computation section 34 computes a horizontal direction distance $L_{CAh}$ of the distance $L_{CA}$ between the PTZ camera apparatus 1 and the target sound source position A according to Equation (85) by using the distance $L_{MO}$ (=$L_{MOv}$) corresponding to a difference between the heights of the omnidirectional microphone array apparatus 2 and the target sound source position A from the floor, and the vertical angle $\theta_{CAv}$ which is directed from the PTZ camera apparatus 1 to the target sound source position A in the triangle CAS' illustrated in FIG. 52(C).

[Equation 85]

$$L_{CAh} = L_{MO}/\tan\theta_{CAv} \quad (85)$$

The sound collection direction computation section 34 computes a horizontal direction distance $L_{MAh}$ of the distance $L_{MA}$ from the omnidirectional microphone array apparatus 2 to the target sound source position A according to Equation (86) based on the cosine theorem for the triangle CAM illustrated in FIG. 52(B) by using the respective computation results of Equations (78) and (79), and an angle ($\theta_{CAh} - \theta_{CMh}$) corresponding to a difference between the horizontal angle $\theta_{CAh}$ which is directed from the PTZ camera apparatus 1 toward the target sound source position A and the horizontal angle $\theta_{CMh}$ which is directed from the PTZ camera apparatus 1 toward the omnidirectional microphone array apparatus 2.

[Equation 86]

$$L_{MAh} = \sqrt{L_{CAh}^2 + L_{CMh}^2 - 2L_{CAh} \times L_{CMh} \times \cos(\theta_{CAh} - \theta_{CMh})} \quad (86)$$

The sound collection direction computation section 34 computes a cosine value $\cos\theta_{MAh}$ of the horizontal angle $\theta_{MAh}$ which is directed from the omnidirectional microphone array apparatus 2 toward the target sound source position A according to Equation (87) based on the cosine theorem for the triangle CAM illustrated in FIG. 52(B) by using the respective computation results of Equations (84) to (86). Consequently, the sound collection direction computation section 34 can compute the horizontal angle $\theta_{MAh}$ which is directed from the omnidirectional microphone array apparatus 2 toward the target sound source position A according to Equation (88).

[Equation 87]

$$\cos\theta_{MAh} = \frac{L_{MAh}^2 + L_{CMh}^2 - L_{CAh}^2}{2L_{MAh} \times L_{CMh}} \quad (87)$$

[Equation 88]

$$\theta_{MAh} = \arccos\left(\frac{L_{MAh}^2 + L_{CMh}^2 - L_{CAh}^2}{2L_{MAh} \times L_{CMh}}\right) \quad (88)$$

In addition, the sound collection direction computation section 34 computes a tangent value $\tan\theta_{MAv}$ of the vertical angle $\theta_{MAv}$ which is directed from the omnidirectional microphone array apparatus 2 toward the target sound source position A according to Equation (89) based on a tangent for the triangle MAS" illustrated in FIG. 53(C) by using the computation result of Equation (86), and the distance $L_{MO}$ corresponding to the difference between the heights of the omnidirectional microphone array apparatus 2 and the target sound source position A from the floor. Consequently, the sound collection direction computation section 34 can compute the vertical angle $\theta_{MAv}$ which is directed from the omnidirectional microphone array apparatus 2 toward the target sound source position A according to Equation (90).

[Equation 89]

$$\tan\theta_{MAv} = \frac{L_{MO}}{L_{MAh}} \quad (89)$$

[Equation 90]

$$\theta_{MAv} = \arctan\left(\frac{L_{MO}}{L_{MAh}}\right) \quad (90)$$

As mentioned above, in the first calibration method and the first method of computing the sound collection direction coordinates ($\theta_{MAh}, \theta_{MAv}$), if the central point O of the calibration marker MAK displayed on the display device 36 is designated with the finger FG of the user, the sound collection direction computation section 34 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

In addition, the sound collection direction computation section 34 can easily compute the sound collection direction coordinates ($\theta_{MAh}, \theta_{MAv}$) indicating a sound collection direction which is directed from the omnidirectional microphone array apparatus 2 toward the target sound source position A without a user inputting the height $H_A$ of the target sound source position A from a horizontal surface during computation of the sound collection direction coordinates.

(Second Method of Computing Sound Collection Direction Coordinates According to Second Calibration Method)

Next, with reference to FIG. 54, FIGS. 55(A) to 55(C), FIG. 56(A) to 56(C), and FIGS. 57(A) to 57(C), a description will be made of a second calibration method, and a second method of computing sound collection direction coordinates after computing a calibration parameter according to the second calibration method.

Figure 54:
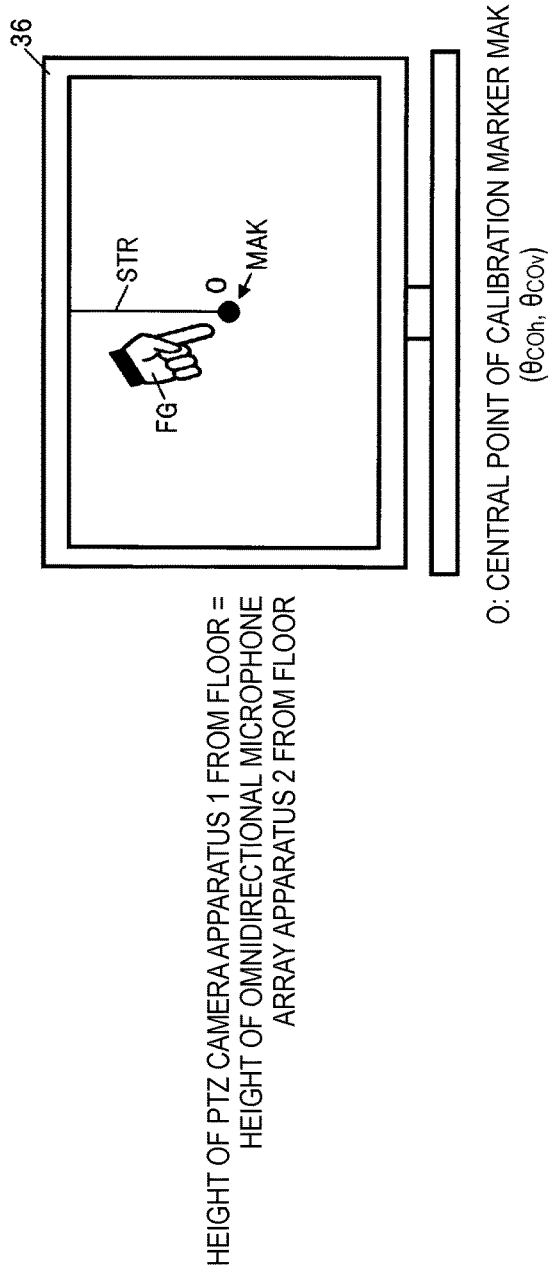
FIG. 54 is a diagram illustrating a second calibration method in the eleventh embodiment.
Figure 55:
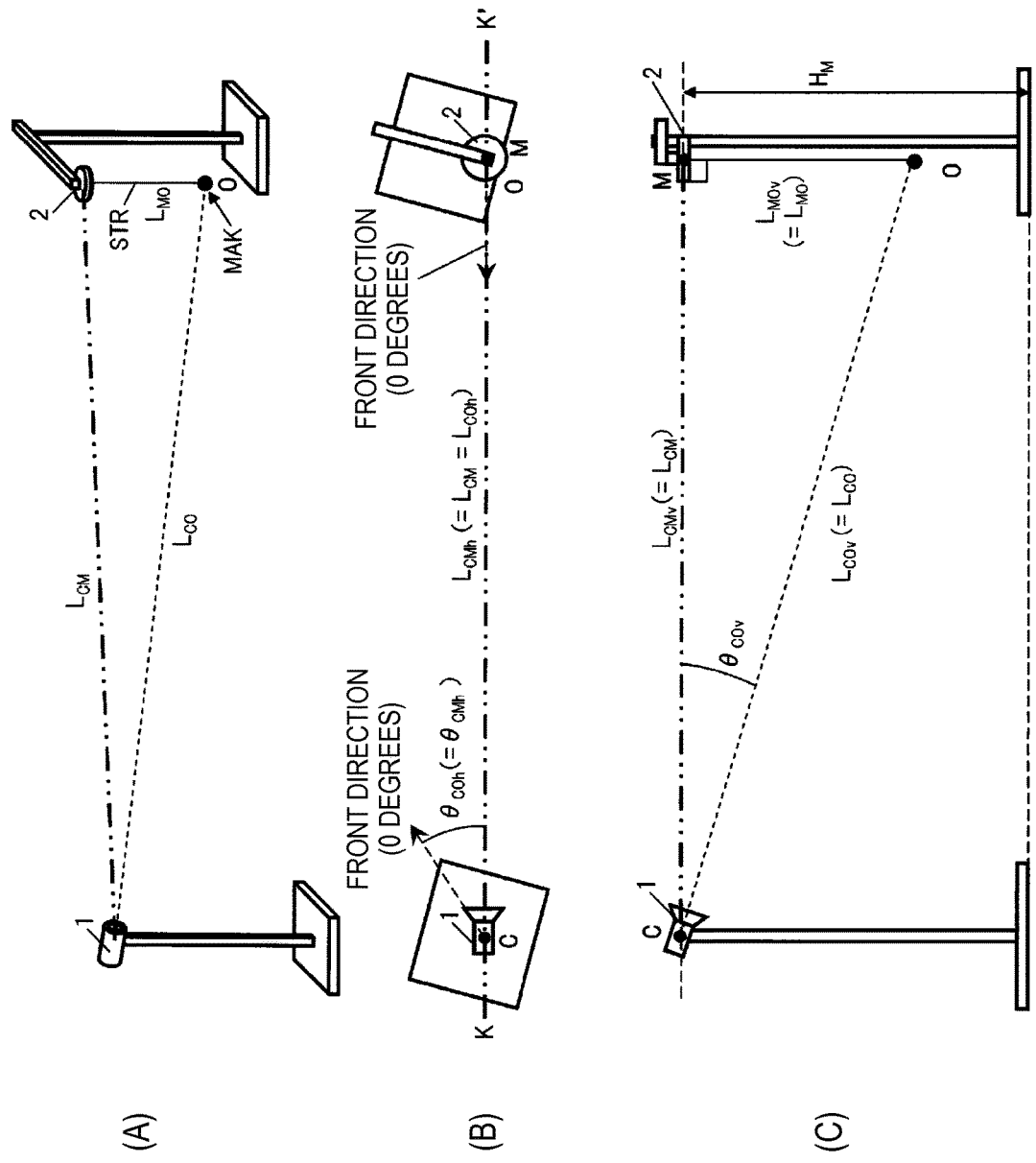
FIG. 55(A) is a diagram illustrating a positional relationship between the PTZ camera apparatus 1, the omnidirectional microphone array apparatus 2, and the calibration marker MAK in the second calibration method.
FIG. 55(B) is a horizontal direction plan view of FIG. 55(A)
FIG. 55(C) is a vertical direction sectional view taken along the line K-K' of FIG. 55(B).
Figure 56:
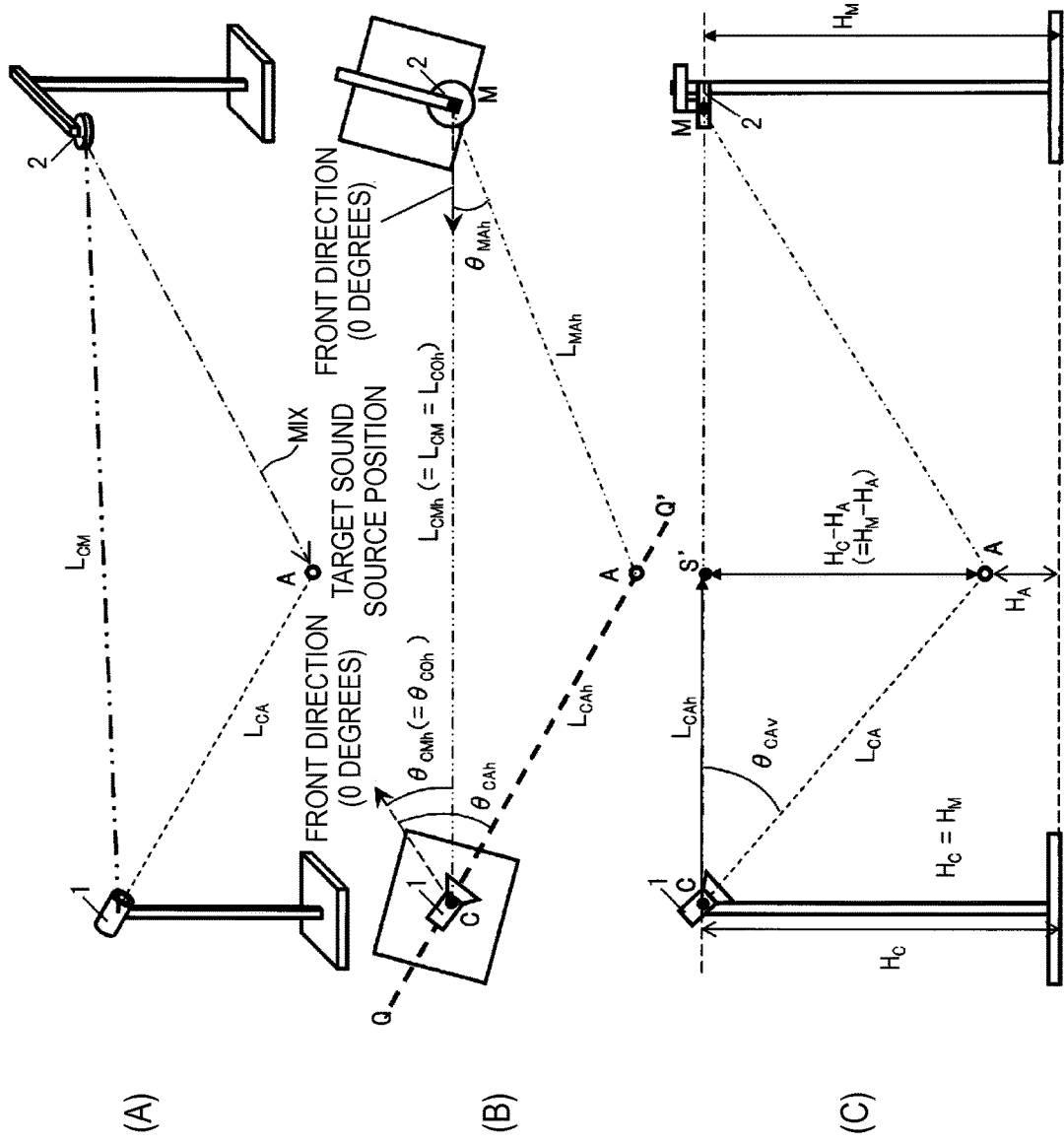
FIG. 56(A) is a diagram illustrating a positional relationship between the PTZ camera apparatus 1, the omnidirectional microphone array apparatus 2, and the target sound source position A in the second calibration method.
FIG. 56(B) is a horizontal direction plan view of FIG. 56(A)
FIG. 56(C) is a vertical direction sectional view taken along the line Q-Q' of FIG. 56(B).
Figure 57:
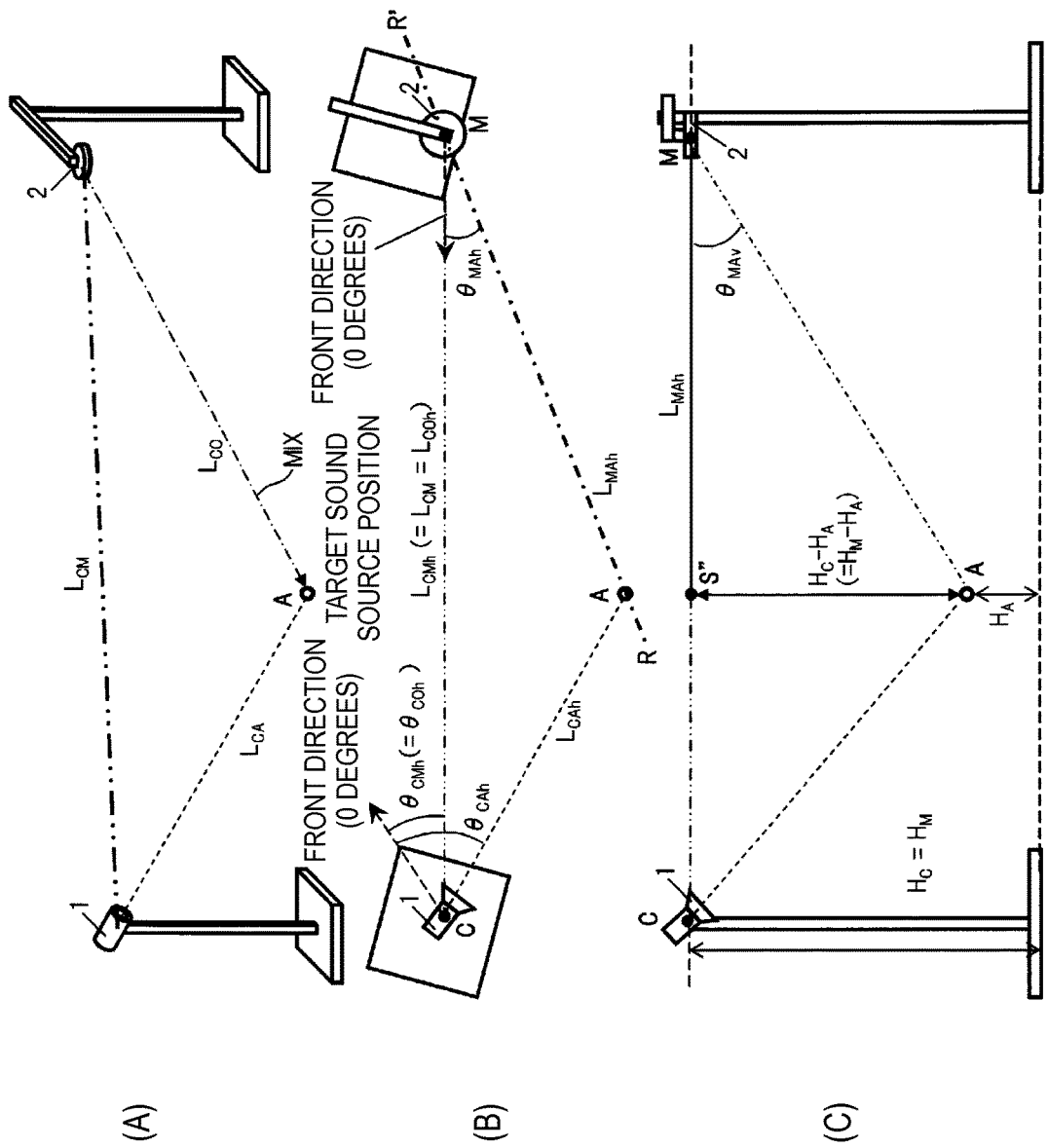
FIG. 57(A) is a diagram illustrating a positional relationship between the PTZ camera apparatus 1, the omnidirectional microphone array apparatus 2, and the target sound source position A in the second calibration method, FIG.
FIG. 57(C) is a vertical direction sectional view taken along the line R-R' of FIG. 57(B).
Figure 59:
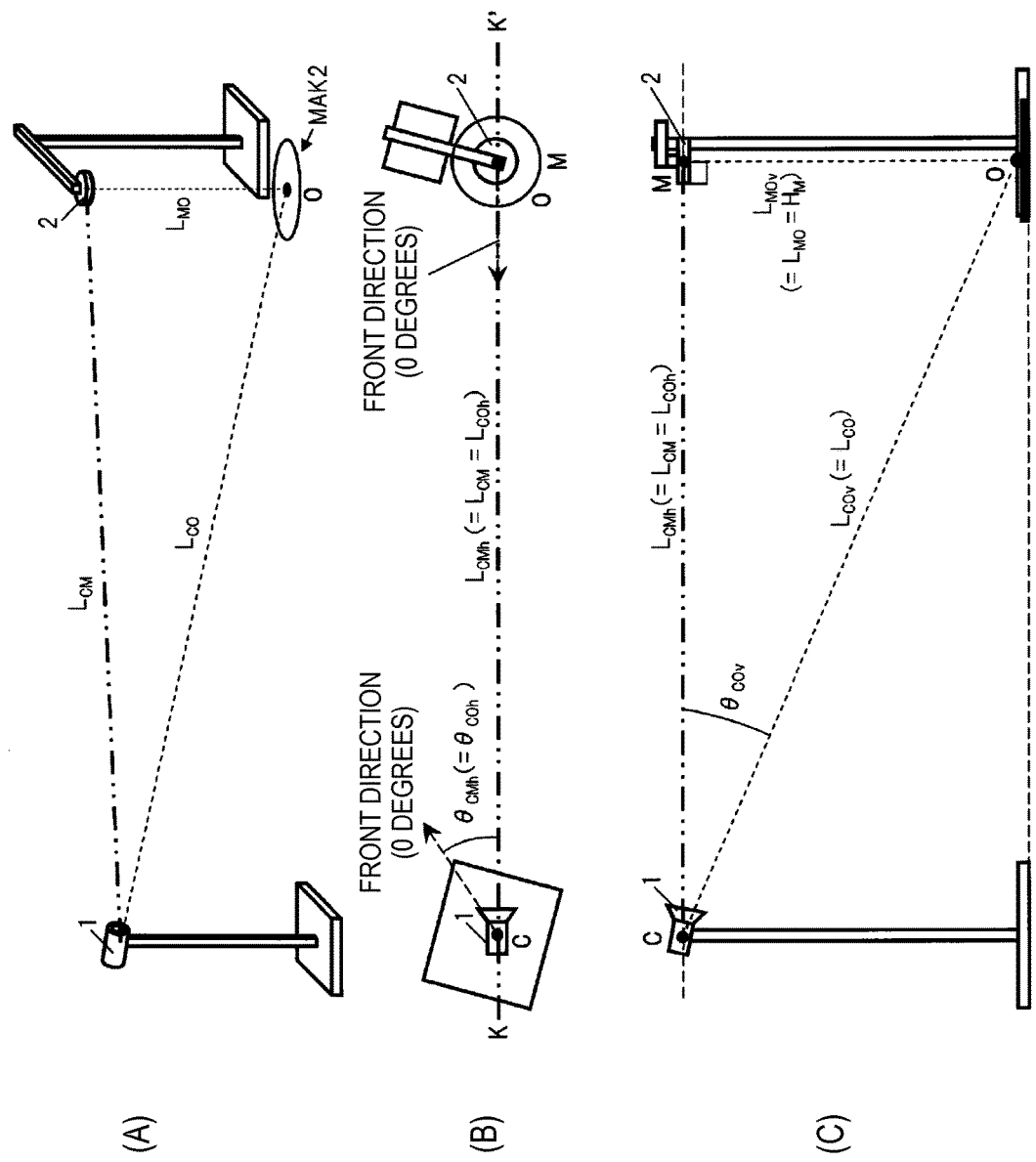
FIG. 59(A) is a diagram illustrating a positional relationship between the PTZ camera apparatus 1, the omnidirectional microphone array apparatus 2, and a calibration floor marker MAK2 in the third calibration method.
FIG. 59(B) is a horizontal direction plan view of FIG. 59(A)
FIG. 59(C) is a vertical direction sectional view taken along the line K-K' of FIG. 59(B).
Figure 61:
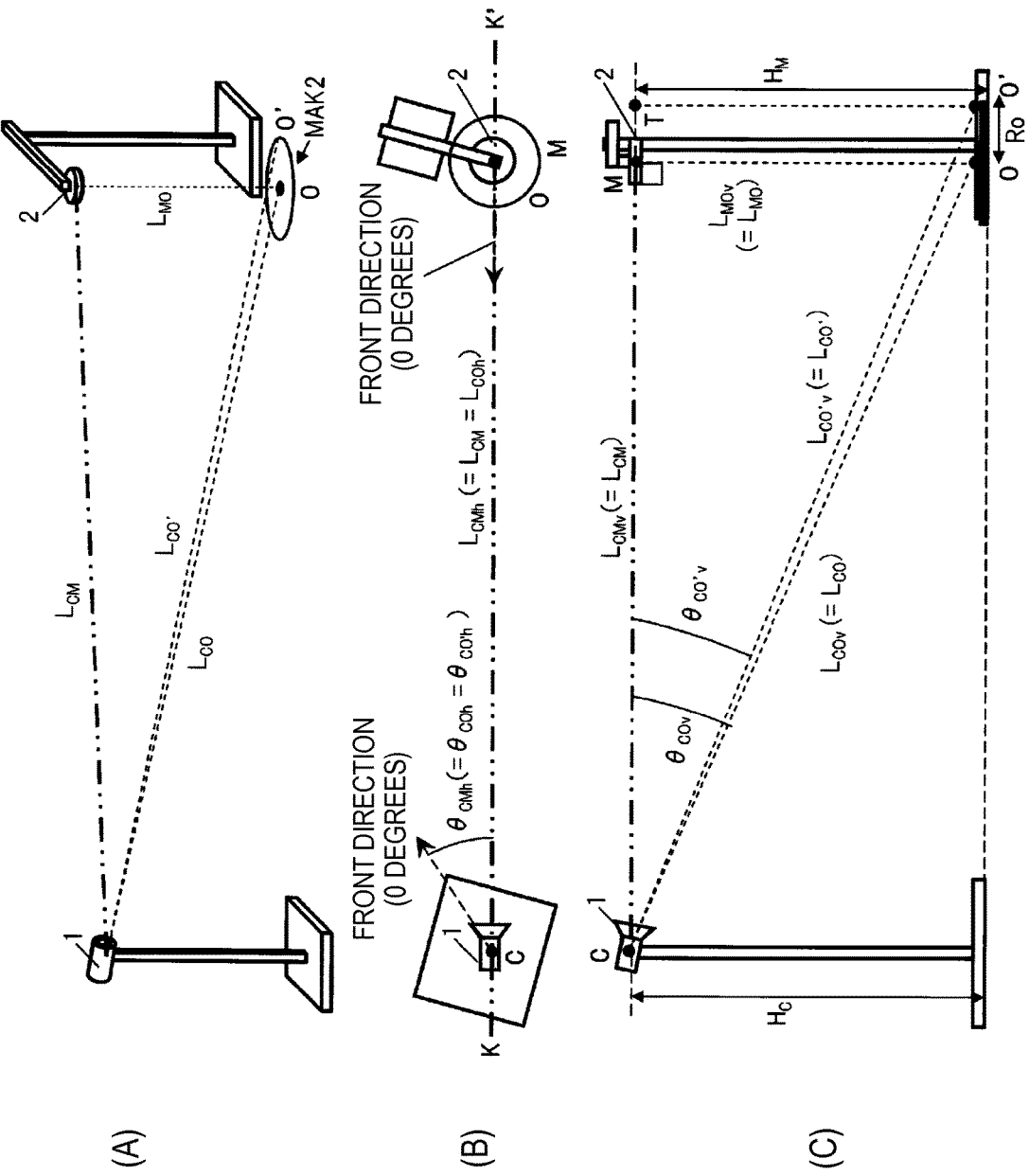
FIG. 61(A) is a diagram illustrating a positional relationship between the PTZ camera apparatus 1, the omnidirectional microphone array apparatus 2, and the calibration floor marker MAK2 in the fourth calibration method.
FIG. 61(B) is a horizontal direction plan view of FIG. 61(A)
FIG. 61(C) is a vertical direction sectional view taken along the line K-K' of FIG. 61(B).
Figure 65:
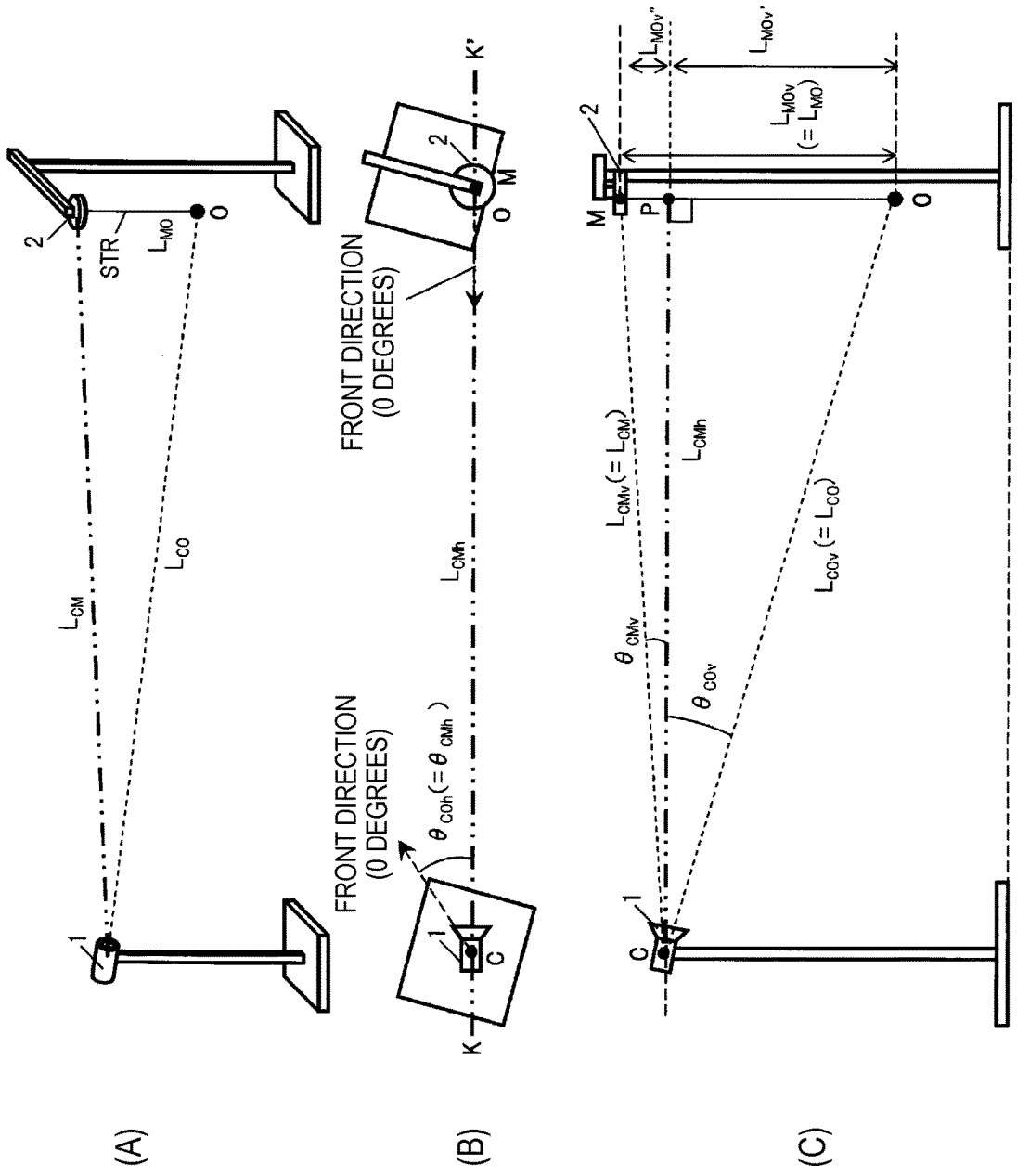
FIG. 65(A) is a diagram illustrating a positional relationship between the PTZ camera apparatus 1, the omnidirectional microphone array apparatus 2, and the calibration marker MAK in the sixth calibration method.
FIG. 65(B) is a horizontal direction plan view of FIG. 65(A)
FIG. 65(C) is a vertical direction sectional view taken along the line K-K' of FIG. 65(B).
Figure 66:
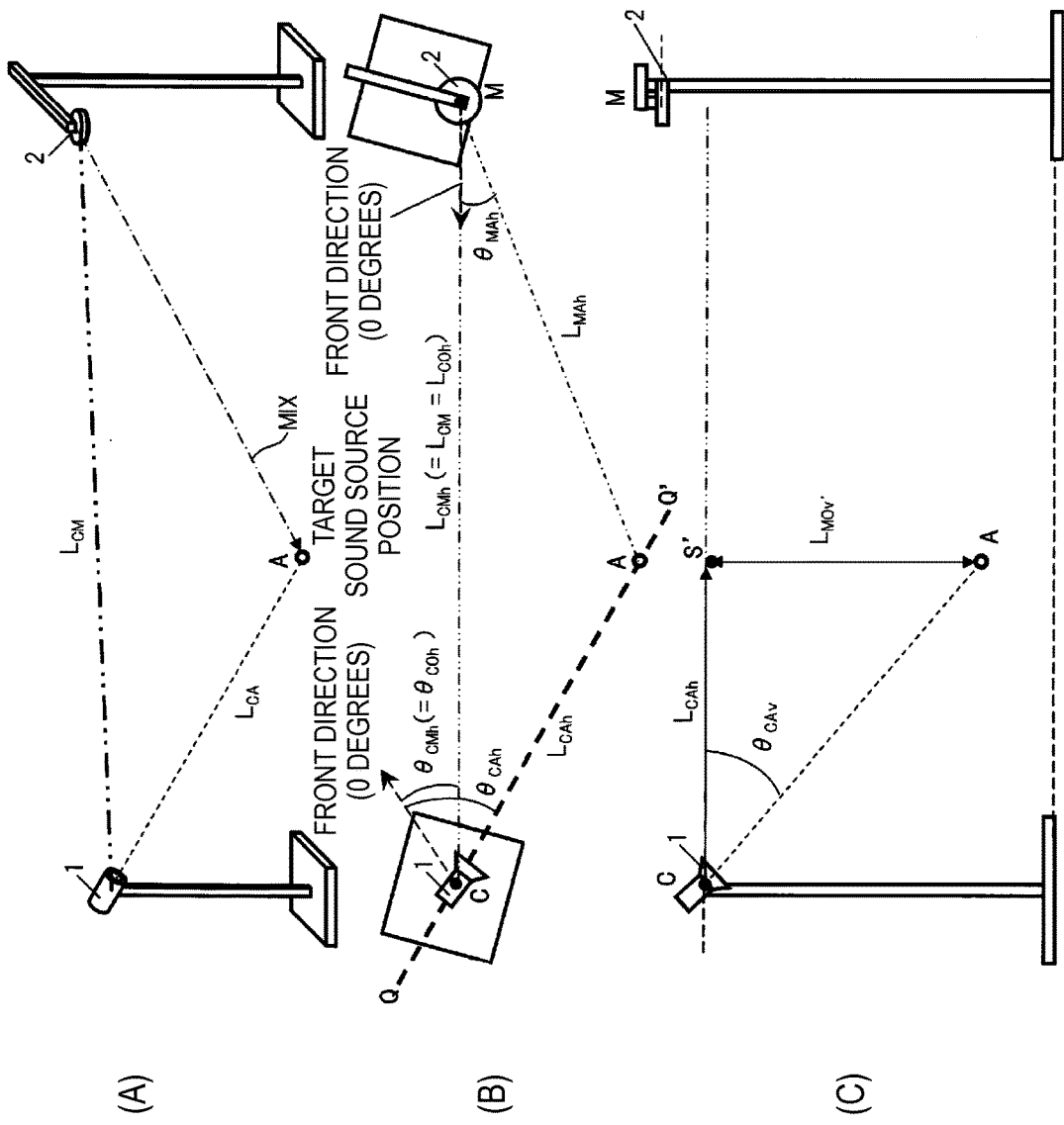
FIG. 66(A) is a diagram illustrating a positional relationship between the PTZ camera apparatus 1, the omnidirectional microphone array apparatus 2, and the target sound source position A in the sixth calibration method.
FIG. 66(B) is a horizontal direction plan view of FIG. 66(A)
FIG. 66(C) is a vertical direction sectional view taken along the line Q-Q' of FIG. 66(B).
Figure 67:
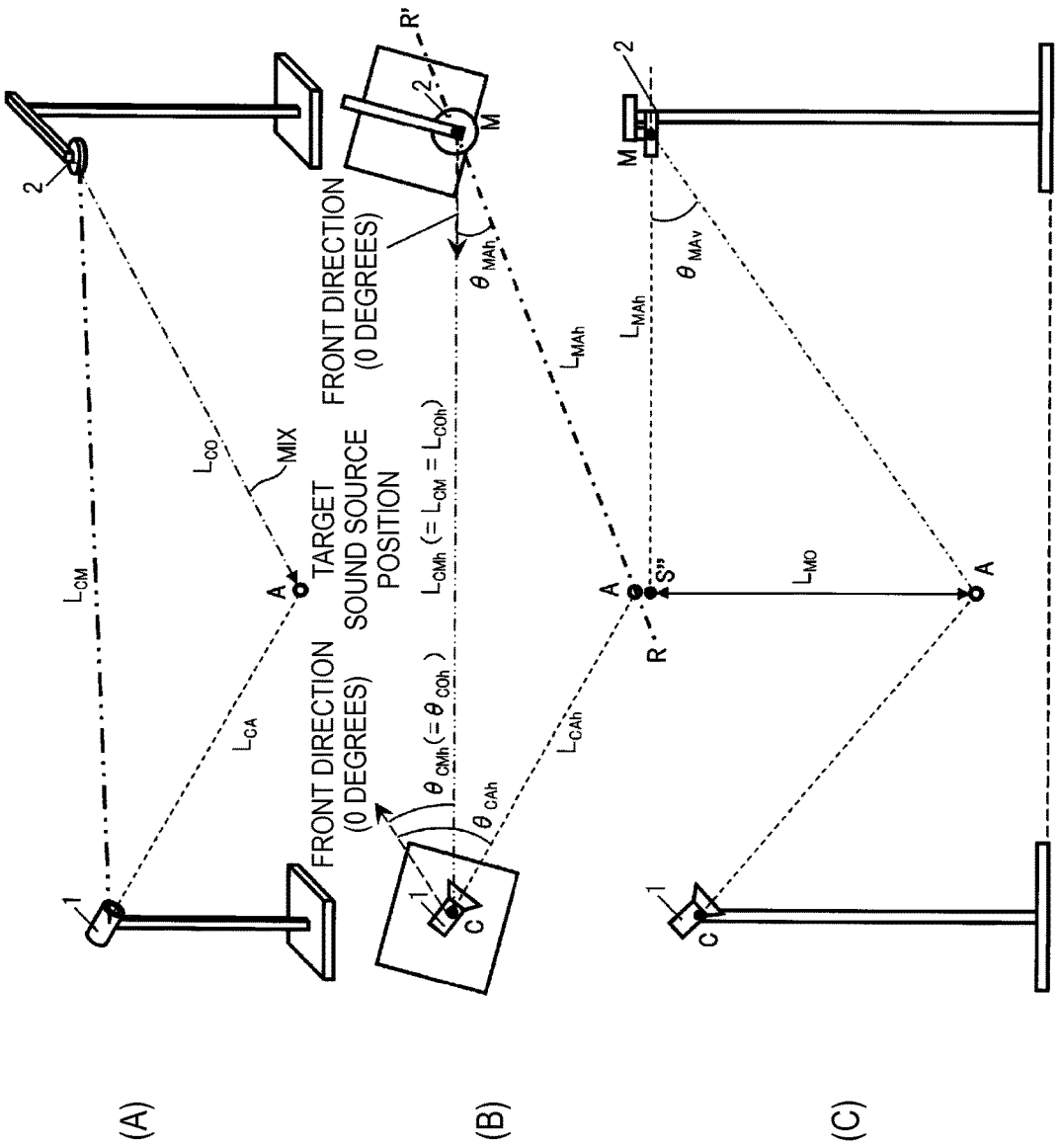
FIG. 67(A) is a diagram illustrating a positional relationship between the PTZ camera apparatus 1, the omnidirectional microphone array apparatus 2, and the target sound source position A in the sixth calibration method.
FIG. 67(B) is a horizontal direction plan view of FIG. 67(A)
FIG. 67(C) is a vertical direction sectional view taken along the line R-R' of FIG. 67(B).
Figure 69:
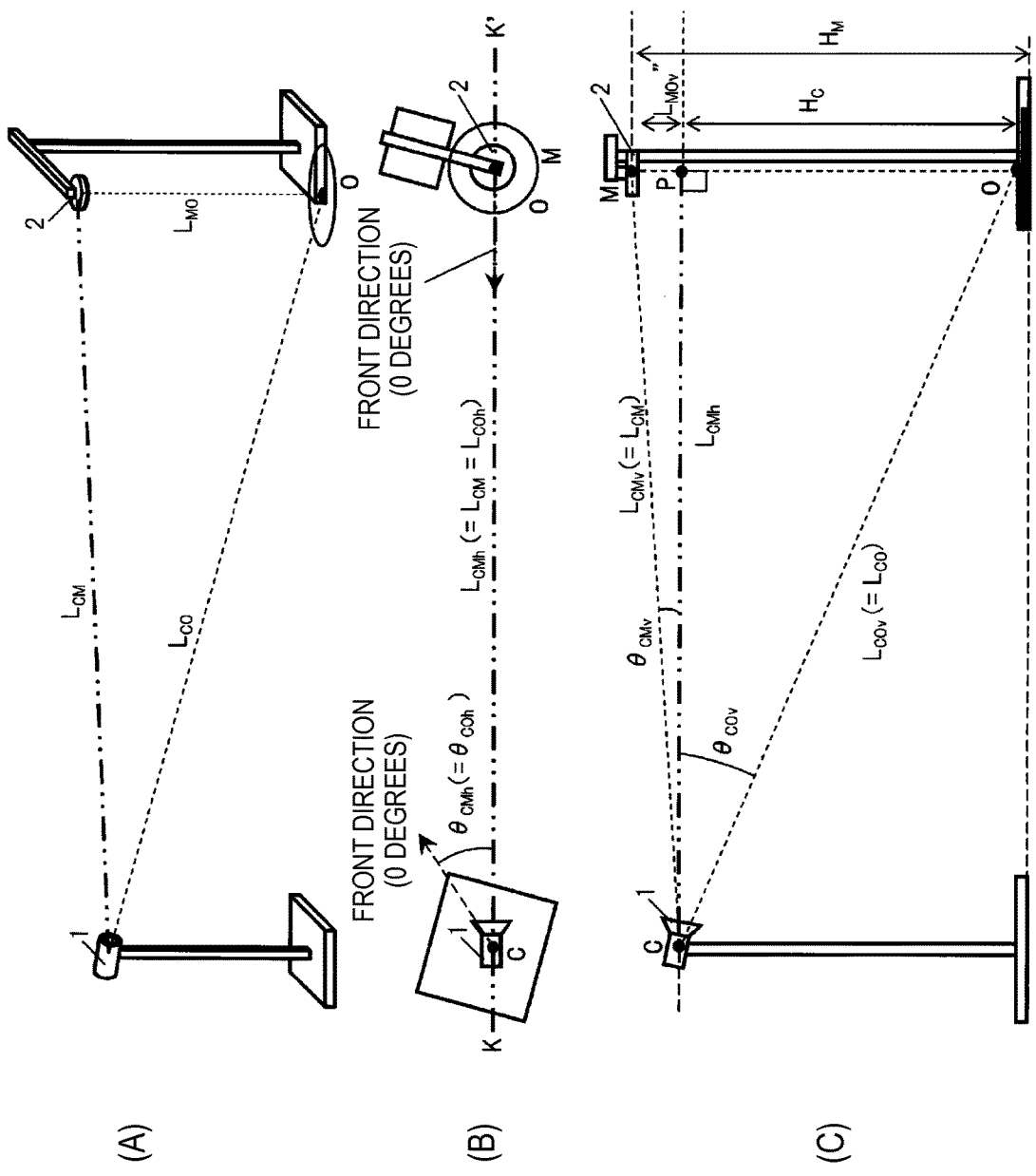
FIG. 69(A) is a diagram illustrating a positional relationship between the PTZ camera apparatus 1, the omnidirectional microphone array apparatus 2, and the calibration floor marker MAK2 in the seventh calibration method.
FIG. 69(B) is a horizontal direction plan view of FIG. 69(A)
FIG. 69(C) is a vertical direction sectional view taken along the line K-K' of FIG. 69(B).
Figure 70:
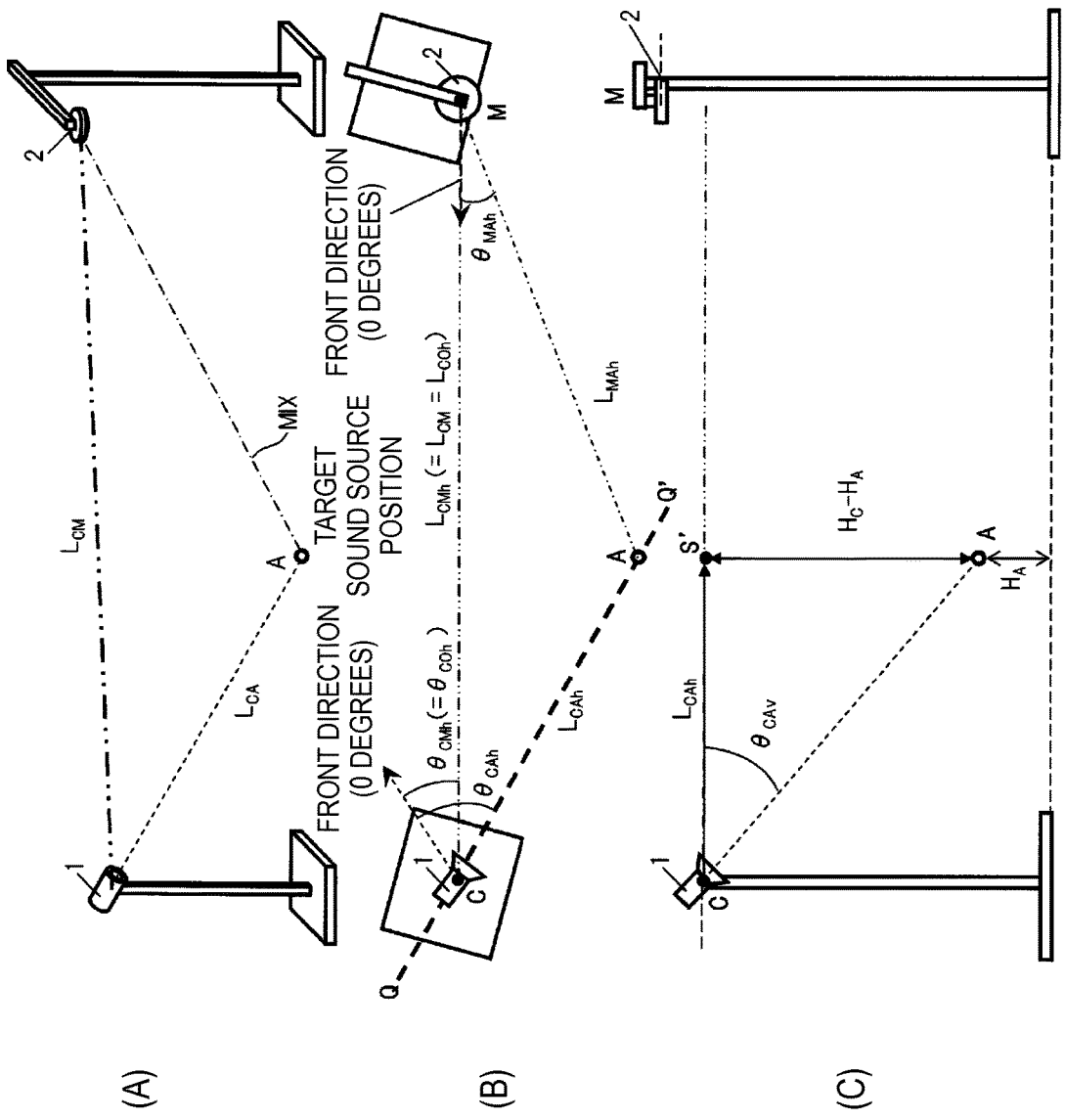
FIG. 70(A) is a diagram illustrating a positional relationship between the PTZ camera apparatus 1, the omnidirectional microphone array apparatus 2, and the target sound source position A in the seventh calibration method.
FIG. 70(B) is a horizontal direction plan view of FIG. 70(A)
FIG. 70(C) is a vertical direction sectional view taken along the line Q-Q' of FIG. 70(B).
Figure 71:
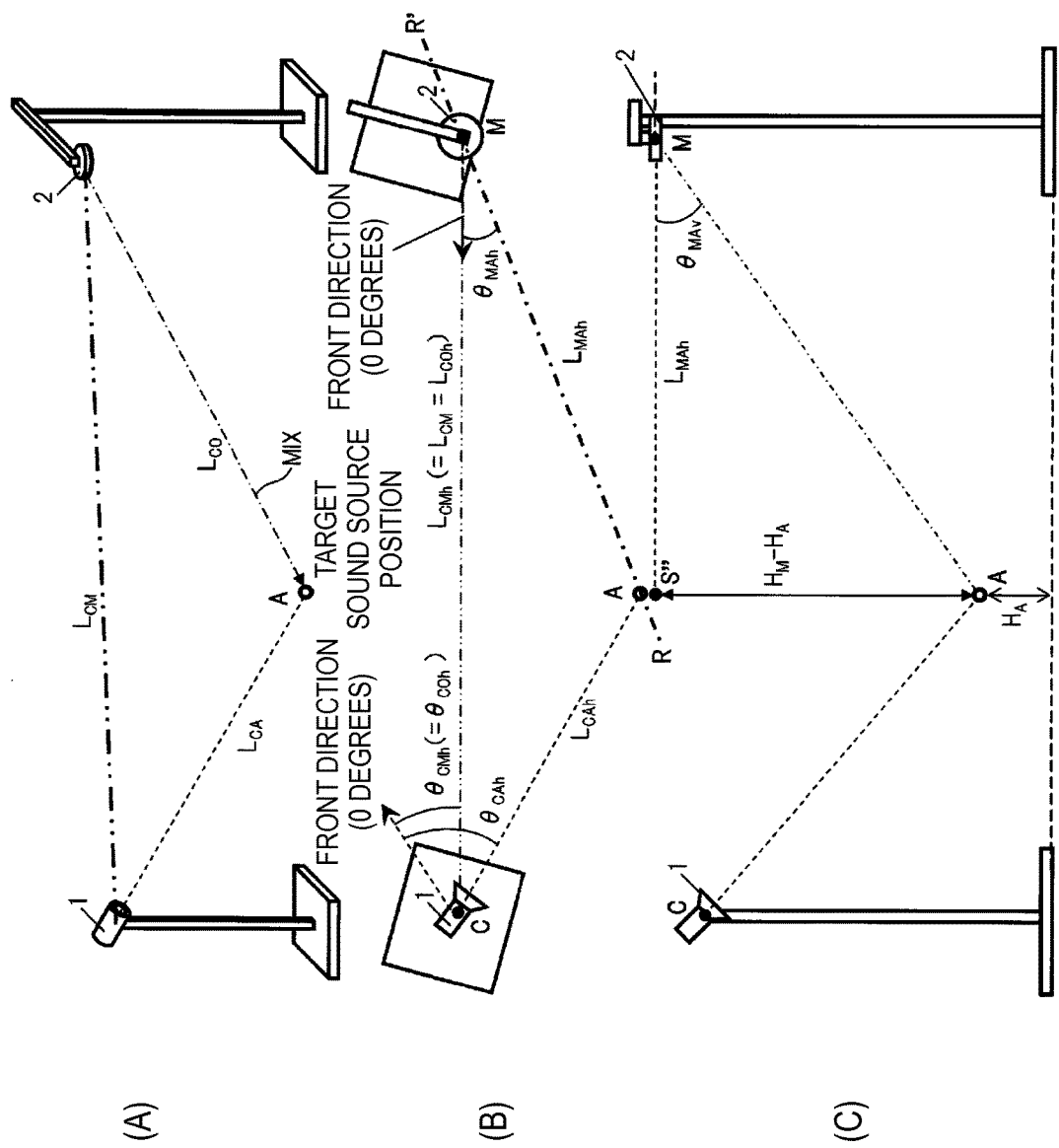
FIG. 71(A) is a diagram illustrating a positional relationship between the PTZ camera apparatus 1, the omnidirectional microphone array apparatus 2, and the target sound source position A in the seventh calibration method.
FIG. 71(B) is a horizontal direction plan view of FIG. 71(A)
FIG. 71(C) is a vertical direction sectional view taken along the line R-R' of FIG. 71(B).
Figure 73:
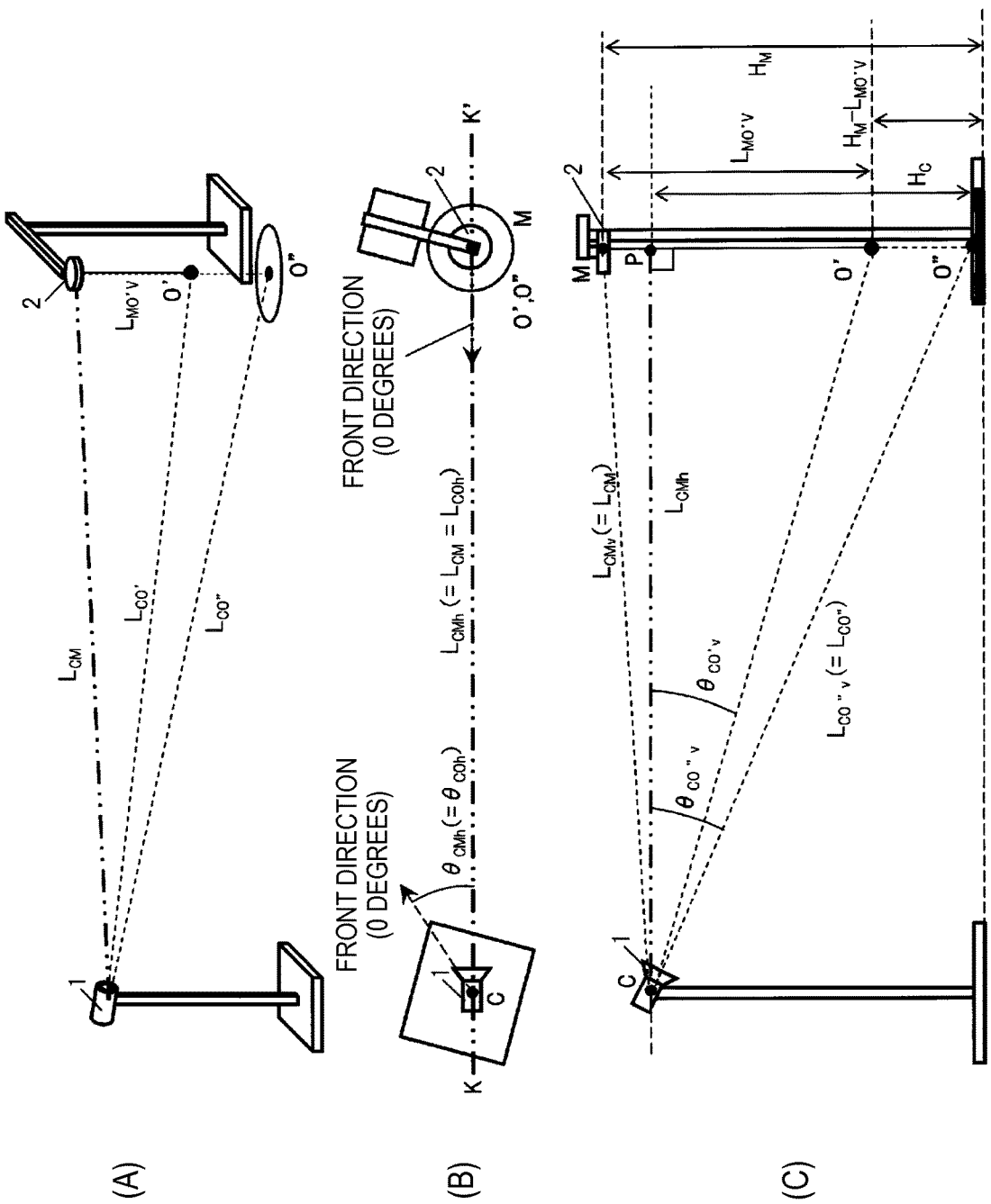
FIG. 73(A) is a diagram illustrating a positional relationship between the PTZ camera apparatus 1, the omnidirectional microphone array apparatus 2, the calibration marker MAK, and the calibration floor marker MAK2 in the eighth calibration method.
FIG. 73(B) is a horizontal direction plan view of FIG. 73(A)
FIG. 73(C) is a vertical direction sectional view taken along the line K-K' of FIG. 73(B).
Figure 75:
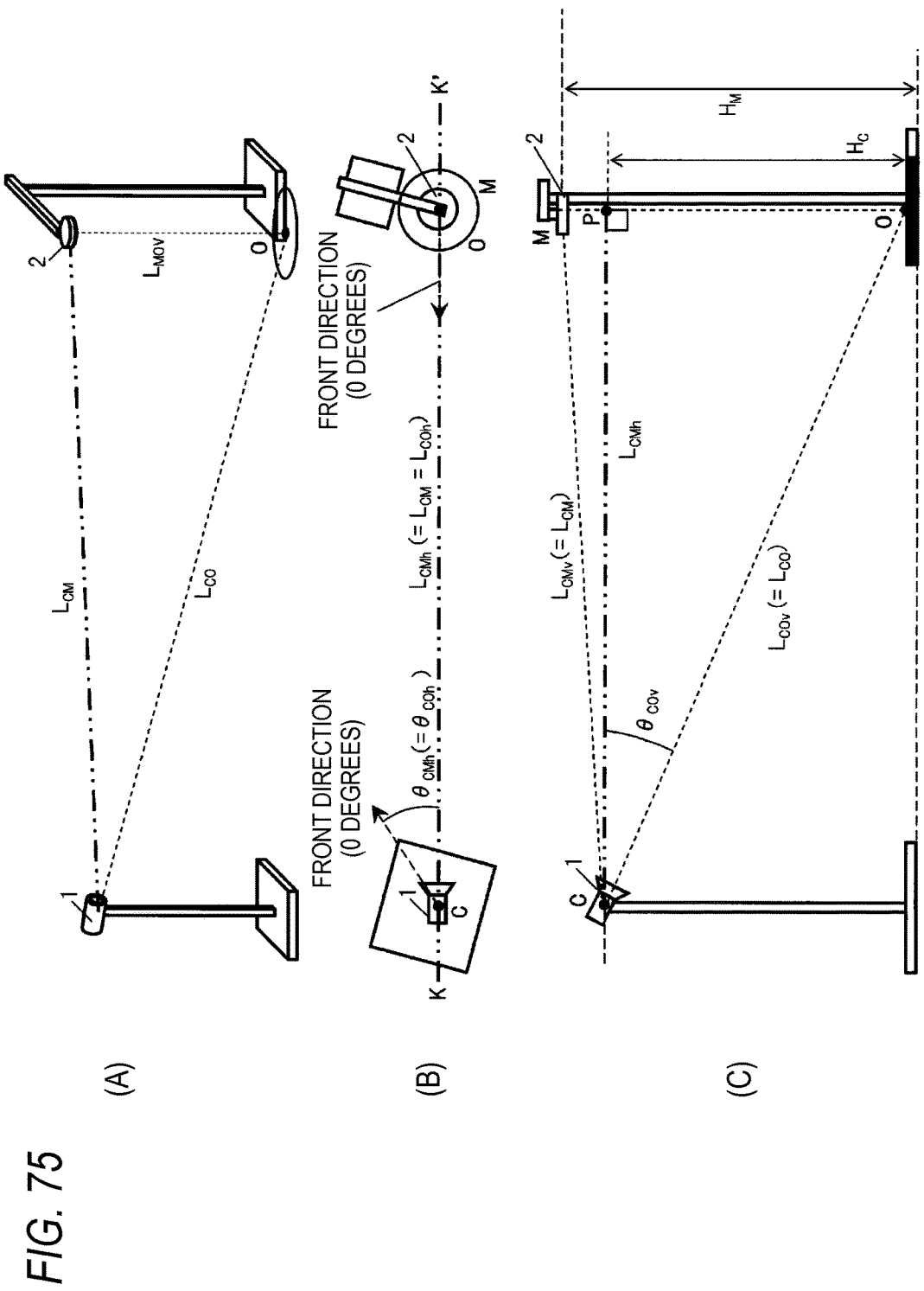
FIG. 75(A) is a diagram illustrating a positional relationship between the PTZ camera apparatus 1, the omnidirectional microphone array apparatus 2, and the calibration floor marker MAK2 in the ninth calibration method.
FIG. 75(B) is a horizontal direction plan view of FIG. 75(A)
FIG. 75(C) is a vertical direction sectional view taken along the line K-K' of FIG. 75(B).
Figure 77:
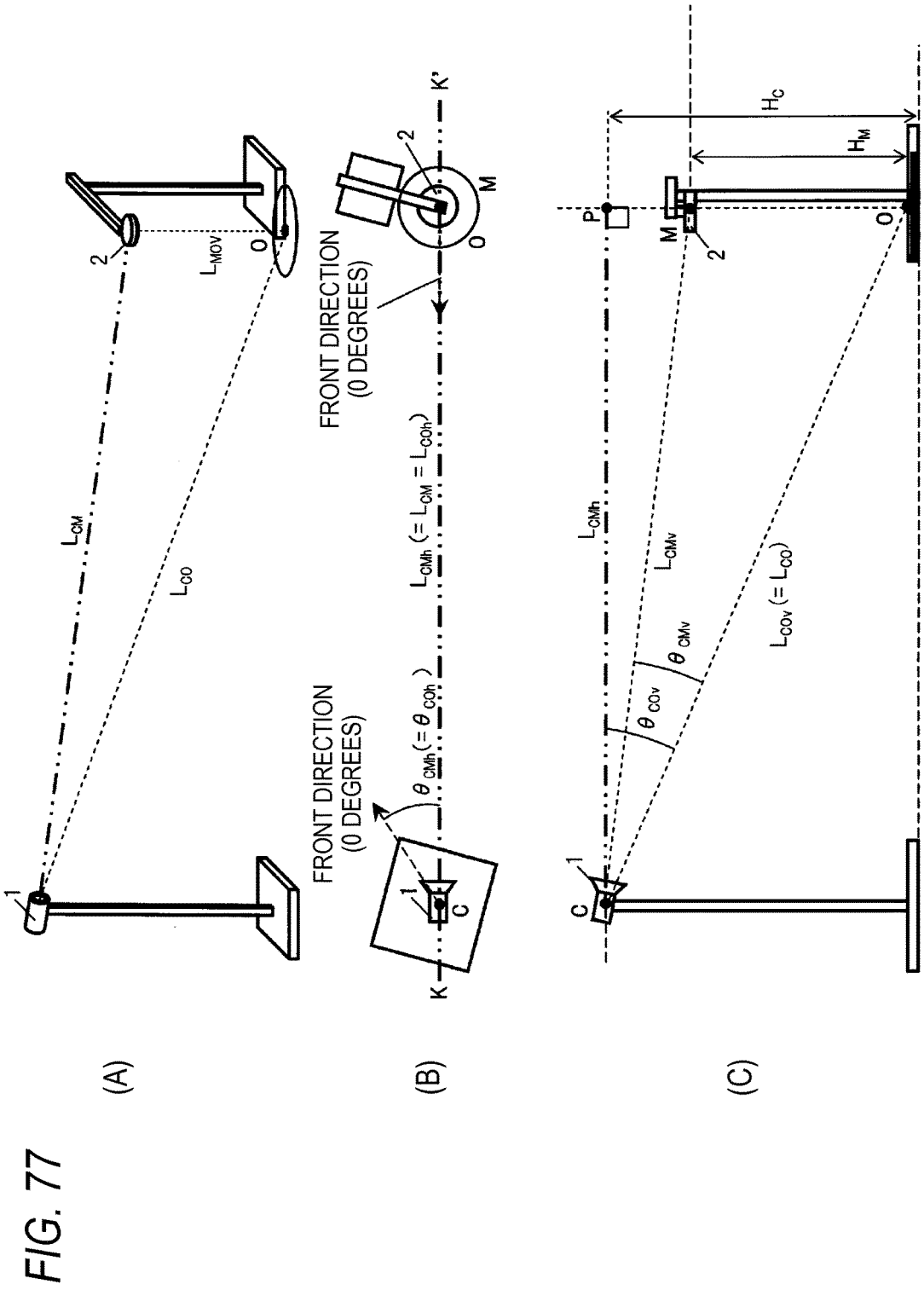
FIG. 77(A) is a diagram illustrating a positional relationship between the PTZ camera apparatus 1, the omnidirectional microphone array apparatus 2, and the calibration marker MAK in the tenth calibration method.
FIG. 77(B) is a horizontal direction plan view of FIG. 77(A)
FIG. 77(C) is a vertical direction sectional view taken along the line K-K' of FIG. 77(B).
Figure 78:
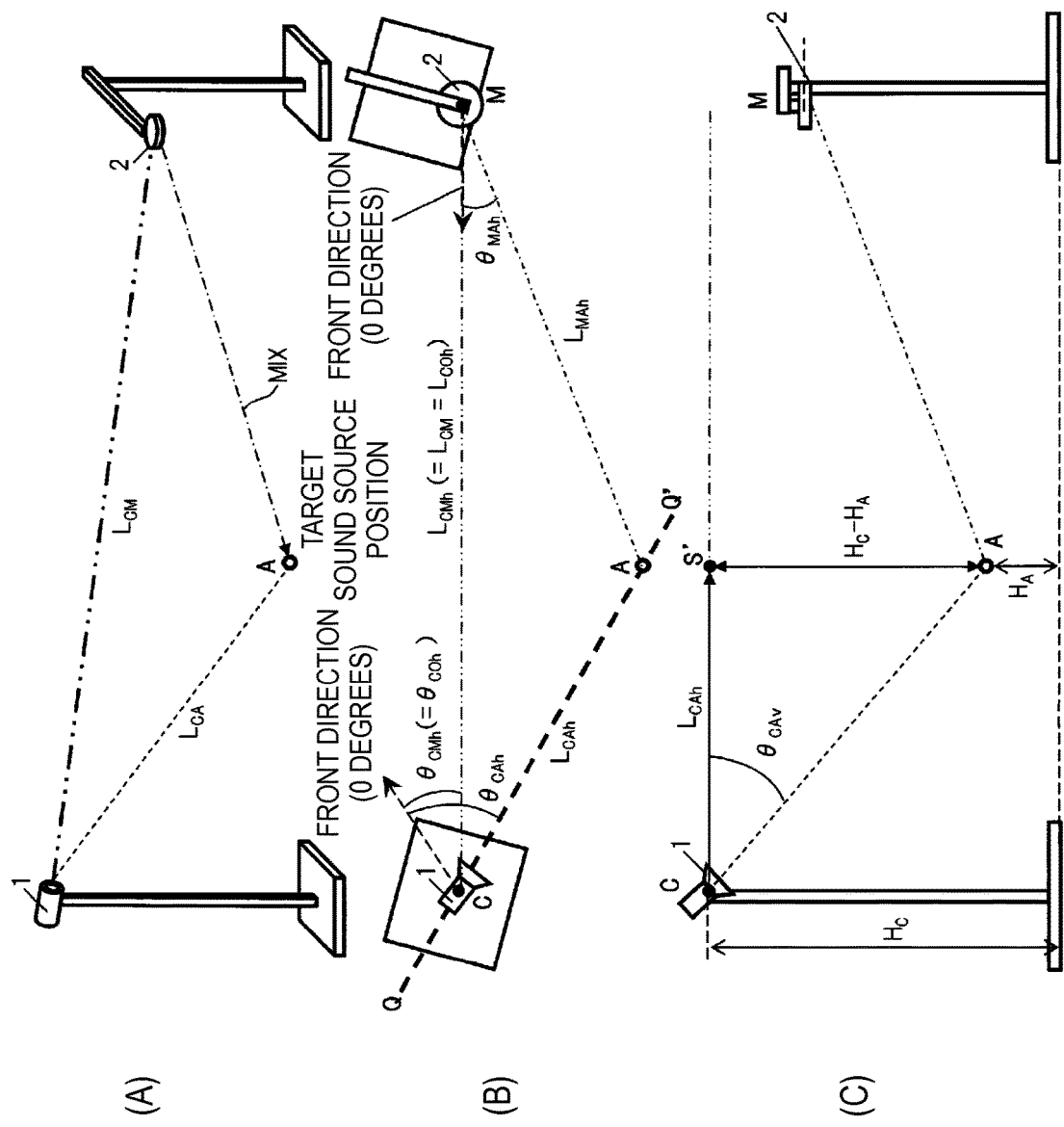
FIG. 78(A) is a diagram illustrating a positional relationship between the PTZ camera apparatus 1, the omnidirectional microphone array apparatus 2, and the target sound source position A in the tenth calibration method.
FIG. 78(B) is a horizontal direction plan view of FIG. 78(A)
FIG. 78(C) is a vertical direction sectional view taken along the line Q-Q' of FIG. 78(B).
Figure 79:
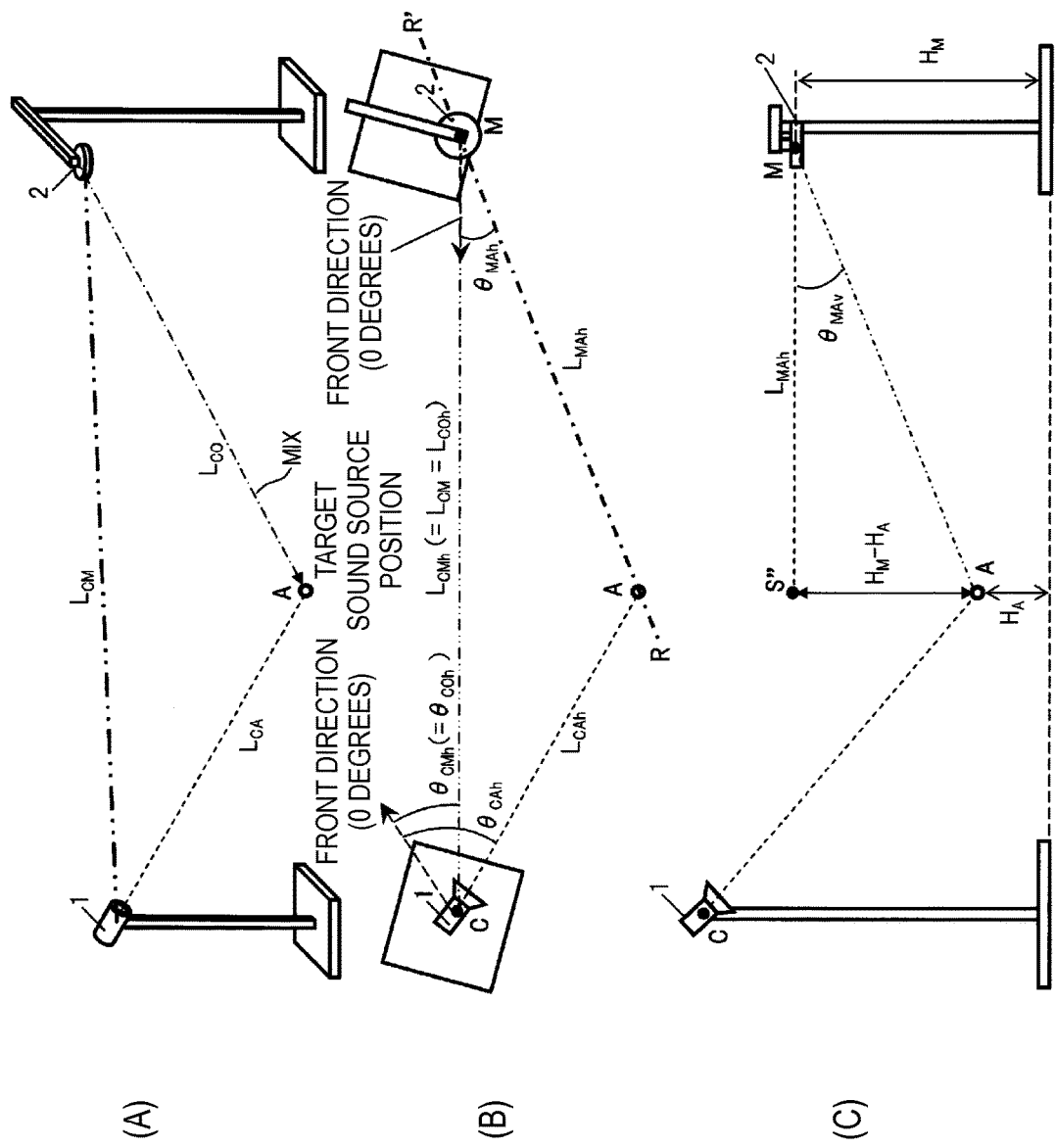
FIG. 79(A) is a diagram illustrating a positional relationship between the PTZ camera apparatus 1, the omnidirectional microphone array apparatus 2, and the target sound source position A in the tenth calibration method.
FIG. 79(B) is a horizontal direction plan view of FIG. 79(A)
FIG. 79(C) is a vertical direction sectional view taken along the line R-R' of FIG. 79(B).

FIG. 54 is a diagram illustrating the second calibration method in the eleventh embodiment. FIG. 55(A) is a diagram illustrating a positional relationship between the PTZ camera apparatus 1, the omnidirectional microphone array apparatus 2, and the calibration marker MAK in the second calibration method. FIG. 55(B) is a horizontal direction plan view of FIG. 55(A). FIG. 55(C) is a vertical direction sectional view taken along the line K-K' of FIG. 55(B).

FIG. 56(A) is a diagram illustrating a positional relationship between the PTZ camera apparatus 1, the omnidirectional microphone array apparatus 2, and the target sound source position A in the second calibration method. FIG. 56(B) is a horizontal direction plan view of FIG. 56(A). FIG. 56(C) is a vertical direction sectional view taken along the line Q-Q' of FIG. 56(B). FIG. 57(A) is a diagram illustrating a positional relationship between the PTZ camera apparatus 1, the omnidirectional microphone array apparatus 2, and the target sound source position A in the second calibration method. FIG. 57(B) is a horizontal direction plan view of FIG. 57(A). FIG. 57(C) is a vertical direction sectional view taken along the line R-R' of FIG. 57(B).

In the same manner as in the first calibration method, also in the second calibration method, the PTZ camera apparatus 1 is driven in a panning direction and a tilting direction and then focuses and zooms the calibration marker MAK, and thus the calibration marker MAK is located at a central point of a screen of the display device 36 (refer to FIG. 54).

In the second calibration method, respective heights of the PTZ camera apparatus 1 and the omnidirectional microphone array apparatus 2 from the floor are the same as each other, and the calibration marker MAK which is a solid object is suspended vertically downward directly under a predetermined position of the omnidirectional microphone array apparatus 2 by using a string STR or a cord (refer to FIG. 55(A)). A distance $L_{MO}$ from the omnidirectional microphone array apparatus 2 to the calibration marker MAK is constant. A calibration parameter in the second calibration method is a horizontal direction distance $L_{CMh}$ between the PTZ camera apparatus 1 and the omnidirectional microphone array apparatus 2.

If a central point O (refer to FIG. 54) of the calibration marker MAK displayed on the display device 36 is designated with the finger FG of the user, the sound collection direction computation section 34 computes the horizontal direction distance $L_{CMh}$ between the PTZ camera apparatus 1 and the omnidirectional microphone array apparatus 2 by using the distance $L_{MO}$ between the omnidirectional microphone array apparatus 2 and the calibration marker MAK. With reference to FIGS. 55(B) and 55(C), a detailed description will be made of a method of computing the horizontal direction distance $L_{CMh}$ in the sound collection direction computation section 34.

If the central point O (refer to FIG. 54) of the calibration marker MAK displayed on the display device 36 is designated with the finger FG of the user, the sound collection direction computation section 34 acquires a horizontal angle $\theta_{COh}$ and a vertical angle $\theta_{COv}$ which are directed from the PTZ camera apparatus 1 to the calibration marker MAK. Data of the horizontal angle $\theta_{COh}$ and the vertical angle $\theta_{COv}$ is computed by the PTZ camera apparatus 1 and is then transmitted from the PTZ camera apparatus 1 to the directionality control apparatus 3. In addition, since the calibration marker MAK is suspended vertically downward directly under a predetermined position of the omnidirectional microphone array apparatus 2, the horizontal angle $\theta_{COh}$ which is directed from the PTZ camera apparatus 1 toward the calibration marker MAK is the same as a horizontal angle $\theta_{CMh}$ which is directed from the PTZ camera apparatus 1 toward the omnidirectional microphone array apparatus 2 ($\theta_{COh} = \theta_{CMh}$).

The sound collection direction computation section 34 computes the horizontal direction distance $L_{CMh}$ between the PTZ camera apparatus 1 and the omnidirectional microphone array apparatus 2 according to Equation (91) by using the vertical angle $\theta_{COv}$ which is directed from the PTZ camera apparatus 1 to the calibration marker MAK, and the distance $L_{MO}$ from the omnidirectional microphone array apparatus 2 to the calibration marker MAK. In addition, since the calibration marker MAK is suspended vertically downward directly under a predetermined position of the omnidirectional microphone array apparatus 2, the horizontal direction distance $L_{COh}$ between the PTZ camera apparatus 1 and the calibration marker MAK is the same as the horizontal direction distance $L_{CMh}$ between the PTZ camera apparatus 1 and the omnidirectional microphone array apparatus 2 ($L_{COh} = L_{CMh}$).

[Equation 91]

$$L_{COh} = L_{CMh} = L_{MO} / \tan \theta_{COv} \qquad (91)$$

Next, in the second method of computing the sound collection direction coordinates ($\theta_{MAh}, \theta_{MAv}$), a height of the target sound source position A from the floor is an input value which is input by the user and is different from that in the first method of computing the sound collection direction coordinates ($\theta_{MAh}, \theta_{MAv}$). In addition, respective heights $H_C$ and $H_M$ of the PTZ camera apparatus 1 and the omnidirectional microphone array apparatus 2 from the floor are the same as each other.

Specifically, the sound collection direction computation section 34 computes the sound collection direction coordinates ($\theta_{MAh}, \theta_{MAv}$) indicating a sound collection direction which is directed from the omnidirectional microphone array apparatus 2 toward the target sound source position A by using:

(1) the horizontal angle $\theta_{CMh}$ which is directed from the PTZ camera apparatus 1 toward the omnidirectional microphone array apparatus 2;

(2) the horizontal direction distance $L_{CMh}$ between the PTZ camera apparatus 1 and the omnidirectional microphone array apparatus 2;

(3) the horizontal angle $\theta_{MCh}$ which is directed from the omnidirectional microphone array apparatus 2 toward the PTZ camera apparatus 1;

(4) the respective heights $H_C$ and $H_M$ of the PTZ camera apparatus 1 and the omnidirectional microphone array apparatus 2 from the floor;

(5) a horizontal angle $\theta_{CAh}$ and a vertical angle $\theta_{CAv}$ which are directed from the PTZ camera apparatus 1 toward the target sound source position A; and (6) the height $H_A$ of the target sound source position A from the floor, input by the user.

With reference to FIGS. 56(B) and 56(C) and FIGS. 57(B) and 57(C), a detailed description will be made of the second method of computing the sound collection direction coordinates ($\theta_{MAh},\theta_{MAv}$) in the sound collection direction computation section 34.

(1) As the horizontal angle $\theta_{CMh}$ which is directed from the PTZ camera apparatus 1 toward the omnidirectional microphone array apparatus 2, a value computed by the PTZ camera apparatus 1 in the second calibration method is used ($L_{CMh}=L_{COh}$).

(2) The horizontal direction distance $L_{CMh}$ between the PTZ camera apparatus 1 and the omnidirectional microphone array apparatus 2 is a calibration parameter in the second calibration method (refer to Equation (85)).

(3) The horizontal angle $\theta_{MCh}$ which is directed from the omnidirectional microphone array apparatus 2 toward the PTZ camera apparatus 1 is a predefined value (zero) obtained based on a positional relationship between the PTZ camera apparatus 1 and the omnidirectional microphone array apparatus 2 in the second calibration method.

(4) The respective heights $H_C$ and $H_M$ of the PTZ camera apparatus 1 and the omnidirectional microphone array apparatus 2 from the floor are predefined values in the second calibration method of computing the sound collection direction coordinates ($H_C=H_M$).

(5) As the horizontal angle $\theta_{CAh}$ and the vertical angle $\theta_{CAv}$ from the PTZ camera apparatus 1 to the target sound source position A, values are used which are computed by the PTZ camera apparatus 1 in response to designation of the designated position A' in captured image data displayed on the display device 36.

(6) The height $H_A$ of the target sound source position A from the floor is a value which is input through a user's input operation.

The sound collection direction computation section 34 computes a horizontal direction distance $L_{CAh}$ of the distance $L_{CA}$ between the PTZ camera apparatus 1 and the target sound source position A according to Equation (92) by using the distance ($H_C$-$H_A$) corresponding to a difference between the heights of the PTZ camera apparatus 1 and the target sound source position A from the floor, and the vertical angle $\theta_{CAv}$ which is directed from the PTZ camera apparatus 1 toward the target sound source position A in the triangle CAS' illustrated in FIG. 56(C).

[Equation 92]

$$L_{CAh}=(H_C-H_A)/\tan\theta_{CAv} \quad (92)$$

The sound collection direction computation section 34 computes a horizontal direction distance $L_{MAh}$ of the distance $L_{MA}$ from the omnidirectional microphone array apparatus 2 to the target sound source position A according to Equation (93) based on the cosine theorem for the triangle CAM illustrated in FIG. 56(B) by using the respective computation results of Equations (91) and (92), and an angle ($\theta_{CAh}-\theta_{CMh}$) corresponding to a difference between the horizontal angle $\theta_{CAh}$ which is directed from the PTZ camera apparatus 1 toward the target sound source position A and the horizontal angle $\theta_{CMh}$ which is directed from the PTZ camera apparatus 1 toward the omnidirectional microphone array apparatus 2.

[Equation 93]

$$L_{MAh}=\sqrt{L_{CAh}^2+L_{CMh}^2-2L_{CAh}\times L_{CMh}\times\cos(\theta_{CAh}-\theta_{CMh})} \quad (93)$$

The sound collection direction computation section 34 computes a cosine value $\cos\theta_{MAh}$ of the horizontal angle $\theta_{MAh}$ which is directed from the omnidirectional microphone array apparatus 2 toward the target sound source position A according to Equation (94) based on the cosine theorem for the triangle CAM illustrated in FIG. 56(B) by using the respective computation results of Equations (91) to (93). Consequently, the sound collection direction computation section 34 can compute the horizontal angle $\theta_{MAh}$ which is directed from the omnidirectional microphone array apparatus 2 toward the target sound source position A according to Equation (95).

[Equation 94]

$$\cos\theta_{MAh}=\frac{L_{MAh}^2+L_{CMh}^2-L_{CAh}^2}{2L_{MAh}\times L_{CMh}} \quad (94)$$

[Equation 95]

$$\theta_{MAh}=\arccos\left(\frac{L_{MAh}^2+L_{CMh}^2-L_{CAh}^2}{2L_{MAh}\times L_{CMh}}\right) \quad (95)$$

In addition, the sound collection direction computation section 34 computes a tangent value $\tan\theta_{MAv}$ of the vertical angle $\theta_{MAv}$ which is directed from the omnidirectional microphone array apparatus 2 toward the target sound source position A according to Equation (96) based on a tangent for the triangle MAS" illustrated in FIG. 57(C) by using the computation result of Equation (93), and the distance ($H_M$-$H_A$) corresponding to the difference between the heights of the omnidirectional microphone array apparatus 2 and the target sound source position A from the floor. Consequently, the sound collection direction computation section 34 can compute the vertical angle $\theta_{MAv}$ which is directed from the omnidirectional microphone array apparatus 2 toward the target sound source position A according to Equation (97).

[Equation 96]

$$\tan\theta_{MAv}=\frac{(H_M-H_A)}{L_{MAh}} \quad (96)$$

[Equation 97]

$$\theta_{MAv}=\arctan\left(\frac{H_M-H_A}{L_{MAh}}\right) \quad (97)$$

As mentioned above, in the second calibration method and the second method of computing the sound collection direction coordinates ($\theta_{MAh},\theta_{MAv}$), if the central point O of the calibration marker MAK displayed on the display device 36 is designated with the finger FG of the user, the sound collection direction computation section 34 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

In addition, the sound collection direction computation section 34 uses the height $H_M$ of the omnidirectional microphone array apparatus 2 from the floor, which is easily measured when the omnidirectional microphone array apparatus 2 is initially installed. Therefore, in a case where the calibration marker MAK is suspended from the omnidirectional microphone array apparatus 2, a suspension distance can be easily adjusted. Further, since a value desired by the user can be used as the height $H_A$ of the target sound source position A from the floor, a degree of freedom of selection of the height $H_A$ of the target sound source position A from the floor is improved.

(Second Method of Computing Sound Collection Direction Coordinates According to Third Calibration Method)

Next, with reference to FIG. 58 and FIGS. 59(A) to 59(C), a description will be made of a third calibration method, and the second method of computing sound collection direction coordinates after computing a calibration parameter according to the third calibration method.

FIG. 58 is a diagram illustrating the third calibration method in the eleventh embodiment. FIG. 59(A) is a diagram illustrating a positional relationship between the PTZ camera apparatus 1, the omnidirectional microphone array apparatus 2, and the calibration floor marker MAK2 in the third calibration method. FIG. 59(B) is a horizontal direction plan view of FIG. 59(A). FIG. 59(C) is a vertical direction sectional view taken along the line K-K' of FIG. 59(B).

In the same manner as in the first calibration method, also in the third calibration method, the PTZ camera apparatus 1 is driven in a panning direction and a tilting direction and then focuses and zooms the calibration floor marker MAK2, and thus the calibration floor marker MAK2 is located at a central point of a screen of the display device 36 (refer to FIG. 58).

In the third calibration method, respective heights of the PTZ camera apparatus 1 and the omnidirectional microphone array apparatus 2 from the floor are the same as each other, and the circular calibration floor marker MAK2 is installed at a position on the floor located vertically downward directly under a predetermined position of the omnidirectional microphone array apparatus 2 (refer to FIG. 59(A)). Thus, a distance $L_{MO}$ from the omnidirectional microphone array apparatus 2 to the calibration floor marker MAK2 is the same as the height $H_M$ of the omnidirectional microphone array apparatus 2 from the floor ($L_{MO}=H_M$). Calibration parameters in the third calibration method are a horizontal direction distance $L_{CMh}$ between the PTZ camera apparatus 1 and the omnidirectional microphone array apparatus 2, and the height $H_M$ of the omnidirectional microphone array apparatus 2 from the floor.

If a central point O (refer to FIG. 58) of the calibration floor marker MAK2 displayed on the display device 36 is designated with the finger FG of the user, the sound collection direction computation section 34 computes the horizontal direction distance $L_{CMh}$ between the PTZ camera apparatus 1 and the omnidirectional microphone array apparatus 2 and the height $H_M$ of the omnidirectional microphone array apparatus 2 from the floor by using the distance $L_{CO}$ between the PTZ camera apparatus 1 and the calibration floor marker MAK2, and the vertical angle $\theta_{COv}$ which is directed from the PTZ camera apparatus 1 toward the calibration floor marker MAK2. With reference to FIGS. 59(B) and 59(C), a detailed description will be made of a method of computing the horizontal direction distance $L_{CMh}$ and the height $H_M$ of the omnidirectional microphone array apparatus 2 from a horizontal surface (for example, the floor) in the sound collection direction computation section 34.

If the central point O (refer to FIG. 58) of the calibration floor marker MAK2 displayed on the display device 36 is designated with the finger FG of the user, the sound collection direction computation section 34 acquires a distance $L_{CO}$ from the PTZ camera apparatus 1 to the calibration floor marker MAK2, and a horizontal angle $\theta_{COh}$ and a vertical angle $\theta_{COv}$ which are directed from the PTZ camera apparatus 1 toward the calibration floor marker MAK2. Data of the distance $L_{CO}$, the horizontal angle $\theta_{COh}$, and the vertical angle $\theta_{COv}$ is computed by the PTZ camera apparatus 1 and is then transmitted from the PTZ camera apparatus 1 to the directionality control apparatus 3. In addition, since the calibration floor marker MAK2 is installed at the position on the floor located vertically downward directly under a predetermined position of the omnidirectional microphone array apparatus 2, the horizontal angle $\theta_{COh}$ which is directed from the PTZ camera apparatus 1 toward the calibration floor marker MAK2 is the same as a horizontal angle $\theta_{CMh}$ which is directed from the PTZ camera apparatus 1 toward the omnidirectional microphone array apparatus 2 ($\theta_{COh}=\theta_{CMh}$).

The sound collection direction computation section 34 computes the horizontal direction distance $L_{CMh}$ between the PTZ camera apparatus 1 and the omnidirectional microphone array apparatus 2 according to Equation (98) by using the distance $L_{CO}$ from the PTZ camera apparatus 1 to the calibration floor marker MAK2, and the vertical angle $\theta_{COv}$ which is directed from the PTZ camera apparatus 1 toward the calibration floor marker MAK2 in the triangle COM illustrated in FIG. 59(C). In addition, since the calibration floor marker MAK2 is installed at the position on the floor located vertically downward directly under a predetermined position of the omnidirectional microphone array apparatus 2, the horizontal direction distance $L_{COh}$ between the PTZ camera apparatus 1 and the calibration floor marker MAK2 is the same as the horizontal direction distance $L_{CMh}$ between the PTZ camera apparatus 1 and the omnidirectional microphone array apparatus 2 ($L_{COh}=L_{CMh}$).

[Equation 98]

$$L_{COh}=L_{CMh}=L_{CO}/\cos\theta_{COv} \quad (98)$$

In addition, the sound collection direction computation section 34 computes the height $H_M$ of the omnidirectional microphone array apparatus 2 from the floor according to Equation (99) by using the distance $L_{CO}$ from the PTZ camera apparatus 1 to the calibration floor marker MAK2, and the vertical angle $\theta_{COv}$ which is directed from the PTZ camera apparatus 1 toward the calibration floor marker MAK2 in the triangle COM illustrated in FIG. 59(C).

[Equation 99]

$$H_M=L_{CO}/\sin\theta_{COv} \quad (99)$$

Further, a method of computing the sound collection direction coordinates ($\theta_{MAh},\theta_{MAv}$) in the sound collection direction computation section 34 after computing the calibration parameters according to the third calibration method is the same as the above-described second method of computing the sound collection direction coordinates ($\theta_{MAh},\theta_{MAv}$), and thus description thereof will be omitted.

As mentioned above, in the third calibration method and the second method of computing the sound collection direction coordinates ($\theta_{MAh},\theta_{MAv}$), if the central point O (refer to FIG. 59) of the calibration floor marker MAK2 displayed on the display device 36 is designated with the finger FG of the user, the sound collection direction computation section 34 can easily compute the distance $L_{CO}$ from the PTZ camera apparatus 1 to the calibration floor marker MAK2 by using, for example, a focus function of the PTZ camera apparatus 1, and can also easily compute the horizontal direction distance $L_{CMh}$ between the PTZ camera apparatus 1 and the omnidirectional microphone array apparatus 2 as a calibration parameter.

(Second Method of Computing Sound Collection Direction Coordinates According to Fourth Calibration Method)

Next, with reference to FIG. 60 and FIGS. 61(A) to 61(C), a description will be made of a fourth calibration method, and the second method of computing sound collection direction coordinates after computing a calibration parameter according to the fourth calibration method.

FIG. 60 is a diagram illustrating the fourth calibration method in the eleventh embodiment. FIG. 61(A) is a diagram illustrating a positional relationship between the PTZ camera apparatus 1, the omnidirectional microphone array apparatus 2, and the calibration floor marker MAK2 in the fourth calibration method. FIG. 61(B) is a horizontal direction plan view of FIG. 61(A). FIG. 61(C) is a vertical direction sectional view taken along the line K-K' of FIG. 61(B).

In the same manner as in the first calibration method, also in the fourth calibration method, the PTZ camera apparatus 1 is driven in a panning direction and a tilting direction and then focuses and zooms the calibration floor marker MAK2, and thus the calibration floor marker MAK2 is located at a central point of a screen of the display device 36 (refer to FIG. 60).

In the fourth calibration method, respective heights of the PTZ camera apparatus 1 and the omnidirectional microphone array apparatus 2 from the floor are the same as each other, and the circular calibration floor marker MAK2 is installed at a position on the floor located vertically downward directly under a predetermined position of the omnidirectional microphone array apparatus 2 (refer to FIG. 61(A)). Thus, a distance $L_{MO}$ from the omnidirectional microphone array apparatus 2 to the calibration floor marker MAK2 is the same as the height $H_M$ of the omnidirectional microphone array apparatus 2 from the floor ($L_{MO}=H_M$). Calibration parameters in the fourth calibration method are a horizontal direction distance $L_{CMh}$ between the PTZ camera apparatus 1 and the omnidirectional microphone array apparatus 2, and the height $H_M$ of the omnidirectional microphone array apparatus 2 from the floor.

If two locations (refer to FIG. 60) including a central point O of the calibration floor marker MAK2 and an end point O' on a circumference thereof displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2 and the height $H_M$ of the omnidirectional microphone array apparatus 2 from the floor by using a radius $R_O$ of the calibration floor marker MAK2, a vertical angle $\theta_{COv}$ which is directed from the PTZ camera apparatus 1 toward the central point O of the calibration floor marker MAK2, and a vertical angle $\theta_{CO'v}$ which is directed from the PTZ camera apparatus 1 toward the end point O' of the calibration floor marker MAK2. With reference to FIGS. 61(B) and 61(C), a detailed description will be made of a method of computing the horizontal direction distance $L_{CMh}$ and the height $H_M$ of the omnidirectional microphone array apparatus 2 from the floor in the sound collection direction computation section 34.

If two locations (refer to FIG. 60) including a central point O of the calibration floor marker MAK2 and an end point O' on a circumference thereof displayed on the display device 36 are designated with the finger FG of the user, the sound collection direction computation section 34 acquires a horizontal angle $\theta_{COh}$ and a vertical angle $\theta_{COv}$ which are directed from the PTZ camera apparatus 1 toward the central point O of the calibration floor marker MAK2, and a horizontal angle $\theta_{CO'h}$ and a vertical angle $\theta_{CO'v}$ which are directed from the PTZ camera apparatus 1 toward the end point O' of the calibration floor marker MAK2. Data of the horizontal angle $\theta_{COh}$, the vertical angle $\theta_{COv}$, the horizontal angle $\theta_{CO'h}$, and the vertical angle $\theta_{CO'v}$ is computed by the PTZ camera apparatus 1 and is then transmitted from the PTZ camera apparatus 1 to the directionality control apparatus 3. In addition, since the calibration floor marker MAK2 is installed at the position on the floor located vertically downward directly under a predetermined position of the omnidirectional microphone array apparatus 2, the horizontal angle $\theta_{COh}$ which is directed from the PTZ camera apparatus 1 toward the calibration floor marker MAK2 is the same as a horizontal angle $\theta_{CMh}$ which is directed from the PTZ camera apparatus 1 toward the omnidirectional microphone array apparatus 2 ($\theta_{COh}=\theta_{CMh}$).

Here, if the central point O of the calibration floor marker MAK2 displayed on the display device 36 is initially designated, the output control section 35 displays a guide line GUD for indicating a location which is to be designated next. Consequently, the output control section 35 can cause the user to easily recognize a position of the end point O' which is to be designated following the central point of the calibration floor marker MAK2 displayed on the display device 36.

In addition, the end point O' on the circumference is not any position on the circumference of the calibration floor marker MAK2 but is a position which provides the same horizontal angle as the horizontal angle $\theta_{COh}$ which is directed from the PTZ camera apparatus 1 toward the central point of the calibration floor marker MAK2. Therefore, the horizontal angle $\theta_{COh}$ which is directed from the PTZ camera apparatus 1 toward the central point of the calibration floor marker MAK2 is the same as the horizontal angle $\theta_{CO'h}$ which is directed from the PTZ camera apparatus 1 toward the end point O' of the calibration floor marker MAK2 ($\theta_{COh}=\theta_{CO'h}$).

The sound collection direction computation section 34 computes a relational expression of the vertical angle $\theta_{COv}$ which is directed from the PTZ camera apparatus 1 toward the central point O of the calibration floor marker MAK2, the height $H_M$ of the omnidirectional microphone array apparatus 2 from the floor, and the horizontal direction distance $L_{CMh}$ between the PTZ camera apparatus 1 and the omnidirectional microphone array apparatus 2 according to Equation (100) in the triangle COM illustrated in FIG. 61(C).

[Equation 100]

$$\tan \theta_{COv} = H_M/L_{CMh} \qquad (100)$$

Similarly, the sound collection direction computation section 34 computes a relational expression of the vertical angle $\theta_{CO'v}$ which is directed from the PTZ camera apparatus 1 toward the end point O' of the calibration floor marker MAK2, the height $H_M$ of the omnidirectional microphone array apparatus 2 from the floor, the horizontal direction distance $L_{CMh}$ between the PTZ camera apparatus 1 and the omnidirectional microphone array apparatus 2, and the radius $R_O$ of the calibration floor marker MAK2 according to Equation (101) in the triangle CO'T illustrated in FIG. 61(C).

[Equation 101]

$$\tan \theta_{CO'v} = H_M/(L_{CMh}+R_O) \qquad (101)$$

The sound collection direction computation section 34 computes the horizontal direction distance $L_{CMh}$ between the PTZ camera apparatus 1 and the omnidirectional microphone array apparatus 2 according to Equation (102) by using the relational expressions shown in Equations (100) and (101).

[Equation 102]

$$L_{COh} = L_{CMh} = R_O \times \tan\theta_{COv}/(\tan\theta_{COv} - \tan\theta_{COv'}) \quad (102)$$

In addition, the sound collection direction computation section 34 computes the height $H_M$ of the omnidirectional microphone array apparatus 2 from the floor according to Equation (103) by using the respective computation results of Equations (100) and (102). Further, the sound collection direction computation section 34 may also compute the height $H_C$ of the PTZ camera apparatus 1 from the floor according to Equation (103).

[Equation 103]

$$H_M = H_C = L_{CMh} \times \tan\theta_{COv} \quad (103)$$

Furthermore, a method of computing the sound collection direction coordinates $(\theta_{MAh}, \theta_{MAv})$ in the sound collection direction computation section 34 after computing the calibration parameters according to the fourth calibration method is the same as the above-described second method of computing the sound collection direction coordinates $(\theta_{MAh}, \theta_{MAv})$, and thus description thereof will be omitted.

As mentioned above, in the fourth calibration method and the second method of computing the sound collection direction coordinates $(\theta_{MAh}, \theta_{MAv})$, if the two locations (refer to FIG. 60) including the central point O of the calibration floor marker MAK2 and the end point O' on the circumference thereof displayed on the display device 36 are designated with the finger FG of the user, the sound collection direction computation section 34 can easily compute the height $H_M$ of the omnidirectional microphone array apparatus 2 from the floor, for example, even in a case where it is hard to measure a distance from the omnidirectional microphone array apparatus 2 to the central point of the calibration floor marker MAK2, and can also easily compute the horizontal direction distance $L_{CMh}$ between the PTZ camera apparatus 1 and the omnidirectional microphone array apparatus 2 as a calibration parameter.

(First Method of Computing Sound Collection Direction Coordinates According to Fifth Calibration Method)

Next, with reference to FIG. 62 and FIGS. 63(A) to 63(C), a description will be made of a fifth calibration method, and the first method of computing sound collection direction coordinates after computing a calibration parameter according to the fifth calibration method.

FIG. 62 is a diagram illustrating the fifth calibration method in the eleventh embodiment. FIG. 63(A) is a diagram illustrating a positional relationship between the PTZ camera apparatus 1, the omnidirectional microphone array apparatus 2, and the calibration marker MAK3 in the fifth calibration method. FIG. 63(B) is a horizontal direction plan view of FIG. 63(A). FIG. 63(C) is a vertical direction sectional view taken along the line K-K' of FIG. 63(B).

In the same manner as in the first calibration method, also in the fifth calibration method, the PTZ camera apparatus 1 is driven in a panning direction and a tilting direction and then focuses and zooms the calibration marker MAK3, and thus the calibration marker MAK3 is located at a central point of a screen of the display device 36 (refer to FIG. 62).

In the fifth calibration method, respective heights of the PTZ camera apparatus 1 and the omnidirectional microphone array apparatus 2 from the floor are the same as each other, and the circular calibration marker MAK3 is installed at a position which is located vertically downward directly under a predetermined position of the omnidirectional microphone array apparatus 2 and has a certain height from the floor (refer to FIG. 63(A)). Thus, a height $H_O$ of the calibration marker MAK3 from the floor is a predefined value. Calibration parameters in the fifth calibration method are a horizontal direction distance $L_{CMh}$ between the PTZ camera apparatus 1 and the omnidirectional microphone array apparatus 2, and a distance $L_{MOv}$ $(=L_{MO})$ between the omnidirectional microphone array apparatus 2 and the calibration marker MAK3.

If a central point O (refer to FIG. 62) of the calibration marker MAK3 displayed on the display device 36 is designated with the finger FG of the user, the sound collection direction computation section 34 computes the horizontal direction distance $L_{CMh}$ between the PTZ camera apparatus 1 and the omnidirectional microphone array apparatus 2, and the distance $L_{MOv}$ between the omnidirectional microphone array apparatus 2 and the calibration marker MAK3 by using the distance $L_{COv}$ between the PTZ camera apparatus 1 and the calibration marker MAK3, and the vertical angle $\theta_{COv}$ which is directed from the PTZ camera apparatus 1 toward the calibration marker MAK3. With reference to FIGS. 63(B) and 63(C), a detailed description will be made of a method of computing the horizontal direction distance $L_{CMh}$ and the distance $L_{MOv}$ between the omnidirectional microphone array apparatus 2 and the calibration marker MAK3 in the sound collection direction computation section 34.

If the central point O (refer to FIG. 62) of the calibration marker MAK3 displayed on the display device 36 is designated with the finger FG of the user, the sound collection direction computation section 34 acquires a horizontal angle $\theta_{COh}$ and a vertical angle $\theta_{COv}$ which are directed from the PTZ camera apparatus 1 toward the central point O of the calibration marker MAK3, and a distance $L_{CO}$ $(=L_{COv})$ from the PTZ camera apparatus 1 to the calibration marker MAK3. Data of the distance $L_{CO}$, the horizontal angle $\theta_{COh}$, and the vertical angle $\theta_{COv}$ is computed by the PTZ camera apparatus 1 and is then transmitted from the PTZ camera apparatus 1 to the directionality control apparatus 3. In addition, since the calibration marker MAK3 is installed at the position which is located vertically downward directly under a predetermined position of the omnidirectional microphone array apparatus 2 and has the certain height from the floor, the horizontal angle $\theta_{COh}$ which is directed from the PTZ camera apparatus 1 toward the calibration marker MAK3 is the same as a horizontal angle $\theta_{CMh}$ which is directed from the PTZ camera apparatus 1 toward the omnidirectional microphone array apparatus 2 $(\theta_{COh} = \theta_{CMh})$.

The sound collection direction computation section 34 computes the horizontal direction distance $L_{CMh}$ between the PTZ camera apparatus 1 and the omnidirectional microphone array apparatus 2 according to Equation (104) by using the distance $L_{CO}$ $(=L_{COv})$ from the PTZ camera apparatus 1 to the central point O of the calibration marker MAK3, and the vertical angle $\theta_{COv}$ which is directed from the PTZ camera apparatus 1 toward the central point O of the calibration marker MAK3 in the triangle COM illustrated in FIG. 63(C).

[Equation 104]

$$L_{COh} = L_{CMh} = L_{CO} \times \cos\theta_{COv} \quad (104)$$

In addition, the sound collection direction computation section 34 computes the distance $L_{MOv}$ between the omnidirectional microphone array apparatus 2 and the calibration marker MAK3 according to Equation (105) by using the distance $L_{CO}$ (=$L_{CO_v}$) from the PTZ camera apparatus 1 to the calibration marker MAK3, and the vertical angle $\theta_{CO_v}$ which is directed from the PTZ camera apparatus 1 toward the calibration marker MAK3 in the triangle COM illustrated in FIG. 63(C).

[Equation 105]

$$L_{MO_v}=L_{CO}\times\sin\theta_{CO_v} \quad (105)$$

Further, a method of computing the sound collection direction coordinates ($\theta_{MAh},\theta_{MAv}$) in the sound collection direction computation section 34 after computing the calibration parameters according to the fifth calibration method is the same as the above-described first method of computing the sound collection direction coordinates ($\theta_{MAh},\theta_{MAv}$), and thus description thereof will be omitted.

As mentioned above, in the fifth calibration method and the first method of computing the sound collection direction coordinates ($\theta_{MAh},\theta_{MAv}$), if the central point O (refer to FIG. 62) of the calibration marker MAK3 displayed on the display device 36 is designated with the finger FG of the user, the sound collection direction computation section 34 can easily compute the horizontal direction distance $L_{CMh}$ between the PTZ camera apparatus 1 and the omnidirectional microphone array apparatus 2, and the height $L_{MO_v}$ of the omnidirectional microphone array apparatus 2 from the calibration marker MAK3 as calibration parameters, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

(Third Method of Computing Sound Collection Direction Coordinates According to Sixth Calibration Method)

Next, with reference to FIG. 64, FIGS. 65(A) to 65(C), FIGS. 66(A) to 66(C), and FIGS. 67(A) to 67(C), a description will be made of a sixth calibration method, and a third method of computing sound collection direction coordinates after computing a calibration parameter according to the sixth calibration method.

FIG. 64 is a diagram illustrating the sixth calibration method in the eleventh embodiment. FIG. 65(A) is a diagram illustrating a positional relationship between the PTZ camera apparatus 1, the omnidirectional microphone array apparatus 2, and the calibration marker MAK in the sixth calibration method. FIG. 65(B) is a horizontal direction plan view of FIG. 65(A). FIG. 65(C) is a vertical direction sectional view taken along the line K-K' of FIG. 65(B).

FIG. 66(A) is a diagram illustrating a positional relationship between the PTZ camera apparatus 1, the omnidirectional microphone array apparatus 2, and the target sound source position A in the sixth calibration method. FIG. 66(B) is a horizontal direction plan view of FIG. 66(A). FIG. 66(C) is a vertical direction sectional view taken along the line Q-Q' of FIG. 66(B). FIG. 67(A) is a diagram illustrating a positional relationship between the PTZ camera apparatus 1, the omnidirectional microphone array apparatus 2, and the target sound source position A in the sixth calibration method. FIG. 67(B) is a horizontal direction plan view of FIG. 67(A). FIG. 67(C) is a vertical direction sectional view taken along the line R-R' of FIG. 67(B).

In the sixth calibration method, respective heights of the PTZ camera apparatus 1 and the omnidirectional microphone array apparatus 2 from the floor are different from each other, and the omnidirectional microphone array apparatus 2 is installed so as to be located within an imaging viewing angle of the PTZ camera apparatus 1. For this reason, the PTZ camera apparatus 1 is driven in a panning direction and a tilting direction and then focuses and zooms both of the omnidirectional microphone array apparatus 2 and the calibration marker MAK, and thus the omnidirectional microphone array apparatus 2 and the calibration marker MAK are located at a central point of a screen of the display device 36 (refer to FIG. 64).

In the sixth calibration method, the height $H_M$ of the omnidirectional microphone array apparatus 2 from the floor is greater than the height $H_C$ of the PTZ camera apparatus 1 from the floor ($H_C < H_M$), and the calibration marker MAK which is a solid object is suspended vertically downward directly under a predetermined position of the omnidirectional microphone array apparatus 2 by using a string STR or a cord (refer to FIG. 65(A)). A distance $L_{MO}$ from the omnidirectional microphone array apparatus 2 to the calibration marker MAK is constant. Calibration parameters in the sixth calibration method are a horizontal direction distance $L_{CMh}$ between the PTZ camera apparatus 1 and the omnidirectional microphone array apparatus 2, and a vertical direction distance $L_{MO_v}$ between the PTZ camera apparatus 1 and the calibration marker MAK.

If two locations (refer to FIG. 64) including a central point O of the calibration marker MAK and the omnidirectional microphone array apparatus 2 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2 and the vertical direction distance $L_{MO_v}$ between the PTZ camera apparatus 1 and the calibration marker MAK by using a vertical angle $\theta_{CO_v}$ which is directed from the PTZ camera apparatus 1 toward the calibration floor marker MAK, and a vertical angle $\theta_{CM_v}$ which is directed from the PTZ camera apparatus 1 toward the omnidirectional microphone array apparatus 2. With reference to FIGS. 65(B) and 65(C), a detailed description will be made of a method of computing the horizontal direction distance $L_{CMh}$ and the vertical direction distance $L_{MO_v}$ in the sound collection direction computation section 34.

In description of the following sixth to tenth calibration methods, the respective heights of the PTZ camera apparatus 1 and the omnidirectional microphone array apparatus 2 from the floor are different from each other (refer to FIG. 65(C)). For this reason, either the vertical angle $\theta_{CM_v}$ which is directed from the PTZ camera apparatus 1 toward the omnidirectional microphone array apparatus 2 nor the vertical angle $\theta_{CM_v}$ which is directed from the omnidirectional microphone array apparatus 2 toward the PTZ camera apparatus 1 are zero ($\theta_{CM_v}=\theta_{MC_v}\neq 0$).

If the two locations (refer to FIG. 64) of the calibration marker MAK and the omnidirectional microphone array apparatus 2 displayed on the display device 36 are designated with the finger FG of the user, the sound collection direction computation section 34 acquires a horizontal angle $\theta_{COh}$ and a vertical angle $\theta_{CO_v}$ which are directed from the PTZ camera apparatus 1 toward the calibration marker MAK, and a horizontal angle $\theta_{CMh}$ and a vertical angle $\theta_{CM_v}$ which are directed from the PTZ camera apparatus 1 toward the omnidirectional microphone array apparatus 2. Data of the horizontal angle $\theta_{COh}$, the vertical angle $\theta_{CO_v}$, the horizontal angle $\theta_{CMh}$, and a vertical angle $\theta_{CM_v}$ is computed by the PTZ camera apparatus 1 and is then transmitted from the PTZ camera apparatus 1 to the directionality control apparatus 3. In addition, since the calibration marker MAK is suspended vertically downward directly under a predetermined position of the omnidirectional microphone array apparatus 2, the horizontal angle $\theta_{COh}$ which is directed from the PTZ camera apparatus 1 toward the calibration marker MAK is the same as the horizontal angle $\theta_{CMh}$ which is directed from the PTZ camera apparatus 1 toward the omnidirectional microphone array apparatus 2 ($\theta_{COh}=\theta_{CMh}$).

The sound collection direction computation section 34 computes a relational expression of the vertical angle $\theta_{COv}$ which is directed from the PTZ camera apparatus 1 toward the central point O of the calibration marker MAK, the horizontal direction distance Loin between the PTZ camera apparatus 1 and the omnidirectional microphone array apparatus 2, and the vertical direction distance $L_{MOv'}$ between the PTZ camera apparatus 1 and the calibration marker MAK according to Equation (106) in the triangle COP illustrated in FIG. 65(C).

[Equation 106]

$$\tan \theta_{COv}=L_{MOv'}/L_{CMh} \quad (106)$$

Similarly, the sound collection direction computation section 34 computes a relational expression of the vertical angle $\theta_{CMv}$ which is directed from the PTZ camera apparatus 1 toward the omnidirectional microphone array apparatus 2, the horizontal direction distance $L_{CMh}$ between the PTZ camera apparatus 1 and the omnidirectional microphone array apparatus 2, and the vertical direction distance $L_{MOv''}$ between the PTZ camera apparatus 1 and the omnidirectional microphone array apparatus 2 according to Equation (107) in the triangle CMP illustrated in FIG. 65(C).

[Equation 107]

$$\tan \theta_{CMv}=L_{MOv''}/L_{CMh} \quad (107)$$

In addition, the vertical direction distance $L_{MOv}$ between the omnidirectional microphone array apparatus 2 and the calibration marker MAK is a sum of the vertical direction distance $L_{MOv'}$ between the PTZ camera apparatus 1 and the calibration marker MAK and the vertical direction distance $L_{MOv''}$ between the PTZ camera apparatus 1 and the omnidirectional microphone array apparatus 2, and thus Equation (108) is established.

[Equation 108]

$$L_{MOv}=L_{MOv'}+L_{MOv''} \quad (108)$$

By using the relational expressions shown in Equations (106) to (108), the sound collection direction computation section 34 computes the horizontal direction distance $L_{CMh}$ between the PTZ camera apparatus 1 and the omnidirectional microphone array apparatus 2 according to Equation (109), computes the vertical direction distance $L_{MOv'}$ between the PTZ camera apparatus 1 and the calibration marker MAK according to Equation (110), and computes the vertical direction distance $L_{MOv''}$ between the PTZ camera apparatus 1 and the omnidirectional microphone array apparatus 2 according to Equation (111).

[Equation 109]

$$L_{CMh}=L_{MO}/(\tan \theta_{COv}+\tan \theta_{CMv}) \quad (109)$$

[Equation 110]

$$L_{MOv'}=L_{MO}\times\tan \theta_{COv}/(\tan \theta_{COv}+\tan \theta_{CMv}) \quad (110)$$

[Equation 111]

$$L_{MOv''}=L_{MO}\times\tan \theta_{CMv}/(\tan \theta_{COv}+\tan \theta_{CMv}) \quad (111)$$

Next, in the third method of computing the sound collection direction coordinates ($\theta_{MAh},\theta_{MAv}$), the respective heights $H_O$ and $H_A$ of the calibration marker MAK and the target sound source position A from the floor are the same as each other ($H_O=H_A$), and the respective heights $H_C$ and $H_M$ of the PTZ camera apparatus 1 and the omnidirectional microphone array apparatus 2 from the floor are different from each other ($H_C \neq H_M$).

Specifically, the sound collection direction computation section 34 computes the sound collection direction coordinates ($\theta_{MAh},\theta_{MAv}$) indicating a sound collection direction which is directed from the omnidirectional microphone array apparatus 2 toward the target sound source position A by using:

(1) the horizontal angle $\theta_{CMh}$ and the vertical angle $\theta_{CMv}$ which are directed from the PTZ camera apparatus 1 toward the omnidirectional microphone array apparatus 2;

(2) the horizontal direction distance $L_{CMh}$ between the PTZ camera apparatus 1 and the omnidirectional microphone array apparatus 2;

(3) the horizontal angle $\theta_{MCh}$ which is directed from the omnidirectional microphone array apparatus 2 toward the PTZ camera apparatus 1;

(4) the height $L_{MOv'}$ of the PTZ camera apparatus 1 from the target sound source position A, and the height $L_{MO}$ of the omnidirectional microphone array apparatus 2 from the target sound source position A; and (5) a horizontal angle $\theta_{CAh}$ and a vertical angle $\theta_{CAv}$ which are directed from the PTZ camera apparatus 1 toward the target sound source position A. With reference to FIGS. 66(B) and 66(C) and FIGS. 67(B) and 67(C), a detailed description will be made of the third method of computing the sound collection direction coordinates ($\theta_{MAh},\theta_{MAv}$) in the sound collection direction computation section 34.

(1) As the horizontal angle $\theta_{CMh}$ and the vertical angle $\theta_{CMv}$ which are directed from the PTZ camera apparatus 1 toward the omnidirectional microphone array apparatus 2, values computed by the PTZ camera apparatus 1 in the sixth calibration method are used ($\theta_{CMh}=\theta_{COh}$).

(2) The horizontal direction distance $L_{CMh}$ between the PTZ camera apparatus 1 and the omnidirectional microphone array apparatus 2 is a calibration parameter in the sixth calibration method (refer to Equation (109)).

(3) The horizontal angle $\theta_{MCh}$ which is directed from the omnidirectional microphone array apparatus 2 toward the PTZ camera apparatus 1 is a predefined value (zero) obtained based on a positional relationship between the PTZ camera apparatus 1 and the omnidirectional microphone array apparatus 2 in the sixth calibration method.

(4) The height $L_{MOv'}$ of the PTZ camera apparatus 1 from the target sound source position A is a calibration parameter in the sixth calibration parameter (refer to Equation (110)), and the height $L_{MO}$ of the omnidirectional microphone array apparatus 2 from the target sound source position A is a predefined value.

(5) As horizontal angle $\theta_{CAh}$ and the vertical angle $\theta_{CAv}$ which are directed from the PTZ camera apparatus 1 toward the target sound source position A, values are used which are computed by the PTZ camera apparatus 1 in response to designation of the designated position A' in captured image data displayed on the display device 36.

The sound collection direction computation section 34 computes a horizontal direction distance $L_{CAh}$ of the distance $L_{CA}$ between the PTZ camera apparatus 1 and the target sound source position A according to Equation (112) by using the vertical angle $\theta_{CAv}$ which is directed from the PTZ camera apparatus 1 to the target sound source position A, and the vertical direction distance $L_{MOv'}$ between the PTZ camera apparatus 1 and the calibration marker MAK as a computation result of Equation (110) in the triangle CAS' illustrated in FIG. 66(C).

[Equation 112]

$$L_{CAh} = L_{MOv}/\tan\theta_{CAv} \quad (112)$$

The sound collection direction computation section 34 computes a horizontal direction distance $L_{MAh}$ of the distance $L_{MA}$ from the omnidirectional microphone array apparatus 2 to the target sound source position A according to Equation (113) based on the cosine theorem for the triangle CAM illustrated in FIG. 66(B) by using the respective computation results of Equations (109) and (112), the horizontal angle $\theta_{CAh}$ which is directed from the PTZ camera apparatus 1 toward the target sound source position A, and the horizontal angle $\theta_{CMh}$ which is directed from the PTZ camera apparatus 1 toward the omnidirectional microphone array apparatus 2.

[Equation 113]

$$L_{MAh} = \sqrt{(L_{CAh}^2 + L_{CMh}^2 - 2L_{CAh} \times L_{CMh} \times \cos(\theta_{CAh} - \theta_{CMh})} \quad (113)$$

The sound collection direction computation section 34 computes a cosine value $\cos\theta_{MAh}$ of the horizontal angle $\theta_{MAh}$ which is directed from the omnidirectional microphone array apparatus 2 toward the target sound source position A according to Equation (114) based on the cosine theorem for the triangle CAM illustrated in FIG. 66(B) by using the respective computation results of Equations (109), (112) and (113). Consequently, the sound collection direction computation section 34 can compute the horizontal angle $\theta_{MAh}$ which is directed from the omnidirectional microphone array apparatus 2 toward the target sound source position A according to Equation (115).

[Equation 114]

$$\cos\theta_{MAh} = \frac{L_{MAh}^2 + L_{CMh}^2 - L_{CAh}^2}{2L_{MAh} \times L_{CMh}} \quad (114)$$

[Equation 115]

$$\theta_{MAh} = \arccos\left(\frac{L_{MAh}^2 + L_{CMh}^2 - L_{CAh}^2}{2L_{MAh} \times L_{CMh}}\right) \quad (115)$$

In addition, the sound collection direction computation section 34 computes a tangent value $\tan\theta_{MAv}$ of the vertical angle $\theta_{MAv}$ which is directed from the omnidirectional microphone array apparatus 2 toward the target sound source position A according to Equation (116) based on a tangent for the triangle MAS'' illustrated in FIG. 67(C) by using the respective computation results of Equations (108) and (113). Consequently, the sound collection direction computation section 34 can compute the vertical angle $\theta_{MAv}$ which is directed from the omnidirectional microphone array apparatus 2 toward the target sound source position A according to Equation (117).

[Equation 116]

$$\tan\theta_{MAv} = \frac{L_{MO}}{L_{MAh}} \quad (116)$$

[Equation 117]

$$\theta_{MAv} = \arctan\left(\frac{L_{MO}}{L_{MAh}}\right) \quad (117)$$

As mentioned above, in the sixth calibration method and the third method of computing the sound collection direction coordinates $(\theta_{MAh}, \theta_{MAv})$, if the two location (refer to FIG. 64) including the central point O of the calibration marker MAK and the omnidirectional microphone array apparatus 2 displayed on the display device 36 are designated with the finger FG of the user, the sound collection direction computation section 34 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

In addition, the sound collection direction computation section 34 can easily compute the sound collection direction coordinates which are directed from the omnidirectional microphone array apparatus 2 toward the target sound source position A without the user inputting the height $H_A$ of the target sound source position A from the floor even in a case where the heights of the PTZ camera apparatus 1 and the omnidirectional microphone array apparatus 2 from the floor are different from each other.

(Fourth Method of Computing Sound Collection Direction Coordinates According to Seventh Calibration Method)

Next, with reference to FIG. 68, FIGS. 69(A) to 69(C), FIGS. 70(A) to 70(C), and FIGS. 71(A) to 71(C), a description will be made of a seventh calibration method, and a fourth method of computing sound collection direction coordinates after computing a calibration parameter according to the seventh calibration method.

FIG. 68 is a diagram illustrating the seventh calibration method in the eleventh embodiment. FIG. 69(A) is a diagram illustrating a positional relationship between the PTZ camera apparatus 1, the omnidirectional microphone array apparatus 2, and the calibration floor marker MAK2 in the seventh calibration method. FIG. 69(B) is a horizontal direction plan view of FIG. 69(A). FIG. 69(C) is a vertical direction sectional view taken along the line K-K' of FIG. 69(B).

FIG. 70(A) is a diagram illustrating a positional relationship between the PTZ camera apparatus 1, the omnidirectional microphone array apparatus 2, and the target sound source position A in the seventh calibration method. FIG. 70(B) is a horizontal direction plan view of FIG. 70(A). FIG. 70(C) is a vertical direction sectional view taken along the line Q-Q' of FIG. 70(B). FIG. 71(A) is a diagram illustrating a positional relationship between the PTZ camera apparatus 1, the omnidirectional microphone array apparatus 2, and the target sound source position A in the seventh calibration method. FIG. 71(B) is a horizontal direction plan view of FIG. 71(A). FIG. 71(C) is a vertical direction sectional view taken along the line R-R' of FIG. 71(B).

In the seventh calibration method, respective heights of the PTZ camera apparatus 1 and the omnidirectional microphone array apparatus 2 from the floor are different from each other, and the omnidirectional microphone array apparatus 2 is installed so as to be located within an imaging viewing angle of the PTZ camera apparatus 1. For this reason, the PTZ camera apparatus 1 is driven in a panning direction and a tilting direction and then focuses and zooms both of the omnidirectional microphone array apparatus 2 and the calibration marker MAK, and thus the omnidirectional microphone array apparatus 2 and the calibration marker MAK are located at a central point of a screen of the display device 36 (refer to FIG. 68).

In the seventh calibration method, the height $H_M$ of the omnidirectional microphone array apparatus 2 from the floor is greater than the height $H_C$ of the PTZ camera apparatus 1 from the floor ($H_C < H_M$), and the circular calibration floor marker MAK2 is installed at a position on the floor located vertically downward directly under a predetermined position of the omnidirectional microphone array apparatus 2 (refer to FIG. 69(A)). Calibration parameters in the seventh calibration method are a horizontal direction distance $L_{CMh}$ between the PTZ camera apparatus 1 and the omnidirectional microphone array apparatus 2, the height $H_C$ of the PTZ camera apparatus 1 from the floor, and the height $H_M$ of the omnidirectional microphone array apparatus 2 from the floor.

If two locations (refer to FIG. 68) including a central point O of the calibration floor marker MAK2 and the omnidirectional microphone array apparatus 2 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, the height $H_C$ of the PTZ camera apparatus 1 from the floor, and the height $H_M$ of the omnidirectional microphone array apparatus 2 from the floor by using a vertical angle $\theta_{COv}$ which is directed from the PTZ camera apparatus 1 toward the calibration floor marker MAK2, a vertical angle $\theta_{CMv}$ which is directed from the PTZ camera apparatus 1 toward the omnidirectional microphone array apparatus 2, and a distance $L_{COv}$ from the PTZ camera apparatus 1 to the calibration floor marker MAK2. With reference to FIGS. 69(B) and 69(C), a detailed description will be made of a method of computing the horizontal direction distance $L_{CMh}$ and the heights $H_M$ and $H_C$ in the sound collection direction computation section 34.

If the two locations (refer to FIG. 68) including the central point O of the calibration floor marker MAK2 and the omnidirectional microphone array apparatus 2 displayed on the display device 36 are designated with the finger FG of the user, the sound collection direction computation section 34 acquires the distance $L_{COv}$ from the PTZ camera apparatus 1 to the calibration floor marker MAK2, a horizontal angle $\theta_{COh}$ and a vertical angle $\theta_{COv}$ which are directed from the PTZ camera apparatus 1 toward the calibration floor marker MAK2, and a horizontal angle $\theta_{CMh}$ and a vertical angle $\theta_{CMv}$ which are directed from the PTZ camera apparatus 1 toward the omnidirectional microphone array apparatus 2. Data of the distance $L_{COv}$, the horizontal angle $\theta_{COh}$, the vertical angle $\theta_{COv}$, the horizontal angle $\theta_{CMh}$, and a vertical angle $\theta_{CMv}$ is computed by the PTZ camera apparatus 1 and is then transmitted from the PTZ camera apparatus 1 to the directionality control apparatus 3. In addition, since, as the calibration floor marker MAK2, the circular calibration floor marker MAK2 is installed at the position on the floor located vertically downward directly under a predetermined position of the omnidirectional microphone array apparatus 2, the horizontal angle $\theta_{COh}$ which is directed from the PTZ camera apparatus 1 toward the calibration floor marker MAK2 is the same as the horizontal angle $\theta_{CMh}$ which is directed from the PTZ camera apparatus 1 toward the omnidirectional microphone array apparatus 2 ($\theta_{COh} = \theta_{CMh}$).

The sound collection direction computation section 34 computes the horizontal direction distance $L_{CMh}$ between the PTZ camera apparatus 1 and the omnidirectional microphone array apparatus 2 according to Equation (118) and computes the height $H_C$ of the PTZ camera apparatus 1 from the floor according to Equation (119), by using the distance $L_{CO}$ ($= L_{COv}$) from the PTZ camera apparatus 1 to the calibration floor marker MAK2, and the vertical angle $\theta_{COv}$ which is directed from the PTZ camera apparatus 1 toward the central point O of the calibration floor marker MAK2 in the triangle COP illustrated in FIG. 69(C).

[Equation 118]

$$L_{COh} = L_{CMh} = L_{COv} \times \cos \theta_{COv} \qquad (118)$$

[Equation 119]

$$H_C = L_{COv} \times \sin \theta_{COv} \qquad (119)$$

The sound collection direction computation section 34 computes a distance $L_{MOv''}$ corresponding to a difference ($H_M - H_C$) between the height $H_M$ of the omnidirectional microphone array apparatus 2 from the floor and the height $H_C$ of the PTZ camera apparatus 1 from the floor according to Equation (120) by using the computation result of Equation (118), and the vertical angle $\theta_{CMv}$ which is directed from the PTZ camera apparatus 1 toward the omnidirectional microphone array apparatus 2 in the triangle CMP illustrated in FIG. 69(C). Consequently, the sound collection direction computation section 34 computes the height $H_M$ of the omnidirectional microphone array apparatus 2 from the floor according to Equation (121) by using the respective computation results of Equations (119) and (120).

[Equation 120]

$$L_{MOv''} = H_M - H_C = L_{CMh} \times \tan \theta_{CMv} = (L_{COv} \times \cos \theta_{COv}) \times \tan \theta_{CMv} \qquad (120)$$

[Equation 121]

$$H_M = H_C + L_{MOv''} = L_{COv} \times \sin \theta_{COv} + (L_{COv} \times \cos \theta_{COv}) \times \tan \theta_{CMv} \qquad (121)$$

Next, in the fourth method of computing the sound collection direction coordinates ($\theta_{MAh}, \theta_{MAv}$), a height of the target sound source position A from the floor is an input value which is input by the user and is different from that in the third method of computing the sound collection direction coordinates ($\theta_{MAh}, \theta_{MAv}$). In addition, the respective heights $H_C$ and $H_M$ of the PTZ camera apparatus 1 and the omnidirectional microphone array apparatus 2 from the floor are different from each other.

Specifically, the sound collection direction computation section 34 computes the sound collection direction coordinates ($\theta_{MAh}, \theta_{MAv}$) indicating a sound collection direction which is directed from the omnidirectional microphone array apparatus 2 toward the target sound source position A by using:

(1) the horizontal angle $\theta_{CMh}$ which is directed from the PTZ camera apparatus 1 toward the omnidirectional microphone array apparatus 2;

(2) the horizontal direction distance $L_{CMh}$ between the PTZ camera apparatus 1 and the omnidirectional microphone array apparatus 2;

(3) the horizontal angle $\theta_{MCh}$ which is directed from the omnidirectional microphone array apparatus 2 toward the PTZ camera apparatus 1;

(4) the respective heights $H_C$ and $H_M$ of the PTZ camera apparatus 1 and the omnidirectional microphone array apparatus 2 from the floor;

(5) a horizontal angle $\theta_{CAh}$ and a vertical angle $\theta_{CAv}$ which are directed from the PTZ camera apparatus 1 toward the target sound source position A; and (6) the height $H_A$ of the target sound source position A from the floor, input by the user.

With reference to FIGS. 70(B) and 70(C) and FIGS. 71(B) and 71(C), a detailed description will be made of the fourth method of computing the sound collection direction coordinates ($\theta_{MAh}, \theta_{MAv}$) in the sound collection direction computation section 34.

(1) As the horizontal angle $\theta_{CMh}$ which is directed from the PTZ camera apparatus 1 toward the omnidirectional microphone array apparatus 2, a value computed by the PTZ camera apparatus 1 in the seventh calibration method is used ($\theta_{CMh}=\theta_{COh}$).

(2) The horizontal direction distance $L_{CMh}$ between the PTZ camera apparatus 1 and the omnidirectional microphone array apparatus 2 is a calibration parameter in the seventh calibration method (refer to Equation (112)).

(3) The horizontal angle $\theta_{MCh}$ which is directed from the omnidirectional microphone array apparatus 2 toward the PTZ camera apparatus 1 is a predefined value (zero) obtained based on a positional relationship between the PTZ camera apparatus 1 and the omnidirectional microphone array apparatus 2 in the seventh calibration method.

(4) The respective heights $H_C$ and $H_M$ of the PTZ camera apparatus 1 and the omnidirectional microphone array apparatus 2 from the floor are calibration parameters in the seventh calibration method (refer to Equations (119) and (121)).

(5) As the horizontal angle $\theta_{CAh}$ and the vertical angle $\theta_{CAv}$ from the PTZ camera apparatus 1 to the target sound source position A, values are used which are computed by the PTZ camera apparatus 1 in response to designation of the designated position A' in captured image data displayed on the display device 36.

(6) The height $H_A$ of the target sound source position A from a horizontal surface (for example, the floor) is a value which is input through a user's input operation.

The sound collection direction computation section 34 computes a horizontal direction distance $L_{CAh}$ of the distance $L_{CA}$ between the PTZ camera apparatus 1 and the target sound source position A according to Equation (122) by using the distance corresponding to a difference ($H_C-H_A$) between the heights of the PTZ camera apparatus 1 and the target sound source position A from the floor, and the vertical angle $\theta_{CAv}$ which is directed from the PTZ camera apparatus 1 toward the target sound source position A in the triangle CAS' illustrated in FIG. 70(C).

[Equation 122]

$$L_{CAh}=(H_C-H_A)/\tan\theta_{CAv} \quad (122)$$

The sound collection direction computation section 34 computes a horizontal direction distance $L_{MAh}$ of the distance $L_{MA}$ from the omnidirectional microphone array apparatus 2 to the target sound source position A according to Equation (123) based on the cosine theorem for the triangle CAM illustrated in FIG. 70(B) by using the respective computation results of Equations (118) and (122), the horizontal angle $\theta_{CAh}$ which is directed from the PTZ camera apparatus 1 toward the target sound source position A, and the horizontal angle $\theta_{MCh}$ which is directed from the PTZ camera apparatus 1 toward the omnidirectional microphone array apparatus 2.

[Equation 123]

$$L_{MAh}=\sqrt{L_{CAh}^2+L_{CMh}^2-2L_{CAh}\times L_{CMh}\times\cos(\theta_{CAh}-\theta_{CMh})} \quad (123)$$

The sound collection direction computation section 34 computes a cosine value $\cos\theta_{MAh}$ of the horizontal angle $\theta_{MAh}$ which is directed from the omnidirectional microphone array apparatus 2 toward the target sound source position A according to Equation (124) based on the cosine theorem for the triangle CAM illustrated in FIG. 70(B) by using the respective computation results of Equations (118), (122) and (123). Consequently, the sound collection direction computation section 34 can compute the horizontal angle $\theta_{MAh}$ which is directed from the omnidirectional microphone array apparatus 2 toward the target sound source position A according to Equation (125).

[Equation 124]

$$\cos\theta_{MAh}=\frac{L_{MAh}^2+L_{CMh}^2-L_{CAh}^2}{2L_{MAh}\times L_{CMh}} \quad (124)$$

[Equation 125]

$$\theta_{MAh}=\arccos\left(\frac{L_{MAh}^2+L_{CMh}^2-L_{CAh}^2}{2L_{MAh}\times L_{CMh}}\right) \quad (125)$$

In addition, the sound collection direction computation section 34 computes a tangent value $\tan\theta_{MAv}$ of the vertical angle $\theta_{MAv}$ which is directed from the omnidirectional microphone array apparatus 2 toward the target sound source position A according to Equation (126) based on a tangent for the triangle MAS" illustrated in FIG. 71(C) by using the computation result of Equation (123), and the distance ($H_M-H_A$) corresponding to the difference between the height $H_M$ of the omnidirectional microphone array apparatus 2 from the floor and the height $H_A$ of the target sound source position A from the floor as the computation result of Equation (121). Consequently, the sound collection direction computation section 34 can compute the vertical angle $\theta_{MAv}$ which is directed from the omnidirectional microphone array apparatus 2 toward the target sound source position A according to Equation (127).

[Equation 126]

$$\tan\theta_{MAv}=\frac{(H_M-H_A)}{L_{MAh}} \quad (126)$$

[Equation 127]

$$\theta_{MAv}=\arctan\left(\frac{H_M-H_A}{L_{MAh}}\right) \quad (127)$$

As mentioned above, in the seventh calibration method and the fourth method of computing the sound collection direction coordinates ($\theta_{MAh},\theta_{MAv}$), if the two locations (refer to FIG. 68) including the central point O of the calibration floor marker MAK2 and the omnidirectional microphone array apparatus 2 displayed on the display device 36 are designated with the finger FG of the user, the sound collection direction computation section 34 can easily compute the heights $H_C$ and $H_M$ of the PTZ camera apparatus 1 and the omnidirectional microphone array apparatus 2 from the horizontal surface, and can also easily compute the horizontal direction distance $L_{CMh}$ between the PTZ camera apparatus 1 and the omnidirectional microphone array apparatus 2 as a calibration parameter.

In addition, the sound collection direction computation section 34 can easily compute the sound collection direction coordinates indicating a sound collection direction which is directed from the omnidirectional microphone array apparatus 2 toward the target sound source position A by using the horizontal angle $\theta_{CMh}$, the horizontal direction distance $L_{CMh}$, the respective heights $H_C$ and $H_M$ of the PTZ camera apparatus 1 and the omnidirectional microphone array apparatus 2 from the horizontal surface, which are computed during calibration, the predefined horizontal angle $\theta_{MCh}$, the horizontal angle $\theta_{CAh}$ and the vertical angle $\theta_{CAv}$ which are directed from the PTZ camera apparatus 1 toward the target sound source position A, and the input value of the height $H_A$ of the target sound source position A from the horizontal surface, input by the user. Further, since a value desired by the user can be used as the height $H_A$ of the target sound source position A from the floor, a degree of freedom of selection of the height $H_A$ of the target sound source position A from the floor is improved.

(Fourth Method of Computing Sound Collection Direction Coordinates According to Eighth Calibration Method)

Next, with reference to FIG. 72 and FIGS. 73(A) to 73(C), a description will be made of an eighth calibration method, and the fourth method of computing sound collection direction coordinates after computing a calibration parameter according to the eighth calibration method.

FIG. 72 is a diagram illustrating the eighth calibration method in the eleventh embodiment. FIG. 73(A) is a diagram illustrating a positional relationship between the PTZ camera apparatus 1, the omnidirectional microphone array apparatus 2, the calibration marker MAK, and the calibration floor marker MAK2 in the eighth calibration method. FIG. 73(B) is a horizontal direction plan view of FIG. 73(A). FIG. 73(C) is a vertical direction sectional view taken along the line K-K' of FIG. 73(B).

In the eighth calibration method, respective heights $H_C$ and $H_M$ of the PTZ camera apparatus 1 and the omnidirectional microphone array apparatus 2 from the floor are different from each other, and the omnidirectional microphone array apparatus 2 is installed so as not to be located within an imaging viewing angle of the PTZ camera apparatus 1. For this reason, the PTZ camera apparatus 1 is driven in a panning direction and a tilting direction and then focuses and zooms both of the calibration marker MAK and the calibration floor marker MAK2, and thus the calibration marker MAK and the calibration floor marker MAK2 are located at a central point of a screen of the display device 36 (refer to FIG. 72).

In the eighth calibration method, the height $H_M$ of the omnidirectional microphone array apparatus 2 from the floor is greater than the height $H_C$ of the PTZ camera apparatus 1 from the floor ($H_C < H_M$), the calibration marker MAK which is a solid object is suspended vertically downward directly under a predetermined position of the omnidirectional microphone array apparatus 2 by using, for example, a string STR or a cord, and, further, the circular calibration floor marker MAK2 is installed at a position on the floor located vertically downward directly under a predetermined position of the omnidirectional microphone array apparatus 2 (refer to FIG. 73(A)). Calibration parameters in the eighth calibration method are a horizontal direction distance $L_{CMh}$ between the PTZ camera apparatus 1 and the omnidirectional microphone array apparatus 2, the height $_c$ of the PTZ camera apparatus 1 from the floor, and the height $H_M$ of the omnidirectional microphone array apparatus 2 from the floor.

If two locations (refer to FIG. 72) including respective central points O' and O" of the calibration marker MAK and the calibration floor marker MAK2 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, the height 11 of the PTZ camera apparatus 1 from the floor, and the height $H_M$ of the omnidirectional microphone array apparatus 2 from the floor by using a vertical angle $\theta_{CO"v}$ which is directed from the PTZ camera apparatus 1 toward the calibration marker MAK, a vertical angle $\theta_{CO"v}$ which is directed from the PTZ camera apparatus 1 toward the calibration floor marker MAK2, and a distance $L_{CO"v}$ from the PTZ camera apparatus 1 to the calibration floor marker MAK2. With reference to FIGS. 73(B) and 73(C), a detailed description will be made of a method of computing the horizontal direction distance $L_{CMh}$ and the heights $H_M$ and $H_C$ in the sound collection direction computation section 34.

If two locations (refer to FIG. 72) including respective central points O' and O" of the calibration marker MAK and the calibration floor marker MAK2 displayed on the display device 36 are designated with the finger FG of the user, the sound collection direction computation section 34 acquires the distance $L_{CO"v}$ from the PTZ camera apparatus 1 to the calibration floor marker MAK2, a horizontal angle $\theta_{CO"h}$ and a vertical angle $\theta_{CO'v}$ which are directed from the PTZ camera apparatus 1 toward the calibration marker MAK, and a horizontal angle $\theta_{CO"h}$ and a vertical angle $\theta_{CO"v}$ which are directed from the PTZ camera apparatus 1 toward the calibration floor marker MAK2. Data of the distance $L_{CO"v}$, the horizontal angle $\theta_{CO"h}$, the vertical angle $\theta_{CO'v}$, the horizontal angle kWh, and a vertical angle $\theta_{CO"v}$ is computed by the PTZ camera apparatus 1 and is then transmitted from the PTZ camera apparatus 1 to the directionality control apparatus 3. In addition, since the calibration marker MAK is suspended vertically downward directly under a predetermined position of the omnidirectional microphone array apparatus 2, and the calibration floor marker MAK2 is installed at the position on the floor located vertically downward directly under a predetermined position of the omnidirectional microphone array apparatus 2, the respective horizontal angles $\theta_{CO'h}$ and $\theta_{CO"h}$ which are directed from the PTZ camera apparatus 1 toward the calibration marker MAK and the calibration floor marker MAK2 are the same as the horizontal angle $\theta_{CMh}$ which is directed from the PTZ camera apparatus 1 toward the omnidirectional microphone array apparatus 2 ($\theta_{CO'h} = \theta_{CO"h} = \theta_{CMh}$).

The sound collection direction computation section 34 computes the horizontal direction distance $L_{CMh}$ between the PTZ camera apparatus 1 and the omnidirectional microphone array apparatus 2 according to Equation (128) and computes the height $H_C$ of the PTZ camera apparatus 1 from the floor according to Equation (129), by using the distance $L_{CO"v}$ ($= L_{CO"}$) from the PTZ camera apparatus 1 to the calibration floor marker MAK2, and the vertical angle $\theta_{CO"v}$ which is directed from the PTZ camera apparatus 1 toward the calibration floor marker MAK2 in the triangle CO"P illustrated in FIG. 73(C). In addition, since the calibration floor marker MAK2 is installed at the position on the floor located vertically downward directly under a predetermined position of the omnidirectional microphone array apparatus 2, the horizontal direction distance $L_{COh}$ between the PTZ camera apparatus 1 and the calibration floor marker MAK2 is the same as a horizontal direction distance $L_{CMh}$ between the PTZ camera apparatus 1 and the omnidirectional microphone array apparatus 2 ($L_{COh} = L_{CMh}$).

[Equation 128]

$$L_{COh} = L_{CMh} = L_{CO"v} \times \cos \theta_{CO"v} \qquad (128)$$

[Equation 129]

$$H_C = L_{CO"v} \times \sin \theta_{CO"v} \qquad (129)$$

A relational expression of Equation (130) is established based on the sine theorem for the triangle CO"O' illustrated in FIG. 73(C). Therefore, the sound collection direction computation section 34 computes the height $H_M$ of the omnidirectional microphone array apparatus 2 from the floor according to Equation (131) by using the computation result of Equation (130).

[Equation 130]

$$L_{CO''v}/\sin(\pi/2+\theta_{CO'v})=H_M-L_{MO'v}/\sin(\theta_{CO''v}-\theta_{CO'v}) \quad (130)$$

[Equation 131]

$$H_M=L_{MO'v}+L_{CO''v}\times\sin(\theta_{CO''v}-\theta_{CO'v})/\sin(\pi/2+\theta_{CO'v}) \quad (131)$$

Further, a method of computing the sound collection direction coordinates ($\theta_{MAh},\theta_{MAv}$) in the sound collection direction computation section 34 after computing the calibration parameters according to the eighth calibration method is the same as the above-described fourth method of computing the sound collection direction coordinates ($\theta_{MAh},\theta_{MAv}$), and thus description thereof will be omitted.

As mentioned above, in the eighth calibration method and the fourth method of computing the sound collection direction coordinates ($\theta_{MAh},\theta_{MAv}$), if the two locations (refer to FIG. 72) including the central points O' and O'' of the calibration marker MAK and the calibration floor marker MAK2 displayed on the display device 36 are designated with the finger FG of the user, the sound collection direction computation section 34 can easily compute the respective heights $H_C$ and $H_M$ of the PTZ camera apparatus 1 and the omnidirectional microphone array apparatus 2 from the floor, and can also easily compute the horizontal direction distance $L_{CMh}$ between the PTZ camera apparatus 1 and the omnidirectional microphone array apparatus 2 as a calibration parameter.

(Fourth Method of Computing Sound Collection Direction Coordinates According to Ninth Calibration Method)

Next, with reference to FIG. 74, and FIGS. 75(A) to 75(C), a description will be made of a ninth calibration method, and the fourth method of computing sound collection direction coordinates after computing a calibration parameter according to the ninth calibration method.

FIG. 74 is a diagram illustrating the ninth calibration method in the eleventh embodiment. FIG. 75(A) is a diagram illustrating a positional relationship between the PTZ camera apparatus 1, the omnidirectional microphone array apparatus 2, and the calibration floor marker MAK2 in the ninth calibration method. FIG. 75(B) is a horizontal direction plan view of FIG. 75(A). FIG. 75(C) is a vertical direction sectional view taken along the line K-K' of FIG. 75(B).

In the ninth calibration method, respective heights $H_C$ and $H_M$ of the PTZ camera apparatus 1 and the omnidirectional microphone array apparatus 2 from the floor are different from each other, and the omnidirectional microphone array apparatus 2 is installed so as not to be located within an imaging viewing angle of the PTZ camera apparatus 1. For this reason, the PTZ camera apparatus 1 is driven in a panning direction and a tilting direction and then focuses and zooms the calibration floor marker MAK2, and thus the calibration floor marker MAK2 is located at a central point of a screen of the display device 36 (refer to FIG. 74).

In the ninth calibration method, the height $H_M$ of the omnidirectional microphone array apparatus 2 from the floor is greater than the height $H_C$ of the PTZ camera apparatus 1 from the floor ($H_C<H_M$), and the circular calibration floor marker MAK2 is installed at a position on the floor located vertically downward directly under a predetermined position of the omnidirectional microphone array apparatus 2 (refer to FIG. 75(A)). Calibration parameters in the ninth calibration method are a horizontal direction distance $L_{CMh}$ between the PTZ camera apparatus 1 and the omnidirectional microphone array apparatus 2, and the height $H_C$ of the PTZ camera apparatus 1 from the floor.

If a central point O (refer to FIG. 74) of the calibration floor marker MAK2 displayed on the display device 36 is designated with the finger FG of the user, the sound collection direction computation section 34 computes the horizontal direction distance $L_{CMh}$ between the PTZ camera apparatus 1 and the omnidirectional microphone array apparatus 2 and the height $H_C$ of the PTZ camera apparatus 1 from the floor by using the vertical angle $\theta_{COv}$ which is directed from the PTZ camera apparatus 1 toward the calibration floor marker MAK2, and the distance $L_{COv}$ between the PTZ camera apparatus 1 and the calibration floor marker MAK2. With reference to FIGS. 75(B) and 75(C), a detailed description will be made of a method of computing the horizontal direction distance $L_{CMh}$ and the height $H_C$, in the sound collection direction computation section 34.

If the central point O (refer to FIG. 74) of the calibration floor marker MAK2 displayed on the display device 36 is designated with the finger FG of the user, the sound collection direction computation section 34 acquires a distance $L_{COv}$ from the PTZ camera apparatus 1 to the calibration floor marker MAK2, and a horizontal angle $\theta_{COh}$ and a vertical angle $\theta_{COv}$ which are directed from the PTZ camera apparatus 1 toward the calibration floor marker MAK2. Data of the distance $L_{COv}$, the horizontal angle $\theta_{COh}$, and the vertical angle $\theta_{COv}$ is computed by the PTZ camera apparatus 1 and is then transmitted from the PTZ camera apparatus 1 to the directionality control apparatus 3. In addition, since the calibration floor marker MAK2 is installed at the position on the floor located vertically downward directly under a predetermined position of the omnidirectional microphone array apparatus 2, the horizontal angle $\theta_{COh}$ which is directed from the PTZ camera apparatus 1 toward the calibration floor marker MAK2 is the same as a horizontal angle $\theta_{CMh}$ which is directed from the PTZ camera apparatus 1 toward the omnidirectional microphone array apparatus 2 ($\theta_{COh}=\theta_{CMh}$).

The sound collection direction computation section 34 computes the horizontal direction distance $L_{CMh}$ between the PTZ camera apparatus 1 and the omnidirectional microphone array apparatus 2 according to Equation (132) and computes the height $H_C$ of the PTZ camera apparatus 1 from the floor according to Equation (133), by using the distance $L_{COv}$ ($=L_{CO}$) from the PTZ camera apparatus 1 to the calibration floor marker MAK2, and the vertical angle $\theta_{COv}$ which is directed from the PTZ camera apparatus 1 toward the calibration floor marker MAK2 in the triangle COP illustrated in FIG. 75(C). In addition, since the calibration floor marker MAK2 is installed at the position on the floor located vertically downward directly under a predetermined position of the omnidirectional microphone array apparatus 2, the horizontal direction distance $L_{COh}$ between the PTZ camera apparatus 1 and the calibration floor marker MAK2 is the same as the horizontal direction distance $L_{CMh}$ between the PTZ camera apparatus 1 and the omnidirectional microphone array apparatus 2 ($L_{COh}=L_{CMh}$).

[Equation 132]

$$L_{COh}=L_{CMh}=L_{COv}\times\cos\theta_{COv} \quad (132)$$

[Equation 133]

$$H_C=L_{COv}\times\sin\theta_{COv} \quad (133)$$

Further, a method of computing the sound collection direction coordinates ($\theta_{MAh},\theta_{MAv}$) in the sound collection direction computation section 34 after computing the calibration parameters according to the ninth calibration method is the same as the above-described fourth method of computing the sound collection direction coordinates ($\theta_{MAh}$, $\theta_{MAv}$), and thus description thereof will be omitted.

As mentioned above, in the ninth calibration method and the fourth method of computing the sound collection direction coordinates ($\theta_{MAh}$, $\theta_{MAv}$), even in a case where the respective heights of the PTZ camera apparatus 1 and the omnidirectional microphone array apparatus 2 from the floor are different from each other, and the omnidirectional microphone array apparatus 2 is not present within the imaging viewing angle of the PTZ camera apparatus 1, if the central point O (refer to FIG. 74) of the calibration floor marker MAK2 displayed on the display device 36 is designated with the finger FG of the user, the sound collection direction computation section 34 can easily compute the height $H_C$ of the PTZ camera apparatus 1 from the floor, and can also easily compute the horizontal direction distance $L_{CMh}$ between the PTZ camera apparatus 1 and the omnidirectional microphone array apparatus 2 as a calibration parameter.

(Fourth Method of Computing Sound Collection Direction Coordinates According to Tenth Calibration Method)

Last, with reference to FIG. 76, FIGS. 77(A) to 77(C), FIGS. 78(A) to 78(C), and FIGS. 79(A) to 79(C), a description will be made of a tenth calibration method, and the fourth method of computing sound collection direction coordinates after computing a calibration parameter according to the tenth calibration method.

FIG. 76 is a diagram illustrating the tenth calibration method in the eleventh embodiment. FIG. 77(A) is a diagram illustrating a positional relationship between the PTZ camera apparatus 1, the omnidirectional microphone array apparatus 2, and the calibration marker MAK in the tenth calibration method. FIG. 77(B) is a horizontal direction plan view of FIG. 77(A). FIG. 77(C) is a vertical direction sectional view taken along the line K-K' of FIG. 77(B).

FIG. 78(A) is a diagram illustrating a positional relationship between the PTZ camera apparatus 1, the omnidirectional microphone array apparatus 2, and the target sound source position A in the tenth calibration method. FIG. 78(B) is a horizontal direction plan view of FIG. 78(A). FIG. 78(C) is a vertical direction sectional view taken along the line Q-Q' of FIG. 78(B). FIG. 79(A) is a diagram illustrating a positional relationship between the PTZ camera apparatus 1, the omnidirectional microphone array apparatus 2, and the target sound source position A in the tenth calibration method. FIG. 79(B) is a horizontal direction plan view of FIG. 79(A). FIG. 79(C) is a vertical direction sectional view taken along the line R-R' of FIG. 79(B).

In the tenth calibration method, respective heights of the PTZ camera apparatus 1 and the omnidirectional microphone array apparatus 2 from the floor are different from each other, and the omnidirectional microphone array apparatus 2 is installed so as to be located within an imaging viewing angle of the PTZ camera apparatus 1. For this reason, the PTZ camera apparatus 1 is driven in a panning direction and a tilting direction and then focuses and zooms both of the omnidirectional microphone array apparatus 2 and the calibration marker MAK, and thus the omnidirectional microphone array apparatus 2 and the calibration marker MAK are located at a central point of a screen of the display device 36 (refer to FIG. 76).

In the tenth calibration method, the height $H_C$ of the PTZ camera apparatus 1 from the floor is greater than the height $H_M$ of the omnidirectional microphone array apparatus 2 from the floor ($H_M < H_C$), and the circular calibration floor marker MAK2 is installed at a position on the floor located vertically downward directly under a predetermined position of the omnidirectional microphone array apparatus 2 (refer to FIG. 77(A)). Calibration parameters in the tenth calibration method are a horizontal direction distance $L_{CMh}$ between the PTZ camera apparatus 1 and the omnidirectional microphone array apparatus 2, the height $H_C$ of the PTZ camera apparatus 1 from the floor, and the height $H_M$ of the omnidirectional microphone array apparatus 2 from the floor.

If two locations (refer to FIG. 76) including a central point O of the calibration floor marker MAK2 and the omnidirectional microphone array apparatus 2 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, the height $H_C$ of the PTZ camera apparatus 1 from the floor, and the height $H_M$ of the omnidirectional microphone array apparatus 2 from the floor by using a vertical angle $\theta_{COv}$ which is directed from the PTZ camera apparatus 1 toward the calibration floor marker MAK2, a vertical angle $\theta_{CMv}$ which is directed from the PTZ camera apparatus 1 toward the omnidirectional microphone array apparatus 2, and a distance $L_{COv}$ from the PTZ camera apparatus 1 to the calibration floor marker MAK2. With reference to FIGS. 77(B) and 77(C), a detailed description will be made of a method of computing the horizontal direction distance $L_{CMh}$ and the heights $H_M$ and $H_C$ in the sound collection direction computation section 34.

If the two locations (refer to FIG. 76) including the central point O of the calibration floor marker MAK2 and the omnidirectional microphone array apparatus 2 displayed on the display device 36 are designated with the finger FG of the user, the sound collection direction computation section 34 acquires the distance $L_{COv}$ ($=L_{CO}$) from the PTZ camera apparatus 1 to the calibration floor marker MAK2, a horizontal angle $\theta_{COh}$ and a vertical angle $\theta_{COv}$ which are directed from the PTZ camera apparatus 1 toward the calibration floor marker MAK2, and a horizontal angle $\theta_{CMh}$ and a vertical angle $\theta_{CMv}$ which are directed from the PTZ camera apparatus 1 toward the omnidirectional microphone array apparatus 2. Data of the distance $L_{COv}$, the horizontal angle $\theta_{COh}$, the vertical angle ° coy, the horizontal angle $\theta_{CMh}$, and a vertical angle $\theta_{CMv}$ is computed by the PTZ camera apparatus 1 and is then transmitted from the PTZ camera apparatus 1 to the directionality control apparatus 3. In addition, since the calibration floor marker MAK2 is installed at the position on the floor located vertically downward directly under a predetermined position of the omnidirectional microphone array apparatus 2, the horizontal angle $\theta_{COh}$ which is directed from the PTZ camera apparatus 1 toward the calibration floor marker MAK2 is the same as the horizontal angle $\theta_{CMh}$ which is directed from the PTZ camera apparatus 1 toward the omnidirectional microphone array apparatus 2 ($\theta_{COh} = \theta_{CMh}$).

The sound collection direction computation section 34 computes the horizontal direction distance $L_{CMh}$ between the PTZ camera apparatus 1 and the omnidirectional microphone array apparatus 2 according to Equation (134) and computes the height $H_C$ of the PTZ camera apparatus 1 from the floor according to Equation (135), by using the distance $L_{COv}$ ($=L_{CO}$) from the PTZ camera apparatus 1 to the calibration floor marker MAK2, and the vertical angle $\theta_{COv}$ which is directed from the PTZ camera apparatus 1 toward the central point O of the calibration floor marker MAK2 in the triangle COP illustrated in FIG. 77(C).

[Equation 134]

$$L_{COh}=L_{CMh}=L_{COv}\times\cos\theta_{COv} \quad (134)$$

[Equation 135]

$$H_C=L_{COv}\times\sin\theta_{COv} \quad (135)$$

The sound collection direction computation section 34 computes a distance corresponding to a difference ($H_C$-$H_M$) between the height $H_C$ of the PTZ camera apparatus 1 from the floor and the height $H_M$ of the omnidirectional microphone array apparatus 2 from the floor according to Equation (136), and computes the height $H_M$ of the omnidirectional microphone array apparatus 2 from the floor according to Equation (137), by using the computation result of Equation (134), and a difference ($\theta_{COv}$-$\theta_{CMv}$) between the vertical angle $\theta_{COv}$ which is directed from the PTZ camera apparatus 1 toward the central point O of the calibration floor marker MAK2 and the vertical angle $\theta_{CMv}$ which is directed from the PTZ camera apparatus 1 toward the omnidirectional microphone array apparatus 2 in the triangle CMP illustrated in FIG. 77(C).

[Equation 136]

$$H_C = L_{COv}\times\sin\theta_{COv} \quad (136)$$

[Equation 137]

$$\begin{aligned}H_M &= H_C - L_{COv}\times\cos\theta_{COv}\times\tan(\theta_{COv}-\theta_{CMv})\\ &= L_{COv}\times(\sin\theta_{COv}-\cos\theta_{COv}\times\tan(\theta_{COv}-\theta_{CMv}))\end{aligned} \quad (137)$$

Next, in the fourth method of computing the sound collection direction coordinates ($\theta_{MAh}$,$\theta_{MAv}$), a height of the target sound source position A from a horizontal surface (for example, the floor) is an input value which is input by the user and is different from that in the third method of computing the sound collection direction coordinates ($\theta_{MAh}$, $\theta_{MAv}$). In addition, the respective heights $H_C$ and $H_M$ of the PTZ camera apparatus 1 and the omnidirectional microphone array apparatus 2 from the floor are different from each other.

Specifically, the sound collection direction computation section 34 computes the sound collection direction coordinates ($\theta_{MAh}$,$\theta_{MAv}$) indicating a sound collection direction which is directed from the omnidirectional microphone array apparatus 2 toward the target sound source position A by using:

(1) the horizontal angle $\theta_{CMh}$ which is directed from the PTZ camera apparatus 1 toward the omnidirectional microphone array apparatus 2;

(2) the horizontal direction distance $L_{CMh}$ between the PTZ camera apparatus 1 and the omnidirectional microphone array apparatus 2;

(3) the horizontal angle $\theta_{MCh}$ which is directed from the omnidirectional microphone array apparatus 2 toward the PTZ camera apparatus 1;

(4) the respective heights $H_C$ and $H_M$ of the PTZ camera apparatus 1 and the omnidirectional microphone array apparatus 2 from the floor;

(5) a horizontal angle $\theta_{CAh}$ and a vertical angle $\theta_{CAv}$ which are directed from the PTZ camera apparatus 1 toward the target sound source position A; and (6) the height $H_A$ of the target sound source position A from the floor, input by the user.

With reference to FIGS. 78(B) and 78(C) and FIGS. 79(B) and 79(C), a detailed description will be made of the method of computing the sound collection direction coordinates ($\theta_{MAh}$,$\theta_{MAv}$) in the sound collection direction computation section 34.

(1) As the horizontal angle $\theta_{CMh}$ which is directed from the PTZ camera apparatus 1 toward the omnidirectional microphone array apparatus 2, a value computed by the PTZ camera apparatus 1 in the tenth calibration method is used ($\theta_{CMh}$=$\theta_{COh}$).

(2) The horizontal direction distance $L_{CMh}$ between the PTZ camera apparatus 1 and the omnidirectional microphone array apparatus 2 is a calibration parameter in the tenth calibration method (refer to Equation (134)).

(3) The horizontal angle $\theta_{MCh}$ which is directed from the omnidirectional microphone array apparatus 2 toward the PTZ camera apparatus 1 is a predefined value (zero) obtained based on a positional relationship between the PTZ camera apparatus 1 and the omnidirectional microphone array apparatus 2 in the tenth calibration method.

(4) The respective heights $H_C$ and $H_M$ of the PTZ camera apparatus 1 and the omnidirectional microphone array apparatus 2 from the floor are calibration parameters in the tenth calibration method (refer to Equations (135) and (137)).

(5) As the horizontal angle $\theta_{CAh}$ and the vertical angle $\theta_{CAv}$ from the PTZ camera apparatus 1 to the target sound source position A, values are used which are computed by the PTZ camera apparatus 1 in response to designation of the designated position A' in captured image data displayed on the display device 36.

(6) The height $H_A$ of the target sound source position A from the floor is a value which is input through a user's input operation.

The sound collection direction computation section 34 computes a horizontal direction distance $L_{CAh}$ of the distance $L_{CA}$ between the PTZ camera apparatus 1 and the target sound source position A according to Equation (138) by using the distance corresponding to a difference ($H_C$-$H_A$) between the heights of the PTZ camera apparatus 1 and the target sound source position A from the floor, and the vertical angle $\theta_{CAv}$ which is directed from the PTZ camera apparatus 1 toward the target sound source position A in the triangle CAS' illustrated in FIG. 78(C).

[Equation 138]

$$L_{CAh}=(H_C-H_A)/\tan\theta_{CAv} \quad (138)$$

The sound collection direction computation section 34 computes a horizontal direction distance $L_{MAh}$ of the distance $L_{MA}$ from the omnidirectional microphone array apparatus 2 to the target sound source position A according to Equation (139) based on the cosine theorem for the triangle CAM illustrated in FIG. 78(B) by using the respective computation results of Equations (134) and (138), the horizontal angle $\theta_{CAh}$ which is directed from the PTZ camera apparatus 1 toward the target sound source position A, and the horizontal angle $\theta_{CMh}$ which is directed from the PTZ camera apparatus 1 toward the omnidirectional microphone array apparatus 2.

[Equation 139]

$$L_{MAh}=\sqrt{(L_{CAh}^2+L_{CMh}^2-2L_{CAh}\times L_{CMh}\times\cos(\theta_{CAh}-\theta_{CMh})} \quad (139)$$

The sound collection direction computation section 34 computes a cosine value $\cos\theta_{MAh}$ of the horizontal angle $\theta_{MAh}$ which is directed from the omnidirectional microphone array apparatus 2 toward the target sound source position A according to Equation (140) based on the cosine theorem for the triangle CAM illustrated in FIG. 78(B) by using the respective computation results of Equations (134), (138) and (139). Consequently, the sound collection direction computation section 34 can compute the horizontal angle $\theta_{MAh}$ which is directed from the omnidirectional microphone array apparatus 2 toward the target sound source position A according to Equation (141).

[Equation 140]

$$\cos\theta_{MAh} = \frac{L_{MAh}^2 + L_{CMh}^2 - L_{CAh}^2}{2L_{MAh} \times L_{CMh}} \quad (140)$$

[Equation 141]

$$\theta_{MAh} = \arccos\left(\frac{L_{MAh}^2 + L_{CMh}^2 - L_{CAh}^2}{2L_{MAh} \times L_{CMh}}\right) \quad (141)$$

In addition, the sound collection direction computation section 34 computes a tangent value $\tan\theta_{MAv}$ of the vertical angle $\theta_{MAv}$ which is directed from the omnidirectional microphone array apparatus 2 toward the target sound source position A according to Equation (142) based on a tangent for the triangle MAS" illustrated in FIG. 79(C) by using the computation result of Equation (139), and the distance ($H_M$-$H_A$) corresponding to the difference between the height $H_M$ of the omnidirectional microphone array apparatus 2 from the floor and the height $H_A$ of the target sound source position A from the floor as the computation result of Equation (137). Consequently, the sound collection direction computation section 34 can compute the vertical angle $\theta_{MAv}$ which is directed from the omnidirectional microphone array apparatus 2 toward the target sound source position A according to Equation (143).

[Equation 142]

$$\tan\theta_{MAv} = \frac{(H_M - H_A)}{L_{MAh}} \quad (142)$$

[Equation 143]

$$\theta_{MAv} = \arctan\left(\frac{H_M - H_A}{L_{MAh}}\right) \quad (143)$$

As mentioned above, in the tenth calibration method and the fourth method of computing the sound collection direction coordinates ($\theta_{MAh}$, $\theta_{MAv}$), if the two locations (refer to FIG. 76) including the central point O of the calibration floor marker MAK2 and the omnidirectional microphone array apparatus 2 displayed on the display device 36 are designated with the finger FG of the user, the sound collection direction computation section 34 can easily compute the heights $H_C$ and $H_M$ of the PTZ camera apparatus 1 and the omnidirectional microphone array apparatus 2 from the floor, and can also easily compute the horizontal direction distance $L_{CMh}$ between the PTZ camera apparatus 1 and the omnidirectional microphone array apparatus 2 as a calibration parameter.

In addition, the sound collection direction computation section 34 can easily compute the sound collection direction coordinates indicating a sound collection direction which is directed from the omnidirectional microphone array apparatus 2 toward the target sound source position A by using the horizontal angle $\theta_{CMh}$, the horizontal direction distance $L_{CMh}$, the respective heights $H_C$ and $H_M$ of the PTZ camera apparatus 1 and the omnidirectional microphone array apparatus 2 from the floor, which are computed during calibration, the predefined horizontal angle $\theta_{MCh}$, the horizontal angle $\theta_{CAh}$ and the vertical angle $\theta_{CAv}$ which are directed from the PTZ camera apparatus 1 toward the target sound source position A, and the input value of the height $H_A$ of the target sound source position A from the floor, input by the user. Further, since a value desired by the user can be used as the height $H_A$ of the target sound source position A from the floor, a degree of freedom of selection of the height $H_A$ of the target sound source position A from the floor is improved.

In addition, the fourth method of computing the sound collection direction coordinates based on the tenth calibration method is the same as the fourth method of computing the sound collection direction coordinates based on the seventh calibration method corresponding to a case where the height $H_M$ of the omnidirectional microphone array apparatus 2 from the floor is greater than the height $H_C$ of the PTZ camera apparatus 1 from the floor. Further, in a case where the height $H_M$ of the omnidirectional microphone array apparatus 2 from the floor is greater than the height $H_C$ of the PTZ camera apparatus 1 from the floor, the same applies to the third method of computing the sound collection direction coordinates based on the sixth calibration method or the fourth method of computing the sound collection direction coordinates based on each of the eighth and ninth calibration methods, and thus the sound collection direction computation section can compute the sound collection direction coordinates indicating a sound collection direction which is directed from the omnidirectional microphone array apparatus 2 toward the target sound source position A.

Hereinafter, configurations, operations, and effects of the above-described directionality control system and directionality control method related on the present invention will be described.

According to an embodiment of the present invention, there is provided a directionality control system including an imaging part that images a target object in a predetermined sound collection region; a sound collection part that collects sound of the sound collection region; a display part that displays image data of the target object imaged by the imaging part; a sound collection direction computation part that computes a sound collection direction which is directed from the sound collection part toward a target sound source position corresponding to a designated position in the image data in response to designation of any position in the image data of the target object; and a sound collection control part that forms sound collection directionality of the sound collected by the sound collection part in the sound collection direction computed by the sound collection direction computation part.

In the above-described configuration, the PTZ camera apparatus 1 images a target object (for example, a person) present in a predetermined sound collection region by using a casing driving function in a panning direction or a tilting direction, and a zooming function which well-known techniques. The omnidirectional microphone array apparatus 2 collects sound of the target object present in an imaging direction of the PTZ camera apparatus 1. If any position is designated in image data captured by the PTZ camera apparatus 1 and displayed on the display device 36, the sound collection direction computation section 34 of the directionality control apparatus 3 computes sound collection direction coordinates ($\theta_{MAh}$, $\theta_{MAv}$) in a sound collection direction which is directed from the PTZ camera apparatus 1 toward a target sound source position A corresponding to a designated position A'. The output control section 35 of the directionality control apparatus 3 forms sound collection directionality of sound collected by the omnidirectional microphone array apparatus 2 in the sound collection direction indicated by the computed sound collection direction coordinates ($\theta_{MAh}, \theta_{MAv}$).

Consequently, in the sound collection system 10, since the designated position A' corresponding to the target sound source position A is designated on the display device 36 which displays the image data captured by the PTZ camera apparatus 1, the directionality control apparatus 3 can easily acquire an input parameter (for example, a distance or a direction) which is required to compute a predetermined calibration parameter during calibration which is required in advance prior to computation of sound collection direction coordinates, and can thus easily compute the calibration parameter. Therefore, the directionality control apparatus 3 can easily form sound collection directionality in a sound collection direction which is directed from the omnidirectional microphone array apparatus 2 toward the target sound source position A corresponding to the designated position A' in the image data captured by the PTZ camera apparatus 1 and can thus easily obtain audio data of sound which is collected in the sound collection direction with high accuracy.

In addition, in the directionality control system according to the embodiment of the present invention, respective heights of the imaging part and the sound collection part from a horizontal surface are the same as each other, and the sound collection direction computation part computes a horizontal angle and a vertical angle of a sound collection direction which is directed from the sound collection part toward the target sound source position by using a horizontal angle which is directed from the imaging part toward the sound collection part, a horizontal direction distance between the imaging part and the sound collection part, a horizontal angle which is directed from the sound collection part toward the imaging part, and a horizontal angle and a vertical angle which are directed from the imaging part toward the target sound source position.

In the above-described configuration, respective heights of the PTZ camera apparatus 1 and the omnidirectional microphone array apparatus 2 from a floor are the same as each other. Therefore, the sound collection direction computation section 34 of the directionality control apparatus 3 can easily compute sound collection direction coordinates which are directed from the omnidirectional microphone array apparatus 2 toward the target sound source position A by using the horizontal angle $\theta_{CMh}$ and the horizontal direction distance $L_{CMh}$ which are computed during calibration, the predefined horizontal angle $\theta_{MCh}$, and the horizontal angle $\theta_{CAh}$ and the vertical angle $\theta_{CAv}$ which are directed from the PTZ camera apparatus 1 toward the target sound source position A.

In addition, the sound collection direction computation section 34 of the directionality control apparatus 3 can easily compute the sound collection direction coordinates ($\theta_{MAh}, \theta_{MAv}$) which are directed from the omnidirectional microphone array apparatus 2 toward the target sound source position A without the user inputting the height $H_A$ of the target sound source position A from the floor during computation of the sound collection direction coordinates.

In addition, in the directionality control system according to the embodiment of the present invention, a first marker having a constant distance to the sound collection part is suspended directly under the sound collection part, a height of the first marker from the horizontal surface is the same as a height of the target sound source position from the horizontal surface, and the sound collection direction computation part computes a horizontal direction distance between the imaging part and the sound collection part by using a distance between the sound collection part and the first marker in response to designation of the first marker displayed on the display part.

In the above-described configuration, the calibration marker MAK having a constant distance ($L_{MOv}$) to the omnidirectional microphone array apparatus 2 is suspended directly under the omnidirectional microphone array apparatus 2, and respective heights $H_O$ and $H_A$ of the calibration marker MAK and the target sound source position A from the floor are the same as each other. Therefore, if the calibration marker MAK displayed on the display device 36 is designated with the finger FG of the user, the sound collection direction computation section 34 of the directionality control apparatus 3 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

Further, in the directionality control system according to the embodiment of the present invention, respective heights of the imaging part and the sound collection part from a horizontal surface are the same as each other, and the sound collection direction computation part computes a horizontal angle and a vertical angle of a sound collection direction which is directed from the sound collection part toward the target sound source position by using a horizontal angle which is directed from the imaging part toward the sound collection part, a horizontal direction distance between the imaging part and the sound collection part, a horizontal angle which is directed from the sound collection part toward the imaging part, the respective heights of the imaging part and the sound collection part from the horizontal surface, a horizontal angle and a vertical angle which are directed from the imaging part toward the target sound source position, and an input value of a height of the target sound source position from the horizontal surface.

In the above-described configuration, the respective heights of the PTZ camera apparatus 1 and the omnidirectional microphone array apparatus 2 are the same as each other. Therefore, the sound collection direction computation section 34 of the directionality control apparatus 3 can easily compute sound collection direction coordinates indicating a sound collection direction which is directed from the omnidirectional microphone array apparatus 2 toward the target sound source position A by using the horizontal angle $\theta_{CMh}$ and the horizontal direction distance $L_{CMh}$ which are computed during calibration, the predefined horizontal angle $\theta_{MCh}$, the respective predefined heights $H_C$ and $H_M$ of the PTZ camera apparatus 1 and the omnidirectional microphone array apparatus 2 from the horizontal surface, the horizontal angle $\theta_{CAh}$ and the vertical angle $\theta_{CAv}$ which are directed from the PTZ camera apparatus 1 toward the target sound source position A, and the input value of the height $H_A$ of the target sound source position A from the floor, input by the user.

In addition, the sound collection direction computation section 34 of the directionality control apparatus 3 uses the height $H_M$ of the omnidirectional microphone array apparatus 2 from the horizontal surface, which is easily measured when the omnidirectional microphone array apparatus 2 is initially installed. Therefore, in a case where the calibration marker MAK is suspended from the omnidirectional microphone array apparatus 2, a suspension distance can be easily adjusted. Further, since a value desired by the user can be used as the height $H_A$ of the target sound source position A from the floor, a degree of freedom of selection of the height $H_A$ of the target sound source position A from the floor is improved.

In addition, in the directionality control system according to the embodiment of the present invention, a first marker which has a constant distance to the sound collection part is suspended directly under the sound collection part, a height of the sound collection part from the horizontal surface is a predetermined value, and the sound collection direction computation part computes a horizontal direction distance between the imaging part and the sound collection part by using a distance between the sound collection part and the first marker in response to designation of the first marker displayed on the display part.

In the above-described configuration, the calibration marker MAK having a constant distance ($L_{MOv}$) to the omnidirectional microphone array apparatus 2 is suspended directly under the omnidirectional microphone array apparatus 2, and the height $H_M$ of the omnidirectional microphone array apparatus 2 from the horizontal surface is known. Therefore, if the calibration marker MAK displayed on the display device 36 is designated with the finger FG of the user, the sound collection direction computation section 34 of the directionality control apparatus 3 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

Further, in the directionality control system according to the embodiment of the present invention, a circular second marker is installed at a position on the horizontal surface directly under the sound collection part, and the sound collection direction computation part computes a horizontal direction distance between the imaging part and the sound collection part, and a height of the sound collection part from the horizontal surface, by using a distance from the imaging part to the second marker, and a vertical angle which is directed from the imaging part toward the second marker, in response to designation of a central point of the second marker displayed on the display part.

In the above-described configuration, the circular calibration floor marker MAK2 is installed at the position on the horizontal surface directly under the omnidirectional microphone array apparatus 2. Therefore, if the central point O of the calibration floor marker MAK2 displayed on the display device 36 is designated with the finger FG of the user, the sound collection direction computation section 34 of the directionality control apparatus 3 can easily compute the distance $L_{CO}$ from the PTZ camera apparatus 1 to the calibration floor marker MAK2 by using, for example, a focus function of the PTZ camera apparatus 1, and can also easily compute the horizontal direction distance $L_{CMh}$ between the PTZ camera apparatus 1 and the omnidirectional microphone array apparatus 2 as a calibration parameter.

Further, in the directionality control system according to the embodiment of the present invention, a circular second marker having a predetermined radius is installed at a position on the horizontal surface directly under the sound collection part, and the sound collection direction computation part computes a horizontal direction distance between the imaging part and the sound collection part, and a height of the sound collection part from the horizontal surface, by using a vertical angle which is directed from the imaging part toward a central point of the second marker, a vertical angle which is directed from the imaging part toward an end point on a circumference of the second marker, and the radius of the second marker, in response to designation of the central point and the end point of the second marker displayed on the display part.

In the above-described configuration, the circular calibration floor marker MAK2 having the predetermined radius is installed at the position on the floor directly under the omnidirectional microphone array apparatus 2. Therefore, for example, even when a distance from the omnidirectional microphone array apparatus 2 to the calibration floor marker MAK2 cannot be measured, if two locations including the central point O of the calibration floor marker MAK2 and the end point O' on the circumference thereof displayed on the display device 36 are designated with the finger FG of the user, the sound collection direction computation section 34 of the directionality control apparatus 3 can easily compute the height $H_M$ of the omnidirectional microphone array apparatus 2 from the floor, for example, even in a case where it is hard to measure a distance from the omnidirectional microphone array apparatus 2 to the central point of the calibration floor marker MAK2, and can also easily compute the horizontal direction distance $L_{CMh}$ between the PTZ camera apparatus 1 and the omnidirectional microphone array apparatus 2 as a calibration parameter.

In addition, in the directionality control system according to the embodiment of the present invention, a third marker having a constant height from the horizontal surface is installed directly under the sound collection part, a height of the third marker from the horizontal surface is the same as a height of the target sound source position from the horizontal surface, and the sound collection direction computation part computes a horizontal direction distance between the imaging part and the sound collection part, and a height of the sound collection part from the third marker, by using a distance from the imaging part to the third marker, and a vertical angle which is directed from the imaging part toward the third marker, in response to designation of the third marker displayed on the display part.

In the above-described configuration, the calibration marker MAK3 is installed at the position where the height $H_O$ from the horizontal surface is constant directly under the omnidirectional microphone array apparatus 2, and the heights $H_O$ and $H_A$ of the calibration marker MAK3 and the target sound source position A from the horizontal surface are the same as each other. Therefore, if the central point O of the calibration marker MAK3 displayed on the display device 36 is designated with the finger FG of the user, the sound collection direction computation section 34 of the directionality control apparatus 3 can easily compute the horizontal direction distance $L_{CMh}$ between the PTZ camera apparatus 1 and the omnidirectional microphone array apparatus 2, and the height $L_{MOv}$ of the omnidirectional microphone array apparatus 2 from the calibration marker MAK3 as calibration parameters, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

In addition, in the directionality control system according to the embodiment of the present invention, respective heights of the imaging part and the sound collection part from a horizontal surface are different from each other, the sound collection part is installed so as to be located within an imaging viewing angle of the imaging part, and the sound collection direction computation part computes a horizontal angle and a vertical angle of a sound collection direction which is directed from the sound collection part to the target sound source position by using a horizontal angle and a vertical angle which are directed from the imaging part toward the sound collection part, a horizontal direction distance between the imaging part and the sound collection part, a horizontal angle which is directed from the sound collection part toward the imaging part, a height of the imaging part from the target sound source position, a height of the sound collection part from the target sound source position, and a horizontal angle and a vertical angle which are directed from the imaging part toward the target sound source position.

In the above-described configuration, the respective heights of the PTZ camera apparatus 1 and the omnidirectional microphone array apparatus 2 from the floor are different from each other, and the omnidirectional microphone array apparatus 2 is present within the imaging viewing angle of the PTZ camera apparatus 1, that is, the omnidirectional microphone array apparatus 2 is installed so as to be displayed on the display device 36. Therefore, the sound collection direction computation section 34 of the directionality control apparatus 3 can easily compute the sound collection direction coordinates indicating a sound collection direction which is directed from the omnidirectional microphone array apparatus 2 toward the target sound source position A by using the horizontal angle $\theta_{CMh}$ and the vertical angle $\theta_{CMv}$, the horizontal direction distance $L_{CMh}$, the respective heights $L_{MOv}$ and $L_{MO}$ of the PTZ camera apparatus 1 and the omnidirectional microphone array apparatus 2 from the target sound source position A, which are computed during calibration, the predefined horizontal angle $\theta_{MCh}$, and the horizontal angle $\theta_{CAh}$ and the vertical angle $\theta_{CAv}$ which are directed from the PTZ camera apparatus 1 toward the target sound source position A.

In addition, the sound collection direction computation section 34 of the directionality control apparatus 3 can easily compute the sound collection direction coordinates which are directed from the omnidirectional microphone array apparatus 2 toward the target sound source position A without the user inputting the height $H_A$ of the target sound source position A from the floor even in a case where the heights of the PTZ camera apparatus 1 and the omnidirectional microphone array apparatus 2 from the floor are different from each other.

In addition, in the directionality control system according to the embodiment of the present invention, a first marker having a constant distance to the sound collection part is suspended directly under the sound collection part, a height of the first marker from the horizontal surface is the same as a height of the target sound source position from the horizontal surface, and the sound collection direction computation part computes a horizontal direction distance between the imaging part and the sound collection part, and a height of the imaging part from the target sound source position, by using a vertical angle which is directed from the imaging part toward the sound collection part, and a vertical angle which is directed from the imaging part toward the first marker, in response to designation of the sound collection part and the first marker displayed on the display part.

In the above-described configuration, the calibration marker MAK having a constant distance ($L_{MOv}$) to the omnidirectional microphone array apparatus 2 is suspended directly under the omnidirectional microphone array apparatus 2, and respective heights $H_O$ and $H_A$ of the calibration marker MAK and the target sound source position A from the floor are the same as each other. Therefore, if two locations including the omnidirectional microphone array apparatus 2 and the calibration marker MAK displayed on the display device 36 are designated with the finger FG of the user, the sound collection direction computation section 34 of the directionality control apparatus 3 can easily compute the horizontal direction distance $L_{CMh}$ between the PTZ camera apparatus 1 and the omnidirectional microphone array apparatus 2 as a calibration parameter, for example, even in a case where the PTZ camera apparatus 1 cannot image a floor surface directly under the omnidirectional microphone array apparatus 2 due to the presence of an obstacle on the floor directly under the omnidirectional microphone array apparatus 2.

Further, in the directionality control system according to the embodiment of the present invention, respective heights of the imaging part and the sound collection part from a horizontal surface are different from each other, the sound collection part is installed so as to be located within an imaging viewing angle of the imaging part, and the sound collection direction computation part computes a horizontal angle and a vertical angle of a sound collection direction which is directed from the sound collection part toward the target sound source position by using a horizontal angle which is directed from the imaging part toward the sound collection part, a horizontal direction distance between the imaging part and the sound collection part, a horizontal angle which is directed from the sound collection part toward the imaging part, the height of the imaging part from the horizontal surface, the height of the sound collection part from the horizontal surface, a horizontal angle and a vertical angle which are directed from the imaging part toward the target sound source position, and an input value of a height of the target sound source position from the horizontal surface.

In the above-described configuration, the respective heights of the PTZ camera apparatus 1 and the omnidirectional microphone array apparatus 2 are different from each other, and the omnidirectional microphone array apparatus 2 is installed so as to be displayed on the display device 36. Therefore, the sound collection direction computation section 34 of the directionality control apparatus 3 can easily compute sound collection direction coordinates indicating a sound collection direction which is directed from the omnidirectional microphone array apparatus 2 toward the target sound source position A by using the horizontal angle $\theta_{CMh}$, the horizontal direction distance $L_{CMh}$, the respective predefined heights $H_C$ and $H_M$ of the PTZ camera apparatus 1 and the omnidirectional microphone array apparatus 2 from the floor surface, which are computed during calibration, the predefined horizontal angle $\theta_{MCh}$, the horizontal angle $\theta_{CAh}$ and the vertical angle $\theta_{CAv}$ which are directed from the PTZ camera apparatus 1 toward the target sound source position A, and the input value of the height $H_A$ of the target sound source position A from the floor, input by the user.

Further, since a value desired by the user can be used as the height $H_A$ of the target sound source position A from the floor, a degree of freedom of selection of the height $H_A$ of the target sound source position A from the floor is improved.

In addition, in the directionality control system according to the embodiment of the present invention, a circular second marker is installed at a position on the horizontal surface directly under the sound collection part, and the sound collection direction computation part computes a horizontal direction distance between the imaging part and the sound collection part, a height of the imaging part from the horizontal surface, and a height of the sound collection part from the horizontal surface, by using a vertical angle which is directed from the imaging part toward the sound collection part, a vertical angle which is directed from the imaging part toward the second marker, and a distance from the imaging part to the second marker, in response to designation of a central point of the second marker displayed on the display part.

In the above-described configuration, the circular calibration floor marker MAK2 is installed at the position on the floor directly under the omnidirectional microphone array apparatus 2. Therefore, if two locations including the central point O of the calibration floor marker MAK2 and the omnidirectional microphone array apparatus 2 displayed on the display device 36 are designated with the finger FG of the user, the sound collection direction computation section 34 of the directionality control apparatus 3 can easily compute the heights $H_C$ and $H_M$ of the PTZ camera apparatus 1 and the omnidirectional microphone array apparatus 2 from the floor, and can also easily compute the horizontal direction distance $L_{CMh}$ between the PTZ camera apparatus 1 and the omnidirectional microphone array apparatus 2 as a calibration parameter.

In addition, in the directionality control system according to the embodiment of the present invention, respective heights of the imaging part and the sound collection part from a horizontal surface are different from each other, the sound collection part is installed so as not to be located within an imaging viewing angle of the imaging part, and the sound collection direction computation part computes a horizontal angle and a vertical angle of a sound collection direction which is directed from the sound collection part to the target sound source position by using a horizontal angle which is directed from the imaging part toward the sound collection part, a horizontal direction distance between the imaging part and the sound collection part, a horizontal angle which is directed from the sound collection part toward the imaging part, a height of the imaging part from the horizontal surface, a height of the sound collection part from the horizontal surface, a horizontal angle and a vertical angle which are directed from the imaging part toward the target sound source position, and an input value of a height of the target sound source position from the horizontal surface.

In the above-described configuration, the respective heights of the PTZ camera apparatus 1 and the omnidirectional microphone array apparatus 2 from the floor are different from each other, and the omnidirectional microphone array apparatus 2 is not present within the imaging viewing angle of the PTZ camera apparatus 1, that is, the omnidirectional microphone array apparatus 2 is installed so as not to be displayed on the display device 36. Therefore, the sound collection direction computation section 34 of the directionality control apparatus 3 can easily compute sound collection direction coordinates indicating a sound collection direction which is directed from the omnidirectional microphone array apparatus 2 toward the target sound source position A by using the horizontal angle $\theta_{CMh}$, the horizontal direction distance $L_{CMh}$, the respective predefined heights $H_C$ and $H_M$ of the PTZ camera apparatus 1 and the omnidirectional microphone array apparatus 2 from the horizontal surface, which are computed during calibration, the predefined horizontal angle $\theta_{MCh}$, the horizontal angle $\theta_{CAh}$ and the vertical angle $\theta_{CAv}$ which are directed from the PTZ camera apparatus 1 toward the target sound source position A, and the input value of the height $H_A$ of the target sound source position A from the horizontal surface, input by the user.

Further, since a value desired by the user can be used as the height $H_A$ of the target sound source position A from the floor, a degree of freedom of selection of the height $H_A$ of the target sound source position A from the floor is improved.

In addition, in the directionality control system according to the embodiment of the present invention, a first marker having a constant distance to the sound collection part is suspended directly under the sound collection part, a circular second marker is installed at a position on the horizontal surface directly under the sound collection part, and the sound collection direction computation part computes a horizontal direction distance between the imaging part and the sound collection part, a height of the imaging part from the horizontal surface, and a height of the sound collection part from the horizontal surface, by using a vertical angle which is directed from the imaging part toward the first marker, a vertical angle which is directed from the imaging part toward the second marker, a distance from the imaging part to the second marker, in response to designation of central points of the first marker and the second marker displayed on the display part.

In the above-described configuration, the calibration marker MAK having a constant distance to the omnidirectional microphone array apparatus 2 is suspended directly under the omnidirectional microphone array apparatus 2, and the circular calibration floor marker MAK2 is installed at the position on the floor directly under the omnidirectional microphone array apparatus 2. Therefore, if two locations including the central points of the calibration marker MAK and the calibration floor marker MAK2 and the omnidirectional microphone array apparatus 2 displayed on the display device 36 are designated with the finger FG of the user, the sound collection direction computation section 34 of the directionality control apparatus 3 can easily compute the heights $H_C$ and $H_M$ of the PTZ camera apparatus 1 and the omnidirectional microphone array apparatus 2 from the horizontal surface, and can also easily compute the horizontal direction distance $L_{CMh}$ between the PTZ camera apparatus 1 and the omnidirectional microphone array apparatus 2 as a calibration parameter.

In addition, in the directionality control system according to the embodiment of the present invention, a circular second marker is installed at a position on the horizontal surface directly under the sound collection part, and the sound collection direction computation part computes a horizontal direction distance between the imaging part and the sound collection part, and a height of the imaging part from the horizontal surface, by using a vertical angle which is directed from the imaging part toward the second marker, and a distance from the imaging part to the second marker, in response to designation of a central point of the second marker displayed on the display part.

In the above-described configuration, the circular calibration floor marker MAK2 is installed at the position on the horizontal surface directly under the omnidirectional microphone array apparatus 2. Therefore, even in a case where the respective heights of the PTZ camera apparatus 1 and the omnidirectional microphone array apparatus 2 from the horizontal surface are different from each other, and the omnidirectional microphone array apparatus 2 is not present within the imaging viewing angle of the PTZ camera apparatus 1, if the central point O of the calibration floor marker MAK2 displayed on the display device 36 is designated with the finger FG of the user, the sound collection direction computation section 34 of the directionality control apparatus 3 can easily compute the height $H_C$ of the PTZ camera apparatus 1 from the floor, and can also easily compute the horizontal direction distance $L_{CMh}$ between the PTZ camera apparatus 1 and the omnidirectional microphone array apparatus 2 as a calibration parameter.

According to another embodiment of the present invention, there is provided a directionality control method for a directionality control system including an imaging part that images a target object in a predetermined sound collection region and a sound collection part that collects sound of the sound collection region, the method including a step of displaying image data of the target object imaged by the imaging part; a step of receiving designation of any position in the displayed image data of the target object; a step of computing a sound collection direction which is directed from the sound collection part toward a target sound source position corresponding to the designated position in the image data in response to the designation of any position in the image data of the target object; and a step of forming sound collection directionality of the sound collected by the sound collection part in the computed sound collection direction.

In the above-described configuration, the PTZ camera apparatus 1 images a target object (for example, a person) present in a predetermined sound collection region by using a casing driving function in a panning direction or a tilting direction, and a zooming function which well-known techniques. The omnidirectional microphone array apparatus 2 collects sound of the target object present in an imaging direction of the PTZ camera apparatus 1. If any position is designated in image data captured by the PTZ camera apparatus 1 and displayed on the display device 36, the sound collection direction computation section 34 of the directionality control apparatus 3 computes sound collection direction coordinates $(\theta_{MAh}, \theta_{MAv})$ in a sound collection direction which is directed from the PTZ camera apparatus 1 toward a target sound source position A corresponding to a designated position A'. The output control section 35 of the directionality control apparatus 3 forms sound collection directionality of sound collected by the omnidirectional microphone array apparatus 2 in the sound collection direction indicated by the computed sound collection direction coordinates $(\theta_{MAh}, \theta_{MAv})$.

Consequently, in the sound collection system 10, since the designated position A' corresponding to the target sound source position A is designated on the display device 36 which displays the image data captured by the PTZ camera apparatus 1, the directionality control apparatus 3 can easily acquire an input parameter (for example, a distance or a direction) which is required to compute a predetermined calibration parameter during calibration which is required in advance prior to computation of sound collection direction coordinates, and can thus easily compute the calibration parameter. Therefore, the directionality control apparatus 3 can easily form sound collection directionality in a sound collection direction which is directed from the omnidirectional microphone array apparatus 2 toward the target sound source position A corresponding to the designated position A' in the image data captured by the PTZ camera apparatus 1 and can thus easily obtain audio data of sound which is collected in the sound collection direction with high accuracy.

(Modification Example of Calibration Method in Eleventh Embodiment)

Next, with reference to FIGS. 82 to 91, a description will be made of a modification example (hereinafter, referred to as the "present modification example") of the calibration method in the sound collection system 10 of the eleventh embodiment. In the present modification example, unlike the above-described method of computing sound collection direction coordinates, front directions (0° directions) of respective horizontal angles of the PTZ camera apparatus 1 and the omnidirectional microphone array apparatus 2 do not oppose each other, and indicates different directions.

Specifically, in the above-described method of controlling sound collection direction coordinates, the horizontal angle $\theta_{MCh}$ of a direction in which the PTZ camera apparatus 1 is viewed from the omnidirectional microphone array apparatus 2 is zero. In other words, the horizontal angle $\theta_{MCh}$ indicating a deviation amount of the X axis direction (a horizontal angle 0° direction; refer to FIG. 82) of the omnidirectional microphone array apparatus 2 is 0, but, in the following present modification example, a case where the horizontal angle $\theta_{MCh}$ is not zero will be described. In addition, in the following present modification example, a method of computing a calibration parameter will be described, and a method of computing sound collection direction coordinates is the same as in the above-described eleventh embodiment, and thus description thereof will be omitted.

(Method of Computing Calibration Parameter According to Eleventh Calibration Method)

In the eleventh calibration method, it is assumed that the heights $H_C$ and $H_M$ of the PTZ camera apparatus 1 and the omnidirectional microphone array apparatus 2 from the horizontal surface (floor surface) are the same as each other but are not known. Calibration parameters in the eleventh calibration method include the horizontal direction distance $L_{CMh}$ between the PTZ camera apparatus 1 and the omnidirectional microphone array apparatus 2, the height $H_C$ of the PTZ camera apparatus 1 from the floor, the height $H_M$ of the omnidirectional microphone array apparatus 2 from the floor, and the horizontal angle $\theta_{MCh}$ indicating a deviation amount of the X axis direction of the omnidirectional microphone array apparatus 2.

FIG. 82(A) is a plan view illustrating a calibration floor marker MAK4 used in the eleventh calibration method. FIG. 82(B) illustrates screens of a point O and a point X enlarged by using the focus function of the PTZ camera apparatus 1. The calibration floor marker MAK4 illustrated in FIG. 82(A) is configured by using, for example, a sheet material. The central point O of the sheet material is provided so as to correspond to a central position of the omnidirectional microphone array apparatus 2 in a vertical lower direction directly thereunder. The point X is provided so as to match a front direction (0° direction) of a horizontal angle of the omnidirectional microphone array apparatus 2. A distance (a radius $R_O$ of a circle) from the central point O of the calibration floor marker MAK4 to the position X is a known (constant) value.

The PTZ camera apparatus 1 focuses the point O of the calibration floor marker MAK4 according to the focus function of the PTZ camera apparatus 1 in response to a user's input operation (for example, a touch operation of the finger FG on the display device 36), so as to compute a distance $L_{CO}$, a horizontal angle $\theta_{COh}$, and a vertical angle $\theta_{COv}$ from the PTZ camera apparatus 1 to the point O. In addition, the PTZ camera apparatus 1 focuses the point X of the calibration floor marker MAK4 according to the focus function of the PTZ camera apparatus 1 in response to a user's input operation (for example, a touch operation of the finger FG on the display device 36), so as to compute a distance $L_{CX}$, a horizontal angle $\theta_{CXh}$, and a vertical angle $\theta_{CXv}$ from the PTZ camera apparatus 1 to the point X. The computation results in the PTZ camera apparatus 1 are transmitted to the directionality control apparatus 3.

FIG. 83(A) is a diagram illustrating a positional relationship between the PTZ camera apparatus 1, the omnidirectional microphone array apparatus 2, and the calibration floor marker MAK4 in the eleventh calibration method. FIG. 83(B) is a horizontal direction plan view of FIG. 83(A). FIG. 83(C) is a sectional view taken along the line K-K' of FIG. 83(B). FIG. 84(A) is a diagram illustrating a positional relationship between the PTZ camera apparatus 1, the omnidirectional microphone array apparatus 2, and the calibration floor marker MAK4 in the eleventh calibration method. FIG. 84(B) is a horizontal direction plan view of FIG. 84(A). FIG. 84(C) is a sectional view taken along the line L-L' of FIG. 84(B).

If two locations (refer to FIG. 82(B)) including the central point O and the point X of the calibration floor marker MAK4 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, the height $H_C$ of the PTZ camera apparatus 1 from the floor, the height $H_M$ of the omnidirectional microphone array apparatus 2 from the floor, and the horizontal angle $\theta_{MCh}$ indicating a deviation amount of the X axis direction of the omnidirectional microphone array apparatus 2 by using the radius $R_O$ of the calibration floor marker MAK4, the distance $L_{CO}$ and the vertical angle $\theta_{COv}$ from the PTZ camera apparatus 1 to the central point O of the calibration floor marker MAK4, and the vertical angle $\theta_{CXv}$ which is directed from the PTZ camera apparatus 1 to the point X of the calibration floor marker MAK4. With reference to FIGS. 83(B) and 83(C), and FIGS. 84(B) and 84(C), a detailed description will be made of a method of computing the horizontal direction distance $L_{CMh}$, the heights $H_M$ and $H_C$, and the horizontal angle $\theta_{MCh}$ in the sound collection direction computation section 34.

The sound collection direction computation section 34 computes the horizontal direction distance $L_{CMh}$ between the PTZ camera apparatus 1 and the omnidirectional microphone array apparatus 2 according to Equation (144), and computes the height $H_C$ of the PTZ camera apparatus 1 from the floor according to Equation (145), by using the distance $L_{CO}$ from the PTZ camera apparatus 1 to the central point O of the calibration floor marker MAK4, and the vertical angle $\theta_{COv}$ which is directed from the PTZ camera apparatus 1 toward the central point O of the calibration floor marker MAK4 in the triangle COM illustrated in FIG. 83(C). In addition, since the calibration floor marker MAK4 is installed at the position on the floor located vertically downward directly under a predetermined position of the omnidirectional microphone array apparatus 2, the horizontal direction distance $L_{COh}$ between the PTZ camera apparatus 1 and the calibration floor marker MAK4 is the same as a horizontal direction distance $L_{CMh}$ between the PTZ camera apparatus 1 and the omnidirectional microphone array apparatus 2 ($L_{COh}=L_{CMh}$).

[Equation 144]

$$L_{COh}=L_{CMh}=L_{CO} \times \cos \theta_{COv} \quad (144)$$

[Equation 145]

$$H_C=H_m=L_{CO} \times \sin \theta_{COv} \quad (145)$$

In addition, the sound collection direction computation section 34 computes the horizontal direction distance $L_{CXh}$ between the PTZ camera apparatus 1 and the point X of the calibration floor marker MAK4 according to Equation (146) by using the distance $L_{CX}$ from the PTZ camera apparatus 1 to the calibration floor marker MAK4, and the vertical angle $\theta_{CXv}$ which is directed from the PTZ camera apparatus 1 toward the point X of the calibration floor marker MAK4 in the triangle CXM illustrated in FIG. 84(C).

[Equation 146]

$$L_{CXh}=L_{CX} \times \cos \theta_{CXv} \quad (146)$$

The sound collection direction computation section 34 computes the horizontal angle $\theta_{MCh}$ indicating a deviation amount of the X axis direction of the omnidirectional microphone array apparatus 2 according to Equation (147) based on the cosine theorem for the triangle CXM illustrated in FIG. 83(B) or 84(B) by using the respective computation results of Equations (144) to (146).

[Equation 147]

$$\theta_{MCh} = \theta_{XCh} = \cos^{-1}\left\{\frac{L_{COh}^2 + R_0^2 - L_{CXh}^2}{2 L_{COh} \times R_0}\right\} \quad (147)$$

As mentioned above, in the eleventh calibration method of the present modification example, if the two locations including the central point O and the point X of the calibration floor marker MAK4 displayed on the display device 36 are designated with the finger FG of the user, the sound collection direction computation section 34 can easily compute the heights $H_C$ and $H_M$ of the PTZ camera apparatus 1 and the omnidirectional microphone array apparatus 2 from the horizontal surface, and can also easily compute the horizontal direction distance $L_{CMh}$ between the PTZ camera apparatus 1 and the omnidirectional microphone array apparatus 2 and the horizontal angle $\theta_{MCh}$ indicating a deviation amount of the X axis direction of the omnidirectional microphone array apparatus 2 as calibration parameters.

Consequently, since a front direction (0° direction) of a horizontal angle of the omnidirectional microphone array apparatus 2 can be specified, the directionality control apparatus 3 can also similarly compute a calibration parameter between each PTZ camera apparatus 1 and the omnidirectional microphone array apparatus 2 in a case of a configuration of a sound collection system in which a plurality of PTZ camera apparatuses 1 are provided for a single omnidirectional microphone array apparatus 2. Thus, there is no limitation on installation of the omnidirectional microphone array apparatus 2, such as the omnidirectional microphone array apparatus 2 being installed so as to be directed toward the PTZ camera apparatus 1, and thus the omnidirectional microphone array apparatus 2 can be easily installed.

(Method of Computing Calibration Parameter According to Twelfth Calibration Method)

In the twelfth calibration method, it is assumed that the heights $H_C$ and $H_M$ of the PTZ camera apparatus 1 and the omnidirectional microphone array apparatus 2 from the horizontal surface (floor surface) are the same as each other and are known. Calibration parameters in the twelfth calibration method include the horizontal direction distance $L_{CMh}$ between the PTZ camera apparatus 1 and the omnidirectional microphone array apparatus 2, and the horizontal angle $\theta_{MCh}$ indicating a deviation amount of the X axis direction of the omnidirectional microphone array apparatus 2. In addition, the height $H_C$ of the PTZ camera apparatus 1 from the floor is known, but may be specifically computed according to the twelfth calibration method. Further, in description of the twelfth calibration method, description of the same content as that in the description of the eleventh calibration method will be omitted or made briefly, and different content will be described.

FIG. 85(A) is a plan view illustrating the calibration floor marker MAK4 used in the twelfth calibration method. FIG. 85(B) illustrates screens of a point O and a point X enlarged by using the focus function of the PTZ camera apparatus 1. The calibration floor marker MAK4 illustrated in FIG. 85(A) is the same as the calibration floor marker MAK4 illustrated in FIG. 82(A), and thus description thereof will be omitted.

FIG. 86(A) is a diagram illustrating a positional relationship between the PTZ camera apparatus 1, the omnidirectional microphone array apparatus 2, and the calibration floor marker MAK4 in the twelfth calibration method. FIG. 86(B) is a horizontal direction plan view of FIG. 86(A). FIG. 86(C) is a sectional view taken along the line K-K' of FIG. 86(B). FIG. 87(A) is a diagram illustrating a positional relationship between the PTZ camera apparatus 1, the omnidirectional microphone array apparatus 2, and the calibration floor marker MAK4 in the twelfth calibration method. FIG. 87(B) is a horizontal direction plan view of FIG. 87(A). FIG. 87(C) is a sectional view taken along the line L-L' of FIG. 87(B).

If two locations (refer to FIG. 85(B)) including the central point O and the point X of the calibration floor marker MAK4 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, and the horizontal angle $\theta_{MCh}$ indicating a deviation amount of the X axis direction of the omnidirectional microphone array apparatus 2, by using the radius $R_O$ of the calibration floor marker MAK4, the distance $L_{CO}$ and the vertical angle $\theta_{COv}$ from the PTZ camera apparatus 1 to the central point O of the calibration floor marker MAK4, and the vertical angle $\theta_{CXv}$ which is directed from the PTZ camera apparatus 1 to the point X of the calibration floor marker MAK4. With reference to FIGS. 86(B) and 86(C), and FIGS. 87(B) and 87(C), a detailed description will be made of a method of computing the horizontal direction distance $L_{CMh}$, the heights, and the horizontal angle $\theta_{MCh}$ in the sound collection direction computation section 34.

The sound collection direction computation section 34 computes the horizontal direction distance $L_{CMh}$ between the PTZ camera apparatus 1 and the omnidirectional microphone array apparatus 2 according to Equation (148) by using the distance $L_{CO}$ from the PTZ camera apparatus 1 to the central point O of the calibration floor marker MAK4, and the vertical angle $\theta_{COv}$ which is directed from the PTZ camera apparatus 1 toward the central point O of the calibration floor marker MAK4 in the triangle COM illustrated in FIG. 86(C). In addition, the sound collection direction computation section 34 may compute the height $H_C$ of the PTZ camera apparatus 1 from the floor according to Equation (148).

[Equation 148]

$$L_{COh} = H_C / \tan\theta_{COv} = L_{CMh} \tag{148}$$

In addition, the sound collection direction computation section 34 computes the horizontal direction distance $L_{CXh}$ between the PTZ camera apparatus 1 and the point X of the calibration floor marker MAK4 according to Equation (149) by using the distance $L_{CX}$ from the PTZ camera apparatus 1 to the calibration floor marker MAK4, the height $H_C$ (a known value) of the PTZ camera apparatus 1 from the horizontal surface or the height $H_C$ of the PTZ camera apparatus 1 from the horizontal surface, computed according to Equation (148), and the vertical angle $\theta_{CXv}$ which is directed from the PTZ camera apparatus 1 toward the point X of the calibration floor marker MAK4 in the triangle CXM illustrated in FIG. 87(C).

[Equation 149]

$$L_{CXh} = H_C / \tan\theta_{CXv} \tag{149}$$

The sound collection direction computation section 34 computes the horizontal angle $\theta_{MCh}$ indicating a deviation amount of the X axis direction of the omnidirectional microphone array apparatus 2 according to Equation (150) based on the cosine theorem for the triangle CXM illustrated in FIG. 86(B) or 87(B) by using the respective computation results of Equations (148) to (149).

[Equation 150]

$$\theta_{MCh} = \theta_{XCh} = \cos^{-1}\left\{\frac{L_{COh}^2 + R_0^2 - L_{CXh}^2}{2L_{COh} \times R_0}\right\} \tag{150}$$

As mentioned above, in the twelfth calibration method of the present modification example, if the two locations including the central point O and the point X of the calibration floor marker MAK4 displayed on the display device 36 are designated with the finger FG of the user, the sound collection direction computation section 34 can easily compute the horizontal direction distance $L_{CMh}$ between the PTZ camera apparatus 1 and the omnidirectional microphone array apparatus 2, and the horizontal angle $\theta_{MCh}$ indicating a deviation amount of the X axis direction of the omnidirectional microphone array apparatus 2 as calibration parameters. In addition, in the twelfth calibration method, the sound collection direction computation section 34 can easily compute the heights $H_C$ and $H_M$ of the PTZ camera apparatus 1 and the omnidirectional microphone array apparatus 2 from the horizontal surface even in a case where the heights $H_C$ and $H_M$ of the PTZ camera apparatus 1 and the omnidirectional microphone array apparatus 2 from the horizontal surface are different from each other.

Consequently, since a front direction (0° direction) of a horizontal angle of the omnidirectional microphone array apparatus 2 can be specified, the directionality control apparatus 3 can also similarly compute a calibration parameter between each PTZ camera apparatus 1 and the omnidirectional microphone array apparatus 2 in a case of a configuration of a sound collection system in which a plurality of PTZ camera apparatuses 1 are provided for a single omnidirectional microphone array apparatus 2. Thus, there is no limitation on installation of the omnidirectional microphone array apparatus 2, such as the omnidirectional microphone array apparatus 2 being installed so as to be directed toward the PTZ camera apparatus 1, and thus the omnidirectional microphone array apparatus 2 can be easily installed.

(Method of Computing Calibration Parameter According to Thirteenth Calibration Method)

In the thirteenth calibration method, it is assumed that the heights $H_C$ and $H_M$ of the PTZ camera apparatus 1 and the omnidirectional microphone array apparatus 2 from the horizontal surface (floor surface) are the same as each other but are not known. Calibration parameters in the thirteenth calibration method include the horizontal direction distance $L_{CMh}$ between the PTZ camera apparatus 1 and the omnidirectional microphone array apparatus 2, the height $H_C$ of the PTZ camera apparatus 1 from the floor, the height $H_M$ of the omnidirectional microphone array apparatus 2 from the floor, and the horizontal angle $\theta_{MCh}$ indicating a deviation amount of the X axis direction of the omnidirectional microphone array apparatus 2. Further, in description of the thirteenth calibration method, description of the same content as that in the description of the eleventh calibration method will be omitted or made briefly, and different content will be described.

FIG. 88(A) is a plan view illustrating a calibration floor marker MAK4 used in the thirteenth calibration method. FIG. 88(B) illustrates screens of points O and O' and a point X enlarged by using the focus function of the PTZ camera apparatus 1. The point O' illustrated in FIG. 88(B) is a point for obtaining the same horizontal angle as a horizontal angle $\theta_{COh}$ from the PTZ camera apparatus 1 to the central point O, and the directionality control apparatus 3 displays a guide line GUD2 on the display device 36 in order to cause a location for obtaining the same horizontal angle to be visually recognized.

The PTZ camera apparatus 1 focuses the central point O of the calibration floor marker MAK4 according to the focus function of the PTZ camera apparatus 1 in response to a user's input operation (for example, a touch operation of the finger FG on the display device 36), so as to compute a distance $L_{CO}$, a horizontal angle $\theta_{COh}$, and a vertical angle $\theta_{COv}$ from the PTZ camera apparatus 1 to the point O. In addition, the PTZ camera apparatus 1 focuses the point X of the calibration floor marker MAK4 according to the focus function of the PTZ camera apparatus 1 in response to a user's input operation (for example, a touch operation of the finger FG on the display device 36), so as to compute a distance $L_{CX}$, a horizontal angle $\theta_{CXh}$, and a vertical angle $\theta_{CXv}$ from the PTZ camera apparatus 1 to the point X. Further, the PTZ camera apparatus 1 focuses the central point O' of the calibration floor marker MAK4 according to the focus function of the PTZ camera apparatus 1 in response to a user's input operation (for example, a touch operation of the finger FG on the display device 36), so as to compute a distance $L_{CO'}$, a horizontal angle $\theta_{CO'h}$, and a vertical angle $\theta_{CO'v}$ from the PTZ camera apparatus 1 to the point O'. The computation results in the PTZ camera apparatus 1 are transmitted to the directionality control apparatus 3.

FIG. 89(A) is a diagram illustrating a positional relationship between the PTZ camera apparatus 1, the omnidirectional microphone array apparatus 2, and the calibration floor marker MAK4 in the thirteenth calibration method. FIG. 89(B) is a horizontal direction plan view of FIG. 89(A). FIG. 89(C) is a sectional view taken along the line K-K' of FIG. 89(B). FIG. 90(A) is a diagram illustrating a positional relationship between the PTZ camera apparatus 1, the omnidirectional microphone array apparatus 2, and the calibration floor marker MAK4 in the thirteenth calibration method. FIG. 90(B) is a horizontal direction plan view of FIG. 90(A). FIG. 90(C) is a sectional view taken along the line L-L' of FIG. 90(B).

If three locations including the central point O, the point X, and the point O' of the calibration floor marker MAK4 displayed on the display device 36 are designated with the finger FG of the user, the sound collection direction computation section 34 computes the horizontal direction distance $L_{CMh}$ between the PTZ camera apparatus 1 and the omnidirectional microphone array apparatus 2, the height $H_C$ of the PTZ camera apparatus 1 from the floor, the height $H_M$ of the omnidirectional microphone array apparatus 2 from the floor, and the horizontal angle $\theta_{MCh}$ indicating a deviation amount of the X axis direction of the omnidirectional microphone array apparatus 2 by using the radius $R_O$ of the calibration floor marker MAK4, the vertical angle $\theta_{COv}$ which is directed from the PTZ camera apparatus 1 to the central point O of the calibration floor marker MAK4, the vertical angle $\theta_{CXv}$ which is directed from the PTZ camera apparatus 1 to the point X of the calibration floor marker MAK4, and the vertical angle $\theta_v$ which is directed from the PTZ camera apparatus 1 to the point O' of the calibration floor marker MAK4. With reference to FIGS. 89(B) and 89(C), and FIGS. 90(B) and 90(C), a detailed description will be made of a method of computing the horizontal direction distance $L_{CMh}$, the heights $H_M$ and $H_C$, and the horizontal angle $\theta_{MCh}$ in the sound collection direction computation section 34.

The sound collection direction computation section 34 obtains a relational expression of the horizontal direction distance $L_{CMh}$ between the PTZ camera apparatus 1 and the omnidirectional microphone array apparatus 2, and the height $H_C$ of the PTZ camera apparatus 1 from the horizontal surface according to Equation (151) by using the vertical angle $\theta_{COv}$ which is directed from the PTZ camera apparatus 1 toward the central point O of the calibration floor marker MAK4, and obtains a relational expression of the horizontal direction distance $L_{CMh}$ between the PTZ camera apparatus 1 and the omnidirectional microphone array apparatus 2, and the height $H_C$ of the PTZ camera apparatus 1 from the horizontal surface according to Equation (152) by using the radius $R_O$ of the calibration floor marker MAK4 and the vertical angle $\theta_{CO'v}$ which is directed from the PTZ camera apparatus 1 toward the point O' of the calibration floor marker MAK4, in the triangle COM illustrated in FIG. 89(C). In addition, since the calibration floor marker MAK4 is installed at the position on the floor located vertically downward directly under a predetermined position of the omnidirectional microphone array apparatus 2, the horizontal direction distance $L_{COh}$ between the PTZ camera apparatus 1 and the calibration floor marker MAK4 is the same as a horizontal direction distance $L_{CMh}$ between the PTZ camera apparatus 1 and the omnidirectional microphone array apparatus 2 ($L_{COh}=L_{CMh}$).

[Equation 151]

$$\tan\theta_{COv} = H_C/L_{CMh} \qquad (151)$$

[Equation 152]

$$\tan\theta_{CO'v} = H_C/(L_{CMh}+R_0) \qquad (152)$$

The sound collection direction computation section 34 computes the horizontal direction distance $L_{CMh}$ between the PTZ camera apparatus 1 and the omnidirectional microphone array apparatus 2 according to Equation (153), and computes the height $H_c$ of the PTZ camera apparatus 1 from the floor according to Equation (154), by using the respective computation results of Equations (151) and (152).

[Equation 153]

$$L_{COh} = R_0 \times \tan\theta_{CO'v}/(\tan\theta_{COv} - \tan\theta_{CO'v}) = L_{CMh} \qquad (153)$$

[Equation 154]

$$H_M = H_C = \tan\theta_{COv} \times L_{CMh} = \frac{R_0 \times \tan\theta_{CO'v} \times \tan\theta_{COv}}{(\tan\theta_{COv} - \tan\theta_{CO'v})} \qquad (154)$$

In addition, the sound collection direction computation section 34 computes the horizontal direction distance $L_{CXh}$ between the PTZ camera apparatus 1 and the point X of the calibration floor marker MAK4 according to Equation (155) by using the computation result of Equation (154) and the vertical angle $\theta_{CXv}$ which is directed from the PTZ camera apparatus 1 toward the point X of the calibration floor marker MAK4 in the triangle CXM illustrated in FIG. 91(C).

[Equation 155]

$$L_{CXh} = H_C / \tan \theta_{CXv} \tag{155}$$

The sound collection direction computation section 34 computes the horizontal angle $\theta_{MCh}$ indicating a deviation amount of the X axis direction of the omnidirectional microphone array apparatus 2 according to Equation (156) based on the cosine theorem for the triangle CXM illustrated in FIG. 89(B) or 90(B) by using the respective computation results of Equations (153) to (155).

[Equation 156]

$$\theta_{MCh} = \theta_{XCh} = \cos^{-1}\left\{\frac{L_{COh}^2 + R_0^2 - L_{CXh}^2}{2L_{COh} \times R_0}\right\} \tag{156}$$

As mentioned above, in the thirteenth calibration method of the present modification example, if the three locations including the central point O, the point O', and the point X of the calibration floor marker MAK4 displayed on the display device 36 are designated with the finger FG of the user, the sound collection direction computation section 34 can easily compute the heights $H_C$ and $H_M$ of the PTZ camera apparatus 1 and the omnidirectional microphone array apparatus 2 from the horizontal surface, and can also easily compute the horizontal direction distance $L_{CMh}$ between the PTZ camera apparatus 1 and the omnidirectional microphone array apparatus 2 and the horizontal angle $\theta_{MCh}$ indicating a deviation amount of the X axis direction of the omnidirectional microphone array apparatus 2 as calibration parameters.

Consequently, since a front direction (0° direction) of a horizontal angle of the omnidirectional microphone array apparatus 2 can be specified, the directionality control apparatus 3 can also similarly compute a calibration parameter between each PTZ camera apparatus 1 and the omnidirectional microphone array apparatus 2 in a case of a configuration of a sound collection system in which a plurality of PTZ camera apparatuses 1 are provided for a single omnidirectional microphone array apparatus 2. Thus, there is no limitation on installation of the omnidirectional microphone array apparatus 2, such as the omnidirectional microphone array apparatus 2 being installed so as to be directed toward the PTZ camera apparatus 1, and thus the omnidirectional microphone array apparatus 2 can be easily installed.

In addition, in the calibration floor marker MAK4 used in the thirteenth calibration method, the user is required to define the point X indicating a front direction (0° direction) of a horizontal angle of the omnidirectional microphone array apparatus 2 in advance. However, the user's work for defining the point X in advance may be omitted, and the user may read the horizontal angle $\theta_{MCh}$ indicating a deviation amount of the X axis direction of the omnidirectional microphone array apparatus 2 from an image obtained by the PTZ camera apparatus 1 and may input the horizontal angle via the operation unit 32 by himself or herself.

In this case, the user uses a calibration floor marker MAK5 with an angle memory illustrated in FIG. 91(A). FIG. 91(A) is a plan view illustrating the calibration floor marker MAK5 with an angle memory. FIG. 91(B) illustrates a screen of points O and O' enlarged by using the focus function of the PTZ camera apparatus 1. In addition, positions of the points O and O' illustrated in FIG. 91(B) are the same as those of the points O and O' illustrated in FIG. 88(B).

If two locations including the central point O and the point O' of the calibration floor marker MAK5 displayed on the display device 36 are designated with the finger FG of the user, and angle information read from an image is also input via the operation unit 32 by the user, the sound collection direction computation section 34 computes the horizontal direction distance $L_{CMh}$ between the PTZ camera apparatus 1 and the omnidirectional microphone array apparatus 2, the height $H_C$ of the PTZ camera apparatus 1 from the floor, and the height $H_M$ of the omnidirectional microphone array apparatus 2 from the floor, by using the radius $R_O$ of the calibration floor marker MAK5, the vertical angle $\theta_{COv}$ which is directed from the PTZ camera apparatus 1 toward the central point O of the calibration floor marker MAK5, and the vertical angle $\theta_{CO'v}$ which is directed from the PTZ camera apparatus 1 to the point O' of the calibration floor marker MAK5. The horizontal angle $\theta_{MCh}$ indicating a deviation amount of the X axis direction of the omnidirectional microphone array apparatus 2 is the value which is input by the user via the operation unit 32. The following method of computing a calibration parameter is the same as the calibration method of the fourth embodiment, the unknown horizontal angle $\theta_{MCh}$ indicating a deviation amount of the X axis direction of the omnidirectional microphone array apparatus 2 is input by the user, and thus description thereof will be omitted.

This application is based on Japanese Patent Application No. 2013-028402, filed Feb. 15, 2013, Japanese Patent Application No. 2013-119850, filed Jun. 6, 2013, Japanese Patent Application No. 2013-129964, filed Jun. 20, 2013, Japanese Patent Application No. 2013-154867, filed Jul. 25, 2013, and Japanese Patent Application No. 2013-217707, filed Oct. 18, 2013; the entire contents of which are incorporated herein by reference.

INDUSTRIAL APPLICABILITY

The present invention is useful as a directionality control system and a directionality control method, in which sound collection directionality is formed toward a location or in a direction corresponding to a position designated in a video of a predetermined region imaged by a camera apparatus with a microphone array apparatus as a reference, and thus audio data is collected in the corresponding direction with high accuracy.

The present invention is useful as a calibration method of matching a reference direction of a horizontal angle of coordinates indicating an imaging direction of a camera apparatus with a reference direction of a horizontal angle of coordinates indicating a sound collection direction of a microphone array apparatus in a case where the camera apparatus and the microphone array apparatus are integrally used.

The present invention is useful as a directionality control system and a horizontal deviation angle computation method, in which a horizontal deviation angle indicating an angle between a 0° direction of each horizontal angle of imaging direction coordinates of a camera apparatus and sound collection direction coordinates of a microphone array apparatus and mutual reference directions connecting both the apparatuses to each other is computed, and thus the microphone array apparatus can appropriately collect conversation voice of a subject who is present in an imaging direction of the camera apparatus.

The present invention is useful as a directionality control system and a directionality control method, in which a height of a target sound source position present in a sound collection space from a reference surface is determined, and sound collection directionality is formed in a sound collection direction which is directed from a microphone array apparatus toward the target sound source position based on the height of the target sound source position from the reference surface.

The present invention is useful as a directionality control system and a directionality control method, in which sound collection directionality is formed in a sound collection direction which is directed toward a target sound source position corresponding to a position designated in an captured by a camera apparatus with a microphone array apparatus as a reference, and sound is collected in the sound collection direction with high accuracy.

REFERENCE SIGNS LIST

1: PTZ CAMERA APPARATUS SYSTEM
1Z, 1A, 1B, AND 1C: SOUND COLLECTION
2, 2A, 2B, 2C, AND 2D: MICROPHONE ARRAY APPARATUS (OMNIDIRECTIONAL MICROPHONE ARRAY APPARATUS)
3, 3A, 3B, 3C: DIRECTIONALITY CONTROL APPARATUS
3z, 3A, 3C, AND 3D: OMNIDIRECTIONAL CAMERA APPARATUS
4: RECORDER (RECORDER APPARATUS)
5, 5A, 5B, AND 5C: OMNIDIRECTIONAL MICROPHONE ARRAY APPARATUS
7: ATTACHMENT MEMBER
7a AND 7b: ENGAGEMENT PIECE
7c AND 7d: HOLE PORTION
7e: SCREW HOLE
8: CEILING SURFACE
10 AND 10A: DIRECTIONALITY CONTROL SYSTEM (SOUND COLLECTION SYSTEM)
11 AND 11n: CAMERA APPARATUS
11y: KEY
11z: OMNIDIRECTIONAL CAMERA APPARATUS
13: OPENING
15: KEY GROOVE
17: CASING
18: MICROPHONE UNIT
21z AND 23z: MARKER
26: ADDER
31 AND 31A: COMMUNICATION UNIT
32: OPERATION UNIT
33, 33A, 33B, 33C: SIGNAL PROCESSING UNIT
34: SOUND COLLECTION DIRECTION COMPUTATION SECTION
34a: SOUND SOURCE HEIGHT DETERMINATION SECTION
34b: SOUND COLLECTION DIRECTIONAL DIRECTION COMPUTATION SECTION
34c: OUTPUT CONTROL SECTION
34w: HORIZONTAL DEVIATION ANGLE COMPUTATION SECTION
34x: COORDINATE COMPUTATION SECTION
34z: COORDINATE TRANSFORM PROCESSING SECTION
35: OUTPUT CONTROL SECTION
36: DISPLAY DEVICE
37: SPEAKER DEVICE
38, 38A, AND 38B: MEMORY
61: TOOL
63: MARK
61A: TOOL IMAGE
63A: MARK IMAGE
71: ENGAGEMENT HOLE
221, 222, 223, 22($n$–1), AND 22$n$: MICROPHONE
241, 242, 243, 24($n$–1), AND 24$n$: A/D CONVERTER
251, 252, 253, 25($n$–1), AND 25$n$: DELAY DEVICE
C1: CALIBRATION OMNIDIRECTIONAL CAMERA APPARATUS
CF1, CF2, AND CF3: CONFIGURATION FILE

The invention claimed is:

1. A calibration method, comprising:
positioning a camera apparatus which captures a video of a predetermined imaging region and a microphone array apparatus which collects sound of the imaging region of the camera apparatus on a same axis;
attaching the camera apparatus to a circumferential edge of an opening formed at a center of a casing of the microphone array apparatus;
attaching a tool indicating a horizontal angle reference direction of the microphone array apparatus to both opposing ends of the casing of the microphone array apparatus;
causing the camera apparatus to capture an image of the tool;
computing a deviation amount of a horizontal angle reference direction of the camera apparatus relative to the horizontal angle reference direction of the microphone array apparatus based on the captured image of the tool; and
matching the respective horizontal angle reference directions of the camera apparatus and the microphone array apparatus with each other on a plane perpendicular to the same axis by adjusting a horizontal angle of a sound collection direction of the microphone array apparatus by using the computed deviation amount.

* * * * *